US010145996B2

United States Patent
DeMeio et al.

(10) Patent No.: US 10,145,996 B2
(45) Date of Patent: *Dec. 4, 2018

(54) PHOTOCHROMIC ARTICLES THAT INCLUDE PHOTOCHROMIC-DICHROIC MATERIALS

(71) Applicant: Transitions Optical, Inc., Pinellas Park, FL (US)

(72) Inventors: Rachael L. DeMeio, Gibsonia, PA (US); Darrin R. Dabideen, Monroeville, PA (US); Meng He, Palm Harbor, FL (US); Anil Kumar, Murrysville, PA (US); Sujit Mondal, Gibsonia, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 316 days.

This patent is subject to a terminal disclaimer.

(21) Appl. No.: 15/050,500

(22) Filed: Feb. 23, 2016

(65) Prior Publication Data

US 2016/0209561 A1 Jul. 21, 2016

Related U.S. Application Data

(63) Continuation of application No. 13/835,413, filed on Mar. 15, 2013, now Pat. No. 9,334,439.

(51) Int. Cl.
| | |
|---|---|
| *G02B 5/23* | (2006.01) |
| *G02C 7/02* | (2006.01) |
| *G02C 7/10* | (2006.01) |
| *G03C 1/685* | (2006.01) |
| *G03C 1/695* | (2006.01) |
| *G03C 1/73* | (2006.01) |
| *B60J 3/00* | (2006.01) |
| *C09K 9/02* | (2006.01) |
| *G02B 1/04* | (2006.01) |
| *G02B 5/20* | (2006.01) |
| *G02B 5/22* | (2006.01) |
| *G02B 1/10* | (2015.01) |

(52) U.S. Cl.
CPC ................ *G02B 5/23* (2013.01); *B60J 3/007* (2013.01); *C09K 9/02* (2013.01); *G02B 1/043* (2013.01); *G02B 5/208* (2013.01); *G02B 5/223* (2013.01); *G02C 7/102* (2013.01); *G03C 1/685* (2013.01); *G03C 1/695* (2013.01); *G03C 1/73* (2013.01); *C09K 2211/1029* (2013.01); *C09K 2211/1033* (2013.01); *C09K 2211/1088* (2013.01); *G02B 1/10* (2013.01)

(58) Field of Classification Search
CPC ............. G03C 1/73; G03C 1/685; G02B 5/23
See application file for complete search history.

(56) References Cited

U.S. PATENT DOCUMENTS

| | | | |
|---|---|---|---|
| 5,808,063 | A | 9/1998 | Kumar |
| 7,166,357 | B2 | 1/2007 | Kumar et al. |
| 9,334,439 | B2 * | 5/2016 | DeMeio .................. G03C 1/73 |
| 2004/0185268 | A1 | 9/2004 | Kumar et al. |
| 2011/0129678 | A1 | 6/2011 | He et al. |
| 2011/0140056 | A1 | 6/2011 | He et al. |
| 2011/0143141 | A1 | 6/2011 | He et al. |
| 2011/0279883 | A1 | 11/2011 | Kumar et al. |
| 2012/0120473 | A1 | 5/2012 | Kumar et al. |

FOREIGN PATENT DOCUMENTS

| | | |
|---|---|---|
| WO | 9916772 A1 | 4/1999 |
| WO | 2004085569 A2 | 10/2004 |
| WO | 2005005570 A1 | 1/2005 |
| WO | 2012082299 A1 | 6/2012 |
| WO | 2012082383 A1 | 6/2012 |
| WO | 2012170066 A1 | 12/2012 |

* cited by examiner

*Primary Examiner* — Ramsey E Zacharia
(74) *Attorney, Agent, or Firm* — The Webb Law Firm

(57) ABSTRACT

The present invention relates to photochromic articles that include a substrate and at least one photochromic material that is adapted to change from an unactivated form to an activated form by exposure to radiation substantially in the wavelength range from 380 to 450 nanometers when measured over a range of from 380 to 700 nanometers. The photochromic article is also adapted to retain at least 12 percent of the delta OD measured in the Outdoor Test when tested in the Behind the Windshield Test. The photochromic material can be selected from certain compounds including, for example, fluoranthenoxazines, naphthopyrans, phenanthropyrans, fluoranthenopyrans, and indenonaphthopyrans, which each have bonded thereto at least one chiral or achiral lengthening group that provides the photochromic compound with dichroic properties. The present invention also relates to methods of forming a photochromic article.

30 Claims, No Drawings

PHOTOCHROMIC ARTICLES THAT INCLUDE PHOTOCHROMIC-DICHROIC MATERIALS

CROSS REFERENCE TO RELATED APPLICATION

This application is a continuation of, and claims and is entitled to the benefit of U.S. patent application Ser. No. 13/835,413, filed Mar. 15, 2013, the disclosure of which is incorporated herein by reference in its entirety.

FIELD

The present invention relates to photochromic articles that include a substrate and one or more photochromic-dichroic materials that each include at least one chiral or achiral lengthening group, and which have photochromic activity when an ultraviolet radiation blocking transparency is interposed between the photochromic article and a source of actinic radiation.

BACKGROUND

Conventional linearly polarizing elements, such as linearly polarizing lenses for sunglasses and linearly polarizing filters, are typically formed from stretched polymer sheets containing a dichroic material, such as a dichroic dye. Consequently, conventional linearly polarizing elements are static elements having a single, linearly polarizing state. Accordingly, when a conventional linearly polarizing element is exposed to either randomly polarized radiation or reflected radiation of the appropriate wavelength, some percentage of the radiation transmitted through the element will be linearly polarized.

In addition, conventional linearly polarizing elements are typically tinted. Typically, conventional linearly polarizing elements contain a coloring agent and have an absorption spectrum that does not vary in response to actinic radiation. The color of the conventional linearly polarizing element will depend upon the coloring agent used to form the element, and most commonly, is a neutral color (for example, brown or gray). Thus, while conventional linearly polarizing elements are useful in reducing reflected light glare, because of their tint, they are typically not well suited for use under low-light conditions.

Conventional linearly polarizing elements are typically formed using sheets of stretched polymer films containing a dichroic material. Correspondingly, while dichroic materials are capable of preferentially absorbing one of two orthogonal plane polarized components of transmitted radiation, if the molecules of the dichroic material are not suitably positioned or arranged, no net linear polarization of transmitted radiation will be achieved. Without intending to be bound by any theory it is believed that due to the random positioning of the molecules of the dichroic material, selective absorption by the individual molecules will cancel each other such that no net or overall linear polarizing effect is achieved. As such, it is typically necessary to position or arrange the molecules of the dichroic material by alignment with another material so as to achieve a net linear polarization.

A common method of aligning the molecules of a dichroic dye involves heating a sheet or layer of polyvinyl alcohol ("PVA") to soften the PVA and then stretching the sheet to orient the PVA polymer chains. Thereafter, the dichroic dye is impregnated into the stretched sheet, and the impregnated dye molecules adopt the orientation of the polymer chains. Resultantly, at least some of the dye molecules become aligned, such that the long axis of each aligned dye molecule is generally parallel to the oriented polymer chains. Alternatively, the dichroic dye can be first impregnated into the PVA sheet, and thereafter the sheet can be heated and stretched as described above to orient the PVA polymer chains and associated dye. In this manner, the molecules of the dichroic dye can be suitably positioned or arranged amongst the oriented polymer chains of the PVA sheet, and a net linear polarization can be correspondingly achieved. As a result, the PVA sheet can be made to linearly polarize transmitted radiation, and correspondingly a linearly polarizing filter can thus be formed.

Conventional photochromic elements, such as photochromic lenses that are formed using conventional photochromic materials are generally capable of converting from a first state, for example a "clear state," to a second state, for example a "colored state," in response to exposure to actinic radiation, and reverting back to the first state when exposure to the actinic radiation is discontinued or reduced. Thus, conventional photochromic elements are generally well suited for use in both low-light and bright conditions. Conventional photochromic elements, however, that do not include linearly polarizing filters are generally not capable of linearly polarizing radiation. The absorption ratio of conventional photochromic elements, in either state, is generally less than two. Therefore, conventional photochromic elements are not capable of reducing reflected light glare to the same extent as conventional linearly polarizing elements.

With conventional photochromic elements that are activated by exposure to actinic radiation that includes ultraviolet (UV) light, when a UV light absorbing filter is positioned between the source of actinic radiation and the conventional photochromic element, the conventional photochromic element typically will not be sufficiently converted from a first non-colored state to a second colored state. An example of such a UV light absorbing filter is a transparency that includes at least one layer of silica-based glass, such as windshields used in automotive, nautical, aircraft, and railway applications.

It would be desirable to develop new photochromic articles that provide a combination of photochromic properties and linearly polarizing properties that are both activated by exposure to a source of actinic radiation passing through a transparent filter, such as a windshield.

SUMMARY

In accordance with some embodiments of the present invention there is provided a photochromic article that comprises: (a) a substrate; and (b) at least one photochromic material adapted to change from an unactivated form to an activated form by exposure to radiation substantially in the wavelength range from 380 to 450 nanometers when measured over a range of from 380 to 700 nanometers. The photochromic article is adapted to retain at least 12 percent of the delta OD ($\Delta$OD) measured in the Outdoor Test when tested in the Behind the Windshield Test. The photochromic material (b) is chosen from one or more photochromic materials (1) through (14) as described further herein below. The photochromic material (b) is, with some embodiments, a photochromic-dichroic material.

With some embodiments, the photochromic material is chosen from (1) at least one photochromic material chosen from at least one fluoranthenoxazine represented by the following Formula (I),

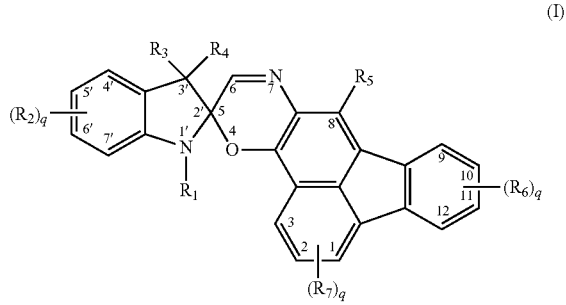

With reference to Formula (I), (a) $R_1$ is chosen from hydrogen, $C_1$-$C_8$ alkyl, $C_3$-$C_7$ cycloalkyl, phen($C_1$-$C_4$)alkyl, naphth($C_1$-$C_4$)alkyl, allyl, acryloyloxy($C_2$-$C_6$)alkyl, methacryloyloxy($C_2$-$C_6$)alkyl, $C_2$-$C_4$ acyloxy($C_2$-$C_6$)alkyl, carboxy($C_2$-$C_6$)alkyl, cyano($C_2$-$C_6$)alkyl, hydroxy($C_2$-$C_6$) alkyl, triarylsilyl, triarylsilyloxy, tri($C_1$-$C_6$)alkylsilyl, tri($C_1$-$C_6$)alkylsilyloxy, tri($C_1$-$C_6$)alkoxysilyl, tri($C_1$-$C_6$) alkoxysilyloxy, di($C_1$-$C_6$)alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ alkyl)silyl, di($C_1$-$C_6$)alkoxy($C_1$-$C_6$ alkyl)silyloxy, $C_1$-$C_6$ alkoxy($C_2$-$C_4$)alkyl or $(C_2H_4O)_r$—$CH_3$, wherein r is an integer from 1 to 6.

With further reference to Formula (I), (b) $R_2$ is chosen from $C_1$-$C_5$ alkyl, $C_1$-$C_5$ alkoxy, nitro, cyano, $C_1$-$C_8$ alkoxycarbonyl, $C_1$-$C_4$ acyloxy, halo, $C_1$-$C_4$ monohaloalkyl or $C_1$-$C_4$ polyhaloalkyl; said halo substituents being chloro, fluoro, iodo or bromo and q is 0, 1 or 2.

With additional reference to Formula (I), (c) $R_3$ and $R_4$ are each independently chosen from $C_1$-$C_5$ alkyl, benzyl, phenyl, mono- or di-substituted phenyl, said phenyl substituents being $C_1$-$C_5$ alkyl or $C_1$-$C_5$ alkoxy; or $R_3$ and $R_4$ taken together form a group chosen from a cyclic ring of from 5 to 8 carbon atoms which includes the spiro carbon atom.

With further additional reference to Formula (I), (d) $R_5$ is chosen from hydrogen, —$CH_2Q$ and —$C(O)W$, wherein Q is halogen, hydroxy, benzoyloxy, $C_1$-$C_6$ alkoxy, $C_2$-$C_6$ acyloxy, amino, $C_1$-$C_6$ mono-alkylamino, $C_1$-$C_6$ dialkylamino, morpholino, piperidino, 1-indolinyl, pyrrolidyl, triarylsilyl, triarylsilyloxy, tri($C_1$-$C_6$)alkylsilyl, tri($C_1$-$C_6$)alkylsilyloxy, tri($C_1$-$C_6$)alkoxysilyl, tri($C_1$-$C_6$)alkoxysilyloxy, di($C_1$-$C_6$) alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ alkyl)silyl, di($C_1$-$C_6$)alkoxy ($C_1$-$C_6$ alkyl)silyloxy, or the group, —$OCH(R_8)Z$; W is the group, —$OCH(R_8)Z$, or an unsubstituted, mono-substituted, or di-substituted heterocyclic ring containing 5 to 6 ring atoms, which ring includes as the hetero atom a nitrogen atom alone or one additional hetero atom of nitrogen or oxygen; wherein Z is —CN, —$CF_3$, halogen, —$C(O)R_8$, or —$COOR_8$, $R_8$ is hydrogen or $C_1$-$C_6$ alkyl; said heterocyclic ring substituents being chosen from $C_1$-$C_6$ alkyl or $C_1$-$C_6$ alkoxy; or W is —$OR_9$ or —$N(R_{10})R_{11}$, wherein $R_9$ is chosen from hydrogen, allyl, $C_1$-$C_6$ alkyl, phenyl, mono($C_1$-$C_6$)alkyl substituted phenyl, mono($C_1$-$C_6$)alkoxy-substituted phenyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl, or $C_1$-$C_6$ haloalkyl; and $R_{10}$ and $R_{11}$ are each independently chosen from hydrogen, $C_1$-$C_6$ alkyl, $C_5$-$C_7$ cycloalkyl, phenyl, mono- or di-substituted phenyl, or $R_{10}$ and $R_{11}$ together with the nitrogen atom form a mono- or di-substituted or unsubstituted heterocyclic ring containing from 5 to 6 ring atoms, which ring includes as the hetero atom said nitrogen atom alone or one additional hetero atom of nitrogen or oxygen, said phenyl and heterocyclic ring substituents being $C_1$-$C_6$ alkyl or $C_1$-$C_6$ alkoxy, and each of said halogen or halo groups in this part (d) being fluoro or chloro.

With additional further reference to Formula (I), (e) each $R_6$ and $R_7$ is independently chosen for each occurrence from aryl, mono($C_1$-$C_6$)alkoxyaryl, di($C_1$-$C_6$)alkoxyaryl, mono ($C_1$-$C_6$)alkylaryl, di($C_1$-$C_6$)alkylaryl, bromoaryl, chloroaryl, fluoroaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_6$)alkyl, $C_3$-$C_7$ cycloalkyloxy($C_1$-$C_6$)alkoxy, aryl($C_1$-$C_6$)alkyl, aryl($C_1$-$C_6$) alkoxy, aryloxy, aryloxy($C_1$-$C_6$)alkyl, aryloxy($C_1$-$C_6$) alkoxy, mono- or di($C_1$-$C_6$)alkylaryl($C_1$-$C_6$)alkyl, mono- or di($C_1$-$C_6$)alkoxyaryl($C_1$-$C_6$)alkyl, mono- or di($C_1$-$C_6$)alkylaryl($C_1$-$C_6$)alkoxy, mono- or di($C_1$-$C_6$)alkoxyaryl($C_1$-$C_6$) alkoxy, amino, mono($C_1$-$C_6$)alkylamino, di($C_1$-$C_6$)alkylamino, diarylamino, N—($C_1$-$C_6$)alkylpiperazino, N-arylpiperazino, aziridino, indolino, piperidino, arylpiperidino, morpholino, thiomorpholino, tetrahydroquinolino, tetrahydroisoquinolino, pyrryl, $C_1$-$C_6$ alkyl, $C_1$-$C_6$ bromoalkyl, $C_1$-$C_6$ chloroalkyl, $C_1$-$C_6$ fluoroalkyl, $C_1$-$C_6$ alkoxy, mono ($C_1$-$C_6$)alkoxy($C_1$-$C_4$)alkyl, acryloxy, methacryloxy, bromo, chloro or fluoro; and q is independently chosen for each occurrence form the integer 0, 1, or 2.

With the fluoranthenoxazine represented by the following Formula (I), there is the proviso that at least one of and less than all of $R_1$, $R_2$ independently for each q, $R_3$, $R_4$, $R_5$, $R_6$ independently for each q, and $R_7$ independently for each q, is in each case independently an L-Group as defined further herein below.

With some embodiments, the photochromic material is chosen from (2) at least one photochromic material chosen from at least one naphthopyran represented by the following Formula (II),

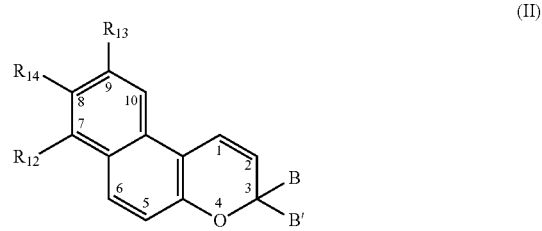

With reference to Formula (II), (a) $R_{12}$ is hydrogen or a $C_1$-$C_6$ alkyl; and (b) $R_{13}$ is hydrogen or the group, —$C(O)J$, J being —$OR_{15}$ or —$N(R_{10})R_{11}$, wherein $R_{15}$ is hydrogen, allyl, $C_1$-$C_6$ alkyl, phenyl, $C_1$-$C_6$ monoalkyl substituted phenyl, $C_1$-$C_6$ monoalkoxy substituted phenyl, phenyl($C_1$-$C_3$)alkyl, $C_1$-$C_6$ monoalkyl substituted phenyl($C_1$-$C_3$)alkyl, $C_1$-$C_6$ monoalkoxy substituted phenyl($C_1$-$C_3$)alkyl, $C_1$-$C_6$ alkoxy($C_2$-$C_4$)alkyl, or $C_1$-$C_6$ monohaloalkyl, and wherein $R_{10}$ and $R_{11}$ are the same as described hereinbefore in (1)(d), and said halo substituent being chloro or fluoro.

With further reference to Formula (II), (c) $R_{14}$ is —$OR_9$, —$N(R_{10})R_{11}$, wherein $R_9$, $R_{10}$ and $R_{11}$ are the same as described hereinbefore in (1)(d), or the group, —$C(O)V$; wherein V is $C_1$-$C_6$ alkyl, phenyl, $C_1$-$C_6$ mono- or $C_1$-$C_6$ di-alkyl substituted phenyl, $C_1$-$C_6$ mono- or $C_1$-$C_6$ di-alkoxy substituted phenyl, $C_1$-$C_6$ alkoxy, phenoxy, $C_1$-$C_6$ mono- or $C_1$-$C_6$ di-alkyl substituted phenoxy, $C_1$-$C_6$ mono- or $C_1$-$C_6$ di-alkoxy substituted phenoxy, $C_1$-$C_6$ alkylamino, phenylamino, $C_1$-$C_6$ mono- or $C_1$-$C_6$ di-alkyl substituted phenylamino, or $C_1$-$C_6$ mono- or $C_1$-$C_6$ di-alkoxy substituted phenylamino, and said halo substituent being chloro, fluoro or bromo, provided that either $R_{12}$ or $R_{13}$ is hydrogen.

With additional reference to Formula (II), (d) B and B' are each independently chosen from the following (i) through (ix). With some embodiments, B and B' of Formula (II) are each independently selected from (i) mono-T-substituted phenyl, wherein the group T is represented by the formula,

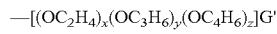

wherein -G being chosen from —C(O)— or —CH$_2$—, G' being chosen from $C_1$-$C_3$ alkoxy or a polymerizable group, x, y and z each being independently chosen from a number between 0 and 50, and the sum of x, y and z being between 2 and 50.

With some additional embodiments, B and B' of Formula (II) are each independently selected from (ii) an unsubstituted, mono-, di-, or tri-substituted aryl group, phenyl or naphthyl.

With some further embodiments, B and B' of Formula (II) are each independently selected from (iii) 9-julolidinyl or the unsubstituted, mono- or di-substituted heteroaromatic group chosen from pyridyl furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl or fluorenyl, each of said aryl and heteroaromatic substituents in (ii) and (iii) being independently chosen from hydroxy, —C(O)U, wherein U being hydroxy, $C_1$-$C_6$ alkyl, $C_1$-$C_6$ alkoxy, phenyl, mono-substituted phenyl, amino, mono ($C_1$-$C_6$)alkylamino, di-($C_1$-$C_6$)alkylamino, morpholino, piperidino or pyrrolidyl; aryl, mono($C_1$-$C_6$)alkoxyaryl, di($C_1$-$C_6$)alkoxyaryl, mono($C_1$-$C_6$)alkylaryl, di($C_1$-$C_6$)alkylaryl, chloroaryl, fluoroaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_6$)alkyl, $C_3$-$C_7$ cycloalkyloxy($C_1$-$C_6$)alkoxy, aryl ($C_1$-$C_6$)alkyl, aryl($C_1$-$C_6$)alkoxy, aryloxy, aryloxy($C_1$-$C_6$) alkyl, aryloxy($C_1$-$C_6$)alkoxy, mono- or di-($C_1$-$C_6$)alkylaryl ($C_1$-$C_6$)alkyl, mono- or di-($C_1$-$C_6$)alkoxyaryl($C_1$-$C_6$)alkyl, mono- or di-($C_1$-$C_6$)alkylaryl($C_1$-$C_6$)alkoxy, mono- or di-($C_1$-$C_6$)alkoxyaryl($C_1$-$C_6$)alkoxy, amino, mono($C_1$-$C_6$)alkylamino, di($C_1$-$C_6$)alkylamino, diarylamino, piperazino, N—($C_1$-$C_6$)alkylpiperazino, N-arylpiperazino, aziridino, indolino, piperidino, morpholino, thiomorpholino, tetrahydroquinolino, tetrahydroisoquinolino, pyrrolidyl, $C_1$-$C_6$ alkyl, $C_1$-$C_6$ chloroalkyl, $C_1$-$C_6$ fluoroalkyl, $C_1$-$C_6$ alkoxy, mono($C_1$-$C_6$)alkoxy($C_1$-$C_4$)alkyl, acryloxy, methacryloxy, bromo, chloro or fluoro, said aryl being chosen from phenyl or naphthyl.

With some further embodiments, B and B' of Formula (II) are each independently selected from (iv) an unsubstituted or mono-substituted group chosen from pyrazolyl, imidazolyl, pyrazolinyl, imidazolinyl, pyrrolinyl, phenothiazinyl, phenoxazinyl, phenazinyl or acridinyl, each of said substituents being independently chosen from $C_1$-$C_6$ alkyl, $C_1$-$C_6$ alkoxy, phenyl, fluoro, chloro or bromo.

In accordance with some embodiments, B and B' of Formula (II) are each independently selected from (v) a monosubstituted phenyl, said phenyl having a substituent located at the para position being —(CH$_2$)$_r$— or —O—(CH$_2$)$_r$—, wherein r being chosen from the integer 1, 2, 3, 4, 5 or 6, said substituent being connected to an aryl group which is a member of another photochromic material.

In accordance with some further embodiments, B and B' of Formula (II) are each independently selected from (vi) a group represented by one of the following formulas,

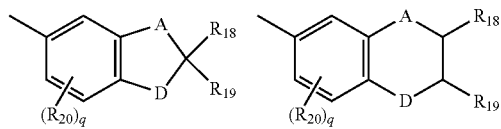

wherein A is independently chosen in each formula from methylene or oxygen and D being independently chosen in each formula from oxygen or substituted nitrogen, provided that when D is substituted nitrogen, A is methylene; said nitrogen substituents being chosen from hydrogen, $C_1$-$C_6$ alkyl, or $C_2$-$C_6$ acyl; each $R_{20}$ being independently chosen for each occurrence in each formula from $C_1$-$C_6$ alkyl, $C_1$-$C_6$ alkoxy, hydroxy, chloro or fluoro; $R_{18}$ and $R_{19}$ each being independently chosen in each formula from hydrogen or $C_1$-$C_6$ alkyl; and q being chosen from the integer 0, 1 or 2.

In accordance with some further embodiments, B and B' of Formula (II) are each independently selected from (vii) $C_1$-$C_6$ alkyl, $C_1$-$C_6$ chloroalkyl, $C_1$-$C_6$ fluoroalkyl, $C_1$-$C_6$ alkoxy($C_1$-$C_4$)alkyl, $C_3$-$C_6$ cycloalkyl, mono($C_1$-$C_6$)alkoxy ($C_3$-$C_6$)cycloalkyl, mono($C_1$-$C_6$)alkyl($C_3$-$C_6$)-cycloalkyl, chloro($C_3$-$C_6$)cycloalkyl, fluoro($C_3$-$C_6$)cyclo-alkyl or $C_4$-$C_{12}$ bicycloalkyl.

In accordance with some additional embodiments, B and B' of Formula (II) are each independently selected from (viii) a group represented by the following formula,

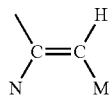

wherein N is chosen from hydrogen or $C_1$-$C_4$ alkyl and M is chosen from an unsubstituted, mono-, or di-substituted group chosen from naphthyl, phenyl, furanyl, or thienyl; each of said group substituents being independently chosen from $C_1$-$C_4$ alkyl, $C_1$-$C_4$ alkoxy, fluoro, or chloro.

In accordance with some further additional embodiments, B and B' of Formula (II) are each independently selected from (ix) B and B' taken together form fluoren-9-ylidene, mono-, or di-substituted fluoren-9-ylidene or a group being independently chosen from saturated $C_3$-$C_{12}$ spiro-monocyclic hydrocarbon rings, saturated $C_7$-$C_{12}$ spiro-bicyclic hydrocarbon rings or saturated $C_7$-$C_{12}$ spiro-tricyclic hydrocarbon rings; each of said fluoren-9-ylidene substituents being independently chosen from $C_1$-$C_4$ alkyl, $C_1$-$C_4$ alkoxy, fluoro or chloro.

With the naphthopyran represented by the following Formula (II), there is the proviso that at least one of and less than all of $R_{12}$, $R_{13}$, $R_{14}$, B, and B' is in each case independently an L-Group as defined further herein below.

With some embodiments, the photochromic material is chosen from (3) at least one photochromic material chosen from at least one naphthopyran represented by the following Formula (III),

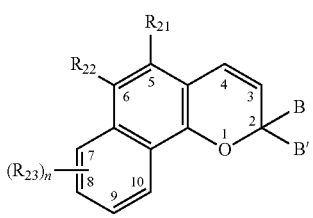

With reference to Formula (III): (a) $R_{21}$ is the group, —C(O)W or $CH_2Q$, described hereinbefore in (1)(d), with regard to Formula (I); (b) $R_{22}$ and each $R_{23}$ are independently chosen for each occurrence from hydroxyl, $NH_2$ or N(R)H, wherein R is $C_1$-$C_6$ alkyl or aryl and n is chosen from the integers 0, 1, 2, or 3; and (c) B and B' are each independently chosen from the groups (i)-(ix) described hereinbefore in (2)(d), with regard to Formula (II).

With the naphthopyran represented by the following Formula (III), there is the proviso that at least one of and less than all of $R_{21}$, $R_{22}$, $R_{23}$ independently for each n, B, and B' is in each case independently an L-Group as defined further herein below.

With some embodiments, the photochromic material is chosen from (4) at least one naphthopyran represented by the following Formula (IV),

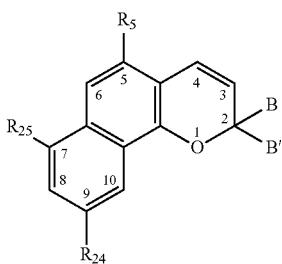

With reference to Formula (IV), (a) $R_5$ is independently chosen from the groups described hereinbefore in (1)(d); and (b) $R_{24}$ and $R_{25}$ are each chosen from hydrogen or an amino group defined hereinafter with further reference to (i)-(v), provided that $R_{24}$ and $R_{25}$ are not both hydrogen. The amino groups from which $R_{24}$ and $R_{25}$ can each be independently chosen include, with some embodiments, (i) —N($R_{16}$)$R_{17}$, $R_{16}$ and $R_{17}$ each being independently chosen from hydrogen, $C_1$-$C_8$ alkyl, aryl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_8$ alkylaryl, $C_3$-$C_{20}$ cycloalkyl, $C_4$-$C_{20}$ bicycloalkyl, $C_5$-$C_{20}$ tricycloalkyl or $C_1$-$C_{20}$ alkoxyalkyl, in which the aryl group is phenyl or naphthyl.

The amino groups from which $R_{24}$ and $R_{25}$ can each be independently chosen include, with some embodiments, (ii) a nitrogen containing ring represented by the following Formula (IVa),

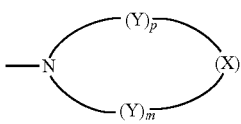

With reference to Formula (IVa), each Y is independently chosen for each occurrence from —$CH_2$—, —CH($R_{26}$)—, —C($R_{26}$)($R_{26}$)—, —CH(aryl)-, —C(aryl)$_2$ or —C($R_{26}$)(aryl)-; X is —Y—, —O—, —S—, —S(O)—, —S(O$_2$)—, —NH—, —N($R_{26}$)— or —N(aryl)-; $R_{26}$ is $C_1$-$C_6$ alkyl; the aryl group is phenyl or naphthyl, m is chosen from the integer 1, 2 or 3, and p is chosen from the integer 0, 1, 2 or 3; provided that when p is 0, X is Y.

The amino groups from which $R_{24}$ and $R_{25}$ can each be independently chosen include, with some embodiments, (iii) a group represented by one of the following Formulas (IVb) and (IVc),

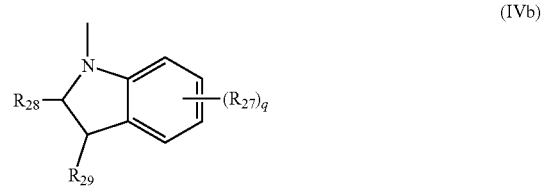

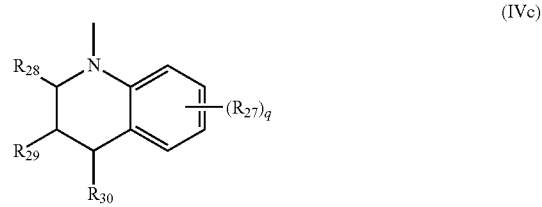

With reference to Formula (IVb) and (IVc), each $R_{28}$, $R_{29}$ and $R_{30}$ is chosen independently for each occurrence in each formula from hydrogen, $C_1$-$C_5$ alkyl, phenyl or naphthyl; or the groups $R_{28}$ and $R_{29}$ together form a ring of 5 to 8 carbon atoms; $R_{27}$ is chosen independently for each occurrence from $C_1$-$C_6$ alkyl, $C_1$-$C_6$ alkoxy, fluoro or chloro, and q is chosen from the integer 0, 1 or 2.

The amino groups from which $R_{24}$ and $R_{25}$ can each be independently chosen include, with some embodiments: (iv) unsubstituted, mono- or di-substituted $C_4$-$C_{18}$ spirobicyclic amine; or (v) unsubstituted, mono- or di-substituted $C_4$-$C_{18}$ spirotricyclic amine; the substituents for (iv) and (v) being independently chosen for each occurrence from aryl, $C_1$-$C_6$ alkyl, $C_{1-6}$ alkoxy or phenyl($C_1$-$C_6$)alkyl.

With further reference to Formula (IV), (c) B and B' are each independently chosen from the groups described hereinbefore in (2)(d) with regard to Formula (II).

With the naphthopyran represented by the following Formula (IV), there is the proviso that at least one of and less than all of $R_5$, $R_{24}$, $R_{25}$, B and B' is in each case independently an L-Group as defined further herein below.

With some embodiments, the photochromic material is chosen from (5) at least one phenanthropyran represented by at least one of the following Formula (VA) and Formula (VB),

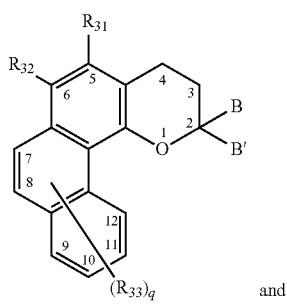

(VA)

and

With reference to and independently for each of Formula (VA) and Formula (VB): (a) $R_{31}$ is the group $R_5$, described hereinbefore in (1)(d); (b) $R_{32}$ is hydrogen, $C_1$-$C_6$ alkyl, $C_1$-$C_6$ alkoxy, $C_3$-$C_7$ cycloalkyl, pyridyl, phenyl, mono-substituted or di-substituted phenyl, said phenyl substituents being $C_1$-$C_6$ alkyl, $C_1$-$C_6$ alkoxy, hydroxy, amino, chloro, or fluoro; (c) each $R_{33}$ is independently chosen for each occurrence from chloro, fluoro, amino, $C_1$-$C_6$ monoalkylamino, —N($R_{10}$)$R_{11}$, which was described hereinbefore in (1)(d), phenyl, $C_1$-$C_6$ alkyl, or —O$R_{34}$, wherein $R_{34}$ is hydrogen, $C_1$-$C_6$ alkyl, allyl, or acetyl, and q is the integer 0, 1, or 2; and (d) B and B' are each independently chosen from the groups described hereinbefore in (2)(d) with regard to Formula (II).

With the phenanthropyran represented by Formula (VA) and/or Formula (VB) there is the proviso that at least one of and less than all of $R_{31}$, $R_{32}$, $R_{33}$ independently for each q, B, and B' is in each case independently an L-Group as defined further herein below.

With some embodiments, the photochromic material is chosen from (6) at least one fluoranthenopyran represented by the following Formula (VI),

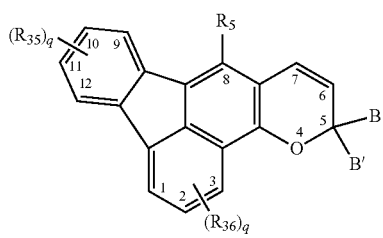

(VI)

With reference to Formula (VI), (a) $R_{35}$ and $R_{36}$ are each independently chosen for each occurrence (or each q) from hydroxy, aryl, mono($C_1$-$C_6$)alkoxyaryl, di($C_1$-$C_6$)alkoxyaryl, mono($C_1$-$C_6$)alkylaryl, di($C_1$-$C_6$)alkylaryl, bromoaryl, chloroaryl, fluoroaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_6$)alkyl, $C_3$-$C_7$ cycloalkyloxy($C_1$-$C_6$)alkoxy, aryl($C_1$-$C_6$)alkyl, aryl($C_1$-$C_6$)alkoxy, aryloxy, aryloxy($C_1$-$C_6$)alkyl, aryloxy($C_1$-$C_6$)alkoxy, mono- or di($C_1$-$C_6$)alkylaryl($C_1$-$C_6$)alkyl, mono- and di($C_1$-$C_6$)alkoxyaryl($C_1$-$C_6$)alkyl, mono- or di($C_1$-$C_6$)alkylaryl($C_1$-$C_6$)alkoxy, mono- or di($C_1$-$C_6$)alkoxyaryl($C_1$-$C_6$)alkoxy, $C_1$-$C_6$ alkyl, $C_1$-$C_6$ bromoalkyl, $C_1$-$C_6$ chloroalkyl, $C_1$-$C_6$ fluoroalkyl, $C_1$-$C_6$ alkoxy, mono($C_1$-$C_6$)alkoxy($C_1$-$C_4$)alkyl, acryloxy, methacryloxy, bromo, chloro, fluoro, amino, mono($C_1$-$C_6$)alkylamino, di($C_1$-$C_6$)alkylamino, phenylamino, mono- or di-($C_1$-$C_6$) alkyl substituted phenylamino or mono- or di-($C_1$-$C_6$)alkoxy substituted phenylamino, and q is the integer 0, 1 or 2.

With further reference to Formula (VI): (b) $R_5$ is independently chosen from the groups described hereinbefore in (1)(d); and (c) B and B' are each independently chosen from the groups described hereinbefore in (2)(d) with regard to Formula (II).

With the phenanthropyran represented by Formula (VI), there is the proviso that at least one of and less than all of $R_5$, $R_{35}$ independently for each q, $R_{36}$ independently for each q, B, and B' is in each case independently an L-Group as defined further herein below.

With some embodiments, the photochromic material is chosen from (7) at least on naphthopyran represented by the following Formula (VII),

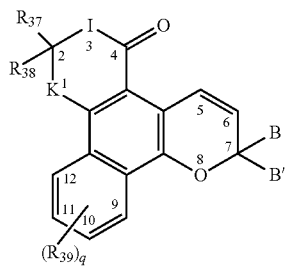

(VII)

With reference to Formula (VII), (a) $R_{37}$ and $R_{38}$ together form an oxo group or $R_{37}$ and $R_{38}$ each are independently chosen for each occurrence from hydrogen, $C_1$-$C_6$ alkyl, $C_3$-$C_7$ cycloalkyl, allyl, phenyl, mono- or di-substituted phenyl, benzyl, mono-substituted benzyl, naphthyl, mono- or di-substituted naphthyl, $C_4$-$C_{12}$ bicycloalkyl, linear or branched $C_3$-$C_{12}$ alkenyl, $C_1$-$C_6$ alkoxy carbonyl($C_1$-$C_6$) alkyl, methacryloxy($C_1$-$C_6$)alkyl, acryloxy($C_1$-$C_6$)alkyl, $C_1$-$C_4$ acyloxy($C_1$-$C_6$)alkyl, $C_1$-$C_6$ alkoxy($C_1$-$C_6$)alkyl or the unsubstituted, mono- or di-substituted heteroaromatic groups pyridyl, furanyl, benzofuran-2-yl, benzylfuran-3-yl, thienyl, benzothien-2-yl, benzothien-3-yl, dibenzofuranyl, dibenzothienyl, carbazolyl, benzopyridyl and indolyl, each of said phenyl, benzyl, naphthyl and heteroaromatic group substituents being $C_1$-$C_6$ alkyl, $C_1$-$C_6$ alkoxy, morpholino, di($C_1$-$C_6$)alkylamino, chloro or fluoro.

With further reference to Formula (VII), (b) $R_{39}$ is chosen from $C_1$-$C_6$ alkyl, $C_1$-$C_6$ alkoxy, chloro, fluoro, phenyl, mono- and di-substituted phenyl, benzyl or mono-substituted benzyl, $C_3$-$C_7$ cycloalkyl, aryloxy, di($C_1$-$C_6$)alkylamino, morpholino, thiomorpholino, piperidino, pyridyl, tetrahydroquinolino, isoquinolino, aziridino, diarylamino, N—($C_1$-$C_6$)alkyl piperizino or N-aryl piperizino, wherein the aryl groups are phenyl or naphthyl, each of said phenyl and benzyl substituents being $C_1$-$C_6$ alkyl, $C_1$-$C_6$ alkoxy, fluoro or chloro, and q is the integer 0, 1 or 2.

With additional reference to Formula (VII), (c) I is oxygen or —N($R_{40}$)—, wherein $R_{40}$ is hydrogen, $C_1$-$C_6$ alkyl, $C_3$-$C_7$ cycloalkyl, allyl, vinyl, $C_1$-$C_5$ acyl, phenyl, mono- or di-substituted phenyl, benzyl, mono-substituted benzyl, $C_1$-$C_4$ alkoxycarbonyl($C_1$-$C_6$)alkyl, methacryloxy($C_1$-$C_6$)alkyl, acryloyloxy($C_1$-$C_6$)alkyl, phenyl($C_1$-$C_6$)alkyl, naphthyl, $C_4$-$C_{12}$ bicycloalkyl, $C_2$-$C_4$ acyloxy or the unsubstituted or substituted heteroaromatic groups pyridyl, furanyl, benzofuran-2-yl, benzofuran-3-yl, thienyl, benzothien-2-yl, benzothien-3-yl, dibenzofuranyl, dibenzothienyl, carbazolyl, benzopyridyl or indolyl, each of the phenyl, benzyl and heteroaromatic group substituents is $C_1$-$C_6$ alkyl or $C_1$-$C_6$ alkoxy.

With further additional reference to Formula (VII): (d) K is oxygen, —N($R_{40}$)— or —C($R_{41}$)($R_{42}$)—, wherein $R_{41}$ and $R_{42}$ are each hydrogen, $C_1$-$C_6$ alkyl or $C_3$-$C_7$ cycloalkyl; and (e) B and B' are each independently chosen from the groups described hereinbefore in (2)(d) with regard to Formula (II).

With the naphthopyran represented by Formula (VII), there is the proviso that at least one of and less than all of $R_{37}$, $R_{38}$, $R_{39}$ independently for each q, B, and B' is in each case independently an L-Group as defined further herein below.

In accordance with some embodiments, the photochromic material is chosen from (8) at least one naphthopyran represented by the following Formula (VIII),

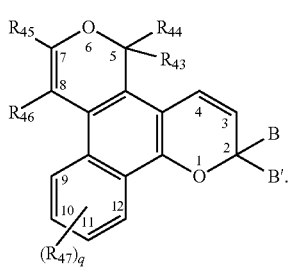

(VII)

With reference to Formula (VIII): (a) $R_{43}$ and $R_{44}$ together form an oxo group or $R_{43}$ and $R_{44}$ are both hydrogen, $C_1$-$C_6$ alkyl, $C_3$-$C_7$ cycloalkyl, allyl, phenyl, mono-substituted phenyl, benzyl or mono-substituted benzyl each of said phenyl and benzyl group substituents being $C_1$-$C_6$ alkyl or $C_1$-$C_6$ alkoxy; and (b) $R_{45}$ is hydrogen, $C_1$-$C_6$ alkyl, $C_3$-$C_7$ cycloalkyl, or the group, CH(B)B', wherein B and B' are each independently chosen from the groups described hereinbefore in (2)(d).

With further reference to Formula (VIII): (c) $R_{46}$ is hydrogen, $C_1$-$C_6$ alkyl, or $C_3$-$C_7$ cycloalkyl; (d) each $R_{47}$ is $C_1$-$C_6$ alkyl, $C_1$-$C_6$ alkoxy, chloro or fluoro, and q is the integer 0, 1, or 2; and (e) B and B' are each independently chosen from the groups described hereinbefore in (2)(d) with regard to Formula (II).

With the naphthopyran represented by Formula (VIII), there is the proviso that at least one of and less than all of $R_{43}$, $R_{44}$, $R_{45}$, $R_{46}$, $R_{47}$, B, and B' is in each case independently an L-Group as defined further herein below.

With some embodiments, the photochromic material is chosen from (9) at least one naphthopyran represented by the following Formulas (IXA), (IXB), (IXC), (IXD), (IXE), (IXF), (IXG) and (IXH),

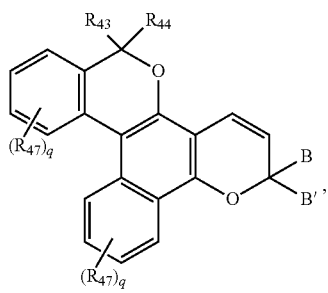

(IXA)

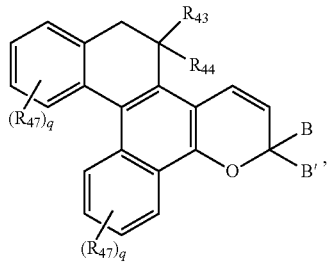

(IXB)

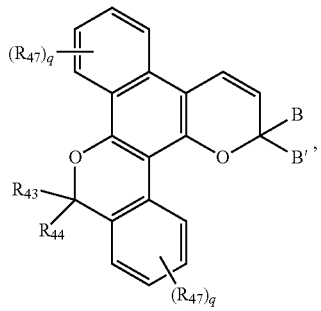

(IXC)

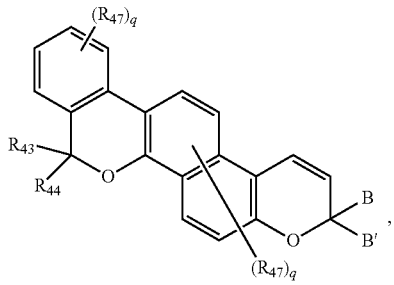

(IXD)

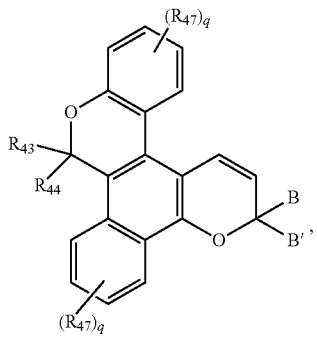

(IXE)

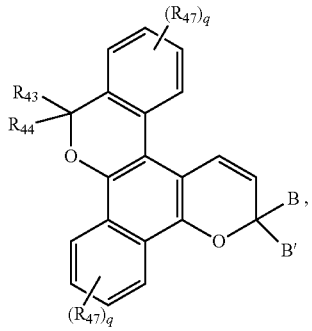

(IXF)

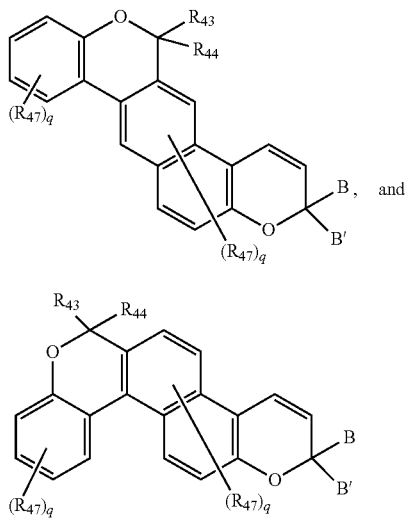

(IXG)

(IXH)

With reference to and independently for each of Formulas (IXA), (IXB), (IXC), (IXD), (IXE), (IXF), (IXG) and (IXH): (a) $R_{43}$ and $R_{44}$ are in each case independently chosen from groups described hereinbefore in (8)(a) with regard to Formula (VIII); (b) $R_{47}$ in each case is independently chosen from groups described hereinbefore in (8)(d) with regard to Formula (VIII), and q is in each case independently as described hereinbefore in (8)(d) with regard to Formula (VIII); and (c) B and B' are each independently chosen from the groups described hereinbefore in (2)(d) with regard to Formula (II).

With and independently for each of the naphthopyran(s) represented by Formulas (IXA), (IXB), (IXC), (IXD), (IXE), (IXF), (IXG) and (IXH) there is the proviso that at least one of and less than all of $R_{43}$, $R_{44}$ independently for each q, $R_{47}$ independently for each q, B, and B' is in each case independently an L-Group as defined further herein below.

With some embodiments, the photochromic material is chosen from (10) at least one naphthopyran represented by the following Formulas (XA) and (XB),

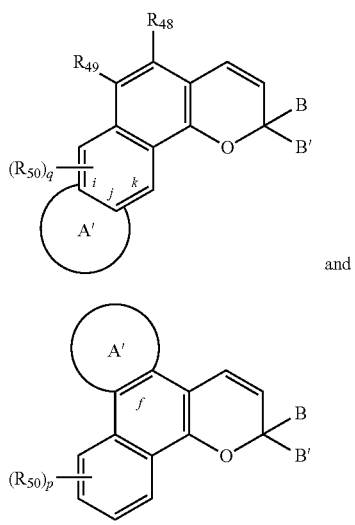

(XA)

and (XB)

With reference to and independently for each of Formulas (XA) and (XB), (a) Ring A' is chosen from: (i) an unsubstituted, monosubstituted or di-substituted heterocyclic ring chosen from benzothieno, benzofurano or indolo, the 2,3 or 3,2 positions of said heterocyclic ring being fused to the i, j or k side of said naphthopyran represented by Formula (XA) or said heterocyclic ring is fused to the f side of said naphthopyran represented by Formula (XB); or (ii) an unsubstituted, mono-substituted or di-substituted indeno group fused to the i, j or k side of said naphthopyran represented by Formula (XA) or to the f side of said naphthopyran represented by Formula (XB); each of said heterocyclic ring and indeno group substituents being $C_1$-$C_6$ alkyl, $C_5$-$C_7$ cycloalkyl, $C_1$-$C_6$ alkoxy, —N($R_{10}$)$R_{11}$, which was described hereinbefore in (1)(d), chloro, fluoro, benzo, mono- or di-substituted benzo group fused to the benzo portion of the benzothieno, benzofurano, indeno or indolo moiety, said benzo substitutent being $C_1$-$C_6$ alkyl, $C_5$-$C_7$ cycloalkyl, $C_1$-$C_6$ alkyl mono-substituted ($C_5$-$C_7$)cycloalkyl, $C_1$-$C_6$ alkoxy, —N($R_{10}$)$R_{11}$, which was described hereinbefore in (1)(d), chloro or fluoro.

With further reference to and independently for each of Formulas (XA) and (XB), (b) $R_{48}$ is chosen from: (i) —C(O)W', W' being —$OR_9$ or —N($R_{10}$)$R_{11}$, wherein said groups were described hereinbefore in (1)(d) with regard to Formula (I); or (ii) —C($R_{51}$)$_2$X', wherein X' is —CN, chloro, fluoro, hydroxy, benzoyloxy, $C_1$-$C_6$ alkoxy, $C_2$-$C_6$ acyloxy, amino, $C_1$-$C_6$ mono-alkylamino, $C_1$-$C_6$ dialkylamino, morpholino, piperidino, 1-indolinyl, pyrrolidyl, or trimethylsilyloxy, $R_{51}$ is hydrogen, $C_1$-$C_6$ alkyl, phenyl or naphthyl, and each of said phenyl and heterocyclic ring substituents in this part (b)(i) and (ii) being $C_1$-$C_6$ alkyl or $C_1$-$C_6$ alkoxy.

With further reference to and independently for each of Formulas (XA) and (XB): (c) $R_{49}$ is hydrogen, $C_1$-$C_6$ alkyl, the mono-, di- or tri-substituted aryl groups phenyl or naphthyl, said aryl substituents being $C_1$-$C_6$ alkyl, $C_1$-$C_6$ alkoxy, chloro or fluoro; (d) each $R_{50}$ is chloro, fluoro, $C_1$-$C_6$ alkyl, $C_1$-$C_6$ alkoxy, phenyl, naphthyl, phenoxy, naphthoxy or the group, —N($R_{10}$)$R_{11}$, described hereinbefore in (1)(d) with regard to Formula (I), and q is selected from the integers 0, 1 or 2 in said naphthopyran represented by Formula (XA), or each $R_{50}$ is chloro, fluoro, phenoxy, naphthoxy or the group, —N($R_{10}$)$R_{11}$, and p is selected from the integers 0, 1, 2 or 3 in said naphthopyran represented by Formula (XB); and (e) B and B' are each independently chosen from the groups described hereinbefore in (2)(d) with regard to Formula (II).

With and independently for each of the naphthopyran(s) represented by Formulas (XA) and (XB) there is the proviso that at least one of and less than all of $R_{48}$, $R_{49}$, $R_{50}$ independently for each q and each p, B, and B' is in each case independently an L-Group as defined further herein below.

With some embodiments, the photochromic material is chosen from (11) at least one indenonaphthopyran represented by the following Formulas (XIA) and (XIB),

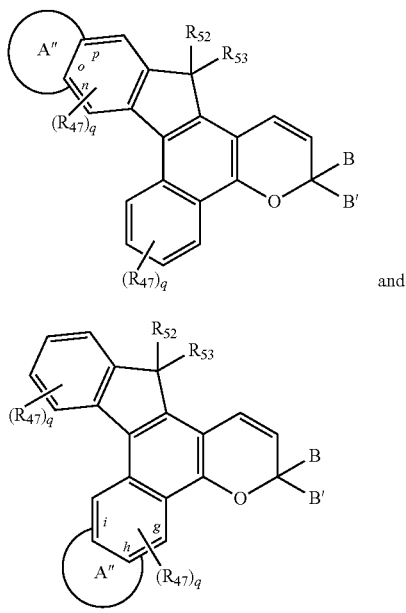

(XIA)

and (XIB)

With reference to and independently for each of Formula (XIA) and Formula (XIB), (a) Ring A" is an unsubstituted, mono-substituted or di-substituted heterocyclic ring chosen from furo, thieno, benzothieno, benzofurano or indolo, the 2,3 or 3,2 positions of said heterocyclic ring being fused to the g, h or i side of Formula (XIB) or to the n, o or p side of Formula (XIA), said heterocyclic ring substituents being $C_1$-$C_6$ alkyl, $C_5$-$C_7$ cycloalkyl, $C_1$-$C_6$ alkoxy, chloro or fluoro.

With further reference to and independently for each of Formula (XIA) and Formula (XIB), (b) $R_{52}$ and $R_{53}$ together form an oxo group, a spiro heterocyclic group having 2 oxygen atoms and from 3 to 6 carbon atoms including the spirocarbon atom, or $R_{52}$ and $R_{53}$ are each hydrogen, hydroxy, $C_1$-$C_6$ alkyl, $C_3$-$C_7$ cycloalkyl, allyl, phenyl, mono-substituted phenyl, benzyl, mono-substituted benzyl, chloro, fluoro or the group, —C(O)W", wherein each W" is hydroxy, $C_1$-$C_6$ alkyl, $C_1$-$C_6$ alkoxy, phenyl, mono-substituted phenyl, amino, mono($C_1$-$C_6$)alkylamino, di($C_1$-$C_6$) alkylamino, morpholino, piperidino or pyrrolidyl; or $R_{52}$ and $R_{53}$ are each the group, the group, —N($R_{10}$)$R_{11}$, described hereinbefore in (1)(d), or —O$R_{54}$, wherein each $R_{54}$ is $C_1$-$C_6$ alkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$)alkyl substituted $C_3$-$C_7$ cycloalkyl, $C_1$-$C_6$ chloroalkyl, $C_1$-$C_6$ fluoroalkyl, allyl, the group, —CH($R_{55}$)X", wherein each $R_{55}$ is hydrogen or $C_1$-$C_3$ alkyl, each X" is —CN, —CF$_3$, or —COO$R_{55}$, or each $R_{54}$ is the group, —C(O)Y', wherein each Y' is hydrogen, $C_1$-$C_6$ alkyl, $C_1$-$C_6$ alkoxy, the unsubstituted, mono- or di-substituted aryl groups, phenyl or naphthyl, phenoxy, mono- or di-($C_1$-$C_6$) alkyl substituted phenoxy, mono- or di-($C_1$-$C_6$)alkoxy substituted phenoxy, amino, mono($C_1$-$C_6$)alkylamino, di($C_1$-$C_6$)alkylamino, phenylamino, mono- or di-($C_1$-$C_6$)alkyl substituted phenylamino or mono- or di-($C_1$-$C_6$)alkoxy substituted phenylamino, each of said phenyl, benzyl or aryl group substituents being $C_1$-$C_6$ alkyl or $C_1$-$C_6$ alkoxy.

With additional reference to and independently for each of Formula (XIA) and Formula (XIB), (c) $R_{47}$ in each case is independently chosen from groups described hereinbefore in (8)(d) with regard to Formula (VIII), and q is in each case independently as described hereinbefore in (8)(d) with regard to Formula (VIII); and (d) B and B' are each independently chosen from the groups described hereinbefore in (2)(d) with regard to Formula (II).

With and independently for each of the indenonaphthopyrans represented by Formula (XIA) and Formula (XIB) there is the proviso that at least one of and less than all of $R_{47}$ independently for each q, $R_{52}$, $R_{53}$, B, and B' is in each case independently an L-Group as defined further herein below.

With some embodiments, the photochromic material is chosen from (12) at least one indenonaphthopyran represented by the following Formulas (XIIA) and (XIIB),

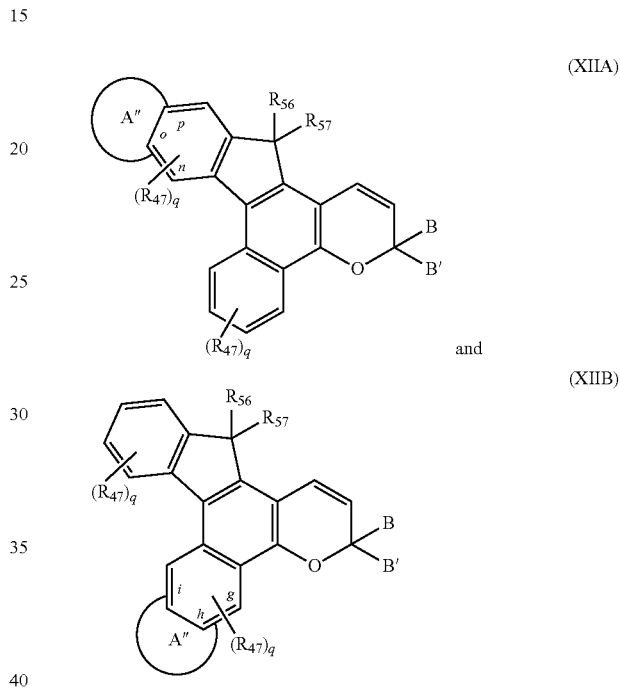

(XIIA)

and (XIIB)

With reference to and independently for each of Formula (XIIA) and Formula (XIIB), (a) Ring A" is independently as described hereinbefore in (11)(a) with regard to Formulas (XIA) and (XIB), wherein Ring A" is fused to the g, h or i side of Formula (XIIB) or to the n, o or p side of Formula (XIIA).

With further reference to and independently for each of Formula (XIIA) and Formula (XIIB): (b) $R_{56}$ is hydrogen, hydroxy, bromo, fluoro or chloro and $R_{57}$ is the group, —CH(V')$_2$, wherein V' is —CN or —COO$R_{58}$, and each $R_{58}$ is hydrogen, $C_1$-$C_6$ alkyl, phenyl($C_1$-$C_3$)alkyl, mono($C_1$-$C_6$) alkyl substituted phenyl($C_1$-$C_3$)alkyl, mono($C_1$-$C_6$)alkoxy substituted phenyl($C_1$-$C_3$)alkyl or the unsubstituted, mono- or di-substituted aryl groups phenyl or naphthyl, or $R_{57}$ is the group, —CH($R_{59}$)Y''', wherein $R_{59}$ is hydrogen, $C_1$-$C_6$ alkyl or the unsubstituted, mono- or di-substituted aryl groups phenyl or naphthyl, and Y''' is —COO$R_{58}$, —CO$R_{59}$, or —CH$_2$O$R_{60}$, wherein $R_{59}$ is hydrogen, $C_1$-$C_6$ alkyl, the unsubstituted, mono- or di-substituted aryl groups phenyl or naphthyl, amino, mono($C_1$-$C_6$)alkylamino, di($C_1$-$C_6$)alkylamino, phenylamino, mono- or di-($C_1$-$C_6$)alkyl substituted phenylamino, mono- or di-($C_1$-$C_6$)alkoxy substituted phenylamino, diphenylamino, mono- or di-($C_1$-$C_6$)alkyl substituted diphenylamino, mono- or di-($C_1$-$C_6$)alkoxy substituted diphenylamino, morpholino, or piperidino; $R_{60}$ is hydrogen, —CO$R_{58}$, $C_1$-$C_6$ alkyl, $C_1$-$C_3$ alkoxy($C_1$-$C_6$)alkyl, phenyl $(C_1-C_3)$alkyl, mono$(C_1-C_6)$alkyl substituted phenyl$(C_1-C_3)$ alkyl, mono$(C_1-C_6)$alkoxy substituted phenyl$(C_1-C_3)$alkyl, or the unsubstituted, mono- or di-substituted aryl groups phenyl or naphthyl, each of said aryl group substituents being $C_1-C_6$ alkyl or $C_1-C_6$ alkoxy; or (c) $R_{56}$ and $R_{57}$ together form the group, =C(V')$_2$ or =C(R$_{59}$)W''', wherein W''' is —COOR$_{58}$ or —COR$_{59}$.

With additional reference to and independently for each of Formula (XIIA) and Formula (XIIB): (d) $R_{47}$ in each case is independently chosen from groups described hereinbefore in (8)(d) with regard to Formula (VIII), and q is in each case independently as described hereinbefore in (8)(d) with regard to Formula (VIII); and (e) B and B' are each independently chosen from the groups described hereinbefore in (2)(d) with regard to Formula (II).

With and independently for each of the indenonaphthopyrans represented by Formula (XIIA) and Formula (XIIB) there is the proviso that at least one of and less than all of $R_{47}$ independently for each q, $R_{56}$, $R_{57}$, B, and B' is in each case independently an L-Group as defined further herein below.

With some embodiments, the photochromic material is chosen from (13) at least one indenonaphthopyran represented by the following Formula (XIII),

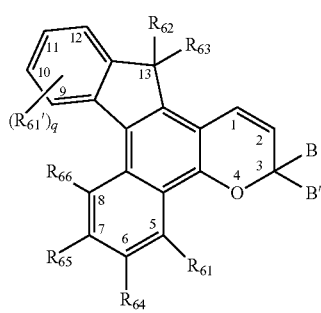

(XIII)

With reference to Formula (XIII), (a) $R_{61}$' is independently chosen for each occurrence from: (i) $C_1-C_6$ alkyl or $C_1-C_6$ alkoxy, perfluoro alkyl, halogen, cyano, ester; (ii) —SR$_{67}$, where $R_{67}$ is chosen from $C_1-C_6$ alkyl, aryl, mono- or di-substituted aryl, said aryl group being phenyl or naphthyl and each of said aryl substitutents being chosen independently from $C_1-C_6$ alkyl, $C_1-C_6$ alkoxy or halogen; and (iii) an amino group described hereinbefore in (4)(b)(i), (ii), (iii), (iv) or (v) with regard to Formula (IV) where q is chosen from the integer 0, 1, 2 or 3.

With further reference to Formula (XIII), (b) $R_{61}$ is chosen from $C_1-C_6$ alkyl or $C_1-C_6$ alkoxy, perfluoro alkyl and halogen With additional reference to Formula (XIII), (c) $R_{62}$ and $R_{63}$ are each independently chosen from the following (i) through (viii):

(i) hydrogen, hydroxy, amino, mono- or di-substituted amino, $C_1-C_{12}$ alkyl, $C_3-C_{12}$ alkylidene, $C_2-C_{12}$ alkylidyne, vinyl, $C_3-C_7$ cycloalkyl, $C_1-C_6$ alkoxyalkyl, allyl, benzyl, mono-substituted benzyl, chloro, fluoro or —C(O)W'', wherein W'' being the same group described hereinbefore in (11)(b); said amino substituents in (c)(i) being $C_1-C_6$ alkyl, phenyl, benzyl or naphthyl; each of said benzyl substituents being $C_1-C_6$ alkyl or $C_1-C_6$ alkoxy;

(ii) an unsubstituted, mono-di- or tri-substituted group chosen from phenyl, naphthyl, phenanthryl, pyrenyl, quinolyl, isoquinolyl, benzofuranyl, thienyl, benzothienyl, dibenzofuranyl, dibenzothienyl, carbazolyl or indolyl; each of said group substituents in (c)(ii) being chosen independently for each occurrence from chloro, fluoro, $C_1-C_6$ alkyl or $C_1-C_6$ alkoxy;

(iii) a monosubstituted phenyl, said phenyl having a substituent located at the para position being as described hereinbefore in (2)(d)(v);

(iv) —OR$_{67}$, $R_{67}$ being chosen from $C_1-C_6$ alkyl, $C_1-C_6$ acyl, phenyl$(C_1-C_3)$alkyl, mono$(C_1-C_6)$alkyl substituted phenyl$(C_1-C_3)$alkyl, mono$(C_1-C_6)$alkoxy substituted phenyl $(C_1-C_3)$alkyl, $C_1-C_6$ alkoxy$(C_2-C_4)$alkyl, $C_3-C_7$ cycloalkyl, mono$(C_1-C_4)$alkyl substituted $C_3-C_7$ cycloalkyl, $C_1-C_6$ chloroalkyl, $C_1-C_6$ fluoroalkyl, allyl, triarylsilyl, triarylsilyloxy, tri$(C_1-C_6)$alkylsilyl, tri$(C_1-C_6)$alkylsilyloxy, tri$(C_1-C_6)$alkoxysilyl, tri$(C_1-C_6)$alkoxysilyloxy, di$(C_1-C_6)$alkyl$(C_1-C_6$ alkoxy)silyl, di$(C_1-C_6)$alkyl$(C_1-C_6$ alkoxy)silyloxy, di$(C_1-C_6)$alkoxy$(C_1-C_6$ alkyl)silyl, di$(C_1-C_6)$alkoxy$(C_1-C_6$ alkyl) silyloxy, benzoyl, mono-substituted benzoyl, naphthoyl or mono-substituted naphthoyl; each of said benzoyl and naphthoyl substituents being independently chosen from $C_1-C_6$ alkyl or $C_1-C_6$ alkoxy; or $R_{67}$ being —CH(R$_{68}$)Q'', wherein $R_{68}$ being chosen from hydrogen or $C_1-C_3$ alkyl and Q'' being chosen from —CN, —CF$_3$, or —COOR$_{68}$; or $R_{67}$ being —C(O)V'', wherein V'' being chosen from hydrogen, $C_1-C_6$ alkoxy, phenoxy, mono- or di-$(C_1-C_6)$alkyl substituted phenoxy, mono-or di-$(C_1-C_6)$alkoxy substituted phenoxy, an unsubstituted, mono- or di-substituted aryl group, phenyl or naphthyl, amino, mono$(C_1-C_6)$alkylamino, di$(C_1-C_6)$alkylamino, phenylamino, mono- or di-$(C_1-C_6)$alkyl substituted phenylamino, or mono- or di-$(C_1-C_6)$alkoxy substituted phenylamino; each of said aryl group substituents being independently chosen from $C_1-C_6$ alkyl or $C_1-C_6$ alkoxy;

(v) —CH(Q''')$_2$, Q''' being chosen from —CN or —COOR$_{69}$ and $R_{69}$ being chosen from hydrogen, $C_1-C_6$ alkyl, phenyl$(C_1-C_3)$alkyl, mono$(C_1-C_6)$alkyl substituted phenyl$(C_1-C_3)$alkyl, mono$(C_1-C_6)$alkoxy substituted phenyl $(C_1-C_3)$alkyl or an unsubstituted, mono- or di-substituted aryl group, phenyl or naphthyl; each of said aryl group substituents being independently chosen from $C_1-C_6$ alkyl or $C_1-C_6$ alkoxy;

(vi) —CH(R$_{70}$)G'', $R_{70}$ being chosen from hydrogen, $C_1-C_6$ alkyl or an unsubstituted, mono- or di-substituted aryl group, phenyl or naphthyl, and G'' being chosen from —COOR$_{69}$, —COR$_{71}$ or —CH$_2$OR$_{72}$, wherein $R_{71}$ being chosen from hydrogen, $C_1-C_6$ alkyl, an unsubstituted, mono- or di-substituted aryl group, phenyl or naphthyl, amino, mono$(C_1-C_6)$alkylamino, di$(C_1-C_6)$alkylamino, phenylamino, mono- or di-$(C_1-C_6)$alkyl substituted phenylamino, mono- or di-$(C_1-C_6)$alkoxy substituted phenylamino, diphenylamino, mono- or di-$(C_1-C_6)$alkyl substituted diphenylamino, mono-or di$(C_1-C_6)$alkoxy substituted diphenylamino, morpholino or piperidino; $R_{72}$ being chosen from hydrogen, —C(O)R$_{69}$, $C_1-C_6$ alkyl, $C_1-C_3$ alkoxy$(C_1-C_6)$alkyl, phenyl$(C_1-C_3)$alkyl, mono$(C_1-C_6)$ alkoxy substituted phenyl$(C_1-C_3)$alkyl or an unsubstituted, mono- or di-substituted aryl group, phenyl or naphthyl, each of said aryl group substituents being independently chosen from $C_1-C_6$ alkyl or $C_1-C_6$ alkoxy;

(vii) the group T being the same as described hereinbefore in (2)(d)(i) with regard to Formula (II); or (viii) $R_{62}$ and $R_{63}$ together form an oxo group or a substituted or unsubstituted spiro-carbocyclic ring containing 3 to 6 carbon atoms or a substituted or unsubstituted spiro-heterocyclic group containing 1 or 2 oxygen atoms and 3 to 6 carbon atoms including the spirocarbon atom, said spiro-carbocyclic ring and spiro-heterocyclic group being annellated with 0, 1 or 2 benzene rings, said substituents being hydrogen or $C_1$-$C_6$ alkyl.

With additional further reference to Formula (XIII), (d) $R_{64}$ is chosen from hydrogen, $C_1$-$C_6$ alkyl, aryl, perfluoroalkyl, halogen or the group $R_a$ chosen from: (i) —$OR_{73}$, $R_{73}$ being chosen from phenyl($C_1$-$C_3$)alkyl, $C_1$-$C_6$ alkyl, mono ($C_1$-$C_6$)alkyl substituted phenyl($C_1$-$C_3$)alkyl, mono($C_1$-$C_6$) alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$)alkyl substituted $C_3$-$C_7$ cycloalkyl, $C_1$-$C_6$ chloroalkyl, $C_1$-$C_6$ fluoroalkyl, allyl or —$CH(R_{68})Q''$ described in (c)(i); or (ii) an amino group as described hereinbefore in (4)(b)(i), (ii), (iii), (iv) or (v) with regard to Formula (IV).

With further reference to Formula (XIII), (e) $R_{65}$ is chosen from hydrogen, $C_1$-$C_6$ alkyl, aryl, perfluoroalkyl, halogen or $R_a$, where $R_a$ is the same as described hereinbefore in (d). With some embodiments, $R_{65}$ is selected from an amino group as described hereinbefore in (4)(b)(i), (ii), (iii), (iv) or (v) with regard to Formula (IV).

With additional reference to Formula (XIII): (f) $R_{66}$ is chosen from hydrogen, $C_1$-$C_6$ alkyl or $R_a$, where $R_a$ is as described hereinbefore in (d); or (g) $R_{65}$ and $R_{66}$ together form one of the following Formulas (XIV-1) and (XIV-2),

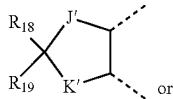

(XIII-1)

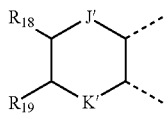

(XIII-2)

With reference to and independently for each of Formulas (XIII-1) and (XIII-2), J' and K' are independently chosen for each occurrence in each formula from oxygen or —$N(R_{15})$—, where $R_{15}$ is as described hereinbefore in (2)(b), $R_{18}$ and $R_{19}$ each being as described hereinbefore in (2)(d)(vi).

With additional reference to Formula (XIII), B and B' are each independently chosen from the groups described hereinbefore in (2)(d) with regard to Formula (II).

With the indenonaphthopyran represented by Formula (XIII) there is the proviso that at least one of and less than all of $R_{61}$, $R_{61'}$ independently for each q, $R_{62}$, $R_{63}$, $R_{64}$, $R_{65}$, $R_{66}$, B, and B' is in each case independently an L-Group as defined in further detail herein below.

With some embodiments, the photochromic material is chosen from (14) at least one indenonaphthopyran represented by the following Formula (XIV),

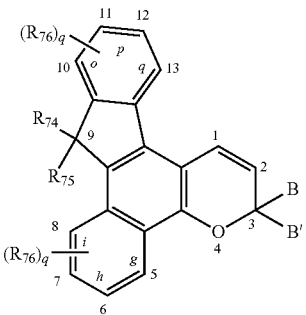

(XIV)

With reference to Formula (XIV), (a) $R_{74}$ and $R_{75}$ are each independently as described hereinbefore with regard to $R_{62}$ and $R_{63}$ in (13)(c) with regard to Formula (XIII).

With further reference to Formula (XIV), (b) each $R_{76}$ is independently chosen for each occurrence from di($C_1$-$C_6$) alkylamino, dicyclohexylamino, diphenylamino, piperidyl, morpholinyl, pyridyl, a group T, described hereinbefore in (2)(d)(i) with regard to Formula (II), or group —$C(O)W''$ described hereinbefore in (11)(b) with regard to Formulas (XIA) and (XIB) and q is the integer 0, 1, or 2; or when q is 2, and the $R_{76}$ substituents are adjacent, each pair of substituents independently forms a substituted or unsubstituted fused carbocyclic or heterocyclic ring chosen from benzo, pyridino, pyrazino, pyrimidino, furano, dihydrofurano, 1,3-dioxolo, 1,4-dioxolo, 1,3-dioxino, 1,4-dioxino, thiopheno, benzofuro, benzothieno, indolo, or indeno, the substituents of said fused carbocyclic or heterocyclic ring being chosen from halogen, $C_1$-$C_6$ alkyl, $C_1$-$C_6$ alkoxy, amino, mono- or di-substituted amino, said amino substituents being chosen from $C_1$-$C_6$ alkyl, phenyl, benzyl or naphthyl; the first $R_{76}$ ring being fused to the o, p or q side and said second $R_{76}$ ring being fused to the g, h, or i side of the indenonaphthopyran represented by Formula (XIV).

With additional reference to Formula (XIV), (c) B and B' are each independently chosen from the groups described hereinbefore in (2)(d) with regard to Formula (II).

With the indenonaphthopyran represented by Formula (XIV) there is the proviso that at least one of and less than all of $R_{74}$, $R_{75}$ independently for each q, $R_{76}$ independently for each q, B, and B' is in each case independently an L-Group as defined in further detail herein below.

The L-Group of the of the photochromic compounds (1) through (14) and each related Formula thereof is in each case a chiral or achiral lengthening group represented by the following Formula (XV), $$—(S_1)_c-(Q_1-(S_2)_d)_{d'}-(Q_2-(S_3)_e)_{e'}-(Q_3-(S_4)_f)_{f'}—S_5—P \quad (XV)$$

With reference to Formula (XV), (i) $Q_1$, $Q_2$, and $Q_3$ are each independently for each occurrence a divalent group chosen from, an unsubstituted or a substituted aromatic group, an unsubstituted or a substituted alicyclic group, and an unsubstituted or a substituted heterocyclic group, wherein each substituent is independently chosen from, a group represented by P, liquid crystal mesogens, halogen, poly($C_1$-$C_{18}$ alkoxy), $C_1$-$C_{18}$ alkoxycarbonyl, $C_1$-$C_{18}$ alkylcarbonyl, $C_1$-$C_{18}$ alkoxycarbonyloxy, aryloxycarbonyloxy, perfluoro($C_1$-$C_{18}$)alkoxy, perfluoro($C_1$-$C_{18}$)alkoxycarbonyl, perfluoro($C_1$-$C_{18}$)alkylcarbonyl, perfluoro($C_1$-$C_{18}$)alkylamino, di-(perfluoro($C_1$-$C_{18}$)alkyl)amino, perfluoro($C_1$-$C_{18}$)alkylthio, $C_1$-$C_{18}$ alkylthio, $C_1$-$C_{18}$ acetyl, $C_3$-$C_{10}$ cycloalkyl, $C_3$-$C_{10}$ cycloalkoxy, a straight-chain or branched $C_1$-$C_{18}$ alkyl group that is mono-substituted with cyano, halo, or $C_1$-$C_{18}$ alkoxy, or poly-substituted with halo, and a group comprising one of the following formulae: -M(T)$_{(t-1)}$ and -M(OT)$_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M.

With further reference to Formula (XV), (ii) c, d, e, and f are each independently an integer selected from 0 to 20, inclusive. With additional reference to formula (XV), $S_1$, $S_2$, $S_3$, $S_4$, and $S_5$ are each independently for each occurrence a spacer unit chosen from the following (1), (2), and (3): (1) —(CH$_2$)$_g$—, —(CF$_2$)$_h$—, —Si(Z)$_2$(CH$_2$)$_g$—, —(Si(CH$_3$)$_2$O)$_h$—, wherein Z is independently chosen for each occurrence from hydrogen, $C_1$-$C_{18}$ alkyl, $C_3$-$C_{10}$ cycloalkyl and aryl; g is independently chosen for each occurrence from 1 to 20; h is a whole number from 1 to 16 inclusive; (2) —N(Z)—, —C(Z)=C(Z)—, —C(Z)=N—, —C(Z')—C(Z')— or a single bond, wherein Z is independently chosen for each occurrence from hydrogen, $C_1$-$C_{18}$ alkyl, $C_3$-$C_{10}$ cycloalkyl and aryl, and Z' is independently chosen for each occurrence from $C_1$-$C_{18}$ alkyl, $C_3$-$C_{10}$ cycloalkyl and aryl; and (3) —O—, —C(O)—, —C≡C—, —N=N—, —S—, —S(O)—, —S(O)(O)—, —(O)S(O)—, —(O)S(O)O—, —O(O)S(O)O—, or straight-chain or branched $C_1$-$C_{24}$ alkylene residue, said $C_1$-$C_{24}$ alkylene residue being unsubstituted, mono-substituted by cyano or halo, or poly-substituted by halo.

With additional reference to the spacer units $S_1$, $S_2$, $S_3$, $S_4$, and $S_5$ of Formula (XV), there is the proviso when two spacer units comprising heteroatoms are linked together the spacer units are linked so that heteroatoms are not directly linked to each other.

With further reference to the spacer units $S_1$, $S_2$, $S_3$, $S_4$, and $S_5$ of Formula (XV), there is the proviso that when $S_1$ is linked to the photochromic material (such as photochromic materials (1) through (14) and each related Formula thereof) and $S_5$ is linked to P, $S_1$ and $S_5$ are each linked so that two heteroatoms are not directly linked to each other.

With additional reference to Formula (XV), (iii) P is chosen from: hydroxy, amino, $C_2$-$C_{18}$ alkenyl, $C_2$-$C_{18}$ alkynyl, azido, silyl, siloxy, silylhydride, (tetrahydro-2H-pyran-2-yl)oxy, thio, isocyanato, thioisocyanato, acryloyloxy, methacryloyloxy, 2-(acryloyloxy)ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, $C_1$-$C_{18}$ alkyl aminocarbonyl, aminocarbonyl($C_1$-$C_{18}$)alkyl, $C_1$-$C_{18}$ alkyloxycarbonyloxy, halocarbonyl, hydrogen, aryl, hydroxy ($C_1$-$C_{18}$)alkyl, $C_1$-$C_{18}$ alkyl, $C_1$-$C_{18}$ alkoxy, amino($C_1$-$C_{18}$) alkyl, $C_1$-$C_{18}$ alkylamino, di-($C_1$-$C_{18}$)alkylamino, $C_1$-$C_{18}$ alkyl($C_1$-$C_{18}$)alkoxy, $C_1$-$C_{18}$ alkoxy($C_1$-$C_{18}$)alkoxy, nitro, poly($C_1$-$C_{18}$)alkyl ether, ($C_1$-$C_{18}$)alkyl($C_1$-$C_{18}$)alkoxy($C_1$-$C_{18}$)alkyl, polyethyleneoxy, polypropyleneoxy, ethylenyl, acryloyl, acryloyloxy($C_1$-$C_{18}$)alkyl, methacryloyl, methacryloyloxy($C_1$-$C_{18}$)alkyl, 2-chloroacryloyl, 2-phenylacryloyl, acryloyloxyphenyl, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, or substituted or unsubstituted chiral or non-chiral monovalent or divalent groups chosen from steroid radicals, terpenoid radicals, alkaloid radicals and mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$ alkyl($C_1$-$C_{18}$)alkoxy, fluoro($C_1$-$C_{18}$)alkyl, cyano, cyano($C_1$-$C_{18}$)alkyl, cyano($C_1$-$C_{18}$) alkoxy or mixtures thereof, or P is a structure having from 2 to 4 reactive groups, or P is an unsubstituted or substituted ring opening metathesis polymerization precursor, or P is a substituted or unsubstituted photochromic compound.

With further additional reference to Formula (XV), (iv) d', e' and f' are each independently chosen from 0, 1, 2, 3, and 4, provided that a sum of d'+e'+f' is at least 2.

DETAILED DESCRIPTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

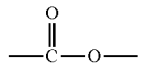

or equivalently —C(O)O—, is inclusive of the right-to-left representation thereof,

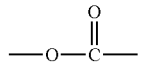

or equivalently —O(O)C— or —OC(O)—.

Other than in the operating examples, or where otherwise indicated, all numbers expressing quantities of ingredients, reaction conditions, and so forth used in the specification and claims are to be understood as modified in all instances by the term "about."

The photochromic materials and compounds of the photochromic articles of the present invention as described herein, including photochromic materials (1) through (14) and the related Formulas, and related photochromic compounds, in each case optionally further include one or more coproducts, resulting from the synthesis of such photochromic materials and compounds.

As used herein, the term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (such as, adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein to modify the term "state," the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, the photochromic compounds of the present invention can have a different absorption spectrum in each of the first and second state. For example, while not limiting herein, a photochromic compound of the present invention can be clear in the first state and colored in the second state. Alternatively, a photochromic compound of the present invention can have a first color in the first state and a second color in the second state.

As used herein the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "ophthalmic substrate" means lenses, partially formed lenses, and lens blanks.

As used herein the term "coating" means a supported film derived from a flowable composition, which can or can not have a uniform thickness, and specifically excludes polymeric sheets. A layer that includes one or more photochromic compounds of the present invention can, with some embodiments, be a photochromic coating.

As used herein the term "sheet" means a pre-formed film having a generally uniform thickness and capable of self-support.

As used herein the term "connected to" means in direct contact with an object or indirect contact with an object through one or more other structures or materials, at least one of which is in direct contact with the object. For purposes of non-limiting illustration, a coating containing one or more photochromic materials/compounds of the present invention, for example, can be in direct contact (e.g., abutting contact) with at least a portion of a substrate, such as an optical article, or it can be in indirect contact with at least a portion of the substrate through one or more other interposed structures or materials, such as a monomolecular layer of a coupling or adhesive agent. For example, although not limiting herein, a coating containing one or more photochromic materials/compounds of the present invention, can be in contact with one or more other interposed coatings, polymer sheets or combinations thereof, at least one of which is in direct contact with at least a portion of the substrate.

As used herein, the term "photosensitive material" means materials that physically or chemically respond to electromagnetic radiation, including, but not limited to, phosphorescent materials and fluorescent materials.

As used herein, the term "non-photosensitive materials" means materials that do not physically or chemically respond to electromagnetic radiation, including, but not limited to, static dyes.

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

As used herein, spatial or directional terms, such as "left", "right", "inner", "outer", "above", "below", and the like, relate to the invention as it is depicted in the drawing figures. However, it is to be understood that the invention can assume various alternative orientations and, accordingly, such terms are not to be considered as limiting.

As used herein, the terms "formed over," "deposited over," "provided over," "applied over," residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

As used herein, the term "Ring Position" means a particular position in the ring structure, such as the fused ring structure, of a chemical compound, such as the photochromic compounds/materials (b) and optional photochromic compounds (c) of the photochromic articles of the present invention, and which are depicted herein in accordance with some embodiments by numbers within the ring structures of representative chemical formulas.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include: a methylene group or a methyl group; groups that are linear, such as linear $C_2$-$C_{20}$ alkyl groups; and groups that are appropriately branched, such as branched $C_3$-$C_{20}$ alkyl groups.

As used herein, recitations of "optionally substituted" group, means a group, including but not limited to, alkyl group, cycloalkyl group, heterocycloalkyl group, aryl group, and/or heteroaryl group, in which at least one hydrogen thereof has been optionally replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (including, but not limited to: alkyl; alkenyl; alkynyl; cycloalkyl, including poly-fused-ring cycloalkyl and polycycloalkyl; heterocycloalkyl; aryl, including hydroxyl substituted aryl, such as phenol, and including poly-fused-ring aryl; heteroaryl, including poly-fused-ring heteroaryl; and aralkyl groups), and amine groups, such as —N($R^{11}$)($R^{12}$) where $R^{11}$ and $R^{12}$ are each independently selected from hydrogen, linear or branched $C_1$-$C_{20}$ alkyl, $C_3$-$C_{12}$ cycloakyl, $C_3$-$C_{12}$ heterocycloalkyl, aryl, and heteroaryl.

As used herein, recitations of "halo substituted" and related terms (such as, but not limited to, haloalkyl groups, haloalkenyl groups, haloalkynyl groups, haloaryl groups and halo-heteroaryl groups) means a group in which at least one, and up to and including all of the available hydrogen groups thereof is substituted with a halo group. The term "halo-substituted" is inclusive of "perhalo-substituted." As used herein, the term perhalo-substituted group and related terms (such as, but not limited to perhaloalkyl groups, perhaloalkenyl groups, perhaloalkynyl groups, perhaloaryl groups and perhalo-heteroaryl groups) means a group in which all of the available hydrogen groups thereof is substituted with a halo group. For example, perhalomethyl is —$CX_3$; perhalophenyl is —$C_6X_5$, where X represents one or more halo groups (e.g., F).

As used herein, the term "alkyl" means linear or branched alkyl, such as but not limited to, linear or branched $C_1$-$C_{20}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, methyl, ethyl, propyl, isopropyl, butyl, isobutyl, sec-butyl, tert-butyl, pentyl, neopentyl, hexyl, heptyl, octyl, nonyl and decyl. Alkyl groups of the various compounds of the present invention can, with some embodiments, include one or more unsaturated linkages selected from —CH=CH— groups and/or one or more —C≡C— groups, provided the alkyl group is free of two or more conjugated unsaturated linkages. With some embodiments, the alkyl groups are free of unsaturated linkages, such as —CH=CH— groups and —C≡C— groups.

As used herein, the term "cycloalkyl" means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include, but are not limited to, cyclopropyl, cyclobutyl, cyclopentyl, cyclohexyl, and cyclooctyl. The term "cycloalkyl" as used herein also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

As used herein, the term "heterocycloalkyl" means groups that are appropriately cyclic, such as but not limited to, $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, imidazolyl, tetrahydrofuranyl, tetrahydropyranyl and piperidinyl. The term "heterocycloalkyl" as used herein also includes: bridged ring polycyclic heterocycloalkyl groups, such as but not limited to, 7-oxabicyclo[2.2.1]heptanyl; and fused ring polycyclic heterocycloalkyl groups, such as but not limited to, octahydrocyclopenta[b]pyranyl, and octahydro-1H-isochromenyl.

As used herein, the term "aryl" includes, but is not limited to, $C_5$-$C_{18}$ aryl, such as but not limited to, $C_5$-$C_{10}$ aryl (including fused ring polycyclic aryl groups). Examples of aryl groups include, but are not limited to, phenyl, naphthyl, and anthracenyl.

As used herein, the term "heteroaryl," includes but is not limited to $C_5$-$C_{18}$ heteroaryl, such as but not limited to $C_5$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, furanyl, pyranyl, pyridinyl, isoquinoline, and pyrimidinyl.

As used herein, the term "fused ring polycyclic-aryl-alkyl group" and similar terms such as, fused ring polycyclic-alkyl-aryl group, fused ring polycyclo-aryl-alkyl group, and fused ring polycyclo-alkyl-aryl group means a fused ring polycyclic group that includes at least one aryl ring and at least one cycloalkyl ring that are fused together to form a fused ring structure. For purposes of non-limiting illustration, examples of fused ring polycyclic-aryl-alkyl groups include, but are not limited to indenyl, 9H-fluorenyl, cyclopentanaphthenyl, and indacenyl.

As used herein, the term "aralkyl," includes but is not limited to $C_6$-$C_{24}$ aralkyl, such as but not limited to $C_6$-$C_{10}$ aralkyl, means an aryl group substituted with an alkyl group that is bonded (or linked) to another group. Examples of aralkyl groups include, but are not limited to, benzyl, and phenethyl.

The photochromic materials of the present invention can be referred to herein with regard to various groups at (or bonded to) various positions of the photochromic materials. The positions are referred to herein, with some embodiments, with regard to the ring-positions as enumerated in the representative Formulas of the photochromic materials as described herein. For purposes of non-limiting illustration, with the fluoranthenoxazine represented by Formula (I): $R_1$ is at the 1'-position (or position 1'); $R_2$ is at one or two positions (depending on q) selected from the 4'-position, 6'-position, and/or 7'-position (or positions 4',5',6', and/or 7'); $R_3$ and $R_4$ are each at the 3'-position (or position 3');

$R_5$ is at the 8-position (or position 8); $R_6$ is at one or two positions (depending on q) selected from the 9-position, 10-position, 11-position, and/or 12-position (or positions 9, 10, 11, and/or 12); and $R_7$ is at one or two position (depending on q) selected from the 1-position, 2-position, and/or 3-position (or positions 1, 2, and/or 3).

The Behind the Windshield Test and the Outdoor Test are described in further detail in the Examples herein below. In summary, test samples containing behind the windshield (BWS) photochromic materials with or without other photochromic materials are tested for photochromic response (e.g., the change in optical density) with the simulated windshield in place under conditions simulating an eyeglass wearer behind an automotive windshield exposure versus conditions simulating outdoor exposure in the Outdoor Test (OS). The retained optical density is calculated by using the following formula:

$$\% \Delta OD \text{ Retained} = 100 \times (\Delta OD_{BWS}/\Delta OD_{OS}).$$

The term "ΔOD" and equivalent recitations, such as "delta OD," means change in optical density (OD) and is determined according to the formula:

$$\Delta OD = \log(\% Tb/\% Ta)$$

In the above formula, % Tb is the percent transmittance in the bleached state (or non-colored state), % Ta is the percent transmittance in the activated state (or colored state) and the logarithm is to the base 10. Optical density measurements are with some embodiments per specific wavelength or photopic. A method of determining change in optical density (ΔOD) is described in further detail herein in the examples.

As used herein, "percent fatigue" is determined by measuring the difference between the change in optical density (ΔOD) of a test sample before and after exposing the test sample to accelerated weathering, and is quantified in accordance with the formula:

$$\% \text{ Fatigue} = (\Delta OD_{init} - \Delta OD_{final})/\Delta OD_{init} \times 100.$$

In accordance with some embodiments of the present invention, the photochromic article is adapted to retain at least 20 percent of the delta OD (ΔOD) (or coloration) measured in the Outdoor Test when tested in the Behind the Windshield Test. With some further embodiments, the photochromic article is adapted t retain at least 25 percent of the delta OD (ΔOD) (or coloration) measured in the Outdoor Test when tested in the Behind the Windshield Test. With some embodiments, the photochromic article is adapted to retain less than or equal to 100 percent of the delta OD (ΔOD) (or coloration) measured in the Outdoor Test when tested in the Behind the Windshield Test. The delta OD (ΔOD) of the photochromic articles of the present invention can range between any combination of the recited upper and lower values, inclusive of the recited values. With some embodiments, the photochromic article is adapted to retain from 20 percent to 100 percent, or from 20 percent to 90 percent, or from 25 percent to 50 percent of the delta OD (ΔOD) (or coloration) measured in the Outdoor Test when tested in the Behind the Windshield Test.

With some embodiments, the photochromic article of the present invention is adapted to exhibit an unactivated state luminous transmittance of greater than 70 percent at 23° C., an activated state luminous transmittance at saturation less than 30 percent when activated at 23° C. by simulated sunlight from a xenon arc lamp set at 6.7 Watts/meter$^2$ UVA and 50,000 lumens/meter$^2$, and an activated state luminous transmittance at saturation less than 60 percent when activated at 28° C. by simulated sunlight from a xenon arc lamp through an UV blocking transparency rendering an irradiance integrated between 380 and 420 nanometers of 0.75 Watts/meter$^2$ and 1,700 lumens/meter$^2$.

With some further embodiments, the photochromic article is adapted to exhibit an unactivated state luminous transmittance of greater than 80 percent at 23° C., an activated state luminous transmittance at saturation less than 30 percent when activated at 23° C. by simulated sunlight from a xenon arc lamp set at 6.7 Watts/meter$^2$ UVA and 50,000 lumens/meter$^2$, and an activated state luminous transmittance at saturation less than 40 percent when activated at 28° C. by simulated sunlight from a xenon arc lamp through an UV blocking transparency rendering an irradiance integrated between 380 and 420 nanometers of 0.75 Watts/meter$^2$ and 1,700 lumens/meter$^2$.

In the aforementioned non-limiting embodiments, the photochromic articles reach saturation within 15 to 30 minutes of exposure to the simulated sunlight and/or simulated sunlight filtered by the UV radiation blocking transparency at 23° C. and 28° C. The term "activated luminous state transmittance at saturation" means that the transmittance of the photochromic article has reached a point where it will not substantially change due to continued exposure to simulated sunlight. Stated another way, the transmittance at saturation upon continued exposure to activating radiation does not vary by more than 5 percent of the percent transmittance value.

The aforementioned unactivated state luminous transmittance at 23° C. can with some embodiments be less than or equal to 100 percent. With some embodiments, the unactivated state luminous transmittance at 23° C. ranges between any combination of the recited lower and upper values, inclusive of the recited values, such as but not limited to, from 70 to 100 percent, or from 70.1 to 100 percent, or from 80 to 100 percent, or from 80.1 to 100 percent, or from 71 to 99 percent, or from 81 to 99 percent, in each case inclusive of the recited values.

The activated state luminous transmittance at saturation when the photochromic article is activated at 23° C. by simulated sunlight from a xenon arc lamp set at 6.7 Watts/meter$^2$ UVA and 50,000 lumens/meter$^2$ can with some embodiments be greater than or equal to 0 percent. With some further embodiments, when the photochromic article is activated at 23° C. by simulated sunlight from a xenon arc lamp set at 6.7 Watts/meter$^2$ UVA and 50,000 lumens/meter$^2$, the activated state luminous transmittance at saturation at 23° C. ranges between any combination of the recited lower and upper values, inclusive of the recited values, such as but not limited to, from 0 to 30 percent, or from 0 to 29 percent, or from 10 to 29 percent, or from 15 to 25 percent, in each case inclusive of the recited values.

The activated state luminous transmittance at saturation when the photochromic article is activated at 28° C. by simulated sunlight from a xenon arc lamp through an UV blocking transparency rendering an irradiance integrated between 380 and 420 nanometers of 0.75 Watts/meter$^2$ and 1,700 lumens/meter$^2$ can with some embodiments be greater than or equal to 0 percent. With some further embodiments, when the photochromic article is activated at 28° C. by simulated sunlight from a xenon arc lamp through an UV blocking transparency rendering an irradiance integrated between 380 and 420 nanometers of 0.75 Watts/meter$^2$ and 1,700 lumens/meter$^2$, the activated state luminous transmittance at saturation when the photochromic article is activated at 28° C. ranges between any combination of the recited lower and upper values, inclusive of the recited values, such as but not limited to, from 0 to 60 percent, or from 0 to less than 60 percent, or from 0 to 59.9 percent, or from 0 to 40 percent, or from 0 to less than 40 percent, or from 0 to 39.9 percent, or from 1 to 59 percent, or from 10 to 50 percent, or from 15 to 40 percent, in each case inclusive of the recited values.

The photochromic materials used to adapt the photochromic article for activation behind ultraviolet radiation blocking transparencies are referred to herein, and in accordance with some embodiments, as Behind the Windshield photochromic materials or BWS photochromic materials.

In accordance with some embodiments, the photochromic articles of the present invention are substantially free of ultraviolet absorbing materials in concentrations that would substantially inhibit the activation of the photochromic materials by radiation below 380 nanometers. With some further embodiments, the photochromic articles of the present invention do not contain ultraviolet absorbing materials in concentrations that would prevent greater than 50 percent of the activation of the photochromic materials, as measured by delta OD by radiation below 380 nanometers.

With some embodiments, the photochromic materials of the photochromic articles of the present invention are adapted to change from an unactivated form to an activated form by exposure to radiation substantially in a wavelength range of from 380 to 450 nanometers, or from 380 to 410 nanometers, (inclusive of the recited values) when measured over a range of from 380 to 700 nanometers.

The photochromic materials of the photochromic articles of the present invention, are described in further detail as follows.

In accordance with some embodiments, for the photochromic material chosen from at least one fluoroanthenoxazine represented by Formula (I): (a) $R_1$ is chosen from $C_1$-$C_8$ alkyl, phen($C_1$-$C_4$)alkyl, acryloyloxy($C_2$-$C_6$)alkyl, methacryloyloxy($C_2$-$C_6$)alkyl, carboxy($C_2$-$C_6$)alkyl, tri($C_1$-$C_6$)alkylsilyl, tri($C_1$-$C_6$)alkylsilyloxy, tri($C_1$-$C_6$)alkoxysilyl, tri($C_1$-$C_6$)alkoxysilyloxy, di($C_1$-$C_6$)alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ alkyl)silyl or di($C_1$-$C_6$)alkoxy($C_1$-$C_6$ alkyl)silyloxy; (b) $R_2$ is chosen from $C_1$-$C_5$ alkyl, $C_1$-$C_5$ alkoxy, $C_1$-$C_8$ alkoxycarbonyl, $C_1$-$C_4$ acyloxy, halo, $C_1$-$C_4$ monohaloalkyl or $C_1$-$C_4$ polyhaloalkyl; said halo substituents being chloro or fluoro, and q is 0, 1 or 2; and (c) $R_3$ and $R_4$ are each independently chosen from $C_1$-$C_5$ alkyl, phenyl; or $R_3$ and $R_4$ taken together form a group chosen from a cyclic ring of from 5 to 8 carbon atoms which includes the spiro carbon atom.

In accordance with some further embodiments, for the photochromic material chosen from at least one fluoroanthenoxazine represented by Formula (I): (d) $R_5$ is chosen from —$CH_2Q$ and —C(O)W, wherein Q is halogen, hydroxy, $C_1$-$C_6$ alkoxy, tri($C_1$-$C_6$)alkylsilyl, tri($C_1$-$C_6$)alkylsilyloxy, tri($C_1$-$C_6$)alkoxysilyl, tri($C_1$-$C_6$)alkoxysilyloxy, di($C_1$-$C_6$)alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ alkyl)silyl, di($C_1$-$C_6$)alkoxy($C_1$-$C_6$ alkyl)silyloxy, or the group, —OCH($R_8$)Z; W is the group, —OCH($R_8$)Z, morpholino or piperidino; Z is —COOR$_8$, $R_8$ is $C_1$-$C_6$ alkyl; or W is —OR$_9$ or —N($R_{10}$)$R_{11}$, wherein $R_9$ is chosen from $C_1$-$C_6$ alkyl or phenyl; and $R_{10}$ and $R_{11}$ are each independently chosen from hydrogen, $C_1$-$C_6$ alkyl, or $R_{10}$ and $R_{11}$ together with the nitrogen atom form a heterocyclic ring chosen from morpholino or piperidino; and each of said halogen or halo groups in this part (d) being fluoro or chloro; and (e) each $R_6$ and $R_7$ is independently chosen for each occurrence from aryl, mono($C_1$-$C_6$) alkoxyaryl, di($C_1$-$C_6$)alkylamino, piperidino, morpholino, $C_1$-$C_6$ alkoxy, or fluoro; and q is independently chosen for each occurrence form the integer 0, 1, or 2.

In accordance with some additional embodiments, for the photochromic material chosen from at least one fluoroanthenoxazine represented by Formula (I), there is the proviso that one or two of $R_1$, $R_2$ independently for each q, $R_3$, $R_4$, $R_5$, $R_6$ independently for each q, and $R_7$ is in each case independently an L-Group as described further herein below.

Photochromic materials represented by Formula (I) can, with some embodiments, be prepared in accordance with art-recognized methods, such as but not limited to, methods disclosed in U.S. Pat. No. 5,808,063.

In accordance with some embodiments, for the photochromic material chosen from at least one naphthopyran represented by Formula (II): (a) $R_{12}$ is hydrogen; (b) $R_{13}$ is hydrogen or the group, —C(O)J, J being —OR$_{16}$ or —N($R_{10}$)$R_{11}$, wherein $R_{15}$ is $C_1$-$C_6$ alkyl, phenyl($C_1$-$C_3$) alkyl, or $C_1$-$C_6$ alkoxy($C_2$-$C_4$)alkyl, $R_{10}$ and $R_{11}$ are the same as described hereinbefore in (1)(d); and (c) $R_{14}$ is hydrogen, $C_1$-$C_6$ alkyl, phenyl($C_1$-$C_3$)alkyl, $C_1$-$C_6$ alkoxy ($C_2$-$C_4$)alkyl, $C_5$-$C_7$ cycloalkyl, or the group, —C(O)V; wherein V is $C_1$-$C_6$ alkyl, $C_1$-$C_6$ alkoxy or $C_1$-$C_6$ alkylamino.

In accordance with some further embodiments, for the photochromic material chosen from at least one naphthopyran represented by Formula (II), (d) B and B' are each independently chosen from the following (i) through (viii): (i) an unsubstituted, mono-, di-, or tri-substituted phenyl group; (ii) a mono-substituted heteroaromatic group chosen from benzofuran-2-yl, benzothien-3-yl, dibenzofuranyl, or carbazoyl; each of said phenyl and heteroaromatic substituents in (i) and (ii) being independently chosen from —C(O) U, wherein U being $C_1$-$C_6$ alkyl, $C_1$-$C_6$ alkoxy, mono-($C_1$-$C_6$)alkylamino, di-($C_1$-$C_6$)alkylamino, morpholino, or piperidino; or amino, mono($C_1$-$C_6$)alkylamino, di($C_1$-$C_6$) alkylamino, piperidino, morpholino or fluoro; (iii) an unsubstituted or mono-substituted phenothiazinyl, said substituents being $C_1$-$C_6$ alkyl or $C_1$-$C_6$ alkoxy; (iv) a monosubstituted phenyl, said phenyl having a substituent located at the para position being —O—(CH$_2$)$_r$—, wherein r being chosen from the integer 3 or 6, said substituent being connected to an aryl group which is a member of another photochromic material; (v) said group represented by one of the following Formulas,

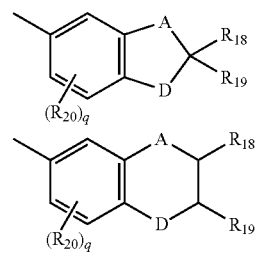

wherein A is independently chosen in each formula from methylene or oxygen and D is independently chosen in each formula from oxygen or substituted nitrogen, provided that when D is substituted nitrogen, A is methylene; said nitrogen substituents being $C_1$-$C_6$ alkyl; each $R_{20}$ being independently chosen for each occurrence in each formula from $C_1$-$C_6$ alkyl or $C_1$-$C_6$ alkoxy; $R_{18}$ and $R_{19}$ each being independently chosen in each formula from hydrogen or $C_1$-$C_6$ alkyl; and q being chosen from the integer 0, 1 or 2; (vi)

$C_1$-$C_6$ alkyl, $C_3$-$C_6$ cycloalkyl, or $C_4$-$C_{17}$ bicycloalkyl; (vii) said group represented by the following Formula,

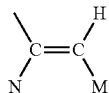

wherein N is hydrogen and M is an unsubstituted, mono-, or di-substituted phenyl; each of said group substituents being independently chosen from $C_1$-$C_4$ alkoxy or fluoro; or (viii) B and B' taken together form fluoren-9-ylidene, mono-, or di-substituted fluoren-9-ylidene or a saturated $C_7$-$C_{12}$ spirobicyclic hydrocarbon rings; each of said fluoren-9-ylidene substituents being fluoro.

In accordance with some additional embodiments, for the photochromic material chosen from at least one naphthopyran represented by Formula (II), there is the proviso that one or two of $R_{12}$, $R_{13}$, $R_{14}$, B, and B' is in each case independently an L-Group as defined below.

The photochromic materials represented by Formula (II) can with some embodiments be prepared by art-recognized methods, such as but not limited to, those disclosed in U.S. Pat. Nos. 5,466,398, 5,578,252 and 5,637,262.

In accordance with some embodiments, for the photochromic material chosen from at least one naphthopyran represented by Formula (III): (a) $R_{21}$ is the group, —C(O)W or $CH_2Q$, described hereinbefore in (1)(d); (b) $R_{22}$ and each $R_{23}$ are independently chosen for each occurrence from hydroxy, $NH_2$ or N(R)H; wherein R is $C_1$-$C_3$ alkyl or phenyl and n is chosen from the integers 0, 1 or 2; and (c) B and B' are each independently chosen from the groups described hereinbefore in (2)(d).

In accordance with some additional embodiments, for the photochromic material chosen from at least one naphthopyran represented by Formula (III), there is the proviso that one or two of $R_{21}$, $R_{22}$, $R_{23}$, B, and B' is in each case independently an L-Group as defined further herein below.

The photochromic materials represented by Formula (III) can with some embodiments be produced by art-recognized methods known, such as but not limited to those disclosed in U.S. Pat. Nos. 5,458,814; 5,573,712; 5,650,098; and 5,651,923.

In accordance with some embodiments, for the photochromic material chosen from at least one naphthopyran represented by Formula (IV), (a) $R_5$ is independently chosen from the groups described hereinbefore in (1)(d).

In accordance with some embodiments, for the photochromic material chosen from at least one naphthopyran represented by Formula (IV), (b) $R_{24}$ and $R_{25}$ are each chosen from hydrogen or an amino group defined hereinafter, provided that $R_{24}$ and $R_{25}$ are not both hydrogen; the amino group being selected from (i) through (iii) as follows: (i) —N($R_{16}$)$R_{17}$, $R_{16}$ and $R_{17}$ each being independently chosen from $C_1$-$C_8$ alkyl, aryl, or $C_3$-$C_{20}$ cycloalkyl; and said aryl group being phenyl or naphthyl; (ii) a nitrogen containing ring represented by the following formula,

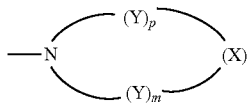

wherein each Y is independently chosen for each occurrence from —$CH_2$—, X is —Y—, —O—, —S—, or —N($R_{26}$)—; $R_{26}$ being $C_1$-$C_6$ alkyl; said aryl group being phenyl or naphthyl, m is chosen from the integer 1, 2 or 3, and p is chosen from the integer 0, 1, 2 or 3; provided that when p is 0, X is Y; or (iii) the group represented by one of the following Formulas,

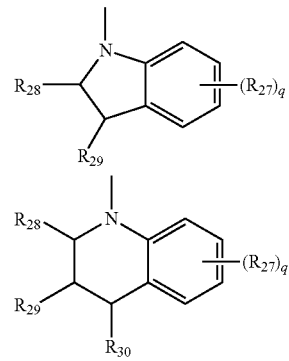

wherein each $R_{28}$, $R_{29}$ and $R_{30}$ are chosen independently for each occurrence in each formula from hydrogen; $R_{27}$ is chosen independently for each occurrence from $C_1$-$C_6$ alkyl, and q is chosen from the integer 0, 1 or 2.

In accordance with some additional embodiments, for the photochromic material chosen from at least one naphthopyran represented by Formula (IV), (c) B and B' are each independently chosen from the groups described hereinbefore in (2)(d) with regard to Formula (II).

In accordance with some additional embodiments, for the photochromic material chosen from at least one naphthopyran represented by Formula (IV), there is the proviso that one or two of $R_5$, $R_{24}$, and $R_{25}$, B, and B' is in each case independently an L-Group as defined in further detail herein below.

The photochromic materials represented by Formula (IV) can with some embodiments be produced by art-recognized methods known, such as but not limited to those disclosed in U.S. Pat. Nos. 6,248,264 and 6,348,604.

In accordance with some embodiments, for the photochromic material chosen from at least one phenanthopyran represented by Formula (VA) and Formula (VB): (a) $R_{31}$ is $R_5$ described hereinbefore in (1)(d); (b) $R_{32}$ is hydrogen or $C_1$-$C_6$ alkyl; (c) each $R_{33}$ is independently chosen for each occurrence from —N($R_{10}$)$R_{11}$, which was described hereinbefore in (1)(d), $C_1$-$C_6$ alkyl, or —O$R_{34}$, wherein $R_{34}$ is $C_1$-$C_6$ alkyl, and q is the integer 0, 1, or 2; and (d) B and B' are each independently chosen from the groups described hereinbefore in (2)(d) with regard to Formula (II).

In accordance with some additional embodiments, for the photochromic material chosen from at least one phenanthopyran represented by Formula (VA) and Formula (VB), there is the proviso that one or two of $R_{31}$, $R_{32}$, $R_{33}$, B, and B' is in each case independently an L-Group as defined in further detail herein below.

The photochromic materials represented by Formula (VA) and Formula (VB) can with some embodiments be produced by art-recognized methods known, such as but not limited to those disclosed in U.S. Pat. No. 5,514,817.

In accordance with some embodiments, for the photochromic material chosen from at least one fluoranthenopyran represented by Formula (VI): (a) $R_{35}$ and $R_{36}$ are each independently chosen for each occurrence from $C_1$-$C_6$ alkyl, $C_1$-$C_6$ alkoxy, fluoro, amino, mono($C_1$-$C_6$)alkylamino, di($C_1$-$C_6$)alkylamino, phenylamino, mono- or di-($C_1$-$C_6$)alkyl substituted phenylamino or mono- or di-($C_1$-$C_6$)alkoxy substituted phenylamino, and q is the integer 0, 1 or 2; (b) $R_5$ is chosen from the group described hereinbefore in (1)(d); and (c) B and B' are each independently chosen from the groups described hereinbefore in (2)(d) with regard to Formula (II).

In accordance with some additional embodiments, for the photochromic material chosen from at least one fluoranthenopyran represented by Formula (VI), there is the proviso that one or two of $R_5$, $R_{35}$, $R_{36}$, B, and B' is in each case independently an L-Group as defined in further detail herein below.

The photochromic materials represented by Formula (VI) can with some embodiments be produced by art-recognized methods known, such as but not limited to those disclosed in U.S. Pat. No. 5,891,368.

In accordance with some embodiments, for the photochromic material chosen from at least one naphthopyran represented by Formula (VII): (a) $R_{37}$ and $R_{38}$ together form an oxo group or $R_{37}$ and $R_{38}$ each are independently chosen for each occurrence from hydrogen, $C_1$-$C_6$ alkyl, $C_3$-$C_7$ cycloalkyl, phenyl or methacryloxy($C_1$-$C_6$)alkyl; (b) $R_{39}$ is chosen from $C_1$-$C_6$ alkyl, $C_1$-$C_6$ alkoxy, fluoro, or morpholino, and q is the integer 0, 1 or 2; (c) I is oxygen or —N($R_{40}$)—, wherein $R_{40}$ is $C_1$-$C_6$ alkyl, $C_3$-$C_7$ cycloalkyl or phenyl; (d) K is oxygen, —N($R_{40}$)— or —C($R_{41}$)($R_{42}$)—, wherein $R_{41}$ and $R_{42}$ are each hydrogen or $C_1$-$C_6$ alkyl; and (e) B and B' are each independently chosen from the groups described hereinbefore in (2)(d) with regard to Formula (II).

In accordance with some additional embodiments, for the photochromic material chosen from at least one naphthopyran represented by Formula (VII), there is the proviso that one or two of $R_{37}$, $R_{38}$, $R_{39}$ independently for each q, B, and B' is in each case independently an L-Group as defined in further detail herein below.

The photochromic materials represented by Formula (VII) can with some embodiments be produced by art-recognized methods known, such as but not limited to those disclosed in U.S. Pat. No. 6,022,497.

In accordance with some embodiments, for the photochromic material chosen from at least one naphthopyran represented by Formula (VIII): (a) $R_{43}$ and $R_{44}$ together form an oxo group or $R_{43}$ and $R_{44}$ are both hydrogen, $C_1$-$C_6$ alkyl, $C_3$-$C_7$ cycloalkyl or phenyl; (b) $R_{45}$ is hydrogen or $C_1$-$C_6$ alkyl; (c) $R_{46}$ is hydrogen or $C_1$-$C_6$ alkyl, $C_3$-$C_7$ cycloalkyl; (d) each $R_{47}$ is $C_1$-$C_6$ alkyl, $C_1$-$C_6$ alkoxy or fluoro, and q is the integer 0, 1 or 2; and (e) B and B' are each independently chosen from the groups described hereinbefore in (2)(d) with regard to Formula (II).

In accordance with some additional embodiments, for the photochromic material chosen from at least one naphthopyran represented by Formula (VIII), there is the proviso that one or two of $R_{43}$, $R_{44}$, $R_{45}$, $R_{46}$, $R_{47}$ independently for each q, B, and B' is in each case independently said L-Group as defined below.

The photochromic materials represented by Formula (VIII) can with some embodiments be produced by art-recognized methods known, such as but not limited to those disclosed in U.S. Pat. No. 6,106,744.

In accordance with some embodiments, for the photochromic material chosen from at least one naphthopyran represented by Formulas (IXA), (IXB), (IXC), (IXD), (IXE), (IXF), (IXG) and (IXH): (a) $R_{43}$ and $R_{44}$ are the same groups described hereinbefore in (8)(a) with regard to Formula (VIII); (b) $R_{47}$ in each case is independently chosen from groups described hereinbefore in (8)(d) with regard to Formula (VIII), and q is in each case independently as described hereinbefore in (8)(d); and (c) B and B' are each independently chosen from the groups described hereinbefore in (2)(d) with regard to Formula (II).

In accordance with some additional embodiments, for the photochromic material chosen from at least one naphthopyran represented by Formulas (IXA), (IXB), (IXC), (IXD), (IXE), (IXF), (IXG) and (IXH), there is the proviso that one or two of $R_{43}$, $R_{44}$, $R_{47}$ independently for each q, B, and B' is in each case independently an L-Group as defined in further detail herein below.

The photochromic materials represented by Formulas (IXA), (IXB), (IXC), (IXD), (IXE), (IXF), (IXG) and (IXH) can with some embodiments be produced by art-recognized methods known, such as but not limited to those disclosed in U.S. Pat. Nos. 6,022,495 and 6,149,841.

In accordance with some embodiments, for the photochromic material chosen from at least one naphthopyran represented by Formula (XA) and Formula (XB), (a) Ring A' is chosen from; (i) an unsubstituted, mono- or di-substituted heterocyclic ring; or (ii) an unsubstituted, mono- or di-substituted indeno group, each of said heterocyclic ring and indeno group substituents being $C_1$-$C_4$ alkyl, $C_1$-$C_3$ alkoxy, —N($R_{10}$)$R_{11}$, which was described hereinbefore in (1)(d), benzo, mono- or di-substituted benzo fused to the indeno moiety, said benzo substituents being $C_1$-$C_3$ alkyl, $C_1$-$C_3$ alkoxy or —N($R_{10}$)$R_{11}$.

In accordance with some further embodiments, for the photochromic material chosen from at least one naphthopyran represented by Formula (XA) and Formula (XB), (b) $R_{48}$ is chosen from: (i) —C(O)W', W' being —OR$_9$ or —N($R_{10}$)$R_{11}$, which groups are described hereinbefore in (1)(d); or (ii) —C($R_{51}$)$_2$X', wherein X' is —CN, halogen, hydroxy, benzoyloxy, $C_1$-$C_4$ alkoxy, $C_2$-$C_4$ acyloxy, amino, $C_1$-$C_4$ mono-alkylamino, $C_1$-$C_4$ dialkylamino, morpholino, piperidino, 1-indolinyl or pyrrolidyl, and $R_{51}$ is hydrogen, $C_1$-$C_4$ alkyl, phenyl or naphthyl.

In accordance with some additional embodiments, for the photochromic material chosen from at least one naphthopyran represented by Formula (XA) and Formula (XB): (c) $R_{49}$ is hydrogen, $C_1$-$C_4$ alkyl, the mono- or di-substituted aryl groups phenyl or naphthyl, said aryl substituents being $C_1$-$C_4$ alkyl or $C_1$-$C_4$ alkoxy, chloro or fluoro; (d) each $R_{50}$ is fluoro, $C_1$-$C_4$ alkyl, $C_1$-$C_4$ alkoxy, phenyl, naphthyl, phenoxy, naphthoxy, or the group, —N($R_{10}$)$R_{11}$, described hereinbefore in (1)(d), and q is selected from the integers 0, 1 or 2 for the naphthopyran represented by Formula (XA), or p is selected from the integers 0, 1, 2 or 3 for the naphthopyran represented by Formula (XB); and (e) B and B' are each independently chosen from the groups described hereinbefore in (2)(d) with regard to Formula (II).

In accordance with some additional embodiments, for the photochromic material chosen from at least one naphthopyran represented by Formula (XA) and Formula (XB), there is the proviso that one or two of $R_{45}$, $R_{49}$, $R_{50}$ independently for each q and independently for each p, B, and B' is in each case independently an L-Group as defined in further detail herein below.

The photochromic materials represented by Formula (XA) and Formula (XB) can with some embodiments be produced by art-recognized methods known, such as but not limited to those disclosed in U.S. Pat. No. 5,651,923.

In accordance with some embodiments, for the photochromic material chosen from at least one indenonaphthopyran represented by Formula (XIA) and Formula (XIB), (a) Ring A" is an unsubstituted, mono-substituted or di-substituted heterocyclic ring chosen from furo, thieno, benzothieno, benzofurano or indolo, the 2,3 or 3,2 positions of said heterocyclic ring being fused to the I side of Formula (XIB), or to the p side of the indenonaphthopyran represented by Formula (XIA), where said heterocyclic ring substituents being $C_1$-$C_6$ alkyl.

In accordance with some further embodiments, for the photochromic material chosen from at least one indenonaphthopyran represented by Formula (XIA) and Formula (XIB), (b) $R_{52}$ and $R_{53}$ together form an oxo group, a spiro heterocyclic group having 2 oxygen atoms and from 3 to 6 carbon atoms including the spirocarbon atom, or $R_{52}$ and $R_{53}$ are each hydrogen, hydroxy, $C_1$-$C_6$ alkyl, $C_3$-$C_7$ cycloalkyl, phenyl or the group, —C(O)W'', wherein each W'' is $C_1$-$C_6$ alkoxy, mono($C_1$-$C_6$)alkylamino or di($C_1$-$C_6$)alkylamino, or $R_{52}$ and $R_{53}$ are each the group, —N($R_{10}$)$R_{11}$, described hereinbefore in (1)(d), or —OR$_{54}$, wherein each $R_{54}$ is $C_1$-$C_6$ alkyl, phenyl($C_1$-$C_3$)alkyl, the group, —CH($R_{55}$)X'', wherein each $R_{55}$ is hydrogen or $C_1$-$C_3$ alkyl, each X'' is —COOR$_{55}$, or each $R_{54}$ is the group, —C(O)Y', wherein each Y' is $C_1$-$C_6$ alkyl.

In accordance with some further embodiments, for the photochromic material chosen from at least one indenonaphthopyran represented by Formula (XIA) and Formula (XIB): (c) $R_{47}$ in each case is independently chosen from groups described hereinbefore in (8)(d) with regard to Formula (VIII), and q is in each case independently as described hereinbefore in (8)(d) with regard to Formula (VIII); and (d) B and B' are each independently chosen from the groups described hereinbefore in (2)(d) with regard to Formula (II).

In accordance with some additional embodiments, for the photochromic material chosen from at least one indenonaphthopyran represented by Formula (XIA) and Formula (XIB), there is the proviso that one or two of $R_{47}$ independently for each q, $R_{52}$, $R_{53}$, B, and B' is in each case independently an L-Group as defined in further detail herein below.

The photochromic materials represented by Formula (XIA) and Formula (XIB) can with some embodiments be produced by art-recognized methods known, such as but not limited to those disclosed in U.S. Pat. No. 5,698,141.

In accordance with some embodiments, for the photochromic material chosen from at least one indenonaphthopyran represented by Formula (XIIA) and Formula (XIIB): (a) Ring A'' is independently as described hereinbefore in (11)(a), wherein Ring A'' is fused to the i side of Formula (XIIB), or to the p side of Formula (XIIA); (b) $R_{56}$ is hydrogen or hydroxy and $R_{57}$ is the group, —CH(V')$_2$, wherein V' is —COOR$_{58}$, and each $R_{58}$ is $C_1$-$C_6$ alkyl or phenyl($C_1$-$C_3$)alkyl; or $R_{57}$ is the group, —CH($R_{59}$)Y'', wherein $R_{59}$ is hydrogen and Y'' is —COOR$_{58}$, or —CH$_2$OR$_{60}$, wherein $R_{59}$ is $C_1$-$C_6$ alkyl or di($C_1$-$C_6$)alkylamino; and $R_{60}$ is $C_1$-$C_6$ alkyl; or (c) $R_{56}$ and $R_{57}$ together form the group, =C($R_{59}$)W''', wherein W'''' is —COOR$_{58}$; (d) $R_{47}$ in each case is independently chosen from groups described hereinbefore in (8)(d) with regard to Formula (VIII), and q is in each case independently as described hereinbefore in (8)(d) with regard to Formula (VIII); and (e) B and B' are each independently chosen from the groups described hereinbefore in (2)(d) with regard to Formula (II).

In accordance with some additional embodiments, for the photochromic material chosen from at least one indenonaphthopyran represented by Formula (XIIA) and Formula (XIIB), there is the proviso that one or two of $R_{47}$ independently for each q, $R_{56}$, $R_{57}$, B, and B' is in each case independently an L-Group as defined in further detail herein below.

The photochromic materials represented by Formula (XIIA) and Formula (XIIB) can with some embodiments be produced by art-recognized methods known, such as but not limited to those disclosed in U.S. Pat. No. 5,723,072.

In accordance with some embodiments, for the photochromic material chosen from at least one indenonaphthopyran represented by Formula (XIII): (a) $R_{61}$' is independently chosen for each q from, (i) $C_1$-$C_6$ alkoxy, perfluoro alkyl, halogen, and (ii) —SR$_{67}$, $R_{67}$ being $C_1$-$C_6$ alkyl or aryl, and (iii) an amino group described hereinbefore in (4)(b)(i), (ii) or (iii); and q is the integer 1. With further reference to Formula (XIII), (b) $R_{61}$ is chosen from perfluor alkyl or halogen.

In accordance with some further embodiments, for the photochromic material chosen from at least one indenonaphthopyran represented by Formula (XIII), (c) $R_{62}$ and $R_{63}$ are each independently chosen from (i) through (vii): (i) hydrogen, hydroxy, $C_1$-$C_{12}$ alkyl, $C_3$-$C_{12}$ alkylidene, $C_3$-$C_7$ cycloalkyl, or —C(O)W'', wherein W'' being the same group described hereinbefore in (11)(b); (ii) an unsubstituted, mono- di- or tri-substituted group chosen from phenyl; each of said phenyl substituents in (c)(ii) being chosen independently for each occurrence from chloro, fluoro, $C_1$-$C_6$ alkyl or $C_1$-$C_6$ alkoxy; (iii) a monosubstituted phenyl, described hereinbefore in (2)(d)(iv); (iv) —OR$_{67}$, $R_{67}$ being chosen from $C_1$-$C_6$ alkyl, phenyl($C_1$-$C_3$)alkyl, $C_1$-$C_6$ alkoxy($C_2$-$C_4$) alkyl tri($C_1$-$C_6$)alkylsilyl, tri($C_1$-$C_6$)alkylsilyloxy, tri($C_1$-$C_6$) alkoxysilyl, tri($C_1$-$C_6$)alkoxysilyloxy, di($C_1$-$C_6$)alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ alkyl)silyl or di($C_1$-$C_6$)alkoxy($C_1$-$C_6$ alkyl)silyloxy; (v) —CH(Q''')$_2$, Q''' being chosen from —COOR$_{69}$ and $R_{69}$ being $C_1$-$C_6$ alkyl; (vi) —CH($R_{70}$)G'', $R_{70}$ being chosen from hydrogen, $C_1$-$C_6$ alkyl or an unsubstituted, mono- or di-substituted aryl group, phenyl or naphthyl, and G'' being chosen from —COOR$_{69}$, —COR$_{71}$ or —CH$_2$OR$_{72}$, wherein $R_{71}$ being chosen from hydrogen, $C_1$-$C_6$ alkyl, an unsubstituted, mono- or di-substituted aryl group, phenyl or naphthyl, amino, mono($C_1$-$C_6$)alkylamino, di($C_1$-$C_6$)alkylamino, phenylamino, mono- or di-($C_1$-$C_6$) alkyl substituted phenylamino, mono- or di-($C_1$-$C_6$)alkoxy substituted phenylamino, diphenylamino, mono- or di($C_1$-$C_6$)alkyl substituted diphenylamino, mono- or di($C_1$-$C_6$) alkoxy substituted diphenylamino, morpholino or piperidino; $R_{72}$ being chosen from hydrogen, —C(O)R$_{69}$, $C_1$-$C_6$ alkyl, $C_1$-$C_3$ alkoxy($C_1$-$C_6$)alkyl, phenyl($C_1$-$C_3$)alkyl, mono ($C_1$-$C_6$)alkoxy substituted phenyl($C_1$-$C_3$)alkyl or an unsubstituted, mono- or di-substituted aryl group, phenyl or naphthyl, each of said aryl group substituents being independently chosen from $C_1$-$C_6$ alkyl or $C_1$-$C_6$ alkoxy; or (vii) $R_{62}$ and $R_{63}$ together form an oxo group or a substituted or unsubstituted spiro-carbocyclic ring containing 3 to 6 carbon atoms or a substituted or unsubstituted spiro-heterocyclic group containing 1 or 2 oxygen atoms and 3 to 6 carbon atoms including the spirocarbon atom, said spirocarbocyclic ring and spiro-heterocyclic group being annellated with 0, 1 or 2 benzene rings, said substituents being hydrogen or $C_1$-$C_6$ alkyl.

In accordance with some further embodiments, for the photochromic material chosen from at least one indenonaphthopyran represented by Formula (XIII), (d) $R_{64}$ is chosen from hydrogen, $C_1$-$C_6$ alkyl or the group $R_a$ chosen from: (i) —OR$_{73}$, $R_{73}$ being chosen from phenyl($C_1$-$C_3$) alkyl, $C_1$-$C_6$ alkyl, mono($C_1$-$C_6$)alkyl substituted phenyl ($C_1$-$C_3$)alkyl, mono($C_1$-$C_6$)alkoxy substituted phenyl($C_1$-

$C_3$)alkyl, $C_1$-$C_6$ alkoxy($C_2$-$C_4$)alkyl, $C_3$-$C_7$ cycloalkyl, mono($C_1$-$C_4$)alkyl substituted $C_3$-$C_7$ cycloalkyl, $C_1$-$C_6$ chloroalkyl, $C_1$-$C_6$ fluoroalkyl, allyl or —CH($R_{68}$)Q"; or (ii) an amino group described hereinbefore in (4)(b)(i), (ii) or (iii) with regard to Formula (IV).

In accordance with some additional embodiments, for the photochromic material chosen from at least one indenonaphthopyran represented by Formula (XIII): (e) $R_{65}$ is chosen from hydrogen, perfluor alkyl, halogen or $R_a$, where $R_a$ is the same as described hereinbefore in (d); (f) $R_{66}$ is chosen from hydrogen, $C_1$-$C_6$ alkyl or $R_a$, where $R_a$ is the same as described hereinbefore in (d); or (g) $R_{65}$ and $R_{66}$ together form one of the following Formulas,

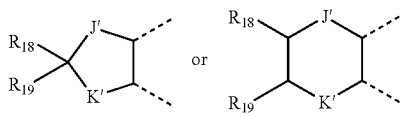

wherein J' and K' are oxygen, and groups $R_{18}$ and $R_{19}$ are each the same as described hereinbefore in (2)(d)(v).

In accordance with some additional embodiments, for the photochromic material chosen from at least one indenonaphthopyran represented by Formula (XIII), (h) B and B' are each independently chosen from the groups described hereinbefore in (2)(d) with regard to Formula (II).

In accordance with some additional embodiments, for the photochromic material chosen from at least one indenonaphthopyran represented by Formula (XIII), there is the proviso that one or two of $R_{61}$, $R_{61'}$ independently for each q, $R_{62}$, $R_{63}$, $R_{64}$, $R_{65}$, $R_{66}$, B, and B' is in each case independently an L-Group as defined in further detail herein below.

The photochromic materials represented by Formula (XIII) can with some embodiments be produced by art-recognized methods known, such as but not limited to those disclosed in U.S. Pat. No. 7,262,295 B2.

In accordance with some embodiments, for the photochromic material chosen from at least one indenonaphthopyran represented by Formula (XIV): (a) $R_{74}$ and $R_{75}$ are each independently as described hereinbefore with regard to $R_{62}$ and $R_{63}$ in (13)(c); (b) each $R_{76}$ is independently chosen from di($C_1$-$C_6$)alkylamino, dicyclohexylamino, diphenylamino, piperidyl, morpholinyl, pyridyl, halogen, or group —C(O)W", the group —C(O)W" being the same group described hereinbefore in (11)(b); and q is the integer 0, 1, or 2; or when q is 2, and the $R_{76}$ substituents are adjacent, each pair of substituents independently forms a substituted or unsubstituted fused carbocyclic or heterocyclic ring chosen from benzo, dihydrofurano, 1,4-dioxolo, 1,3-dioxino, or benzofuro, the substituents of said fused carbocyclic or heterocyclic ring being chosen from the group consisting of $C_1$-$C_6$ alkyl or $C_1$-$C_6$ alkoxy; and (c) B and B' are each independently chosen from the groups described hereinbefore in (2)(d) with regard to Formula (II).

In accordance with some additional embodiments, for the photochromic material chosen from at least one indenonaphthopyran represented by Formula (XIV), there is the proviso that one or two of $R_{74}$, $R_{75}$, $R_{76}$ independently for each q, B, and B' is in each case independently an L-Group as defined in further detail herein below.

The photochromic materials represented by Formula (XIV) can with some embodiments be produced by art-recognized methods known, such as but not limited to those disclosed in U.S. Pat. No. 6,736,998 B2.

In accordance with some embodiments of the present invention, independently for each L-Group represented by Formula (XV): (i) $Q_1$, $Q_2$, and $Q_3$ are each independently for each occurrence a divalent group selected from optionally substituted aryl, optionally substituted heteroaryl, optionally substituted cycloalkyl, and optionally substituted heterocycloalkyl, wherein each substituent is independently selected from: P, liquid crystal mesogens, halogen, poly($C_1$-$C_{12}$ alkoxy), $C_1$-$C_{12}$ alkoxycarbonyl, $C_1$-$C_{12}$ alkylcarbonyl, perfluoro($C_1$-$C_{12}$)alkoxy, perfluoro($C_1$-$C_{12}$)alkoxycarbonyl, perfluoro($C_1$-$C_{12}$)alkylcarbonyl, $C_1$-$C_{18}$ acetyl, $C_3$-$C_7$ cycloalkyl, $C_3$-$C_7$ cycloalkoxy, straight-chain $C_1$-$C_{12}$ alkyl, and branched $C_1$-$C_{12}$ alkyl; wherein said straight-chain $C_1$-$C_{12}$ alkyl and branched $C_1$-$C_{12}$ alkyl are mono-substituted with a group selected from, halogen, and $C_1$-$C_{12}$ alkoxy; or wherein said straight-chain $C_1$-$C_{12}$ alkyl and branched $C_1$-$C_{12}$ alkyl are poly-substituted with at least two groups independently selected from halogen.

In accordance with some further embodiments of the present invention, independently for each L-Group represented by Formula (XV): (ii) c, d, e, and f are each independently an integer chosen from 1 to 10; and $S_1$, $S_2$, $S_3$, $S_4$, and $S_5$ are each independently for each occurrence a spacer unit selected from (1) through (3): (1) substituted or unsubstituted alkylene, substituted or unsubstituted haloalkylene, —Si($CH_2$)$_g$—, and —Si[($CH_3$)$_2$]O)$_h$—, wherein g for each occurrence is independently chosen from an integer from 1 to 10; h for each occurrence is independently chosen from an integer from 1 to 8; and said substitutes for the alkylene and haloalkylene are independently selected from $C_1$-$C_{12}$ alkyl, $C_3$-$C_7$ cycloalkyl and phenyl; (2) —N(Z)—, —C(Z)=C(Z)—, and a single bond, wherein Z for each occurrence is independently selected from hydrogen, $C_1$-$C_{12}$ alkyl, $C_3$-$C_7$ cycloalkyl and phenyl; and (3) —O—, —C(=O)—, —C≡C—, —N=N—, —S—, and —S(=O)—; provided that when two spacer units comprising heteroatoms are linked together the spacer units are linked so that heteroatoms of the first spacer unit are not directly linked to the heteroatoms of the second spacer unit; and provided that when $S_1$ is linked to Formula I and $S_5$ is linked to P, $S_1$ and $S_5$ are each linked so that two heteroatoms are not directly linked to each other.

In accordance with some further embodiments of the present invention, independently for each L-Group represented by Formula (XV), (iii) P for each occurrence is selected from hydroxy, amino, $C_2$-$C_{12}$ alkenyl, $C_2$-$C_{12}$ alkenyl, silyl, siloxy, (tetrahydro-2H-pyran-2-yl)oxy, isocyanato, acryloyloxy, methacryloyloxy, epoxy, carboxylic acid, carboxylic ester, $C_1$-$C_{12}$ alkyloxycarbonyloxy, halocarbonyl, hydrogen, aryl, hydroxy($C_1$-$C_{12}$)alkyl, $C_1$-$C_{12}$ alkyl, $C_1$-$C_{12}$ alkoxy, ethylene, acryloyl, acryloyloxy($C_1$-$C_{12}$) alkyl, methacryloyl, methacryloyloxy($C_1$-$C_{12}$)alkyl, oxetanyl, glycidyl, vinyl ether, siloxane derivatives, unsubstituted cinnamic acid derivatives, cinnamic acid derivatives that are substituted with at least one of methyl, methoxy, cyano and halogen, and substituted or unsubstituted chiral or non-chiral monovalent or divalent groups chosen from steroid radicals, wherein each substituent is independently chosen from $C_1$-$C_{12}$ alkyl, $C_1$-$C_{12}$ alkoxy, amino, $C_3$-$C_7$ cycloalkyl, $C_1$-$C_{12}$ alkyl($C_1$-$C_{12}$)alkoxy, or fluoro($C_1$-$C_{12}$)alkyl, or P is a structure having from 2 to 4 reactive groups.

In accordance with some further additional embodiments of the present invention, independently for each L-Group represented by Formula (XV), (iv) d', e' and f' are each independently chosen from 0, 1, 2, 3, and 4, provided that a sum of d'+e'+f' is at least 2.

In accordance with some embodiments of the present invention, independently for each L-Group represented by Formula (XV): (i) $Q_1$, $Q_2$, and $Q_3$ are each independently for each occurrence a divalent group selected from optionally substituted aryl, optionally substituted heteroaryl, optionally substituted cycloalkyl, and optionally substituted heterocycloalkyl, wherein each substituent is independently selected from: P, $C_1$-$C_6$ alkoxycarbonyl, perfluoro($C_1$-$C_6$)alkoxy, $C_3$-$C_7$ cycloalkyl, $C_3$-$C_7$ cycloalkoxy, straight-chain $C_1$-$C_6$ alkyl, and branched $C_1$-$C_6$ alkyl; wherein said straight-chain $C_1$-$C_6$ alkyl and branched $C_1$-$C_6$ alkyl are mono-substituted with a group selected from halogen and $C_1$-$C_{12}$ alkoxy; or wherein said straight-chain $C_1$-$C_6$ alkyl and branched $C_1$-$C_6$ alkyl are poly-substituted with at least two groups independently selected from halogen.

In accordance with some further embodiments of the present invention, independently for each L-Group represented by Formula (XV): (ii) c, d, e, and f are each independently an integer chosen from 1 to 10; and $S_1$, $S_2$, $S_3$, $S_4$, and $S_5$ are each independently for each occurrence a spacer unit selected from (1) through (3): (1) substituted or unsubstituted alkylene; (2) —N(Z)—, —C(Z)=C(Z)—, and a single bond, wherein Z for each occurrence is independently selected from hydrogen and $C_1$-$C_6$ alkyl; and (3) —O—, —C(=O)—, —C≡C—, and —N=N—, —S—; provided that when two spacer units comprising heteroatoms are linked together the spacer units are linked so that heteroatoms of the first spacer unit are not directly linked to the heteroatoms of the second spacer unit; and provided that when $S_1$ is linked to Formula I and $S_5$ is linked to P, $S_1$ and $S_5$ are each linked so that two heteroatoms are not directly linked to each other.

In accordance with some further embodiments of the present invention, independently for each L-Group represented by Formula (XV): (iii) P for each occurrence is independently selected from hydroxy, amino, $C_2$-$C_6$ alkenyl, $C_2$-$C_6$ alkenyl, siloxy, (tetrahydro-2H-pyran-2-yl)oxy, isocyanato, acryloyloxy, methacryloyloxy, epoxy, carboxylic acid, carboxylic ester, $C_1$-$C_6$alkyloxycarbonyloxy, hydrogen, aryl, hydroxy($C_1$-$C_6$)alkyl, $C_1$-$C_6$ alkyl, ethylene, acryloyl, acryloyloxy($C_1$-$C_{12}$)alkyl, oxetanyl, glycidyl, vinyl ether, siloxane derivatives, and substituted or unsubstituted chiral or non-chiral monovalent or divalent groups chosen from steroid radicals, wherein each substituent is independently chosen from $C_1$-$C_6$ alkyl, $C_1$-$C_6$ alkoxy, amino, $C_3$-$C_7$ cycloalkyl.

With some embodiments of the present invention, each L-Group of each photochromic material is independently selected from the following L(1) through L(37):

L(1)

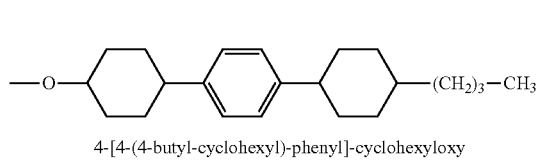

4-[4-(4-butyl-cyclohexyl)-phenyl]-cyclohexyloxy

L(2)

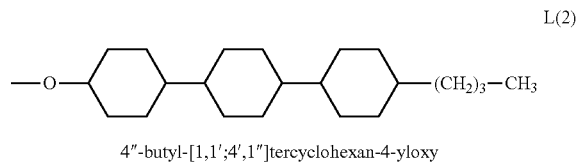

4″-butyl-[1,1′;4′,1″]tercyclohexan-4-yloxy

L(3)

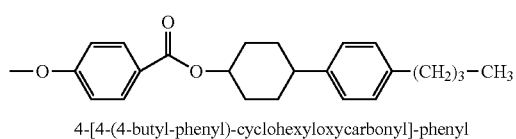

4-[4-(4-butyl-phenyl)-cyclohexyloxycarbonyl]-phenyl

L(4)

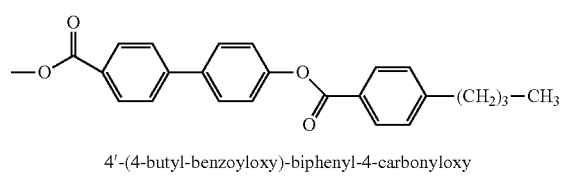

4′-(4-butyl-benzoyloxy)-biphenyl-4-carbonyloxy

L(5)

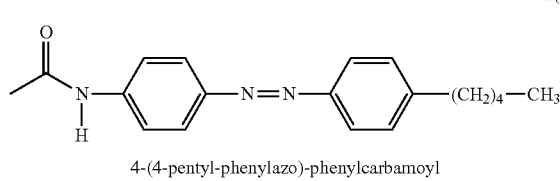

4-(4-pentyl-phenylazo)-phenylcarbamoyl

L(6)

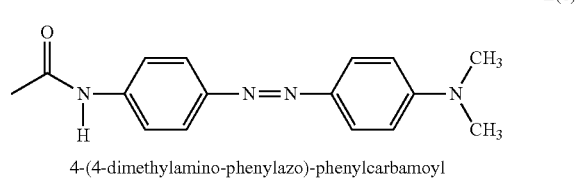

4-(4-dimethylamino-phenylazo)-phenylcarbamoyl

L(7)

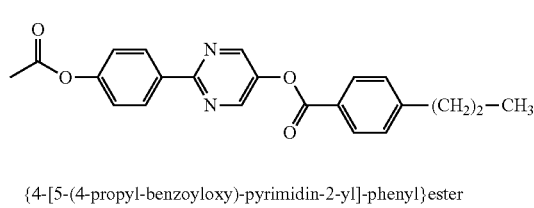

{4-[5-(4-propyl-benzoyloxy)-pyrimidin-2-yl]-phenyl}ester

L(8)

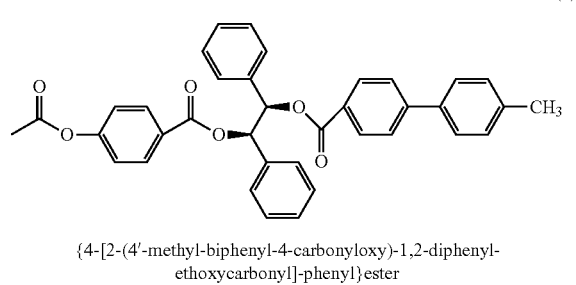

{4-[2-(4′-methyl-biphenyl-4-carbonyloxy)-1,2-diphenyl-ethoxycarbonyl]-phenyl}ester

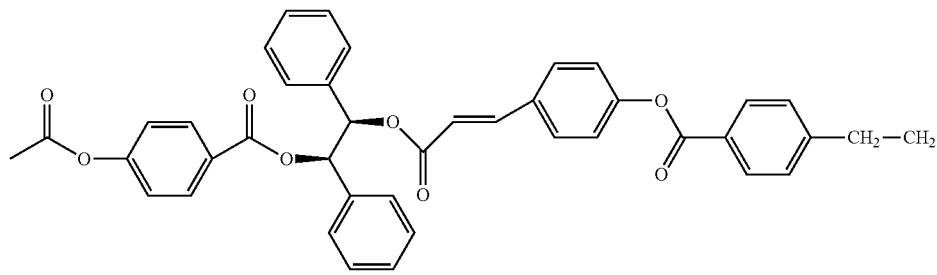

[4-1,2-diphenyl-2-{3-[4-(4-propyl-benzoyloxy)-phenyl]-acryloyloxy}-ethoxycarbonyl)-phenyl]ester

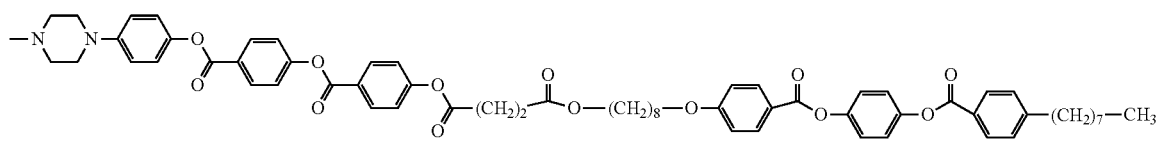

4-[4-(4-{4-[3-(6-{4-[4-(4-nonyl-benzoyloxy)-phenoxycarbonyl]-phenoxy}-hexyloxycarbonyl)-propionyloxy]-benzoyloxy}-benzoyloxy)-phenyl]piperazin-1-yl

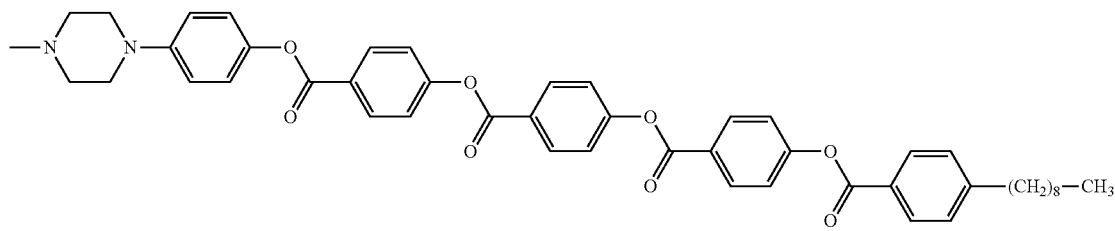

{4-[4-(4-{4-[4-(4-nonyl-benzoyloxy)-benzoyloxy)-benzoyloxy]-benzoyloxy}-benzoyloxy)-phenyl]-piperazin-1-yl}

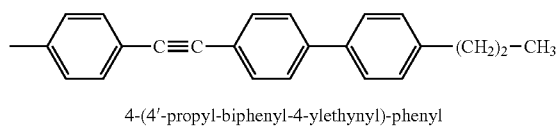

4-(4'-propyl-biphenyl-4-ylethynyl)-phenyl

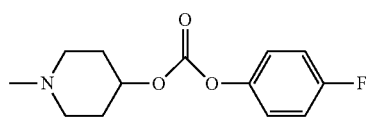

4-(4-fluoro-phenoxycarbonyloxy)-piperidin-1-yl

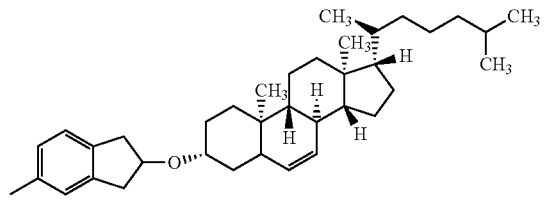

2-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxy]-indan-5-yl

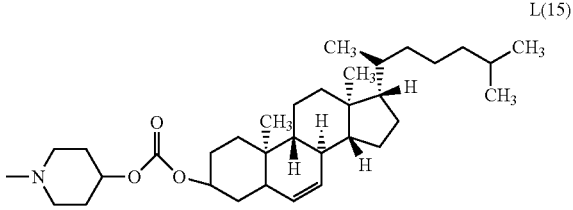

2-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl

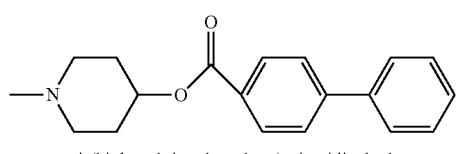

4-(biphenyl-4-carbonyloxy)-piperidin-1-yl

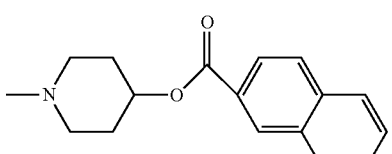

4-(naphthalene-2-carbonyloxy)-piperidin-1-yl

-continued

L(18)
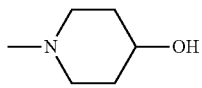
4-hydroxy-piperidin-1-yl

L(19)
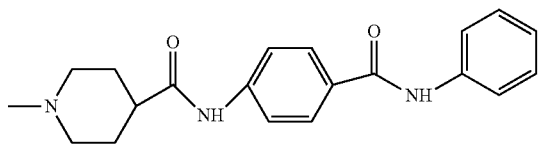
4-(4-phenylcarbamoyl-phenylcarbamoyl)-piperidin-1-yl

L(20)
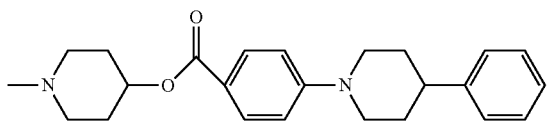
4-(4-(4-phenylpiperidin-1-yl)-benzoyloxy)-piperidin-1-yl

L(21)
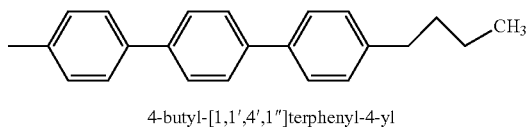
4-butyl-[1,1′,4′,1″]terphenyl-4-yl

L(22)
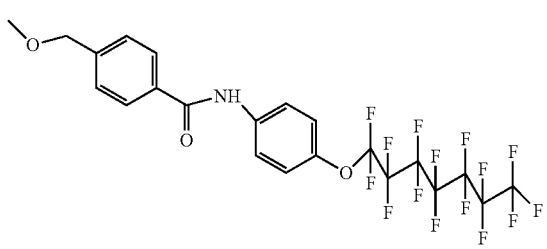
4-(4-pentadecafluoroheptyloxy-phenylcarbamoyl)-benzyloxy

L(23)
4-(3-piperidin-4-yl-propyl)-piperidin-1-yl

L(24)
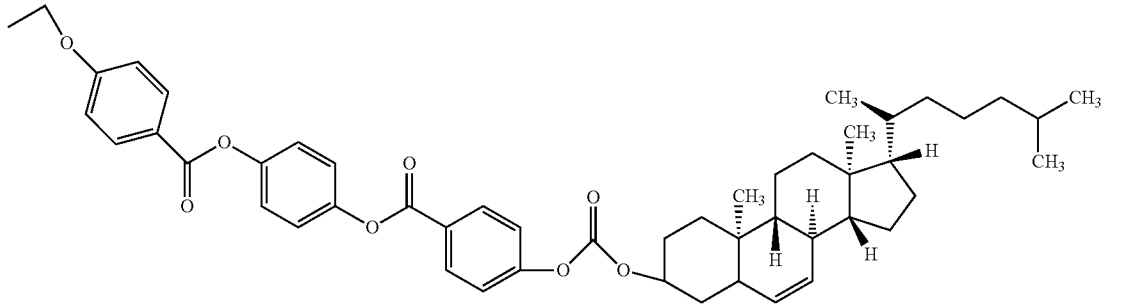
4-(4-{4-[17-(1,5-dimethyl-hexyl)-10,13-dimethyl-
2,3,4,7,8,9,10,11,12,13,14,15,16,17-tetradecahydro-1H-cyclopenta[a]phenanthren-3-
yloxycarbonyloxy]-benzoyloxy}-phenoxycarbonyl)-phenoxymethyl L(25)
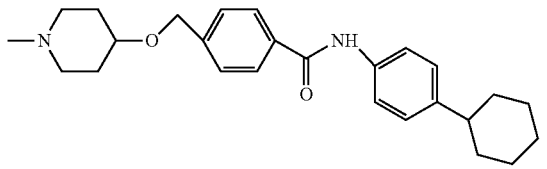
4-[4-(4-cyclohexyl-phenylcarbamoyl)-benzyloxy]-piperidin-1-yl L(26)
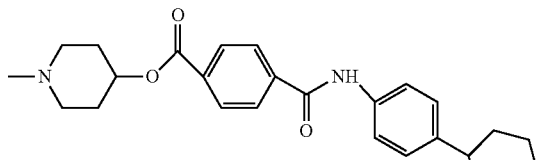
4-[4-(4-cyclohexyl-phenylcarbamoyl)-benzoyloxy]-piperidin-1-yl L(27)
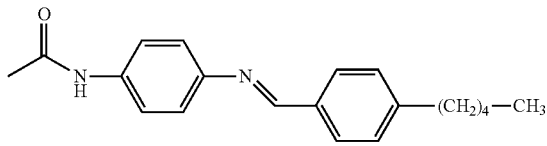
N-{-[(4-pentyl-benzyllidene)-amino]-phenyl}-acetamidyl L(28)
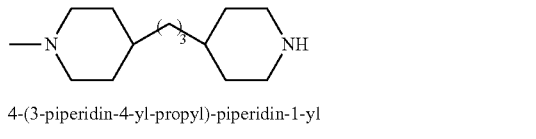
4-(3-piperidin-4-yl-propyl)-piperidin-1-yl

L(29)

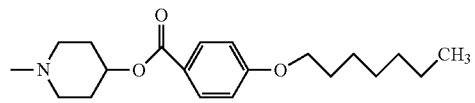

4-(4-hexyloxy-benzoyloxy)-piperidin-1-yl]

L(30)

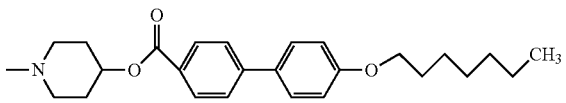

4-(4'-hexyloxy-biphenyl-4-carbonyloxy)-piperidin-1-yl]

L(31)

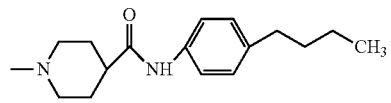

4-(4-butyl-phenylcarbamoyl)-piperidin-1-yl

L(32a)

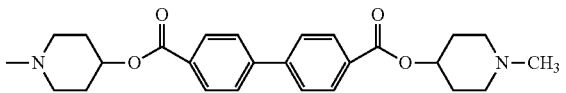

1-methyl-4-((4'-(((1-methylpiperidin-4-yl)oxy)carbonyl)-[1,1'-biphenyl]-4-carbonyl(oxy)piperidin-1-yl L(32b)

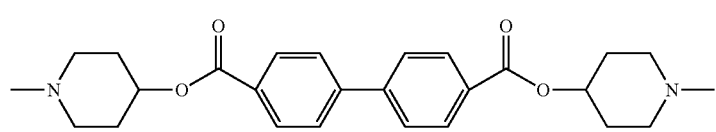

bis(1-yl)piperidin-4-yl) [1,1'-biphenyl]-4,4'-dicarboxylate (which links two separate photochromic PC groups)

L(33)

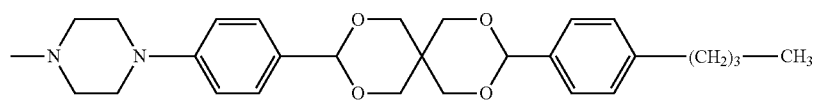

4-(4-(9-(4-butylphenyl)-2,4,8,10-tetraoxaspiro[5.5]undec-3-yl)phenyl)piperazin-1-yl

L(34)

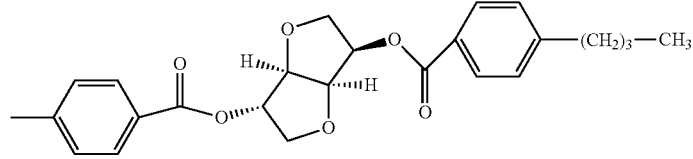

4-(6-(4-butylpenyl)carbonyloxy-(4,8-dioxabicyclo[3.3.0]oct-2-yl))oxycarbonyl)pheny

L(35)

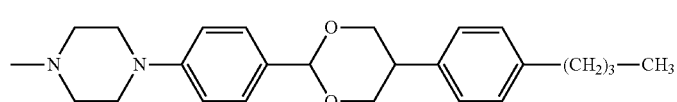

1-{4-[5-(4-butyl-phenyl)-[1,3]dioxan-2-yl]-phenyl}-4-methyl-piperazin-1-yl

L(36)

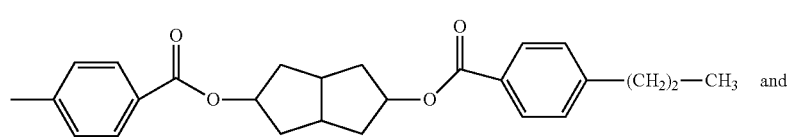

and 4-(7-(4-propylphenylcarbonyloxy)bicyclo[3.3.0]oct-2-yl)oxycarbonyl)phenyl

L(37)

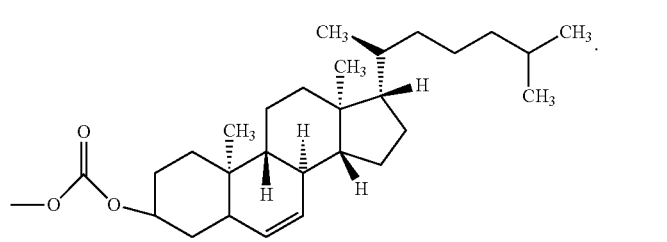

4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy With some embodiments of the present invention, each L-Group of each photochromic material is independently selected from the following L(a) through L(z):
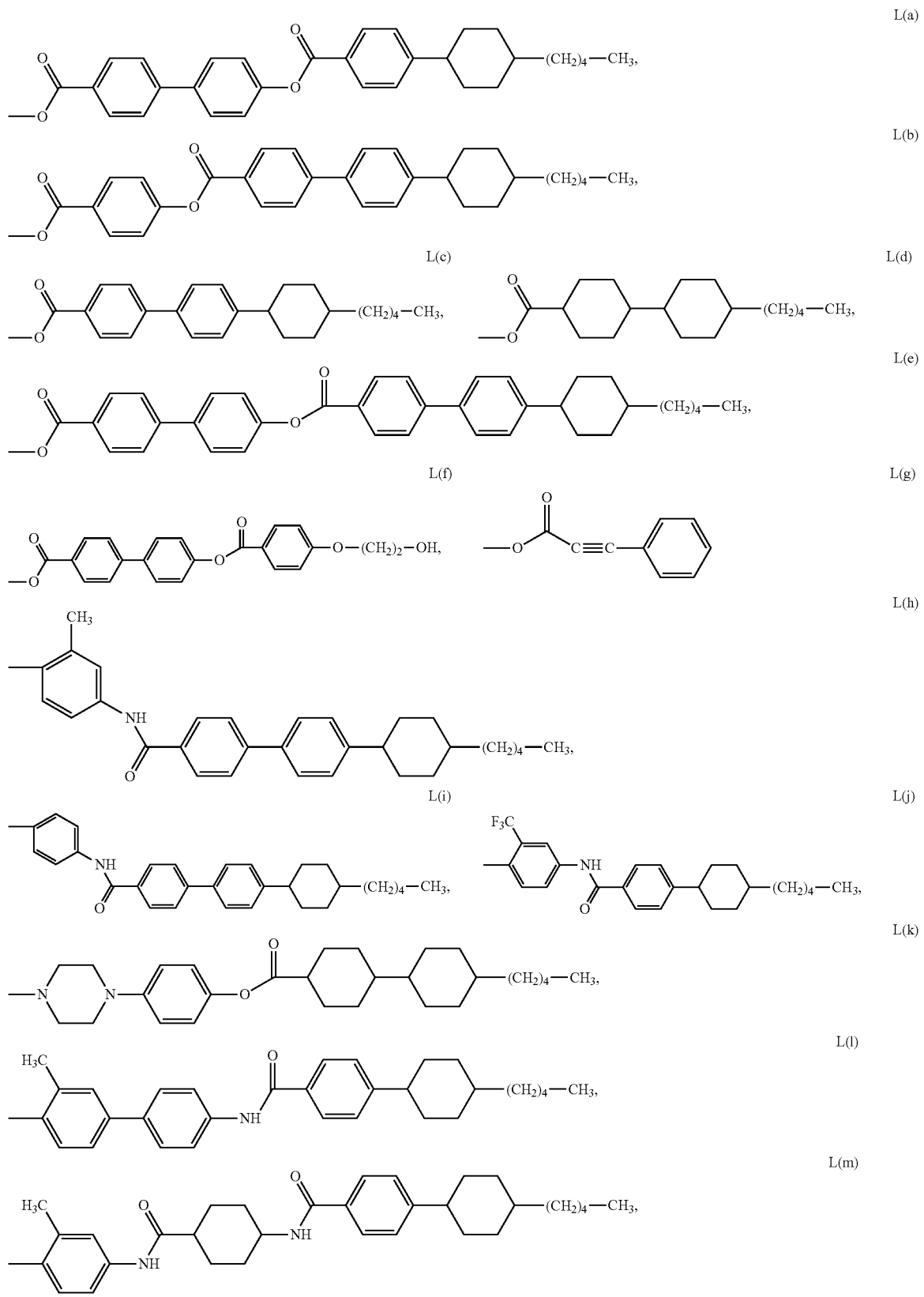

L(n)
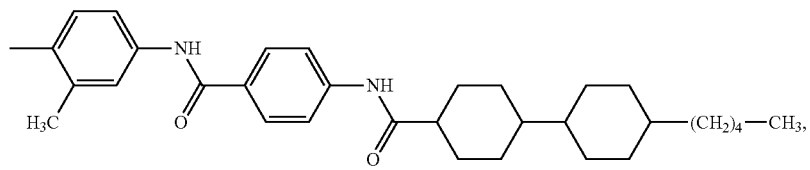
L(o)
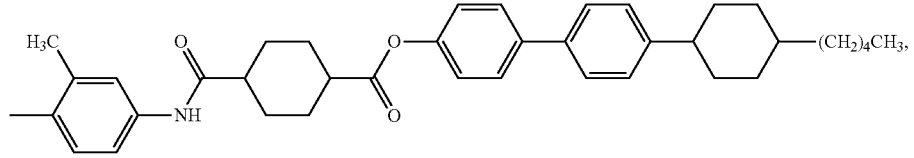
L(p)
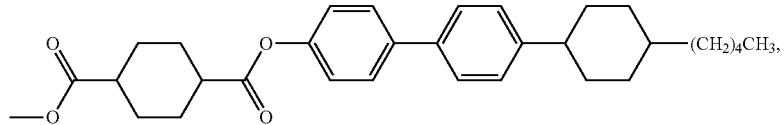
L(q)
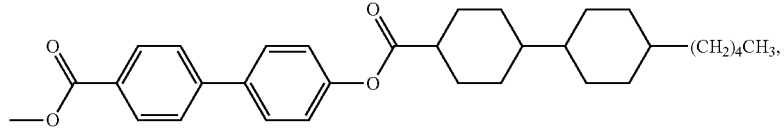
L(r)
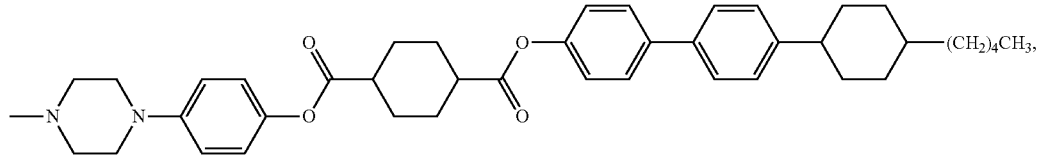
L(s)
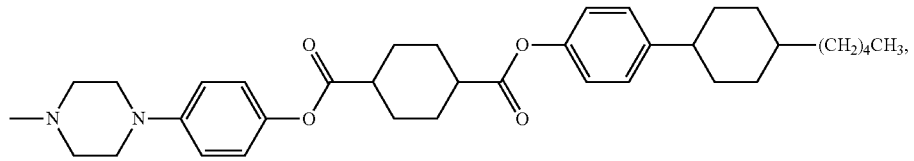
L(t)
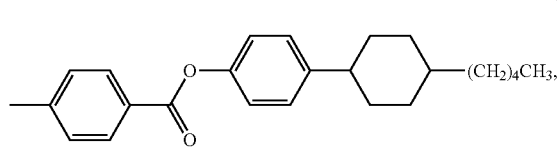
L(u)
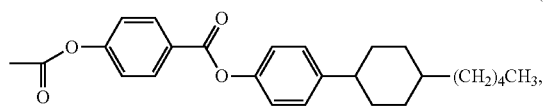
L(v)
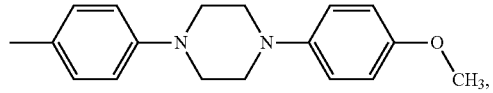
L(w)
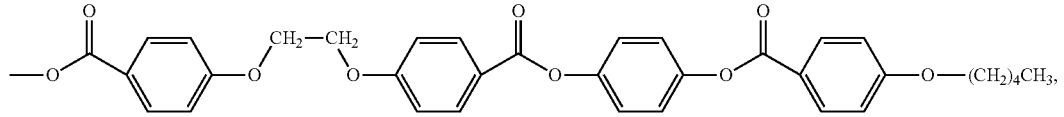
L(x)
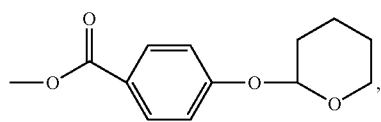
L(y)
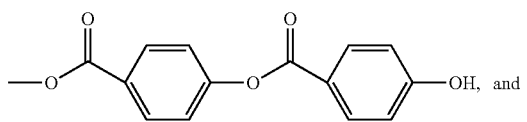
and -continued

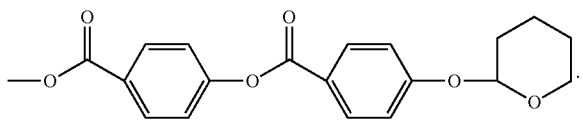

L(z)

With some embodiments of the present invention, each L-Group of each photochromic material is independently selected from the following L(aa) through L(ae):

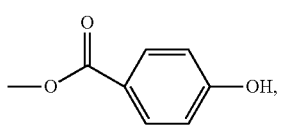

L(aa)

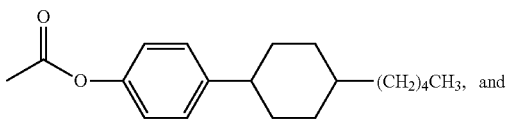

L(ab)

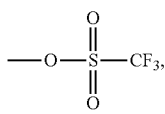

L(ac)

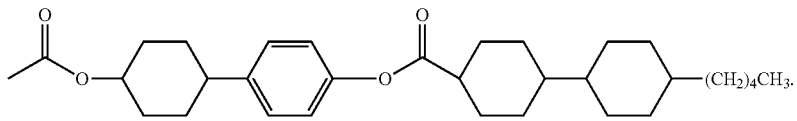

L(ad)

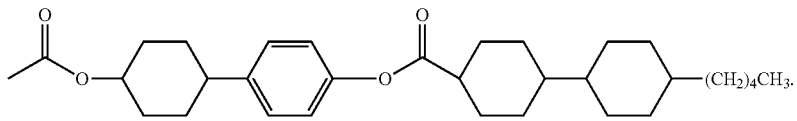

L(ae)

With some embodiments of the present invention, each L-Group of each photochromic material is independently selected from the following L-DC-(a) through L-DC-(l):

L-DC-(a) (4-trans-(4-pentylcyclohexyl)benzamido)phenyl,

L-DC-(b) (4-(4-trans-(4-pentylcyclohexyl)phenoxy)carbonyl) phenyl,

L-DC-(c) 4-(4-(4-trans-(4-pentylcyclohexyl)phenyl)benzamido) phenyl,

L-DC-(d) 4-((trans-(4'-pentyl-[1,1'-bi(cyclohexan)]-4-yl)oxy)carbonyl)phenyl,

L-DC-(e) 4-(4'-(4-pentylcyclohexyl)-[1,1'-biphenyl]-4-ylcarboxamido)phenyl,

L-DC-(f) 4-((4'-(4-pentylcyclohexyl)-[1,1'-biphenyl]-4-carbonyl)oxy)benzamido,

L-DC-(g) 4-(4'-(4-pentylcyclohexyl)-[1,1'-biphenyl]-4-carbonyl)piperazin-1-yl,

L-DC-(h) 4-(4-(4-trans-(4-pentylcyclohexyl) phenyl)benzamido)-2-(trifluoromethyl)phenyl, L-DC-(i) 2-methyl-4-trans-(4-((4'-trans-(4-pentylcyclohexyl)biphenyl-4-yloxy)carbonyl)cyclohexanecarboxamido)phenyl, L-DC-(j) 4'-(4'-pentylbi(cyclohexane-4-)carbonyloxy)biphenylcarbonyloxy, L-DC-(k) 4-(((3S,8S,9S,10R,13R,14S,17R)-10,13-dimethyl-17-((R)-6-methylheptan-2-yl)-2,3,4,7,8,9,10,11,12,13,14,15,16,17-tetradecahydro-1H-cyclopenta[a]phenanthren-3-yloxy)carbonyl)piperazin-1-yl, and L-DC-(l) 4-((S)-2-methylbutoxy)phenyl)-10-(4-(((3R,3aS,6S,6aS)-6-(4'-trans-(4-pentylcyclohexyl)biphenylcarbonyloxy)hexahydrofuro[3,2-d]furan-3-yloxy)carbonyl) phenyl.

The photochromic materials of the present invention include at least one L-Group independently bonded to at least one position of the photochromic molecule. With some embodiments, at least one and less than all available positions of the photochromic molecule of the photochromic materials of the present invention each independently have bonded thereto an L-Group. In accordance with some additional embodiments, one to two available positions of the photochromic molecule of the photochromic materials of the present invention each independently have bonded thereto an L-Group. In accordance with some further embodiments, one available position of the photochromic molecule of the photochromic materials of the present invention has bonded thereto an L-Group.

With some embodiments, the photochromic material is selected from at least one fluoranthenoxazine represented by Formula (I) having at least one L-Group bonded to a Ring Position selected from Ring Position 1 ($R_7$), Ring Position 11 ($R_6$), Ring Position 5' ($R_2$), and/or Ring Position 6' ($R_2$).

With some embodiments, the photochromic material is selected from at least one naphthopyran represented by Formula (II) having an L-Group bonded to Ring Position 7 ($R_{12}$).

With some embodiments, the photochromic material is selected from at least one naphthopyran represented by Formula (III) having an L-Group bonded to Ring Position 8 ($R_{23}$).

With some embodiments, the photochromic material is selected from at least one naphthopyran represented by Formula (IV) having an L-Group bonded to Ring Position 9 ($R_{24}$).

With some embodiments, the photochromic material is selected from at least one phenanthropyan represented by Formula (VA) having at least one L-Group bonded a Ring Position selected from Ring Position 8 ($R_{33}$), Ring Position 9 ($R_{33}$), and Ring Position 12 ($R_{33}$). With some embodiments, the photochromic material is selected from at least one phenanthropyan represented by Formula (VB) having an L-Group bonded Ring Position 8 ($R_{33}$).

With some embodiments, the photochromic material is selected from at least one fluoranthenopyran represented by Formula (VI) having at least one L-Group bonded to a Ring Position selected from Ring Position 1 ($R_{36}$), Ring Position 9 ($R_{35}$), and/or Ring Position 12 ($R_{35}$).

With some embodiments, the photochromic material is selected from at least one naphthopyran represented by Formula (VII) having at least one L-Group bonded to Ring Position 11 ($R_{47}$).

With some embodiments, the photochromic material is selected from at least one naphthopyran represented by Formula (VIII) having at least one L-Group bonded to a Ring Position selected from Ring Position 8 ($R_{46}$) and/or Ring Position 10 ($R_{47}$).

With some embodiments, the photochromic material is selected from at least one naphthopyran represented by Formula (IXA) having at least one L-Group bonded to a Ring Position selected from Ring Position 8 ($R_{47}$), Ring Position 9 ($R_{47}$), and/or Ring Position 12 ($R_{47}$). With some embodiments, the photochromic material is selected from at least one naphthopyran represented by Formula (IXB) having at least one L-Group bonded to a Ring Position selected from Ring Position 8 ($R_{47}$), Ring Position 9 ($R_{47}$), and/or Ring Position 12 ($R_{47}$).

With some embodiments, the photochromic material is selected from at least one naphthopyran represented by Formula (IXC) having at least one L-Group bonded to a Ring Position selected from Ring Position 1 ($R_{47}$), Ring Position 4 ($R_{47}$), Ring Position 7 ($R_{47}$), and/or Ring Position 10 ($R_{47}$). With some embodiments, the photochromic material is selected from at least one naphthopyran represented by Formula (IXD) having at least one L-Group bonded to a Ring Position selected from Ring Position 6 ($R_{47}$), Ring Position 9 ($R_{47}$), and/or Ring Position 12 ($R_{47}$).

With some embodiments, the photochromic material is selected from at least one naphthopyran represented by Formula (IXE) having at least one L-Group bonded to a Ring Position selected from Ring Position 3 ($R_{47}$) and/or Ring Position 9 ($R_{47}$). With some embodiments, the photochromic material is selected from at least one naphthopyran represented by Formula (IXF) having at least one L-Group bonded to a Ring Position selected from Ring Position 3 ($R_{47}$) and/or Ring Position 9 ($R_{47}$).

With some embodiments, the photochromic material is selected from at least one naphthopyran represented by Formula (IXG) having at least one L-Group bonded to a Ring Position selected from Ring Position 6 ($R_{47}$), Ring Position 7 ($R_{47}$), Ring Position 9 ($R_{47}$), and/or Ring Position 14 ($R_{47}$). With some embodiments, the photochromic material is selected from at least one naphthopyran represented by Formula (IXH) having at least one L-Group bonded to a Ring Position selected from Ring Position 5 ($R_{47}$), Ring Position 10 ($R_{47}$), and/or Ring Position 13 ($R_{47}$).

With some embodiments, the photochromic material is selected from at least one indenonaphthopyran represented by Formula (XIII) having at least one L-Group bonded to a Ring Position selected from Ring Position 7 ($R_{65}$) and/or Ring Position 10 ($R_{61'}$).

With some embodiments, the photochromic material is selected from at least one indenonaphthopyran represented by Formula (XIV) having at least one L-Group bonded to a Ring Position selected from Ring Position 7 ($R_{76}$), Ring Position 10 ($R_{76}$), and/or Ring Position 13 ($R_{76}$).

The photochromic material of the photochromic article of the present invention, with some embodiments, includes at least one fluoroanthenoxazine represented by Formula (I), which is selected from:

1-[4-(4-(4-(trans-4-pentylcyclohexyl) phenyl)benzamido)-2-(trifluoromethyl)phenyl]-1',3',3'-trimethyl-spiro[indoline-2',5-[3H]-fluorantheno[3,2-b][1,4]oxazine]; and 1-[4-(4-(4-(trans-4-pentylcyclohexyl) phenyl)benzamido)-1'-propyl-3',3',4',5' (or 3',3',5',6')-tetramethyl-spiro[indoline-2',5-[3H]-fluorantheno[3,2-b][1,4]oxazine].

The photochromic material of the photochromic article of the present invention, with some embodiments, includes at least one naphthopyran represented by Formula (II), which is selected from:

7-[4-(4-(4-(trans-4-pentylcyclohexyl)phenyl)benzamido)-3-(2-fluorophenyl)-3-(4-methoxyphenyl)-8-hydroxy-9-carbopropoxy-3H-naphtho[2,1-b]pyran;

6,7-bis(4-(4'-(trans 4-pentylcyclohexyl)biphenyl-4-ylcarboxamido)phenyl)-3-(2-fluorophenyl)-3-(3-methoxy-2-thienyl)-7-h-pentyl-8-benzoyloxy-3H-naphtho[2,1-b]pyran; and 7-(4'-(trans,trans-4'-pentylbi(cyclohexane-4-)carbonyloxy)biphenylcarbonyloxy)-3-(2,4-dimethoxyphenyl)-3-(4-methoxyphenyl)-8-acetoxy-9-carbomethoxy-3H-naphtho[2,1-b]pyran.

The photochromic material of the photochromic article of the present invention, with some embodiments, includes at least one naphthopyran represented by Formula (III), which is selected from:

8-(4-(trans,trans-4'-pentylbi(cyclohexane-4-)carbonyloxy)biphenylcarbonyloxy)-2,2-di(4-methoxyphenyl)-5-methoxycarbonyl-6-hydroxy-2H-naphtho[1,2-b]pyran; and 8-(4-(4-(trans-4-pentylcyclohexyl)benzamido)phenyl)-2,2-diphenyl-5-methoxycarbonyl-6-phenylamino-2H-naphtho[1,2-b]pyran.

The photochromic material of the photochromic article of the present invention, with some embodiments, includes at least one naphthopyran represented by Formula (IV), which is selected from:

8-(4'-(trans,trans-4'-pentylbi(cyclohexane-4-) carbonyloxy) biphenyl carbonyloxy)-2-phenyl-2-(4-morpholinophenyl)-5-carbomethoxy-9-dimethylamino-2H-naphtho[1,2-b]pyran; and 8-(4-(4-(trans-4-pentylcyclohexyl)benzamido)phenyl)-2-phenyl-2-(4-methoxyphenyl)-5-carbomethoxy-9-dimethylamino-2H-naphtho[1,2-b]pyran.

The photochromic material of the photochromic article of the present invention, with some embodiments, includes at least one phenanthropyan represented by at least one of Formula (VA) and Formula (VB), which is selected from:

8-(4'-(trans,trans-4'-pentylbi(cyclohexane-4-) carbonyloxy) biphenyl carbonyloxy)-3,3-diphenyl-12-methoxycarbonyl-11-methyl-3H-phenanthro[1,2-b]pyran;

8-(2-methyl-4-(trans-4-((4'-((trans-4-pentylcyclohexyl)biphenyl-4-yloxy)carbonyl)cyclohexanecarboxamido)phenyl)-2,2-diphenyl-5-methoxcarbonyl-6-methyl-2H-phenanthro[4,3-b]pyran;

8-(4-(4'-(trans-4-pentylcyclohexyl)-[1,1'-biphenyl]-4-carbonyl)piperazin-1-yl)-2-(4-methoxyphenyl)-2-phenyl-5-methoxycarbonyl-6-methyl-2H-phenanthro[4,3-b]pyran; and 8-[4-(4-(4-(trans-4-pentylcyclohexyl) phenyl)benzamido)-2-(trifluoromethyl)phenyl]3-(2-fluorophenyl)-3-(4-methoxyphenyl)-6-methoxy-12-methoxycarbonyl-3H-phenanthro[1,2-b]pyran.

The photochromic material of the photochromic article of the present invention, with some embodiments, includes at least one fluoranthenopyran represented by Formula (VI), which is selected from:

1-[4-(4-(4-(trans-4-pentylcyclohexyl) phenyl)benzamido)-5-(4-methoxyphenyl)-5-(4-morpholinophenyl)-8-ethoxycarbonyl-5H-fluorantheno[3,2-b]pyran; and 8-(2-methyl-4-(trans-4-((4'-((trans-4-pentylcyclohexyl)biphenyl-4-yloxy)carbonyl)cyclohexanecarboxamido)phenyl)-5,5-bis(4-methoxyphenyl)-2-methoxy-8-methoxycarbonyl-5H-fluorantheno[3,2-b]pyran.

The photochromic material of the photochromic article of the present invention, with some embodiments, includes at least one naphthopyran represented by Formula (VII), which is selected from:

11-[4-(4-(4-(trans-4-pentylcyclohexyl) phenyl)benzamido) phenyl]-7,7-diphenyl-2-(1-phenylethyl)-4-oxo-4H-7H-[1,3]dioxino[5',4':3,4]naphtho[1,2-b]pyran; and 11-(4-(4'-(trans-4-pentylcyclohexyl)-[1,1'-biphenyl]-4-carbonyl)piperazin-1-yl)-3-(2-methacryloyloxyethyl)-7,7-diphenyl-2,4-dioxo-2,3,4,7-tetrahydro[1,3]oxazino[5',6':3,4]naphtho[1,2-b]pyran.

The photochromic material of the photochromic article of the present invention, with some embodiments, includes at least one naphthopyran represented by Formula (VIII), which is selected from:

10-[4-(4-(4-(trans-4-pentylcyclohexyl)phenyl)benzamido)-2-(trifluoromethyl)phenyl]-2-(4-methoxyphenyl)-2-(2,4-dimethoxy-phenyl)-7-diphenylmethyl-5-oxo-2H-5H-pyrano[3',4':3,4]naphtho[1,2-b]pyran; and 10-[4-(4-(4-(trans-4-pentylcyclohexyl)phenyl)benzamido)-2-(trifluoromethyl)phenyl]-2-(4-methoxyphenyl)-2-(4-morphiliono-phenyl)-7-diphenylmethyl-5-oxo-2H-5H-pyrano[3',4':3,4]naphtho[1,2-b]pyran.

The photochromic material of the photochromic article of the present invention, with some embodiments, includes at least one naphthopyran represented by at least one of Formulas (IXA), (IXB), (IXC), (IXD), (IXE), (IXF), (IXG) and (IXH), which is selected from:

2-[4-(4-(4-(trans-4-pentylcyclohexyl)phenyl)benzamido)-2-(trifluoromethyl)phenyl]-6,6-bis(4-methoxyphenyl)-6,10-dihydro[2]benzopyrano-[3',4':3,4]naphtho(1,2-b) pyran;

8-[4-(4-(4-(trans-4-pentylcyclohexyl)phenyl)benzamido)-2-(trifluoromethyl)phenyl]-2-(4-methoxyphenyl)-2-(4-morpholinophenyl)-10-oxo-2,10-dihydro[2]benzopyrano[4',3':3,4]naphtho(2,1-b)pyran;

8-[4-(4-(4-(trans-4-pentylcyclohexyl)phenyl)benzamido)-2-(4-methoxyphenyl)-2-phenyl-12,13-dimethoxy-10-oxo-2,10-dihydro[2]benzopyrano[4',3':3,4]naphtho(2,1-b) pyran;

2-[4-(4-(4-(trans-4-pentylcyclohexyl)phenyl)benzamido)-6,6-diphenyl-9-oxo-6,9-dihydro[1]benzopyrano [3',4':3,4]naphtho(1,2-b)pyran; and 6-[4-(4-(4-(trans-4-pentylcyclohexyl)phenyl)benzamido)-3,3-diphenyl-8-oxo-3,8-dihydro[2]benzopyrano[3',4':5,6]naphtho(2,1-b)pyran.

The photochromic material of the photochromic article of the present invention, with some embodiments, includes at least one naphthopyran represented by at least one of Formula (XA) and Formula (XB), which is selected from:

8-[4-(4-(4-(trans-4-pentylcyclohexyl)phenyl)benzamido)-2,2-bis(4-methoxyphenyl)-5-methoxycarbonyl-6-methyl-2H-benzofuro[2',3':8,9]naphtho[12-b]pyran; and 3,3-Bis(4-methoxyphenyl)-13-[4-(4-(4-(trans-4-pentylcyclohexyl)phenyl)benzamido)-2-(trifluoromethyl)phenyl]-10-methoxy-3H-naphtho[2",1":4',5']furo[2',3':3,4]naphtho[1,2-b]pyran.

The photochromic material of the photochromic article of the present invention, with some embodiments, includes at least one indenonaphthopyran represented by at least one of Formula (XIA) and Formula (XIB), which is selected from:

10-[4-(4-(4-(trans-4-pentylcyclohexyl)phenyl)benzamido)-2-(trifluoromethyl)phenyl]-3,3-di(4-methoxyphenyl)-16-hydroxy-16-ethyl-16H-benzofuro[2',3':7,8]indeno[2',3':3,4]naphtho[1,2-b]pyran;

8-[4-(4-(4-(trans-4-pentylcyclohexyl)phenyl)benzamido)-3,3-di(4-methoxyphenyl)-16-hydroxy-16H-benzofuro[2",3":6',7']indeno[3',2':4,3]naphtho[1,2-b]pyran; and 3,3-di(4-methoxyphenyl)-10-[4-(4-(4-(trans-4-pentylcyclohexyl)phenyl)benzamido)-16-hydroxy-16-ethyl-16H-benzofuro[2",3":6',7']indeno[3',2':4,3]naphtho[1,2-b] pyran.

The photochromic material of the photochromic article of the present invention, with some embodiments, includes at least one indenonaphthopyran represented by at least one of Formula (XIIA) and Formula (XIIB), which is selected from:

3,3-di(4-methoxyphenyl)-10-[4-(4-(4-(trans-4-pentylcyclohexyl)phenyl)benzamido)-2-(trifluoromethyl)phenyl]-16-(ethoxycarbonyl) methyl-16-hydroxy-3,16-di[H]-benzofuro[2',3':7,8]indeno [2',3':3,4]naphtho[1,2-b]pyran; and 10-[4-(4-(4-(trans-4-pentylcyclohexyl)phenyl)benzamido)-3-(4-methoxyphenyl)-3-(4-morpholinophenyl)-16-(ethoxycarbonyl)methyl-16-hydroxy-3,16-di[H]-benzofuro [2',3':7,8]indeno[2',3':3,4]naphtho[1,2-b]pyran.

The photochromic material of the photochromic article of the present invention, with some embodiments, includes at least one indenonaphthopyran represented by Formula (XIII), which is selected from:

3-(4-fluorophenyl)-3-(4-morpholinophenyl)-6,8-difluoro-10-(4-(4'-trans-4-pentylcyclohexyl)-[1,1'-biphenyl]-4-ylcarbamido)phenyl)-13,13-dimethyl-3,13-dihydro-indeno[2',3':3,4]naphtho[1,2-b]pyran;

3-(4-butoxyphenyl)-3-(4-fluorophenyl)-5,7-dichloro-10-(4-(4'-trans-4-pentylcyclohexyl)-[1,1'-biphenyl]-4-ylcarbamido)phenyl)-13,13-dimethyl-3,13-dihydro-indeno[2',3':3,4]naphtho[1,2-b]pyran;

3-(4-butoxyphenyl)-3-(4-fluorophenyl)-6,8-difluoro-10-(4-(4'-trans-4-pentylcyclohexyl)-[1,1'-biphenyl]-4-ylcarbamido)phenyl)-13,13-dimethyl-3,13-dihydro-indeno[2',3':3,4]naphtho[1,2-b]pyran;

3-(4-butoxyphenyl)-3-(4-fluorophenyl)-6-(trifluoromethyl)-10-[4-(4'-(4-(trans-4-pentylcyclohexyl)-[1,1'-biphenyl]-4-carbonyloxy)benzamido]-12-bromo-13,13-dimethyl-3,13-dihydro-indeno[2',3':3,4]naphtho[1,2-b]pyran;

3-(4-butoxyphenyl)-3-(4-methoxyphenyl)-5,7-dichloro-10-(4-(4'-trans-4-pentylcyclohexyl)-11-methoxy-[1,1'-biphenyl]-4-ylcarbamido)phenyl)-13,13-dimethyl-3,13-dihydro-indeno[2',3':3,4]naphtho[1,2-b]pyran;

5,7-Dichloro-12-bromo-3,3-bis(4-hydroxyphenyl)-11-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

3-(4-butoxyphenyl)-3-(4-fluorophenyl)-6-(trifluoromethyl)-10-[4-(4'-(4-(trans-4-pentylcyclohexyl)-[1,1'-biphenyl]-4-carbonyloxy)benzamido]-13,13-dimethyl-3,13-dihydro-indeno[2',3':3,4]naphtho[1,2-b]pyran;

3-(4-butoxyphenyl)-3-(4-fluorophenyl)-7-(4-(4'-(trans-4-pentylcyclohexyl)-[1,1'-biphenyl]-4-ylcarbamido)phenyl)-11-(trifluoromethyl)-13,13-dimethyl-3,13-dihydro-indeno[2',3':3,4]naphtho[1,2-b]pyran; and 3-(4-butoxyphenyl)-3-(4-fluorophenyl)-6-(trifluoromethyl)-10-[(4-(4'-(trans-4-pentylcyclohexyl)-[1,1'-biphenyl]-4-yl)carbonyl)piperazin-1-yl]-13,13-dimethyl-3,13-dihydro-indeno[2',3':3,4]naphtho[1,2-b]pyran.

The photochromic material of the photochromic article of the present invention, with some embodiments, includes at least one indenonaphthopyran represented by Formula (XIV), which is selected from:

7-(4-((4'-(trans-4-pentylcyclohexyl)-[1,1-biphenyl]-4-carbonyl)oxy)benzamido)-3,3,9-triphenyl-3H-9H-benzo[4",5"]indeno[3',2':3,4]naphtho[1,2-b]pyran;

7-(4-(4'-(trans-4-pentylcyclohexyl)-[1,1'-biphenyl]-4-ylcarboxamido)phenyl)-3-(4-morpholinophenyl)-3,9-diphenyl-3H-9H-benzo[4",5"]indeno[3',2':3,4]naphtho[1,2-b]pyran;

10-(4-(4'-(trans-4-pentylcyclohexyl)-[1,1'-biphenyl]-4-carbonyl)piperazin-1-yl)-3,3-di(4-methoxyphenyl)-9,9-dimethyl-7,11-dimethoxy-3H-9H-benzo[4",5"]indeno[3',2':3,4]naphtho[1, 2-b]pyran; and 7-(2-methyl-4-(trans-4-((4'-((trans-4-pentylcyclohexyl)biphenyl-4-yloxy)carbonyl)cyclohexanecarboxamido)phenyl)-3,3-di(4-methoxyphenyl)-9-methyl-11,13-dimethoxy-3H-9H-benzo[4",5"]indeno[3',2':3,4]naphtho[1,2-b]pyran;

In accordance with some embodiments, the photochromic article includes, in addition to at least one photochromic material (1) through (14), at least one fixed tint dye (or fixed colorant or fixed dye or fixed tint). The fixed tint dye can, with some embodiments, be selected from azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and mixtures thereof.

The fixed tint dye, with some embodiments, can be present in the photochromic article in amounts sufficient to provide a desired color and percent transmittance of actinic radiation, such as visible light. The types and amounts of fixed tint dye can be selected, with some embodiments, to provide the photochromic with a base color and base percent transmittance, when the photochromic compound(s) of the photochromic article undergoes neither photochromic activation nor dichroic activation. The types and amounts of fixed tint dye can be selected, with some embodiments, to provide the photochromic article with one or more activated colors and one or more activated percent transmittance values, when the photochromic compound(s) of the photochromic article undergoes photochromic activation and/or dichroic activation. The fixed tint dye can be present in the photochromic article in varying amounts to provide the intended effect such as done with other conventional additives.

In accordance with some non-limiting embodiments, adjuvant materials can also be incorporated into host material used to produce the photochromic articles of the present invention. Such adjuvants can be used, prior to, simultaneously with, or subsequent to application or incorporation of the photochromic material. For purposes of non-limiting illustration, ultraviolet light absorbers can be admixed with photochromic materials before their addition to the composition or such absorbers can be superposed, e.g., superimposed, as a coating between the photochromic article and the incident light.

Further, stabilizers can be used in conjunction with the photochromic materials (such as being admixed with the photochromic materials prior to their addition to a composition) to improve the light fatigue resistance of the photochromic materials, provided that such stabilizers do not prevent the photochromic materials from activating. Non-limiting examples of stabilizers include, hindered amine light stabilizers (HALS), asymmetric diaryloxalamide (oxanilide) compounds, and singlet oxygen quenchers (e.g., a nickel ion complex with an organic ligand) polyphenolic antioxidants, or mixtures of such stabilizers are contemplated. In some non-limiting embodiments, stabilizers can be used alone or in combination. Non-limiting examples of stabilizers are described in U.S. Pat. Nos. 4,720,356, 5,391,327 and 5,770,115.

In accordance with some embodiments, photochromic article is adapted to exhibit a neutral activated color. A neutral activated color can be achieved, with some embodiments, by selection of the photochromic material(s) (1) through (14) alone, and optionally in combination with (a) one or more photochromic materials that are different than photochromic materials (1)-(14), and/or (b) one or more fixed tint dyes, as described above. With some embodiments, the photochromic article is adapted so as to exhibit a desired resultant color, e.g., a substantially neutral color when activated with unfiltered sunlight, e.g., as near a neutral color as possible given the colors of the activated photochromic materials, and a retained coloration, measured as delta OD or ΔOD, of at least 12 percent of that demonstrated under conditions of outdoor exposure when tested in the Behind the Windshield Test described herein in the Examples. In accordance with some alternate non-limiting embodiments, the photochromic articles of the present invention demonstrate an activated state luminous transmittance at saturation less than 60 percent when activated under the conditions in the Behind the Windshield Test. In one non-limiting embodiment, the BWS photochromic materials could be used to produce articles having a wide range of colors, e.g., pink. Further discussion of neutral colors and ways to describe colors can be found in U.S. Pat. No. 5,645,767 column 12, line 66 to column 13, line 19.

In accordance with some non-limiting embodiments, it is contemplated that the photochromic materials of the present invention (1)-(14) ("BWS photochromic materials") can each be used alone or in combination with other BWS photochromic materials of the present invention, or in combination with one or more other photochromic materials, e.g., photochromic materials having at least one activated absorption maxima within the range of between about 400 and 700 nanometers, and can be incorporated, e.g., dissolved or dispersed, in a polymeric organic host material used to prepare photochromic articles, which become colored when activated to an appropriate hue.

With some embodiments, the photochromic article further includes at least one other photochromic material (c) that is different from photochromic material (b). The other photochromic material (c) can, with some embodiments, be selected from an organic photochromic material, inorganic photochromic material or a mixture thereof.

Classes of organic photochromic materials from which the other photochromic material (c) can be selected include, but are not limited to, naphthopyrans, benzopyrans, phenanthropyrans, indenonaphthopyrans, oxazines, metal-dithiozonates, fulgides, fulgimides, spiro(indoline)pyrans or mixtures thereof.

Classes of inorganic photochromic materials from which the other photochromic material (c) can be selected include, but are not limited to, silver halide, cadmium halide, copper halide europium (II), cerium(III) or mixtures thereof. Such inorganic photochromic materials are described in Kirk Othmer Encyclopedia of Chemical Technology, 4th Edition, Volume 6, pages 322-325, which disclosure is incorporated herein by reference.

In accordance with some embodiments, the other photochromic material (c) can include the following classes of materials: chromenes, e.g., naphthopyrans, benzopyrans, indenonaphthopyrans and phenanthropyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; mercury dithizonates, fulgides, fulgimides and mixtures of such photochromic materials.

Such classes of other photochromic materials (c) are described in U.S. Pat. No. 4,931,220 at column 8, line 52 to column 22, line 40; U.S. Pat. No. 5,645,767 at column 1, line 10 to column 12, line 57; U.S. Pat. No. 5,658,501 at column 1, line 64 to column 13, line 17; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64, the disclosures of the aforementioned patents are incorporated herein by reference. Spiro(indoline)pyrans are also described in the text, *Techniques in Chemistry*, Volume III, "Photochromism", Chapter 3, Glenn H. Brown, Editor, John Wiley and Sons, Inc., New York, 1971.

With some embodiment the other photochromic material (c) can include one or more polymerizable photochromic materials. Classes of polymerizable photochromic materials include, but are not limited to: polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymerizable photochromic compounds disclosed in WO97/05213 and application Ser. No. 09/828,260 filed Apr. 6, 2001. The disclosures of the aforementioned patents on polymerizable photochromic materials are incorporated herein by reference.

Further classes of other photochromic materials (c) include, but are not limited to: organo-metal dithiozonates, e.g., (arylazo)-thioformic arylhydrazidates, e.g., mercury dithizonates which are described in, for example, U.S. Pat. No. 3,361,706 at column 2, line 27 to column 8, line 43; and fulgides and fulgimides, e.g., the 3-furyl and 3-thienyl fulgides and fulgimides, which are described in U.S. Pat. No. 4,931,220 at column 1, line 39 through column 22, line 41, the disclosures of which are incorporated herein by reference.

With some further embodiments, the other photochromic material (c) can be selected from organic photochromic materials that are resistant to the effects of a polymerization initiator. Examples of such organic photochromic materials include, but are not limited to, photochromic compounds encapsulated in metal oxides, such as described in U.S. Pat. Nos. 4,166,043 and 4,367,170 at column 1 line 36 to column 7, line 12, which disclosure is incorporated herein by reference.

The photochromic articles of the present invention can include one or more photochromic materials (1)-(14) within the substrate and/or one or more photochromic materials (1)-(14) in one or more coatings, one or more films, and/or one or more sheets applied over the substrate.

With some embodiments, one or more of the photochromic materials (1)-(14) can be: incorporated, such as dissolved and/or dispersed, into the substrate, such as by imbibition; polymerized with other components from which the substrate is prepared, such as with reaction injection molding; incorporated or mixed with other components from which the substrate is prepared, such as with injection molding of thermoplastic materials; and/or incorporated into an at least partial coating or film applied to a substrate, such as an at least partially cured polymeric coating or a film applied to one surface of the substrate. The term "imbibition" or "imbibe" is intended to mean and include permeation of the photochromic materials individually or with other non-photochromic materials into a polymerizate, solvent assisted transfer absorption of the photochromic materials into a polymerizate, vapor phase transfer, and other such transfer mechanisms.

With some embodiments, the substrate includes at least one photochromic material (b) (1-14). With some further embodiments, the substrate further comprises at least one photochromic material (c) that is different from photochromic material (b) (1-14).

In accordance with some embodiments, the photochromic article of the present invention further includes a coating that has an at least partially cured polymer matrix, applied to at least one surface of the substrate. With some further embodiments, the at least partially cured polymeric coating includes one or more photochromic materials (b) (1-14). With some additional embodiments, the coating further includes at least one other photochromic material (c) that is different from photochromic material (b).

As used herein the term "polymeric host" includes and refers to the terms polymeric substrate, polymeric film, and/or polymeric coating. Generally, the polymeric host is such that it allows the photochromic material (b) of the present invention and other optional photochromic materials (c) to reversibly transform between their "open" and "closed" forms. With some non-limiting embodiments, the polymer and/or polymeric coating composition used to produce the photochromic articles of the present invention includes compositions adapted to provide thermoplastic or thermosetting organic polymeric materials that are described in the *Kirk-Othmer Encyclopedia of Chemical Technology*, Fourth Edition, Volume 6, pages 669 to 760, which disclosure is incorporated herein by reference. Such polymeric host materials can be transparent, translucent or opaque; but are transparent with some embodiments. With other non-limiting contemplated embodiments, the polymeric host material is a polymeric material that upon curing forms an at least partially cured polymeric coating chosen from polyurethanes, aminoplast resins, poly(meth)acrylates, e.g., polyacrylates and polymethacrylates, polyanhydrides, polyacrylamides, epoxy resins and polysilanes.

With some non-limiting embodiments, the amount of the photochromic material (b) to be applied to or incorporated into a polymeric host material, such as a polymeric coating composition, of the photochromic article of the present invention can vary widely. Typically, a sufficient amount is used to produce the desired retained coloration behind an UV blocking transparency such as a vehicular windshield. Generally such an amount can be described as a behind the UV blocking transparency activating amount or behind the windshield activating amount. The particular amount used depends often upon the retained coloration desired upon irradiation thereof and upon the method used to incorporate or apply the photochromic material(s) (b). Typically, with some non-limiting embodiments, the more photochromic material (b) applied or incorporated, the greater is the coloration retained behind the windshield up to a certain limit. There is a point after which the addition of any more material will not have a noticeable effect, although more material can be added, if desired.

With some embodiments of the present invention, the UV blocking transparency is a vehicular windshield. Examples of vehicular windshields include, but are not limited to, automobile windshields, truck windshields, train windshields, motorcycle windshields, golf cart windshields, windshields used with aquatic craft (such as wave-runners, boats, and ships), and aircraft windshields.

With some non-limiting embodiments, the amount of the other photochromic material(s) (c) incorporated into a polymeric host material, such as the substrate and/or coating, can vary widely. Typically, a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate the photochromic materials. Typically, with some non-limiting embodiments, the more photochromic material (c) incorporated, the greater is the color intensity up to a certain limit. There is a point after which the addition of any more material will not have a noticeable effect, although more material can be added, if desired.

The relative amounts of the photochromic material (b) or combinations of photochromic materials (b) and other optional photochromic material(s) (c) used will vary and depend in part upon the relative intensities of the color of the activated species of such materials, the ultimate color desired, the retained coloration desired and the method of application to the host material and/or substrate. In one non-limiting embodiment, the amount of total photochromic material which includes BWS photochromic materials, other photochromic materials or both, incorporated by imbibition into a photochromic optical host material can vary widely. With some alternate non-limiting embodiments, the amount can range from about 0.01 to about 2.0, or from 0.05 to about 1.0, milligrams per square centimeter of surface to which the photochromic material is incorporated or applied. The amount of total photochromic material incorporated or applied to the host material can range between any combination of these values, inclusive of the recited range, e.g., 0.015 to 1.999 milligrams per square centimeter.

With some further non-limiting embodiments, the total amount of photochromic material (b), and optionally (c), incorporated into a polymerizable composition for forming a coating, film or polymerizate can vary widely. With some embodiments, the amount incorporated can range from 0.01 to 40 weight percent based on the weight of the solids in the polymerizable composition. With some alternate non-limiting embodiments, the concentration of photochromic materials ranges from 0.1 to 30 weight percent, from 1 to 20 weight percent, from 5 to 15 weight percent, or from 7 to 14 weight percent. The amount of photochromic material(s) in the coating can range between any combination of these values, inclusive of the recited range, such as from 0.011 to 39.99 weight percent.

The various coating compositions described below are well known and are made with components and according to methods well understood and appreciated to those skilled in the art. Suitable substrates for the application of coatings containing the photochromic materials (b) or a mixture of the photochromic materials (b) and other optional photochromic materials (c) include any type of substrate. Non-limiting examples include, paper, glass, ceramics, wood, masonry, textiles, metals and organic polymeric materials as host materials.

Photochromic polyurethane coatings that can be used to prepare the photochromic coated articles of the present invention, with some non-limiting embodiments, can be produced by the catalyzed or uncatalyzed reaction of an organic polyol component and an isocyanate component in the presence of photochromic compound(s). Materials and methods for the preparation of polyurethanes are described in *Ullmann's Encyclopedia of Industrial Chemistry*, Fifth Edition, 1992, Vol. A21, pages 665 to 716. Non-limiting examples of methods and materials, e.g., organic polyols, isocyanates and other components, which can be used to prepare the polyurethane coating are disclosed in U.S. Pat. Nos. 4,889,413 and 6,187,444B1.

Photochromic aminoplast resin coating compositions that can be used to produce the photochromic coated articles of the present invention, with some non-limiting embodiments, can be prepared by combining a photochromic material with the reaction product of a functional component(s) having at least two functional groups chosen from hydroxyl, carbamate, urea or a mixture thereof and an aminoplast resin, e.g., crosslinking agent as described in U.S. Pat. Nos. 4,756,973, 6,432,544B1 and 6,506,488.

Photochromic polysilane coating compositions contemplated for use in preparing the photochromic coated articles of the present invention, with some non-limiting embodiment, are prepared by hydrolyzing at least one silane monomer such as glycidoxypropyltrimethoxysilane, vinyltrimethoxysilane, methacryloxypropyltrimethoxysilane, tetramethoxysilane, tetraethoxysilane and/or methyltrimethoxysilane and combining the hydrolyzate with at least one photochromic material as described in U.S. Pat. No. 4,556,605.

Photochromic poly(meth)acrylate coating compositions contemplated for use in preparing the photochromic coated articles of the present invention can be prepared, with some non-limiting embodiments, by combining photochromic compound(s) with mono-, di- or multi-functional (meth) acrylates as described in U.S. Pat. Nos. 6,025,026 and 6,150,430 and WO publication 01/02449 A2.

Polyanhydride photochromic coating compositions that can be used to prepare the photochromic coated articles of the present invention can be prepared with some non-limiting embodiments, by the reaction of a hydroxyl-functional component and a polymeric anhydride-functional component in a composition including at least one organic photochromic material as described in U.S. Pat. No. 6,432, 544B1. Non-limiting examples of hydroxyl-functional components, anhydride-functional component(s) and other components that can be used to prepare the polyanhydride photochromic coatings are disclosed in U.S. Pat. Nos. 4,798, 745, 4,798,746 and 5,239,012.

Photochromic polyacrylamide coating compositions contemplated for use in preparing the photochromic coated articles of the present invention, with some non-limiting embodiments, can be prepared by combining a photochromic component with the free radical initiated reaction product of a polymerizable ethylenically unsaturated composition comprising N-alkoxymethyl(meth)acrylamide and at least one other copolymerizable ethylenically unsaturated monomer as described in U.S. Pat. No. 6,060,001. Methods for preparing N-alkoxymethyl(meth)acrylamide functional polymer are described in U.S. Pat. No. 5,618,586.

Photochromic epoxy resin coating compositions that can be used to prepare the photochromic coated articles of the present invention, with some non-limiting embodiments, can be prepared by combining photochromic compound(s), epoxy resins or polyepoxides and curing agents as described in U.S. Pat. Nos. 4,756,973 and 6,268,055B1.

With some non-limiting embodiments, the types of photochromic polymeric coatings including the film-forming polymers and the photochromic materials (b) of the present invention with or without other optional photochromic compounds (c) include paints, e.g., a pigmented liquid or paste used for the decoration, protection and/or the identification of a substrate; and inks, e.g., a pigmented liquid or paste used for writing and printing on substrates such as in producing verification marks on security documents, e.g., documents such as banknotes, passport and drivers' licenses, for which authentication or verification of authenticity may be desired.

Application of the polymeric coating can be by any of the methods used in coating technology, non-limiting examples include, spray coating, spin coating, spin and spray coating, spread coating, curtain coating, dip coating, casting or roll-coating and methods used in preparing overlays, such as the method of the type described in U.S. Pat. No. 4,873,029. The application method selected also depends, with some embodiments, on the thickness of the desired coating.

The thickness of the coatings on/of the photochromic articles of the present invention can vary widely. Coatings having a thickness ranging from 1 to 50 microns can be applied by the methods used in coating technology. Coatings of a thickness greater than 50 microns can require the application of multiple coatings or molding methods typically used for overlays. With some non-limiting embodiments, the coating can range in thickness from 1 to 10,000 microns, or from 5 to 1000, or from 8 to 400, or from 10 to 250 microns. The thickness of the polymeric coating can range between any combination of these values, inclusive of the recited range, such as a thickness of from 20 to 200 microns.

Following application of the polymeric coating composition to a surface of the substrate, with some non-limiting embodiments, the coating composition is at least partially cured. With some further non-limiting embodiments, the methods used for curing the photochromic polymeric coating include the methods used for forming an at least partially cured polymer. Such methods include radical polymerization, thermal polymerization, photopolymerization or a combination thereof. Additional non-limiting methods include irradiating the coated substrate or at least partially cured polymer with infrared, ultraviolet, gamma or electron radiation so as to initiate the polymerization reaction of the polymerizable components. This can be followed by a heating step.

With some non-limiting embodiments, if required and if appropriate, the surface of the substrate to be coated is cleaned prior to applying the photochromic polymeric coating to produce the photochromic article of the present invention. This can be done for the purposes of cleaning and/or promoting adhesion of the coating. Effective treatment techniques for plastics and glass are known to those skilled in the art.

With some non-limiting embodiments, it may be necessary to apply a primer to the surface of the substrate before application of the photochromic polymeric coating. The primer can serve as a barrier coating to prevent interaction of the coating ingredients with the substrate and/or vice versa, and/or as an adhesive layer to adhere the photochromic polymeric coating to the substrate. Application of the primer can be by any of the methods used in coating technology such as, for example, spray coating, spin coating, spin and spray coating, spread coating, dip coating, casting or roll-coating.

The use of protective coatings, some of which can contain polymer-forming organosilanes, as primers to improve adhesion of subsequently applied coatings has been described in U.S. Pat. No. 6,150,430, which disclosure is incorporated herein by reference. With some non-limiting embodiments, non-tintable coatings are used. Non-limiting examples of commercial coating products include SILVUE® 124 and HI-GARD® coatings, available from SDC Coatings, Inc. and PPG Industries, Inc., respectively. In addition, depending on the intended use of the coated article, with some non-limiting embodiments, it can be necessary to apply an appropriate protective coating(s), such as an abrasion resistant coating and/or coatings that can serve as oxygen barriers, onto the exposed surface of the coating composition to prevent scratches from the effects of friction and abrasion and interactions of oxygen with the photochromic materials, respectively.

With some embodiments, the primer and protective coatings are interchangeable, in which case the same coating composition can be used as the primer and the protective coating(s). Non-limiting examples of hardcoats include those based on inorganic materials such as silica, titania and/or zirconia as well as organic hardcoats of the type that are ultraviolet light curable.

With some non-limiting embodiments, such protective coatings can be applied to the surface of photochromic articles including at least partially cured polymers containing photochromic materials.

With some non-limiting embodiments, the photochromic article of the present invention includes a substrate to which a primer is applied followed by the photochromic polymeric coating and a protective hardcoat. With further non-limiting embodiments, the protective hardcoat is an organosilane hardcoat.

With some additional non-limiting embodiments, other coatings or surface treatments, such as a tintable coating, antireflective surface, etc., can also be, applied to the photochromic articles of the present invention. An antireflective coating, such as a monolayer or multilayer of metal oxides, metal fluorides, or other such materials, can be deposited onto the photochromic articles, e.g., lenses, of the present invention through vacuum evaporation, sputtering, or some other method.

With further non-limiting embodiments, the photochromic article that includes an at least partially cured polymer and at least one photochromic material (b) with or without other photochromic material(s) (c) further includes a superstrate, e.g., a film or sheet comprising at least one organic polymeric material. The photochromic material (b) and optionally (c) can be located in the superstrate, the at least partially cured polymer or both. The organic polymeric material of the superstrate is the same as the organic polymeric material described hereinafter as the substrate or host material. Non-limiting examples of the organic polymeric materials include thermosetting or thermoplastic materials, for example a thermoplastic polyurethane superstrate.

With still further non-limiting embodiments, the superstrate can be connected to the polymer surface directly, but does not become thermally fused to the substrate. With other non-limiting embodiments, the superstrate can be adheringly bonded to the substrate by becoming thermally fused with the subsurface of the substrate. General conditions under which superstrates are adheringly bonded to a substrate are known to those skilled in the art. Non-limiting conditions for adheringly laminating a superstrate to a substrate include heating to a temperature of from 250-350° F. (121-177° C.) and applying pressure of from 150 to 400 pounds per square inch (psi)(1034 to 2758 kPa). Sub-atmospheric pressures, e.g., a vacuum, can also be applied to draw down and conform the superstrate to the shape of the substrate as known to those skilled in the art. Non-limiting examples include applying at a sub-atmospheric pressure within the range of from 0.001 mm Hg to 20 mm Hg (0.13 Pa to 2.7 kPa).

After a laminate that includes a superstrate applied to at least one surface of a substrate is formed, it can further include a protective coating or film superposed onto the superstrate. Such a protective coating or film, in one non-limiting embodiment, serves as an at least partially abrasion resistant coating or film. Non-limiting types of protective coatings include the aforedescribed hardcoats that are curable by ultraviolet radiation and/or that contain organosilanes. The thickness of the protective coating can vary widely and include the aforementioned range for the photochromic polymeric coatings. Non-limiting types of protective films include those made of organic polymeric materials such as thermosetting and thermoplastic materials. In another non-limiting embodiment, the protective film is a thermoplastic film made of polycarbonate. The thickness of the protective film or sheet can vary widely. Typically, such films have a thickness of from 1 to 20 mils (0.025 to 0.5 mm).

The host material, such as the substrate, of the photochromic material (b) with or without other photochromic material(s) (c) is usually be transparent, but may be translucent or even opaque. The host material need only be pervious to that portion of the electromagnetic spectrum, which activates the photochromic material, e.g., that wavelength of ultraviolet (UV) light that produces the open or colored form of the photochromic and that portion of the visible spectrum that includes the absorption maximum wavelength of the photochromic in its UV activated form, e.g., the open form. In one contemplated non-limiting embodiment, the host color should not be such that it masks the color of the activated form of the photochromic materials, e.g., so the change in color is readily apparent to the observer. Compatible tints may be applied to the host material as described in U.S. Pat. No. 5,645,767 in column 13, line 59 to column 14, line 3.

With some non-limiting embodiments, the polymeric organic host material can be a solid transparent or optically clear material, e.g., materials having a luminous transmittance of at least 70 percent and are suitable for optical applications, such as optical elements chosen from plano and ophthalmic lenses, ocular devices such as ophthalmic devices that physically reside in or on the eye, e.g., contact lenses and intraocular lenses, windows, automotive transparencies, e.g., windshields, aircraft transparencies, plastic sheeting, polymeric films, etc.

With some embodiments of the present invention, the substrate of the photochromic article is an optical element. With some further embodiments, the optical element is an ophthalmic lens.

Non-limiting examples of polymeric organic materials which can be used as a host material for the photochromic materials (b) of the present invention with or without other photochromic materials (c) or as a substrate for a photochromic polymeric coating include: poly(meth)acrylates, polyurethanes, polythiourethanes, thermoplastic polycarbonates, polyesters, poly(ethylene terephthalate), polystyrene, poly (alpha methylstyrene), copoly(styrene-methyl methacrylate), copoly(styrene-acrylonitrile), polyvinylbutyral, poly (vinyl acetate), cellulose acetate, cellulose propionate, cellulose butyrate, cellulose acetate butyrate, polystyrene or polymers, such as homopolymers and copolymers prepared by polymerizing monomers chosen from bis(allyl carbonate) monomers, styrene monomers, diisopropenyl benzene monomers, vinylbenzene monomers, e.g., those described in U.S. Pat. No. 5,475,074, diallylidene pentaerythritol monomers, polyol (allyl carbonate) monomers, e.g., diethylene glycol bis(allyl carbonate), vinyl acetate monomers, acrylonitrile monomers, mono- or polyfunctional, e.g., di- or multi-functional, (meth)acrylate monomers such as ($C_1$-$C_{12}$) alkyl (meth)acrylates, e.g., methyl (meth)acrylate, ethyl (meth)acrylate, butyl (meth)acrylate etc., poly(oxyalkylene) (meth)acrylate, poly(alkoxylated phenol (meth)acrylates), diethylene glycol (meth)acrylates, ethoxylated bisphenol A (meth)acrylates, ethylene glycol (meth)acrylates, poly(ethylene glycol) (meth)acrylates, ethoxylated phenol (meth) acrylates, alkoxylated polyhydric alcohol (meth)acrylates, e.g., ethoxylated trimethylol propane triacrylate monomers, urethane (meth)acrylate monomers, such as those described in U.S. Pat. No. 5,373,033, or a mixture thereof. Further examples of polymeric organic host materials are disclosed in the U.S. Pat. No. 5,753,146, column 8, line 62 to column 10, line 34.

With some embodiments, the substrate of the photochromic article of the present invention is an organic polymeric material, and the organic polymeric material is chosen from poly($C_1$-$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly (vinyl alcohol), poly(vinyl chloride), poly(vinylidene chloride), thermoplastic polycarbonates, polyesters, polyurethanes, poly(ethylene terephthalate), polystyrene, poly (alpha methylstyrene), copoly(styrene-methylmethacrylate), copoly(styrene-acrylonitrile), polyvinylbutyral or is polymerized from monomers chosen from bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bis methacrylate monomers, alkoxylated polyhydric alcohol polyacrylate monomers, styrene monomers, urethane acrylate monomers, glycidyl acrylate monomers, glycidyl methacrylate monomers, diallylidene pentaerythritol monomers or mixtures thereof.

With some further non-limiting embodiments, transparent copolymers and blends of transparent polymers are also suitable as polymeric materials. The host material can be an optically clear polymerized organic material prepared from a thermoplastic polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups, as described in U.S. Pat. No. 5,200,483.

In accordance with some further non-limiting embodiments, the photochromic materials (b) of the present invention and other optional photochromic materials (c) are used with optical organic resin monomers to produce optically clear coatings, films and polymerizates, e.g., materials suitable for optical applications, such as for example plano and ophthalmic lenses, windows, and automotive transparencies. Examples of non-limiting embodiments include polymerizates of optical resins sold by PPG Industries, Inc. as TRIVEX monomers and under the CR- designation, e.g., CR-307, CR-407 and CR-607 and the resins used to prepare hard or soft contact lenses. Methods for producing both types of contact lenses are disclosed in U.S. Pat. No. 5,166,345, column 11, line 52, to column 12, line 52.

Further non-limiting embodiments of optical resins include the resins used to form soft contact lenses with high moisture content described in U.S. Pat. No. 5,965,630 and extended wear contact lenses described in U.S. Pat. No. 5,965,631.

With some embodiments, the photochromic article of the present invention, further includes a phase-separated polymer that includes: a matrix phase that is at least partially ordered; and a guest phase that is at least partially ordered. The guest phase includes the photochromic material or compound, and the photochromic material or compound is at least partially aligned with at least a portion of the guest phase. With some embodiments: (i) the substrate of the photochromic article includes the phase-separated polymer; and/or (ii) one or more films or layers residing over at least a portion of at least one surface of the substrate of the photochromic article includes the phase-separated polymer.

In accordance with some further embodiments, the photochromic article further includes an interpenetrating polymer network that includes: an anisotropic material that is at least partially ordered; and a polymeric material. The anisotropic material includes the photochromic material, and the photochromic material is at least partially aligned with at least a portion of the anisotropic material. With some additional embodiments: (i) the substrate of the photochromic article includes the interpenetrating polymer network; and/or (ii) one or more films or layers residing over at least a portion of at least one surface of the substrate of the photochromic article includes the interpenetrating polymer network.

As used herein the term "anisotropic" means having at least one property that differs in value when measured in at least one different direction. Accordingly, "anisotropic materials" are materials that have at least one property that differs in value when measured in at least one different direction. Non-limiting examples of anisotropic materials that can be included in the photochromic articles of the present invention include, but are not limited to, art-recognized liquid crystal polymers, liquid crystal pre-polymers, liquid crystal monomers, and liquid crystal mesogens.

With some embodiments, the photochromic article includes, such as in a film or layer thereof: (i) liquid crystal oligomers and/or polymers prepared at least in part from the monomeric mesogenic compounds; and/or (ii) the mesogenic compounds, in each case as disclosed in Table 1 of U.S. Pat. No. 7,910,019 B2 at columns 43-90 thereof, which disclosure is incorporated herein by reference.

In accordance with some embodiments of the present invention, the photochromic material is a photochromic-dichroic compound, and can be at least partially aligned by interaction with the anisotropic material, which itself is at least partially ordered. For example, although not limiting herein, at least a portion of the photochromic-dichroic compound can be aligned such that the long-axis of the photochromic-dichroic compound in the dichroic state is essentially parallel to the general direction of the anisotropic material. Further, although not required, the photochromic-dichroic compound can be bound to or reacted with at least a portion of the at least partially ordered anisotropic material.

Methods of ordering, or introducing order into, the anisotropic material of the photochromic article include, but are not limited to, exposing the anisotropic material to at least one of a magnetic field, an electric field, linearly polarized ultraviolet radiation, linearly polarized infrared radiation, linearly polarized visible radiation, and a shear force. Alternatively or additionally, the anisotropic material can be at least partially ordered by aligning at least a portion of the anisotropic material with another material or structure. For example, the anisotropic material can be at least partially ordered by aligning the anisotropic material with an alignment layer (or an orientation facility).

By ordering at least a portion of the anisotropic material, it is possible to at least partially align at least a portion of the photochromic-dichroic compound that is contained within or otherwise connected to the anisotropic material of the photochromic article. Although not required, the photochromic-dichroic compound can be at least partially aligned while in an activated state. With some embodiments, ordering of the anisotropic material and/or aligning the photochromic-dichroic compound can occur prior to, during, or after application of a layer containing the photochromic-dichroic compound over the substrate of the photochromic article of the present invention.

The photochromic-dichroic compound and the anisotropic material can be aligned and ordered during formation of the photochromic article of the present invention, such as during application of a photochromic-dichroic layer over the substrate. With some embodiments, the photochromic-dichroic layer can be applied using a coating technique that introduces a shear force to the anisotropic material during application, such that the anisotropic material becomes at least partially ordered generally parallel to the direction of the applied shear force. For purposes of non-limiting illustration, a solution or mixture (optionally in a solvent or carrier) including the photochromic-dichroic compound and the anisotropic material can be curtain coated over the substrate, such that shear forces are introduced to the materials being applied due to relative movement of the surface of the substrate with respect to the materials being applied. The shear forces can cause at least a portion of the anisotropic material to be ordered in a general direction that is substantially parallel to the direction of the movement of the surface. As discussed above, by ordering at least a portion of the anisotropic material in this manner, at least a portion of the photochromic-dichroic compound can be aligned. In addition, and optionally, by exposing at least a portion of the photochromic-dichroic compound to actinic radiation during the curtain coating process, so as to convert the photochromic-dichroic compound to an activated state, at least partial alignment of the photochromic-dichroic compound while in the activated state can also be achieved.

The photochromic-dichroic compound and the anisotropic material can be aligned and ordered after formation of the photochromic article of the present invention, such as after application of a photochromic-dichroic layer over the substrate. For example, a solution or mixture of the photochromic-dichroic compound and the anisotropic material (optionally in a solvent or carrier) can be spin-coated over at least a portion of the substrate. Thereafter, at least a portion of the anisotropic material can be ordered, for example, by exposing the anisotropic material to a magnetic field, an electric field, linearly polarized ultraviolet radiation, linearly polarized infrared radiation, linearly polarized visible radiation, and/or a shear force. Alternatively or additionally, the anisotropic material can be at least partially ordered by alignment thereof with another material or structure, such as an alignment layer.

The photochromic-dichroic compound and the anisotropic material can be aligned and ordered prior to formation of the photochromic article of the present invention, such as prior to application of a photochromic-dichroic layer over the substrate. For example, a solution or mixture (optionally in a solvent or carrier) of the photochromic-dichroic compound and the anisotropic material can be applied over an ordered polymeric sheet to form a layer thereover. Thereafter, at least a portion of the anisotropic material can be allowed to align with the underlying ordered polymeric sheet. The polymeric sheet can be subsequently applied over the substrate by, for example, art-recognized laminating or bonding methods. Alternatively, the ordered photochromic-dichroic layer can be transferred from the polymeric sheet to/over the substrate by art-recognized method, such as hot stamping.

With some embodiments, the photochromic article includes a phase-separated polymer that includes: a matrix phase; and a guest phase distributed in the matrix phase. The matrix phase can include an at least partially ordered liquid crystal polymer. The guest phase can include the at least partially ordered anisotropic material and at least a portion of the photochromic-dichroic compound, which can be at least partially aligned. The at least partially aligned photochromic-dichroic compound can be at least partially aligned by interaction with the at least partially ordered anisotropic material. With some embodiments, the photochromic article includes a film or layer residing over at least a portion of at least one surface of the substrate, in which the film/layer includes the phase-separate polymer.

With some embodiments, a phase-separating polymer system including, a matrix phase forming material that includes a liquid crystal material, and a guest phase forming material that includes the anisotropic material and the photochromic-dichroic compound, is applied over the substrate of the photochromic article of the present invention. After applying the phase-separating polymer system, at least portion of the liquid crystal material of the matrix phase and at least a portion of the anisotropic material of the guest phase are at least partially ordered, such that at least a portion of the photochromic-dichroic compound is aligned with at least a portion of the at least partially ordered anisotropic material of the guest phase. Methods of ordering the matrix phase forming material and the guest phase forming material of the phase-separating polymer system include, but are not limited to, exposing the applied layer to at least one of: a magnetic field, an electric field, linearly polarized infrared radiation, linearly polarized ultraviolet radiation, linearly polarized visible radiation, and a shear force. Alternatively or additionally, ordering the matrix phase forming material and the guest phase forming material can include alignment thereof by interaction with an underlying alignment layer.

After ordering the matrix phase forming material and the guest phase forming material, the guest phase forming material can be separated from the matrix phase forming material by polymerization induced phase separation and/or solvent induced phase separation. Although the separation of the matrix and guest phase forming materials is described herein in relation to the guest phase forming material separating from the matrix phase forming material, it should be appreciated that this language is intended to cover any separation between the two phase forming materials. That is, this language is intended to cover separation of the guest phase forming material from the matrix phase forming material and separation of the matrix phase forming material from the guest phase forming material, as well as, simultaneous separation of both phase forming materials and any combination thereof.

According to some embodiments, the matrix phase forming material can include a liquid crystal material chosen form liquid crystal monomers, liquid crystal pre-polymers, and liquid crystal polymers. The guest phase forming material can, with some embodiments, include a liquid crystal material chosen from liquid crystal mesogens, liquid crystal monomers, and liquid crystal polymers and pre-polymers.

With some embodiments, the phase-separating polymer system can include, a mixture of a matrix phase forming material that includes a liquid crystal monomer, a guest phase forming material that includes liquid crystal mesogens and the photochromic-dichroic compound. With such embodiments, causing the guest phase forming material to separate from the matrix phase forming material can include polymerization induced phase-separation. Typically, the liquid crystal monomer of the matrix phase can be polymerized and thereby separated from at least a portion of the liquid crystal mesogens of the guest phase forming material. Examples of polymerization methods include, but are not limited to, photo-induced polymerization and thermally-induced polymerization.

With some further embodiments, the phase-separating polymer system can include, a mixture of a matrix phase forming material that includes a liquid crystal monomer, a guest phase forming material that includes a low viscosity liquid crystal monomer having a different functionality from the liquid crystal monomer of the matrix phase, and the photochromic-dichroic compound. As used herein, the term "low viscosity liquid crystal monomer," refers to a liquid crystal monomer mixture or solution that is freely flowing at room temperature. Typically, causing the guest phase forming material to separate from the matrix phase forming material includes polymerization induced phase-separation. For example, at least a portion of the liquid crystal monomer of the matrix phase can be polymerized under conditions that do not cause the liquid crystal monomer of the guest phase to polymerize. During polymerization of the matrix phase forming material, the guest phase forming material typically separates from the matrix phase forming material. Thereafter, the liquid crystal monomer of the guest phase forming material can be polymerized in a separate polymerization process.

The phase-separating polymer system can include, with some embodiments, a solution in at least one common solvent of a matrix phase forming material that includes a liquid crystal polymer, a guest phase forming material that includes a liquid crystal polymer that is different from the liquid crystal polymer of the matrix phase forming material, and the photochromic-dichroic compound. Causing the guest phase forming material to separate from the matrix phase forming material typically includes solvent induced phase-separation. Typically, at least a portion of the common solvent is evaporated from the mixture of liquid crystal polymers, thereby causing the two phases to separate from each other.

With further embodiments, the photochromic article includes an interpenetrating polymer network. The at least partially ordered anisotropic material and a polymeric material can form an interpenetrating polymer network, in which at least a portion of the polymeric material interpenetrates with at least a portion of the at least partially ordered anisotropic material. As used herein the term "interpenetrating polymer network" means an entangled combination of polymers, at least one of which is cross-linked, that are not bonded to each other. Thus, as used herein, the term interpenetrating polymer network includes semi-interpenetrating polymer networks. For example, see L. H. Sperling, *Introduction to Physical Polymer Science*, John Wiley & Sons, New York (1986) at page 46. In addition, at least a portion of the at least one at least partially aligned photochromic-dichroic compound can be at least partially aligned with the at least partially ordered anisotropic material. Still further, the polymeric material can be isotropic or anisotropic, provided that, on the whole, the photochromic article (or a photochromic-dichroic layer residing over the substrate) is anisotropic.

According to some embodiments, the anisotropic material can be adapted to allow the photochromic-dichroic compound to switch from a first state to a second state at a desired rate. In general, conventional photochromic compounds can undergo a transformation from one isomeric form to another in response to actinic radiation, with each isomeric form having a characteristic absorption spectrum. The photochromic-dichroic compounds of the photochromic articles of the present invention undergo a similar isomeric transformation, with some embodiments. Without intending to be bound by any theory, the rate or speed at which this isomeric transformation (and the reverse transformation) occurs depends, in part, upon the properties of the local environment surrounding the photochromic-dichroic compound (i.e., the "host"). Although not limiting herein, it is believed based on the evidence at hand that the rate of transformation of the photochromic-dichroic compound depends, in part, upon the flexibility of the chain segments of the host, and more particularly on the mobility or viscosity of the chain segments of the host. Correspondingly it is believed, without intending to be bound by any theory, that the rate of transformation of the photochromic-dichroic compound is generally faster in hosts having flexible chain segments than in hosts having stiff or rigid chain segments. As such, and in accordance with some embodiments, when the anisotropic material is a host, the anisotropic material can be adapted to allow the photochromic-dichroic compound to transform between various isomeric states at desired rates. For example, the anisotropic material can be adapted by adjusting the molecular weight and/or the cross-link density of the anisotropic material.

With some embodiments, the photochromic article includes a phase-separated polymer that includes a matrix phase including a liquid crystal polymer, and guest phase distributed within the matrix phase. The phase-separated polymer can reside in or define a film or layer residing over at least a portion of at least one surface of the substrate, with some embodiments. The guest phase can include the anisotropic material. Typically, a majority of the photochromic-dichroic compound can be contained within the guest phase of the phase-separated polymer. As previously discussed, because the transformation rate of the photochromic-dichroic compound depends, in part, on the host in which it is contained, the rate of transformation of the photochromic-dichroic compound depends, substantially, on the properties of the guest phase, with some embodiments.

In accordance with some further embodiments, the present invention relates to a method for producing a photochromic article adapted to retain at least 12 percent of the delta OD measured in the Outdoor Test when tested in the Behind the Windshield Test, which method includes:

a) providing a substrate;
b) providing at least one photochromic material (b) as described previously herein;
c) combining the photochromic material together with the substrate by a method chosen from:
  i) introducing photochromic material (b) with the starting materials used to form said substrate;
  ii) at least partially imbibing photochromic material (b) into at least one surface of said substrate;
  iii) applying at least a partial coating of a polymeric coating composition comprising photochromic material (b) to at least one surface of the substrate;
  iv) at least partially connecting a superstrate comprising photochromic material (b) to at least one surface of said substrate; or
  v) combinations of i), ii), ii) or iv).

The introducing, imbibing, coating application, and superstrate connection steps are, with some embodiments, each independently as described previously herein.

With some further embodiments, the above method further includes adding a photochromic material (c) that is different from photochromic material (b), in step (c) (i), (ii), (iii), (iv) or (v).

With some further embodiments, the above method further includes adding a fixed tint dye in (c) (i), (ii), (iii), (iv) or (v). The fixed tint dye can be used alone or in combination with one or more optional further photochromic materials (c).

The photochromic articles prepared by the aforementioned methods can be substantially free of ultraviolet radiation absorbing materials adapted to substantially inhibit the activation of the photochromic material by radiation below 380 nm.

The photochromic articles of the present invention can be used in, as, or in conjunction with various applications including, but not limited to, optical lenses, such as vision correcting ophthalmic lenses and plano lenses, face shields, goggles, visors, camera lenses, windows, automotive windshields, aircraft and automotive transparencies, such as T-roofs, sidelights and backlights, polymeric coatings, plastic films and sheets, textiles, security verification articles, such as security documents that include verification marks including photochromic material (b) (e.g., documents such as banknotes, passports and drivers' licenses for which authentication or verification of authenticity may be desired).

The present invention is more particularly described in the following examples, which are intended as illustrative only, since numerous modifications and variations therein will be apparent to those skilled in the art.

EXAMPLES

The present invention is more particularly described in the following examples, which are intended as illustrative only, since numerous modifications and variations therein will be apparent to those skilled in the art.

Part 1 describes the preparation of the primer layer formulation (PLF). Part 2 describes the preparation of the liquid crystal alignment formulation (LCAF). Part 3 describes the preparation of the coating layer formulations (CLFs). Part 4 describes the preparation of the topcoat layer formulation (TLF). Part 5 describes the procedures used for preparing the substrate and subsequent stack of coatings listed in Table 2. Part 6 describes the photochromic performance tests including the dichroic ratio, polarization efficiency and optical response measurements.

Part 1—Preparation of the Primer Layer Formulation (PLF)

A PLF was prepared by adding the ingredients according to Table 1 in the listed order. The solution was stirred at room temperature for two hours to yield a solution having 46.82 weight % solids as determined after 1 hour at 110° C.

TABLE 1

| Material | Weight, g |
|---|---|
| Polyacrylate polyol[1] | 14.69 |
| POLYMEG ® 1000[2] | 36.70 |
| DESMODUR ® PL 340[3] | 48.23 |
| TRIXENE ® BI 7960[4] | 34.39 |
| BYK ®-333[5] | 0.08 |
| K-KAT ® 348[6] | 1.00 |
| SILQUEST ® A-187[7] | 3.96 |
| TINUVIN ® 928[8] | 8.07 |
| AROMATIC ® 100[9] | 36.00 |
| 1-Methyl-2-pyrrolidinone | 61.88 |

[1]Composition D of Example 1 in U.S. Pat. No. 6,187,444, except that in Charge 2, the styrene was replaced with methyl methacrylate and triphenyl phosphite was added at 0.5% based on total monomer weight
[2]A polyTHF available from Lyondell Chemical Co.
[3]A blocked aliphatic polyisocyanate available from Bayer Material Science
[4]A blocked aliphatic polyisocyanate available from Baxenden Chemicals Ltd.
[5]Polyether modified polydimethylsiloxane available from BYK-Chemie, USA
[6]A Bismuth catalyst available from King Industries, Inc.
[7]Epoxy functional silane available from Momentive Performance Materials, Inc.
[8]A UV absorber available from BASF Resins
[9]A mixture of high temperature boiling solvents available from ExxonMobil Chemical Company Part 3—Preparation of the Coating Layer Formulations (CLFs)

Liquid crystal materials used to prepare the CLFs are described below in Table 2. Four liquid crystal coating formulations were prepared as follows: to a suitable flask containing a mixture of anisole (3.4667 g) and BYK®-346 additive (0.0347 g, available from BYK Chemie, USA), was added LCM-1 (1.3 g), LCM-2 (1.3 g), LCM-3 (1.3 g), LCM-4 (1.3 g), 4-methoxyphenol (0.0078 g), and IRGACURE® 819 (0.078 g, a photoinitiator available from BASF Resins)

TABLE 2

| | |
|---|---|
| LCM-1 | 1-(6-(6-(6-(6-(6-(6-(6-(6-(8-(4-(4-(4-(8-acryloyloxyhexylloxy)-benzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexan-1-ol |
| LCM-2 | RM257[1] |
| LCM-3 | RM105[2] |
| LCM-4 | RM82[3] |

[1]4-(3-acryloyloxypropyloxy)-benzoic acid 2-methyl-1,4-phenylene ester, available from EMD Chemicals, Inc., having the molecular formula of $C_{33}H_{32}O_{10}$.
[2]4-methoxy-3-methylphenyl 4-(6-(acryloyloxy)hexyloxy)benzoate, available from EMD Chemicals, Inc., having the molecular formula of $C_{23}H_{26}O_6$
[3]2-methyl-1,4-phenylene bis(4-(6-(acryloyloxy)hexyloxy)benzoate), available from EMD Chemicals, Inc., having the molecular formula of $C_{39}H_{44}O_{10}$ nol (0.0078 g), and IRGACURE ® 819 (0.078 g, a photoinitiator available from BASF Resins).

To each of the identical liquid crystal coating solutions were added a dye corresponding to Dye 1, Dye 2, Dye 3 or Dye 4 as described in Table 3 below resulting in four distinct CLFs. The individual dyes were added in a quantity to yield a dye concentration of 6.3 mmol per 100 g of CLF. The resulting mixtures were stirred for 2 hours at 80° C. and cooled to 26° C.

TABLE 3

| Coating Layer Formulation | | Photochromic dye chemical name |
|---|---|---|
| CLF-1 | Dye 1 | 3-(4-fluorophenyl)-3-(4-morpholinophenyl)-6,8-difluoro-10-(4-(4'-trans-4-pentylcyclohexyl)-[1,1'-biphenyl]-4-ylcarbamido)phenyl)-13,13-dimethyl-3,13-dihydro-indeno[2',3':3,4]naphtho[1,2-b]pyran |
| CLF-2 | Dye 2 | 3-(4-butoxyphenyl)-3-(4-fluorophenyl)-6,8-difluoro-10-(4-(4'-trans-4-pentylcyclohexyl)-[1,1'-biphenyl]-4-ylcarbamido)phenyl)-13,13-dimethyl-3,13-dihydro-indeno[2',3':3,4]naphtho[1,2-b]pyran |
| CLF-3 | Dye 3 | 3-(4-butoxyphenyl)-3-(4-methoxyphenyl)-5,7-dichloro-10-(4-(4'-trans-4-pentylcyclohexyl)-11-methoxy-[1,1'-biphenyl]-4-ylcarbamido)phenyl)-13,13-dimethyl-3,13-dihydro-indeno[2',3':3,4]naphtho[1,2-b]pyran |
| CLF-4 | Dye 4 | 3-(4-butoxyphenyl)-3-(4-fluorophenyl)-7-(4-(4'-(trans-4-pentylcyclohexyl)-[1,1'-biphenyl]-4-ylcarbamido)phenyl)-11-(trifluoromethyl)-13,13-dimethyl-3,13-dihydro-indeno[2',3':3,4]naphtho[1,2-b]pyran |

Part 2—Preparation of Liquid Crystal Alignment Formulation (LCAF)

A solution of a photo alignment material, Poly[(E)-2-methoxy-4-(3-methoxy-3-oxoprop-1-enyl)phenyl 4-(6-(methacryloyloxy)hexyloxy)benzoate], was prepared by adding 6 weight percent of the photo alignment material to cyclopentanone, based on the total weight of the solution.

Part 4: Preparation of the Topcoat Layer Formulation (TLF)

A topcoat layer formulation (TLF) was from the material and quantities as described in paragraphs [0505] through [0514] of U.S. patent application Ser. No. 13/296,867, Publication No. 201210120473A1 (published May 17, 2012), the cited portions of which are incorporated by reference herein. The cited materials were stirred at room temperature for two hours in a 50 mL amber glass bottle equipped with a magnetic stir-bar.

Part 5:—Procedures Used for Preparing Substrate and Coating Stacks

Substrate Preparation

Finished single vision lenses (6 base, 70 mm) prepared from CR-39® monomer were used as substrates. Each substrate was cleaned by wiping with a tissue soaked with acetone and dried with a stream of air and corona treated by passing on a conveyor belt in Tantec EST Systems Serial No. 020270 Power Generator HV 2000 series corona treatment equipment with a high voltage transformer. The substrates were exposed to corona generated by 53.99 KV, 500 Watts while traveling on a conveyor at a belt speed 3 ft/min.

Coating Procedure for the Primer Layer

The PLF was applied to the test substrates by spin-coating on a portion of the surface of the test substrate by dispensing approximately 1.5 mL of the solution. A spin processor from Laurell Technologies Corp. (WS-400B-6NPP/LITE) was used for spin coating the substrates at 976 revolutions per minute (rpm) for 4 seconds, followed by 1501 rpm for 2 seconds, followed by 2500 rpm for 1 second. Afterwards, the coated substrates were placed in an oven maintained at 125° C. for 60 minutes. The coated substrates were cooled to 26° C. The substrate was corona treated by passing on a conveyor belt in Tantec EST Systems Serial No. 020270 Power Generator HV 2000 series corona treatment equipment with a high voltage transformer. The dried primer layers were exposed to corona generated by 53.00 KV, 500 Watts while traveling on a conveyor at a belt speed 3 ft/min.

Coating Procedure for the Liquid Crystal Alignment Layer

The LCAF was applied to the test substrates by spin-coating on a portion of the surface of the test substrate by dispensing approximately 1.0 mL of the solution and spinning the substrates at 800 revolutions per minute (rpm) for 3 seconds, followed by 1,000 rpm for 7 seconds, followed by 2,500 rpm for 4 seconds. A spin processor from Laurell Technologies Corp. (WS-4006-6NPP/LITE) was used for spin coating. Afterwards, the coated substrates were placed in an oven maintained at 120° C. for 30 minutes. The coated substrates were cooled to 26° C.

The dried photoalignment layer on each of the substrates was at least partially ordered by exposure to linearly polarized ultraviolet radiation. The light source was oriented such that the radiation was linearly polarized in a plane perpendicular to the surface of the substrate. The amount of ultraviolet radiation that each photoalignment layer was exposed to was measured using a UV Power Puck™ High energy radiometer from EIT Inc (Serial No. 2066) and was as follows: UVA 0.018 W/cm$^2$ and 5.361 J/cm$^2$; UVB 0 W/cm$^2$ and 0 J/cm$^2$; UVC 0 W/cm$^2$ and 0 J/cm$^2$; and UVV 0.005 W/cm$^2$ and 1.541 J/cm$^2$. After ordering at least a portion of the photo-orientable polymer network, the substrates were cooled to 26° C. and kept covered.

Coating Procedure for the Coating Layer

The CLFs from Part 3 were each spin coated at a rate of 400 revolutions per minute (rpm) for 6 seconds, followed by 800 rpm for 6 seconds onto the at least partially ordered photoalignment materials on the test substrates. Each coated substrate was placed in an oven at 60° C. for 30 minutes. They were then cured under two ultraviolet lamps in the UV Curing Oven Machine designed and built by Belcan Engineering under a Nitrogen atmosphere while running on a conveyor belt at 2 ft/min speed. The coated substrates were subjected to a peak intensity of 0.388 Watts/cm2 of UVA and 0.165 Watts/cm2 of UVV and UV dosage of 7.386 Joules/cm$^2$ of UVA and 3.337 Joules/cm$^2$ of UVV. Coated substrates which were to receive a topcoat layer were subsequently exposed to corona generated by 53.00 KV, 500 Watts while traveling on a conveyor at a belt speed 3 ft/min. Coated substrates which were not to receive a topcoat layer were further cured at 105° C. for 3 hours.

Coating Procedure for the Topcoat Layer

The TLF was spin coated at a rate of 1,400 revolutions per minute (rpm) for 7 seconds onto the cured CLF coated substrates. Afterwards the substrates were cured under two ultraviolet lamps in the UV Curing Oven Machine designed and built by Belcan Engineering under a Nitrogen atmosphere while running on a conveyor belt at 6 ft/min speed. The topcoated substrates were subjected to a peak intensity of 1.887 Watts/cm2 of UVA and 0.694 Watts/cm2 of UVV and UV dosage of 4.699 Joules/cm2 of UVA and 1.787 Joules/cm2 of UVV. Post curing was completed at 105° C. for 3 hours. Table 4 lists the coating stacks fabricated for testing below. An "X" in the columns of Table 4 indicates the presence of the specified layer in a given Example. The CLF from Part 3 used for each example is listed in the appropriate column.

TABLE 4

Examples with different dye and Coating Stacks

| Example # | Dye | Primer Layer (PLF) | Alignment Layer (LCAF) | Liquid crystal Coating Layer (CLF) | Topcoat Layer (TLF) |
|---|---|---|---|---|---|
| 1 | Dye-1 | | X | CLF-1 | |
| 2 | Dye-2 | | X | CLF-2 | |
| 3 | Dye-3 | | X | CLF-3 | |
| 4 | Dye-4 | | X | CLF-4 | |
| 5 | Dye-4 | X | X | CLF-4 | X |
| 6 | Dye-4 | X | X | CLF-4 | X |

Part 6—Photochromic Property Testing

Part 6A—Outdoor Simulation (OS) Testing

The photochromic samples prepared as described in Parts 1-5 were tested for photochromic response in the Outdoor Simulation (OS) Test as described herein on an Advance Bench for Measuring Photochromics (A-BMP) custom made by PPG. Prior to testing on the A-BMP, the photochromic samples were conditioned by activating and fading as described hereinafter. The test samples were first exposed to 365 nanometer ultraviolet light for approximately 10 minutes at a distance of 14 centimeters to activate the photochromic compounds. The UVA (315 to 380 nm) irradiance at the sample was measured with a Licor Model Li-1800 spectroradiometer and found to be 22.2 watts per square meter. The activated samples were then placed under a 500 watt, high intensity halogen lamp for approximately 10 minutes at a distance of 36 centimeters to bleach or inactivate the photochromic compounds. The illuminance at the sample was measured with the Licor spectroradiometer and found to be 21.4 Klux. The test samples were then kept covered for at least 1 hour prior to testing on an A-BMP.

The A-BMP was fitted with two 150 watt Xenon arc lamps positioned 90° apart (one lamp to provide the amount of UV/VIS light (Lamp 1) and one to provide the additional contribution of visible light (Lamp 2)). The collimated output beams from the Xenon arc lamps were combined and directed toward the sample cell through a 50/50 beam splitter. Each lamp was filtered and shuttered individually and also shuttered after blending, prior to entering the temperature controlled sample chamber. The light path from Lamp 1 was directed through a 3 mm Schott KG-2 band-pass filter and appropriate neutral density filters that contributed to the required UV and partial VIS light irradiance level. The light path from the Lamp 2 was directed through a 3 mm Schott KG-2 band-pass filter, a 400 nm cutoff filter and neutral density filters in order to provide supplemental VIS light illuminance. Proprietary software was used on the A-BMP to control timing, irradiance intensity, sample chamber temperature, shuttering, filter selection and response measurement. A Zeiss spectrophotometer, Model MCS 601, with fiber optic cables for light delivery through the sample was used for response and color measurement. The sample within the sample chamber was controlled at a temperature of 23+/−0.2° C. using an FTS™ Systems AirJet™ XE maintained at 3.5 cfm pressure flow through sample chamber.

Testing was conducted using conditions simulating the average photochromic lens response on a wearer when outdoors at the specified temperature or a value of 6.7 Watts/m2 (UVA) integrated between 315 and 380 nm and 50 Klux, Response measurements, in terms of change in optical density ($\Delta$OD) from the unactivated state to the activated or darkened state were determined by establishing the initial unactivated transmittance, opening the shutter from the Xenon lamp(s) and measuring the transmittance during activation of the sample at selected intervals of time. Change in optical density was determined according to the formula: $\Delta$OD=log 10(% Tb/% Ta), where % Tb is the percent transmittance in the bleached state, % Ta is the percent transmittance in the activated state. Optical density measurement can be per specific wavelength or photopic response.

Part 6B—Behind the Windshield (BWS) Response Testing

In a similar fashion, these lenses were tested in the Behind the Windshield (BWS) Test using the A-BMP described above with conditions simulating photochromic lens response on a wearer inside an automobile. It was determined that the amount of light energy available to activate a photochromic lens on a wearer in an automobile was 0.75 Watts/m2 integrated between 380 and 420 nm and 1.7 Klux (kilolumens/m2). These conditions were attained using only Lamp 1 with a direct irradiance path to the sample. In this irradiance path, the 3 mm Schott KG-2 band-pass filter and a simulated windshield was used to attain the irradiance spectral profile. The simulated windshield was prepared by laminating a 0.73 mm thick piece of polyvinylbutyrate film from Solutia Inc. between two 2.3 mm thick layers of Solex 97 glass from PPG Industries, Inc. The simulated windshield had a total thickness of 5.33 mm. Test results are recorded below in Table 5.

TABLE 5

Photochromic Performance Test Results

| Example # | Dye # | $\lambda_{max\text{-}vis}$ (nm) | $\Delta$OD @ 15 minutes (OS) | $\Delta$OD at 15 minutes (BWS) | % $\Delta$OD Retained |
|---|---|---|---|---|---|
| 1 | Dye 1 | 608 | 0.54 | 0.12 | 22 |
| 2 | Dye-2 | 574 | 0.58 | 0.14 | 24 |
| 3 | Dye-3 | 582 | 0.67 | 0.27 | 40 |
| 4 | Dye-4 | 449 | 0.76 | 0.35 | 46 |
| 5 | Dye-4 | 449 | 0.79 | 0.34 | 43 |
| 6 | Dye-4 | 449 | 0.75 | 0.33 | 44 |

The results of Table 5 show that Examples 1-6, when under behind the windshield eyeglass wearer simulating conditions, retain from 22 to 28 percent of the $\Delta$OD measured under outdoor simulating conditions.

Part 7—Photochromic Performance Tests Including Polarization Efficiency and Optical Response Measurements Part 7A—Outdoor Simulation with Polarization (OSP) Testing Prior to response testing on an optical bench, the substrates were conditioned by exposing them to 365 nm ultraviolet light for 10 minutes at a distance of 14 cm from the source in order to pre-activate the photochromic molecules. The UVA irradiance at the sample was measured with a Licor Model Li-1800 spectroradiometer and found to be 22.2 watts per square meter. The samples were then placed under a high intensity halogen lamp (500 W, 120 V) for approximately 10 minutes at a distance of 36 cm from the lamp in order to bleach, or inactivate, the photochromic compound in the samples. The illuminance at the sample was measured with the Licor spectroradiometer and found to be 21.9 Klux. The samples were exposed to yellow fluorescent lamps for 30 minutes to provide further visible light bleaching. The samples were then kept in a dark environment for at least 1 hour prior to testing in order to cool and continue to fade back to a ground state.

An optical bench was used to measure the optical properties of the coated substrates and derive the dichroic ratio and photochromic properties. Each test sample was placed on the optical bench with an activating light source (a Newport/Oriel Model 66485 300-Watt Xenon arc lamp fitted with a UNIBLITZ® VS-25 high-speed computer controlled shutter that momentarily closed during data collection so that stray light would not interfere with the data collection process, a SCHOTT® 3 mm KG-2 band-pass filter, which removed short wavelength radiation, neutral density filter(s) for intensity attenuation and a condensing lens for beam collimation) positioned at a 30° to 35° angle of incidence to the surface of the test sample. The arc lamp was equipped with a light intensity controller (Newport/Oriel model 68950).

A broadband light source for monitoring response measurements was positioned in a perpendicular manner to a surface of the test sample. Increased signal of shorter visible wavelengths was obtained by collecting and combining separately filtered light from a 100-Watt tungsten halogen lamp (controlled by a constant voltage powder supply) with a split-end, bifurcated fiber optical cable. Light from one side of the tungsten halogen lamp was filtered with a SCHOTT® KG1 filter to absorb heat and a HOYA® B-440 filter to allow passage of the shorter wavelengths. The other side of the light was either filtered with a SCHOTT® KG1 filter or unfiltered. The light was collected by focusing light from each side of the lamp onto a separate end of the split-end, bifurcated fiber optic cable, and subsequently combined into one light source emerging from the single end of the cable. A 4" or 6" light pipe was attached to the single end of the cable to insure proper mixing. The broad band light source was fitted with a UNIBLITZ® VS-25 high-speed computer controlled shutter that momentarily opened during data collection.

Polarization of the light source was achieved by passing the light from the single end of the cable through a Moxtek, PROFLUX® Polarizer held in a computer driven, motorized rotation stage (Model M-061-PD from Polytech, PI or equivalent). The monitoring beam was set so that the one polarization plane) (0°) was perpendicular to the plane of the optical bench table and the second polarization plane) (90°) was parallel to the plane of the optical bench table. The samples were run in air, at 23° C.±0.1° C. maintained by a temperature controlled air cell.

To align each sample, a second polarizer was added to the optical path. The second polarizer was set to 90° of the first polarizer. The sample was placed in an air cell in a self-centering holder mounted on a rotation stage. A laser beam (Coherent—ULN 635 diode laser) was directed through the crossed polarizers and sample. The sample was rotated (in 3° steps as coarse moves and in 0.1° steps as fine moves) to find the minimum transmission. At this point the sample was aligned either parallel or perpendicular to the Moxtek polarizer and the second polarizer as well as the diode laser beam was removed from the optical path. The sample was aligned within ±0.5° prior to any activation.

To conduct the measurements, each test sample was exposed to 6.7 W/m² of UVA from the activating light source for 10 to 20 minutes to activate the photochromic compound. An International Light Research Radiometer (Model IL-1700) with a detector system (Model SED033 detector, B Filter, and diffuser) was used to verify exposure at the beginning of each day. Light from the monitoring source that was polarized to the 0° polarization plane was then passed through the coated sample and focused into a 1" integrating sphere, which was connected to an OCEAN OPTICS® S2000 spectrophotometer or equivalent using a single function fiber optic cable. The spectral information, after passing through the sample, was collected using OCEAN OPTICS® OOIBase32 and OOIColor software, and PPG propriety software. While the photochromic material was activated, the position of the polarizing sheet was rotated back and forth to polarize the light from the monitoring light source to the 90° polarization plane and back. Data was collected for approximately 600 to 1200 seconds at 5-second intervals during activation. For each test, rotation of the polarizers was adjusted to collect data in the following sequence of polarization planes: 0°, 90°, 90°, 0°, etc. Absorption spectra were obtained and analyzed for each test sample using the Igor Pro software (available from WaveMetrics). The change in the absorbance in each polarization direction for each test sample was calculated by subtracting out the 0 time (i.e., unactivated) absorption measurement for the samples at each wavelength tested. Average absorbance values were obtained in the region of the activation profile where the photochromic response of the photochromic compound was saturated or nearly saturated (i.e., the regions where the measured absorbance did not increase or did not increase significantly over time) for each sample by averaging absorbance at each time interval in this region. The average absorbance values in a predetermined range of wavelengths corresponding λmax-vis+/−5 nm were extracted for the 0° and 90° polarizations, and the dichroic ratio for each wavelength in this range was calculated by dividing the larger average absorbance by the small average absorbance. For each wavelength extracted, 5 to 100 data points were averaged. The average dichroic ratio for the photochromic compound was then calculated by averaging these individual dichroic ratios.

The change in optical density (ΔOD) from the bleached state to the darkened state was determined as described in Part 6A.

Polarization efficiency (PE) is calculated by taking the fully activated ΔOD values from the 0 and 90 degree polarization orientations at the 90 degree lambda max (90 degree peak absorption position), converting those delta absorbance values to transmission ($1/10^{(\Delta OD)}$) and then performing the following calculation:

$$PE = 100 \ast ((T_0 - T_{90})/(T_0 + T_{90}))$$

Perfect polarization would be 100%, no polarization=0%, and partial polarization ranges from >0 to <100% in this calculation. The basis for this calculation comes from Optics, Eugene Hecht, 4th Edition, Addison Wesley, 2002, Chapter 8. Transmission was substituted for intensity in this calculation.

The fade half life (T½) is the time interval in seconds for the ΔOD of the activated form of the photochromic compounds in the test samples to reach one half the ΔOD measured after fifteen minutes, or after saturation or near-saturation was achieved, at room temperature after removal of the source of activating light, e.g., by closing the shutter.

Part 7B—Behind the Windshield with Polarization (BWSP) Response Testing

Behind the windshield response testing with polarization efficiency and optical response is performed in a similar manner as Part 7A—Outdoor Simulation with polarization (OSP) Testing, with the following modifications: The temperature of the temperature controlled air cell was set to 27+/−0.2° C. The temperature dwell time before exposure to UV-VIS radiation was 2-3 minutes. The relative humidity in the air cell was 20-28% with some variation within due to room humidity. The activation time was 15 minutes. The activation exposure (irradiance level) was set to 1.00+−0.02 W/m² over an integrated wavelength range of 380 to 420 nm using a WG295, KG-2 (3 mm), Solar Green/PVB windshield filter, and various neutral density filters and lamp powers to obtain said exposure level. The visible illuminance (380 to 780 nm) was measured at 4800+/−200 lux, though this level was not controlled. The irradiance was measured using an ILT950 spectral radiometer from International Light. The output data from the spectral radiometer was post processed for wavelength correction, such that the wavelength accuracy of the spectral radiometer was <+/−1 nm. Test results are recorded below in Table 6.

TABLE 6

Photochromic and Polarization Performance Test Results

| Example # | Dye # | λ$_{max-vis}$ (nm) | ΔOD @ 15 minutes (OSP) | ΔOD at 15 minutes (BWSP) | Dichroic Ratio (DR) | % PE (OSP) | % PE (BWSP) | % PE Retained |
|---|---|---|---|---|---|---|---|---|
| 1 | Dye 1 | 608 | 0.52 | 0.11 | 5.6 | 88.1 | 19.9 | 22% |
| 2 | Dye 2 | 574 | 0.56 | 0.14 | 5.6 | 89.3 | 23.3 | 26% |
| 3 | Dye 3 | 582 | 0.62 | 0.27 | 5.2 | 94.3 | 48.9 | 52% |
| 4 | Dye-4 | 449 | 0.76 | 0.34 | 5.0 | 97.5 | 60.3 | 62% |
| 5 | Dye-4 | 449 | 0.74 | 0.34 | 5.3 | 98.0 | 61.5 | 63% |
| 6 | Dye-4 | 449 | 0.73 | 0.32 | 4.8 | 94.0 | 54.3 | 57% |

The results of Table 6 show that Examples 1-6, when under behind the windshield eyeglass wearer simulating conditions, retained from 22 to 63% percent of the polarization efficiency (% PE) measured under outdoor with polarization simulating conditions.

The present invention has been described with reference to specific details of particular embodiments thereof. It is not intended that such details be regarded as limitations upon the scope of the invention except insofar as to the extent that they are included in the accompanying claims.

What is claimed is:
1. A photochromic article comprising:
   (a) a substrate; and
   (b) at least one photochromic material adapted to change from an unactivated form to an activated form by exposure to radiation substantially in the wavelength range from 380 to 450 nanometers when measured over a range of from 380 to 700 nanometers, said photochromic article being adapted to retain at least 12 percent of the delta OD measured in the Outdoor Test when tested in the Behind the Windshield Test,
wherein photochromic material (b) is chosen from at least one of,
   (1) a photochromic material chosen from at least one fluoranthenoxazine represented by the following Formula (I),

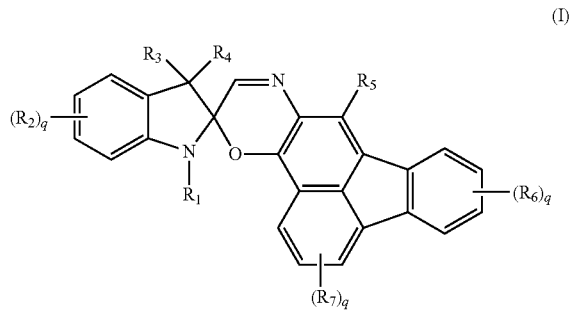

(I)

wherein for Formula (I),
   (a) $R_1$ is chosen from hydrogen, $C_1$-$C_8$ alkyl, $C_3$-$C_7$ cycloalkyl, phen($C_1$-$C_4$)alkyl, naphth($C_1$-$C_4$)alkyl, allyl, acryloyloxy($C_2$-$C_6$)alkyl, methacryloyloxy($C_2$-$C_6$)alkyl, $C_2$-$C_4$ acyloxy($C_2$-$C_6$)alkyl, carboxy($C_2$-$C_6$)alkyl, cyano($C_2$-$C_6$)alkyl, hydroxy($C_2$-$C_6$)alkyl, triarylsilyl, triarylsilyloxy, tri($C_1$-$C_6$)alkylsilyl, tri($C_1$-$C_6$)alkylsilyloxy, tri($C_1$-$C_6$)alkoxysilyl, tri($C_1$-$C_6$)alkoxysilyloxy, di($C_1$-$C_6$)alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ alkyl)silyl, di($C_1$-$C_6$)alkoxy($C_1$-$C_6$ alkyl)silyloxy, $C_1$-$C_6$ alkoxy($C_2$-$C_4$)alkyl or ($C_2H_4O$)$_r$-$CH_3$, wherein r is an integer from 1 to 6,
   (b) $R_2$ is chosen from $C_1$-$C_5$ alkyl, $C_1$-$C_5$ alkoxy, nitro, cyano, $C_1$-$C_8$ alkoxycarbonyl, $C_1$-$C_4$ acyloxy, halo, $C_1$-$C_4$ monohaloalkyl or $C_1$-$C_4$ polyhaloalkyl; said halo substituents being chloro, fluoro, iodo or bromo and q is 0, 1 or 2,
   (c) $R_3$ and $R_4$ are each independently chosen from $C_1$-$C_5$ alkyl, benzyl, phenyl, mono- or di-substituted phenyl, said phenyl substituents being $C_1$-$C_5$ alkyl or $C_1$-$C_5$ alkoxy; or $R_3$ and $R_4$ taken together form a group chosen from a cyclic ring of from 5 to 8 carbon atoms which includes the spiro carbon atom,
   (d) $R_5$ is chosen from hydrogen, —$CH_2Q$ and —C(O)W, wherein Q is halogen, hydroxy, benzoyloxy, $C_1$-$C_6$ alkoxy, $C_2$-$C_6$ acyloxy, amino, $C_1$-$C_6$ mono-alkylamino, $C_1$-$C_6$ dialkylamino, morpholino, piperidino, 1-indolinyl, pyrrolidyl, triarylsilyl, triarylsilyloxy, tri($C_1$-$C_6$)alkylsilyl, tri($C_1$-$C_6$)alkylsilyloxy, tri($C_1$-$C_6$) alkoxysilyl, tri($C_1$-$C_6$)alkoxysilyloxy, di($C_1$-$C_6$)alkyl ($C_1$-$C_6$ alkoxy)silyl, di($C_1$-$C_6$)alkyl($C_1$-$C_6$ alkoxy) silyloxy, di($C_1$-$C_6$)alkoxy($C_1$-$C_6$ alkyl)silyl, di($C_1$-$C_6$) alkoxy($C_1$-$C_6$ alkyl)silyloxy, or the group, —OCH($R_8$)Z; W is the group, —OCH($R_8$)Z, or an unsubstituted, mono-substituted, or di-substituted heterocyclic ring containing 5 to 6 ring atoms, which ring includes as the hetero atom a nitrogen atom alone or one additional hetero atom of nitrogen or oxygen; wherein Z is —CN, —$CF_3$, halogen, —C(O)$R_8$, or —COOR$_8$, $R_8$ is hydrogen or $C_1$-$C_6$ alkyl; said heterocyclic ring substituents being chosen from $C_1$-$C_6$ alkyl or $C_1$-$C_6$ alkoxy; or W is —OR$_9$ or —N($R_{10}$)$R_{11}$, wherein $R_9$ is chosen from hydrogen, allyl, $C_1$-$C_6$ alkyl, phenyl, mono($C_1$-$C_6$) alkyl substituted phenyl, mono($C_1$-$C_6$)alkoxy-substituted phenyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$) alkyl, or $C_1$-$C_6$ haloalkyl; and $R_{10}$ and $R_{11}$ are each independently chosen from hydrogen, $C_1$-$C_6$ alkyl, $C_5$-$C_7$ cycloalkyl, phenyl, mono- or di-substituted phenyl, or $R_{10}$ and $R_{11}$ together with the nitrogen atom form a mono- or di-substituted or unsubstituted heterocyclic ring containing from 5 to 6 ring atoms, which ring includes as the hetero atom said nitrogen atom alone or one additional hetero atom of nitrogen or oxygen, said phenyl and heterocyclic ring substituents being $C_1$-$C_6$ alkyl or $C_1$-$C_6$ alkoxy, and each of said halogen or halo groups in this part (d) being fluoro or chloro, and
   (e) each $R_6$ and $R_7$ is independently chosen for each occurrence from aryl, mono($C_1$-$C_6$)alkoxyaryl, di($C_1$-$C_6$)alkoxyaryl, mono($C_1$-$C_6$)alkylaryl, di($C_1$-$C_6$)alkylaryl, bromoaryl, chloroaryl, fluoroaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_6$)alkyl, $C_3$-$C_7$ cycloalkyloxy($C_1$-$C_6$)alkoxy, aryl($C_1$-$C_6$)alkyl, aryl($C_1$-$C_6$) alkoxy, aryloxy, aryloxy($C_1$-$C_6$)alkyl, aryloxy($C_1$-$C_6$) alkoxy, mono- or di($C_1$-$C_6$)alkylaryl($C_1$-$C_6$)alkyl, mono- or di($C_1$-$C_6$)alkoxyaryl($C_1$-$C_6$)alkyl, mono- or di($C_1$-$C_6$)alkylaryl($C_1$-$C_6$)alkoxy, mono- or di($C_1$-$C_6$) alkoxyaryl($C_1$-$C_6$)alkoxy, amino, mono($C_1$-$C_6$)alkylamino, di($C_1$-$C_6$)alkylamino, diarylamino, N—($C_1$-$C_6$)alkylpiperazino, N-arylpiperazino, aziridino, indolino, piperidino, arylpiperidino, morpholino, thiomorpholino, tetrahydroquinolino, tetrahydroisoquinolino, pyrryl, $C_1$-$C_6$ alkyl, $C_1$-$C_6$ bromoalkyl, $C_1$-$C_6$ chloroalkyl, $C_1$-$C_6$ fluoroalkyl, $C_1$-$C_6$ alkoxy, mono ($C_1$-$C_6$)alkoxy($C_1$-$C_4$)alkyl, acryloxy, methacryloxy, bromo, chloro or fluoro; and q is independently chosen for each occurrence form the integer 0, 1, or 2,
provided that for Formula (I) at least one of and less than all of $R_1$, $R_2$, $R_3$, $R_4$, $R_5$, $R_6$, and $R_7$ is in each case independently an L-Group as defined below;
(2) a photochromic material chosen from at least one naphthopyran represented by the following Formula (II),

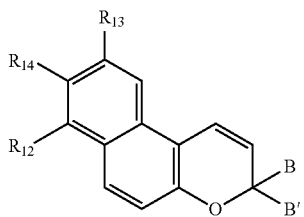

(II)

wherein for Formula (II),
(a) $R_{12}$ is hydrogen or a $C_1$-$C_6$ alkyl,
(b) $R_{13}$ is hydrogen or the group, —C(O)J, J being —O$R_{15}$ r —N($R_{10}$)$R_{11}$, wherein $R_{15}$ is hydrogen, allyl, $C_1$-$C_6$ alkyl, phenyl, $C_1$-$C_6$ monoalkyl substituted phenyl, $C_1$-$C_6$ monoalkoxy substituted phenyl, phenyl($C_1$-$C_3$)alkyl, $C_1$-$C_6$ monoalkyl substituted phenyl($C_1$-$C_3$) alkyl, $C_1$-$C_6$ monoalkoxy substituted phenyl($C_1$-$C_3$) alkyl, $C_1$-$C_6$ alkoxy($C_2$-$C_4$)alkyl, or $C_1$-$C_6$ monohaloalkyl, and wherein $R_{10}$ and $R_{11}$ are the same as described hereinbefore in (1)(d), and said halo substituent being chloro or fluoro,
(c) $R_{14}$ is —O$R_9$, —N($R_{10}$)$R_{11}$, wherein $R_9$, $R_{10}$ and $R_{11}$ are the same as described hereinbefore in (1)(d), or the group, —C(O)V; wherein V is $C_1$-$C_6$ alkyl, phenyl, $C_1$-$C_6$ mono- or $C_1$-$C_6$ di-alkyl substituted phenyl, $C_1$-$C_6$ mono- or $C_1$-$C_6$ di-alkoxy substituted phenyl, $C_1$-$C_6$ alkoxy, phenoxy, $C_1$-$C_6$ mono- or $C_1$-$C_6$ di-alkyl substituted phenoxy, $C_1$-$C_6$ mono- or $C_1$-$C_6$ di-alkoxy substituted phenoxy, $C_1$-$C_6$ alkylamino, phenylamino, $C_1$-$C_6$ mono- or $C_1$-$C_6$ di-alkyl substituted phenylamino, or $C_1$-$C_6$ mono- or $C_1$-$C_6$ di-alkoxy substituted phenylamino, and said halo substituent being chloro, fluoro or bromo, provided that either $R_{12}$ or $R_{13}$ is hydrogen; and
(d) B and B' are each independently chosen from,
  (i) mono-T-substituted phenyl, wherein the group T is represented by the formula, -G[(OC$_2$H$_4$)$_x$(OC$_3$H$_6$)$_y$(OC$_4$H$_8$)$_z$]G'

—[(OC$_2$H$_4$)$_x$(OC$_3$H$_6$)$_y$(OC$_4$H$_8$)$_z$]G' wherein -G being chosen from —C(O)— or —CH$_2$—, G' being chosen from $C_1$-$C_3$ alkoxy or a polymerizable group, x, y and z each being independently chosen from a number between 0 and 50, and the sum of x, y and z being between 2 and 50,
  (ii) an unsubstituted, mono-, di-, or tri-substituted aryl group, phenyl or naphthyl,
  (iii) 9-julolidinyl or the unsubstituted, mono- or di-substituted heteroaromatic group chosen from pyridyl furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl or fluorenyl, each of said aryl and heteroaromatic substituents in (ii) and (iii) being independently chosen from hydroxy, —C(O)U, wherein U being hydroxy, $C_1$-$C_6$ alkyl, $C_1$-$C_6$ alkoxy, phenyl, mono-substituted phenyl, amino, mono ($C_1$-$C_6$)alkylamino, di-($C_1$-$C_6$)alkylamino, morpholino, piperidino or pyrrolidyl; aryl, mono($C_1$-$C_6$)alkoxyaryl, di($C_1$-$C_6$)alkoxyaryl, mono($C_1$-$C_6$)alkylaryl, di($C_1$-$C_6$)alkylaryl, chloroaryl, fluoroaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_6$)alkyl, $C_3$-$C_7$ cycloalkyloxy($C_1$-$C_6$)alkoxy, aryl($C_1$-$C_6$)alkyl, aryl($C_1$-$C_6$)alkoxy, aryloxy, aryloxy($C_1$-$C_6$)alkyl, aryloxy($C_1$-$C_6$)alkoxy, mono- or di-($C_1$-$C_6$)alkylaryl($C_1$-$C_6$)alkyl, mono- or di-($C_1$-$C_6$)alkoxyaryl($C_1$-$C_6$)alkyl, mono- or di-($C_1$-$C_6$)alkylaryl($C_1$-$C_6$) alkoxy, mono- or di-($C_1$-$C_6$)alkoxyaryl($C_1$-$C_6$) alkoxy, amino, mono($C_1$-$C_6$)alkylamino, di($C_1$-$C_6$) alkylamino, diarylamino, piperazino, N—($C_1$-$C_6$) alkylpiperazino, N-arylpiperazino, aziridino, indolino, piperidino, morpholino, thiomorpholino, tetrahydroquinolino, tetrahydroisoquinolino, pyrrolidyl, $C_1$-$C_6$ alkyl, $C_1$-$C_6$ chloroalkyl, $C_1$-$C_6$ fluoroalkyl, $C_1$-$C_6$ alkoxy, mono($C_1$-$C_6$)alkoxy($C_1$-$C_4$) alkyl, acryloxy, methacryloxy, bromo, chloro or fluoro, said aryl being chosen from phenyl or naphthyl,
  (iv) an unsubstituted or mono-substituted group chosen from pyrazolyl, imidazolyl, pyrazolinyl, imidazolinyl, pyrrolinyl, phenothiazinyl, phenoxazinyl, phenazinyl or acridinyl, each of said substituents being independently chosen from $C_1$-$C_6$ alkyl, $C_1$-$C_6$ alkoxy, phenyl, fluoro, chloro or bromo,
  (v) a monosubstituted phenyl, said phenyl having a substituent located at the para position being —(CH$_2$)$_r$— or —O—(CH$_2$)$_r$—, wherein r being chosen from the integer 1, 2, 3, 4, 5 or 6, said substituent being connected to an aryl group which is a member of another photochromic material,
  (vi) a group represented by one of the following formulas,

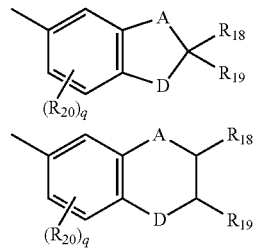

wherein A is independently chosen in each formula from methylene or oxygen and D being independently chosen in each formula from oxygen or substituted nitrogen, provided that when D is substituted nitrogen, A is methylene; said nitrogen substituents being chosen from hydrogen, $C_1$-$C_6$ alkyl, or $C_2$-$C_6$ acyl; each $R_{20}$ being independently chosen for each occurrence in each formula from $C_1$-$C_6$ alkyl, $C_1$-$C_6$ alkoxy, hydroxy, chloro or fluoro; $R_{18}$ and $R_{19}$ each being independently chosen in each formula from hydrogen or $C_1$-$C_6$ alkyl; and q being chosen from the integer 0, 1 or 2;
  (vii) $C_1$-$C_6$ alkyl, $C_1$-$C_6$ chloroalkyl, $C_1$-$C_6$ fluoroalkyl, $C_1$-$C_6$ alkoxy($C_1$-$C_4$)alkyl, $C_3$-$C_6$ cycloalkyl, mono ($C_1$-$C_6$)alkoxy($C_3$-$C_6$)cycloalkyl, mono($C_1$-$C_6$)alkyl ($C_3$-$C_6$)-cycloalkyl, chloro($C_3$-$C_6$)cycloalkyl, fluoro ($C_3$-$C_6$)cyclo-alkyl or $C_4$-$C_{12}$ bicycloalkyl;
  (viii) a group represented by the following formula,

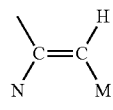

wherein N is chosen from hydrogen or $C_1$-$C_4$ alkyl and M is chosen from an unsubstituted, mono-, or di-substituted group chosen from naphthyl, phenyl, furanyl, or thienyl; each of said group substituents being independently chosen from $C_1$-$C_4$ alkyl, $C_1$-$C_4$ alkoxy, fluoro, or chloro, or (ix) B and B' taken together form fluoren-9-ylidene, mono-, or di-substituted fluoren-9-ylidene or a group being independently chosen from saturated $C_3$-$C_{12}$ spiro-monocyclic hydrocarbon rings, saturated $C_7$-$C_{12}$ spiro-bicyclic hydrocarbon rings or saturated $C_7$-$C_{12}$ spiro-tricyclic hydrocarbon rings; each of said fluoren-9-ylidene substituents being independently chosen from $C_1$-$C_4$ alkyl, $C_1$-$C_4$ alkoxy, fluoro or chloro, provided that for Formula (II) at least one of and less than all of $R_{12}$, $R_{13}$, $R_{14}$, B, and B' is in each case independently said L-Group as defined below;

(3) a photochromic material chosen from at least one naphthopyran represented by the following Formula (III),

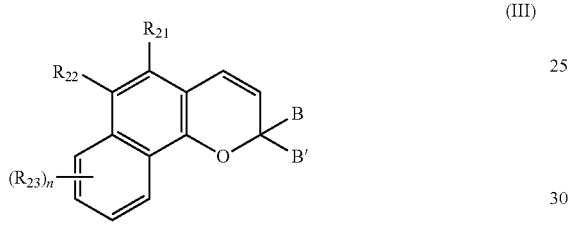

wherein for Formula (III),
(a) $R_{21}$ is the group, —C(O)W or $CH_2Q$, described hereinbefore in (1)(d),
(b) $R_{22}$ and each $R_{23}$ are independently chosen for each occurrence from hydroxy, $NH_2$ or N(R)H; wherein R is $C_1$-$C_6$ alkyl or aryl and n is chosen from the integers 0, 1, 2, or 3, and
(c) B and B' are each independently chosen from the groups described hereinbefore in (2)(d),
provided that for Formula (III) at least one of and less than all of $R_{21}$, $R_{22}$, $R_{23}$, B, and B' is in each case independently said L-Group as defined below;

(4) a photochromic material chosen from at least one naphthopyran represented by the following Formula (IV),

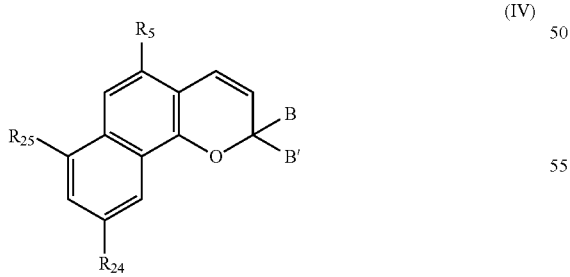

wherein for Formula (IV),
(a) $R_5$ is independently chosen from the groups described hereinbefore in (1)(d),
(b) $R_{24}$ and $R_{25}$ are each chosen from hydrogen or an amino group defined hereinafter, provided that $R_{24}$ and $R_{25}$ are not both hydrogen, said amino group being selected from, (i) —N($R_{16}$)$R_{17}$, $R_{16}$ and $R_{17}$ each being independently chosen from hydrogen, $C_1$-$C_8$ alkyl, aryl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_8$ alkylaryl, $C_3$-$C_{20}$ cycloalkyl, $C_4$-$C_{20}$ bicycloalkyl, $C_5$-$C_{20}$ tricycloalkyl or $C_1$-$C_{20}$ alkoxyalkyl and said aryl group being phenyl or naphthyl, (ii) a nitrogen containing ring represented by the following formula,

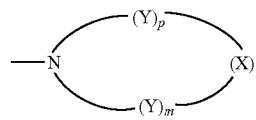

wherein each Y being independently chosen for each occurrence from —$CH_2$—, —CH($R_{26}$)—, —C($R_{26}$)($R_{26}$)—, —CH(aryl)-, —C(aryl)$_2$- or —C($R_{26}$)(aryl)-; X being —Y—, —O—, —S—, —S(O)—, —S(O$_2$)—, —NH—, —N($R_{26}$)— or —N(aryl)-; $R_{26}$ being $C_1$-$C_6$ alkyl; said aryl group being phenyl or naphthyl, m being chosen from the integer 1, 2 or 3 and p being chosen from the integer 0, 1, 2 or 3; provided that when p is 0, X is Y, (iii) a group represented by one of the following formulas,

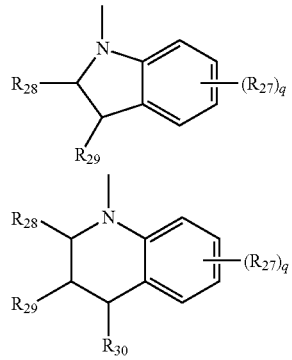

wherein each $R_{28}$, $R_{29}$ and $R_{30}$ being chosen independently for each occurrence in each formula from hydrogen, $C_1$-$C_5$ alkyl, phenyl or naphthyl; or the groups $R_{28}$ and $R_{29}$ together form a ring of 5 to 8 carbon atoms; $R_{27}$ being chosen independently for each occurrence from $C_1$-$C_6$ alkyl, $C_1$-$C_6$ alkoxy, fluoro or chloro and q being chosen from the integer 0, 1 or 2, (iv) unsubstituted, mono- or di-substituted $C_4$-$C_{18}$ spirobicyclic amine, or (v) unsubstituted, mono- or di-substituted $C_4$-$C_{18}$ spirotricyclic amine; said substituents for (iv) and (v) being independently chosen for each occurrence from aryl, $C_1$-$C_6$ alkyl, $C_{1-6}$ alkoxy or phenyl($C_1$-$C_6$)alkyl, and (c) B and B' are each independently chosen from the groups described hereinbefore in (2)(d),
provided that for Formula (IV) at least one of and less than all of $R_5$, $R_{24}$, $R_{25}$, B and B' is in each case independently said L-Group as defined below;

(5) a photochromic material chosen from at least one phenanthropyran represented by at least one of the following Formula (VA) and Formula (VB),

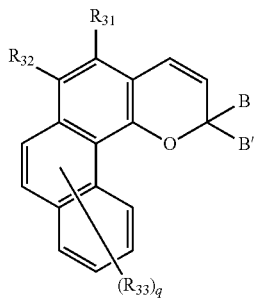

(VA)

and

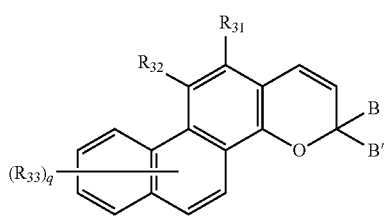

(VB)

wherein for Formula (VA) and Formula (VB),
(a) $R_{31}$ is the group $R_5$, described hereinbefore in (1)(d),
(b) $R_{32}$ is hydrogen, $C_1$-$C_6$ alkyl, $C_1$-$C_6$ alkoxy, $C_3$-$C_7$ cycloalkyl, pyridyl, phenyl, mono-substituted or di-substituted phenyl, said phenyl substituents being $C_1$-$C_6$ alkyl, $C_1$-$C_6$ alkoxy, hydroxy, amino, chloro, or fluoro,
(c) each $R_{33}$ is independently chosen for each occurrence from chloro, fluoro, amino, $C_1$-$C_6$ monoalkylamino, —N($R_{10}$)$R_{11}$, which was described hereinbefore in (1)(d), phenyl, $C_1$-$C_6$ alkyl, or —O$R_{34}$, wherein $R_{34}$ is hydrogen, $C_1$-$C_6$ alkyl, allyl, or acetyl, and q is the integer 0, 1, or 2, and
(d) B and B' are each independently chosen from the groups described hereinbefore in (2)(d),
provided that for Formula (VA) and Formula (VB) at least one of and less than all of $R_{31}$, $R_{32}$, $R_{33}$, B, and B' is in each case independently said L-Group as defined below;
(6) a photochromic material chosen from at least one fluoranthenopyran represented by the following Formula (VI),

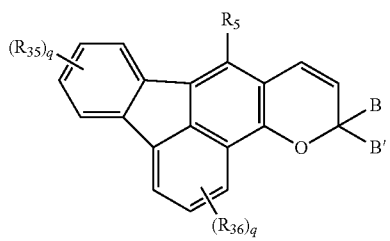

(VI)

wherein for Formula (VI),
(a) $R_{35}$ and $R_{36}$ are each independently chosen for each occurrence from hydroxy, aryl, mono($C_1$-$C_6$)alkoxyaryl, di($C_1$-$C_6$)alkoxyaryl, mono($C_1$-$C_6$)alkylaryl, di($C_1$-$C_6$)alkylaryl, bromoaryl, chloroaryl, fluoroaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_6$)alkyl, $C_3$-$C_7$ cycloalkyloxy($C_1$-$C_6$)alkoxy, aryl($C_1$-$C_6$)alkyl, aryl($C_1$-$C_6$)alkoxy, aryloxy, aryloxy($C_1$-$C_6$)alkyl, aryloxy($C_1$-$C_6$)alkoxy, mono- or di($C_1$-$C_6$)alkylaryl($C_1$-$C_6$)alkyl, mono- and di($C_1$-$C_6$)alkoxyaryl($C_1$-$C_6$)alkyl, mono- or di($C_1$-$C_6$)alkylaryl($C_1$-$C_6$)alkoxy, mono- or di($C_1$-$C_6$)alkoxyaryl($C_1$-$C_6$)alkoxy, $C_1$-$C_6$ alkyl, $C_1$-$C_6$ bromoalkyl, $C_1$-$C_6$ chloroalkyl, $C_1$-$C_6$ fluoroalkyl, $C_1$-$C_6$ alkoxy, mono($C_1$-$C_6$)alkoxy($C_1$-$C_4$)alkyl, acryloxy, methacryloxy, bromo, chloro, fluoro, amino, mono($C_1$-$C_6$)alkylamino, di($C_1$-$C_6$)alkylamino, phenylamino, mono- or di-($C_1$-$C_6$)alkyl substituted phenylamino or mono- or di-($C_1$-$C_6$)alkoxy substituted phenylamino, and q is the integer 0, 1 or 2,
(b) $R_5$ is independently chosen from the groups described hereinbefore in (1)(d), and
(c) B and B' are each independently chosen from the groups described hereinbefore in (2)(d),
provided that for Formula (VI) at least one of and less than all of $R_5$, $R_{35}$, $R_{36}$, B, and B' is in each case independently said L-Group as defined below;
(7) a photochromic material chosen from at least one naphthopyran represented by the following Formula (VII),

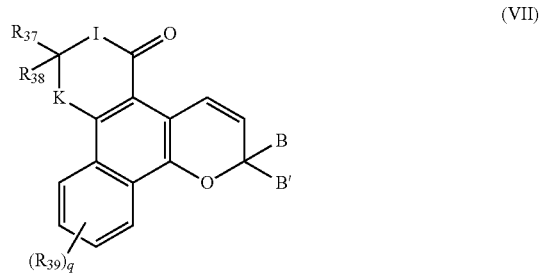

(VII)

wherein for Formula (VII),
(a) $R_{37}$ and $R_{38}$ together form an oxo group or $R_{37}$ and $R_{38}$ each are independently chosen for each occurrence from hydrogen, $C_1$-$C_6$ alkyl, $C_3$-$C_7$ cycloalkyl, allyl, phenyl, mono- or di-substituted phenyl, benzyl, mono-substituted benzyl, naphthyl, mono- or di-substituted naphthyl, $C_4$-$C_{12}$ bicycloalkyl, linear or branched $C_3$-$C_{12}$ alkenyl, $C_1$-$C_6$ alkoxy carbonyl($C_1$-$C_6$)alkyl, methacryloxy($C_1$-$C_6$)alkyl, acryloxy($C_1$-$C_6$)alkyl, $C_1$-$C_4$acyloxy($C_1$-$C_6$)alkyl, $C_1$-$C_6$ alkoxy($C_1$-$C_6$)alkyl or the unsubstituted, mono- or di-substituted heteroaromatic groups pyridyl, furanyl, benzofuran-2-yl, benzylfuran-3-yl, thienyl, benzothien-2-yl, benzothien-3-yl, dibenzofuranyl, dibenzothienyl, carbazolyl, benzopyridyl and indolyl, each of said phenyl, benzyl, naphthyl and heteroaromatic group substituents being $C_1$-$C_6$ alkyl, $C_1$-$C_6$ alkoxy, morpholino, di($C_1$-$C_6$)alkylamino, chloro or fluoro,
(b) $R_{39}$ is chosen from $C_1$-$C_6$ alkyl, $C_1$-$C_6$ alkoxy, chloro, fluoro, phenyl, mono- and di-substituted phenyl, benzyl or mono-substituted benzyl, $C_3$-$C_7$ cycloalkyl, aryloxy, di($C_1$-$C_6$)alkylamino, morpholino, thiomorpholino, piperidino, pyridyl, tetrahydroquinolino, isoquinolino, aziridino, diarylamino, N—($C_1$-$C_6$)alkyl piperizino or N-aryl piperizino, wherein the aryl groups are phenyl or naphthyl, each of said phenyl and benzyl substituents being $C_1$-$C_6$ alkyl, $C_1$-$C_6$ alkoxy, fluoro or chloro, and q is the integer 0, 1 or 2, (c) I is oxygen or —N(R$_{40}$)—, wherein R$_{40}$ is hydrogen, C$_1$-C$_6$ alkyl, C$_3$-C$_7$ cycloalkyl, allyl, vinyl, C$_1$-C$_5$ acyl, phenyl, mono- or di-substituted phenyl, benzyl, mono-substituted benzyl, C$_1$-C$_4$ alkoxycarbonyl(C$_1$-C$_6$)alkyl, methacryloxy(C$_1$-C$_6$)alkyl, acryloyloxy(C$_1$-C$_6$)alkyl, phenyl(C$_1$-C$_6$)alkyl, naphthyl, C$_4$-C$_{12}$ bicycloalkyl, C$_2$-C$_4$ acyloxy or the unsubstituted or substituted heteroaromatic groups pyridyl, furanyl, benzofuran-2-yl, benzofuran-3-yl, thienyl, benzothien-2-yl, benzothien-3-yl, dibenzofuranyl, dibenzothienyl, carbazolyl, benzopyridyl or indolyl, each of said phenyl, benzyl and heteroaromatic group substituents being C$_1$-C$_6$ alkyl or C$_1$-C$_6$ alkoxy, (d) K is oxygen, —N(R$_{40}$)— or —C(R$_{41}$)(R$_{42}$)—, wherein R$_{41}$ and R$_{42}$ are each hydrogen, C$_1$-C$_6$ alkyl or C$_3$-C$_7$ cycloalkyl, and (e) B and B' are each independently chosen from the groups described hereinbefore in (2)(d), provided that for Formula (VII) at least one of and less than all of R$_{37}$, R$_{38}$, R$_{39}$, B, and B' is in each case independently said L-Group as defined below;

(8) a photochromic material chosen from at least one naphthopyran represented by the following Formula (VIII),

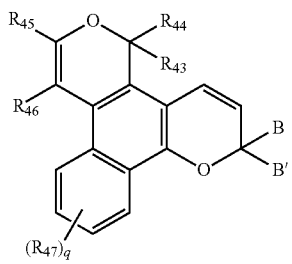

(VIII)

wherein for Formula (VIII), (a) R$_{43}$ and R$_{44}$ together form an oxo group or R$_{43}$ and R$_{44}$ are both hydrogen, C$_1$-C$_6$ alkyl, C$_3$-C$_7$ cycloalkyl, allyl, phenyl, mono-substituted phenyl, benzyl or mono-substituted benzyl each of said phenyl and benzyl group substituents being C$_1$-C$_6$ alkyl or C$_1$-C$_6$ alkoxy, (b) R$_{45}$ is hydrogen, C$_1$-C$_6$ alkyl, C$_3$-C$_7$ cycloalkyl, or the group, CH(B)B', wherein B and B' are each independently chosen from the groups described hereinbefore in (2)(d), (c) R$_{46}$ is hydrogen, C$_1$-C$_6$ alkyl, or C$_3$-C$_7$ cycloalkyl;

(d) each R$_{47}$ is C$_1$-C$_6$ alkyl, C$_1$-C$_6$ alkoxy, chloro or fluoro, and q is the integer 0, 1, or 2, and (e) B and B' are each independently chosen from the groups described hereinbefore in (2)(d), provided that for Formula (VIII) at least one of and less than all of R$_{43}$, R$_{44}$, R$_{45}$, R$_{46}$, R$_{47}$, B, and B' is in each case independently said L-Group as defined below;

(9) a photochromic material chosen from at least one naphthopyran represented by the following Formulas (IXA), (IXB), (IXC), (IXD), (IXE), (IXF), (IXG) and (IXH),

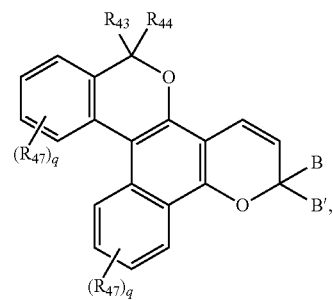

(IXA)

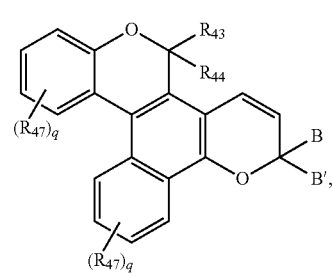

(IXB)

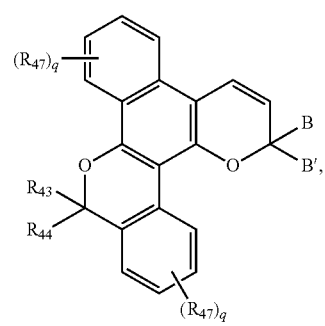

(IXC)

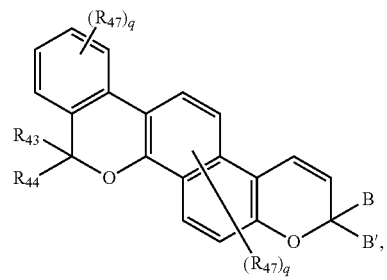

(IXD)

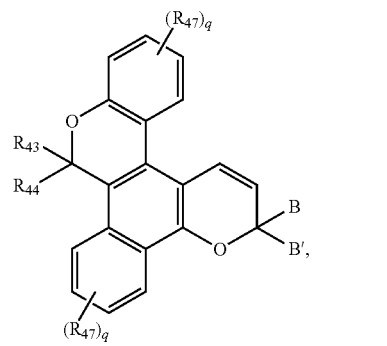

(IXE)

-continued (IXF)

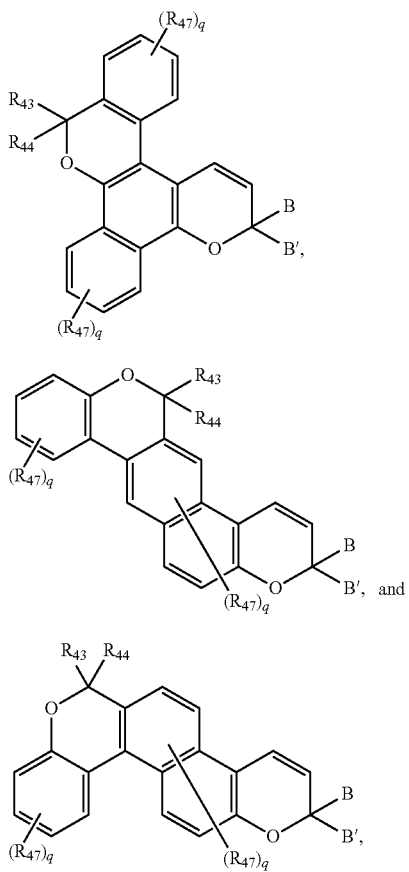

(IXG)

(IXH)

wherein independently for each of Formulas (IXA), (IXB), (IXC), (IXD), (IXE), (IXF), (IXG) and (IXH),
(a) $R_{43}$ and $R_{44}$ are in each case independently chosen from groups described hereinbefore in (8)(a);
(b) $R_{47}$ in each case is independently chosen from groups described hereinbefore in (8)(d), and q is in each case independently as described hereinbefore in (8)(d), and
(c) B and B' are each independently chosen from the groups described hereinbefore in (2)(d),
provided that independently for each of Formulas (IXA), (IXB), (IXC), (IXD), (IXE), (IXF), (IXG) and (IXH), at least one of and less than all of $R_{43}$, $R_{44}$, $R_{47}$, B, and B' is in each case independently said L-Group as defined below;
(10) a photochromic material chosen from at least one naphthopyran represented by the following Formulae (XA) and Formula (XB), (XA)

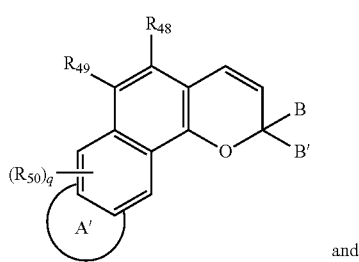

and

-continued (XB)

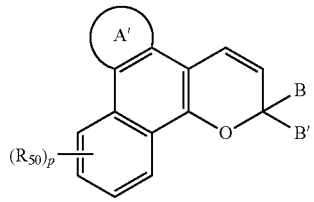

wherein independently for each of Formula (XA) and Formula (XB),
(a) Ring A' is chosen from,
(i) an unsubstituted, mono-substituted or di-substituted heterocyclic ring chosen from benzothieno, benzofurano or indolo, the 2,3 or 3,2 positions of said heterocyclic ring being fused to the i, j or k side of said naphthopyran represented by Formula(XA) or said heterocyclic ring is fused to the f side of said naphthopyran represented by Formula (XB), or
(ii) an unsubstituted, mono-substituted or di-substituted indeno group fused to the i, j or k side of said naphthopyran represented by Formula (XA) or to the f side of said naphthopyran represented by Formula (XB); each of said heterocyclic ring and indeno group substituents being $C_1$-$C_6$ alkyl, $C_5$-$C_7$ cycloalkyl, $C_1$-$C_6$ alkoxy, —$N(R_{10})R_{11}$, which was described hereinbefore in (1)(d), chloro, fluoro, benzo, mono- or di-substituted benzo group fused to the benzo portion of the benzothieno, benzofurano, indeno or indolo moiety, said benzo substitutent being $C_1$-$C_6$ alkyl, $C_5$-$C_7$ cycloalkyl, $C_1$-$C_6$ alkyl mono-substituted ($C_5$-$C_7$)cycloalkyl, $C_1$-$C_6$ alkoxy, —$N(R_{10})R_{11}$, which was described hereinbefore in (1)(d), chloro or fluoro,
(b) $R_{48}$ is chosen from,
(i) —C(O)W', W' being —$OR_9$ or —$N(R_{10})R_{11}$, wherein said groups were described hereinbefore in (1)(d), or
(ii) —$C(R_{51})_2X'$, wherein X' is —CN, chloro, fluoro, hydroxy, benzoyloxy, $C_1$-$C_6$ alkoxy, $C_2$-$C_6$ acyloxy, amino, $C_1$-$C_6$ mono-alkylamino, $C_1$-$C_6$ dialkylamino, morpholino, piperidino, 1-indolinyl, pyrrolidyl, or trimethylsilyloxy, $R_{51}$ is hydrogen, $C_1$-$C_6$ alkyl, phenyl or naphthyl, and each of said phenyl and heterocyclic ring substituents in this part (b)(i) and (ii) being $C_1$-$C_6$ alkyl or $C_1$-$C_6$ alkoxy,
(c) $R_{49}$ is hydrogen, $C_1$-$C_6$ alkyl, the mono-, di- or tri-substituted aryl groups phenyl or naphthyl, said aryl substituents being $C_1$-$C_6$ alkyl, $C_1$-$C_6$ alkoxy, chloro or fluoro, or
(d) each $R_{50}$ is chloro, fluoro, $C_1$-$C_6$ alkyl, $C_1$-$C_6$ alkoxy, phenyl, naphthyl, phenoxy, naphthoxy or the group, —$N(R_{10})R_{11}$, described hereinbefore in (1)(d), and q is selected from the integers 0, 1 or 2 in said naphthopyran represented by Formula (XA), or each $R_{50}$ is chloro, fluoro, phenoxy, naphthoxy or the group, —$N(R_{10})R_{11}$, and p is selected from the integers 0, 1, 2 or 3 in said naphthopyran represented by Formula (XB), and
(e) B and B' are each independently chosen from the groups described hereinbefore in (2)(d),
provided that independently for each of Formula (XA) and Formula (XB) at least one of and less than all of $R_{48}$, $R_{49}$, $R_{50}$, B, and B' is in each case independently said L-Group as defined below;

(11) a photochromic material chosen from at least one indenonaphthopyran represented by the following Formula (XIA) and Formula (XIB),

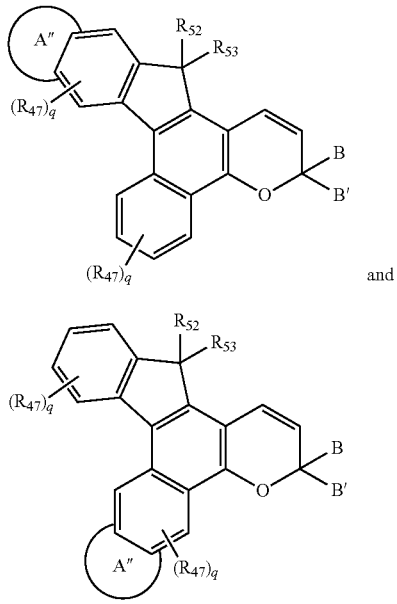

(XIA)

and (XIB)

wherein independently for each of Formula (XIA) and Formula (XIB),
(a) Ring A" is an unsubstituted, mono-substituted or di-substituted heterocyclic ring chosen from furo, thieno, benzothieno, benzofurano or indolo, the 2,3 or 3,2 positions of said heterocyclic ring being fused to the g, h or i side of Formula (XIB) or to the n, o or p side of Formula (XIA), said heterocyclic ring substituents being $C_1$-$C_6$ alkyl, $C_5$-$C_7$ cycloalkyl, $C_1$-$C_6$ alkoxy, chloro or fluoro,
(b) $R_{52}$ and $R_{53}$ together form an oxo group, a spiro heterocyclic group having 2 oxygen atoms and from 3 to 6 carbon atoms including the spirocarbon atom, or $R_{52}$ and $R_{53}$ are each hydrogen, hydroxy, $C_1$-$C_6$ alkyl, $C_3$-$C_7$ cycloalkyl, allyl, phenyl, mono-substituted phenyl, benzyl, mono-substituted benzyl, chloro, fluoro or the group, —C(O)W", wherein each W" is hydroxy, $C_1$-$C_6$ alkyl, $C_1$-$C_6$ alkoxy, phenyl, mono-substituted phenyl, amino, mono($C_1$-$C_6$)alkylamino, di($C_1$-$C_6$)alkylamino, morpholino, piperidino or pyrrolidyl; or $R_{52}$ and $R_{53}$ are each the group, the group, —N($R_{10}$)$R_{11}$, described hereinbefore in (1)(d), or —$OR_{54}$, wherein each $R_{54}$ is $C_1$-$C_6$ alkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono ($C_1$-$C_4$)alkyl substituted $C_3$-$C_7$ cycloalkyl, $C_1$-$C_6$ chloroalkyl, $C_1$-$C_6$ fluoroalkyl, allyl, the group, —CH($R_{55}$)X", wherein each $R_{55}$ is hydrogen or $C_1$-$C_3$ alkyl, each X" is —CN, —$CF_3$, or —$COOR_{55}$, or each $R_{54}$ is the group, —C(O)Y', wherein each Y' is hydrogen, $C_1$-$C_6$ alkyl, $C_1$-$C_6$ alkoxy, the unsubstituted, mono- or di-substituted aryl groups, phenyl or naphthyl, phenoxy, mono- or di-($C_1$-$C_6$)alkyl substituted phenoxy, mono- or di-($C_1$-$C_6$)alkoxy substituted phenoxy, amino, mono ($C_1$-$C_6$)alkylamino, di($C_1$-$C_6$)alkylamino, phenylamino, mono- or di-($C_1$-$C_6$)alkyl substituted phenylamino or mono- or di-($C_1$-$C_6$)alkoxy substituted phenylamino, each of said phenyl, benzyl or aryl group substituents being $C_1$-$C_6$ alkyl or $C_1$-$C_6$ alkoxy,
(c) $R_{47}$ in each case is independently chosen from groups described hereinbefore in (8)(d), and q is in each case independently as described hereinbefore in (8)(d), and
(d) B and B' are each independently chosen from the groups described hereinbefore in (2)(d),
provided that independently for each of Formula (XIA) and Formula (XIB) at least one of and less than all of $R_{47}$, $R_{52}$, $R_{53}$, B, and B' is in each case independently said L-Group as defined below;
(12) a photochromic material chosen from at least one indenonaphthopyran represented by Formula (XIIA) and Formula (XIIB),

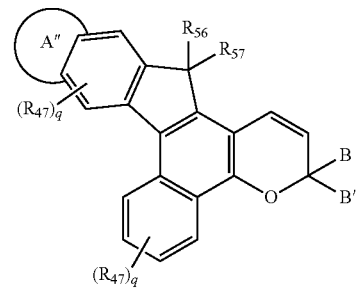

(XIIA)

and

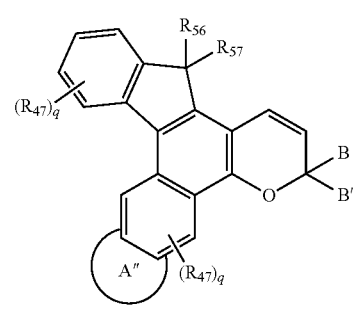

(XIIB)

wherein independently for each of Formula (XIIA) and Formula (XIIB),
(a) Ring A" is independently as described hereinbefore in (11)(a), wherein Ring A" is fused to the g, h or i side of Formula (XIIB) or to the n, o or p side of Formula (XIIA),
(b) $R_{56}$ is hydrogen, hydroxy, bromo, fluoro or chloro and $R_{57}$ is the group, —CH(V')$_2$, wherein V' is —CN or —$COOR_{58}$, and each $R_{58}$ is hydrogen, $C_1$-$C_6$ alkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl or the unsubstituted, mono- or di-substituted aryl groups phenyl or naphthyl, or $R_{57}$ is the group, —CH($R_{59}$)Y", wherein $R_{59}$ is hydrogen, $C_1$-$C_6$ alkyl or the unsubstituted, mono- or di-substituted aryl groups phenyl or naphthyl, and Y" is —$COOR_{58}$, —$COR_{59}$, or —$CH_2OR_{60}$, wherein $R_{59}$ is hydrogen, $C_1$-$C_6$ alkyl, the unsubstituted, mono- or di-substituted aryl groups phenyl or naphthyl, amino, mono($C_1$-$C_6$) alkylamino, di($C_1$-$C_6$)alkylamino, phenylamino, mono- or di-($C_1$-$C_6$)alkyl substituted phenylamino, mono- or di-($C_1$-$C_6$)alkoxy substituted phenylamino, diphenylamino, mono- or di-($C_1$-$C_6$)alkyl substituted diphenylamino, mono- or di-($C_1$-$C_6$)alkoxy substituted diphenylamino, morpholino, or piperidino; $R_{60}$ is hydrogen, —COR$_{58}$, C$_1$-C$_6$ alkyl, C$_1$-C$_3$ alkoxy(C$_1$-C$_6$) alkyl, phenyl(C$_1$-C$_3$)alkyl, mono(C$_1$-C$_6$)alkyl substituted phenyl(C$_1$-C$_3$)alkyl, mono(C$_1$-C$_6$)alkoxy substituted phenyl(C$_1$-C$_3$)alkyl, or the unsubstituted, mono- or di-substituted aryl groups phenyl or naphthyl, each of said aryl group substituents being C$_1$-C$_6$ alkyl or C$_1$-C$_6$ alkoxy, or (c) R$_{56}$ and R$_{57}$ together form the group, =C(V')$_2$ or =C(R$_{59}$)W''', wherein W''' is —COOR$_{58}$ or —COR$_{59}$;

(d) R$_{47}$ in each case is independently chosen from groups described hereinbefore in (8)(d), and q is in each case independently as described hereinbefore in (8)(d), and (e) B and B' are each independently chosen from the groups described hereinbefore in (2)(d), provided that independently for each of Formula (XIIA) and Formula (XIIB) at least one of and less than all of R$_{47}$, R$_{56}$, R$_{57}$, B, and B' is in each case independently said L-Group as defined below;

(13) a photochromic material chosen from at least one indenonaphthopyran represented by the following Formula (XIII),

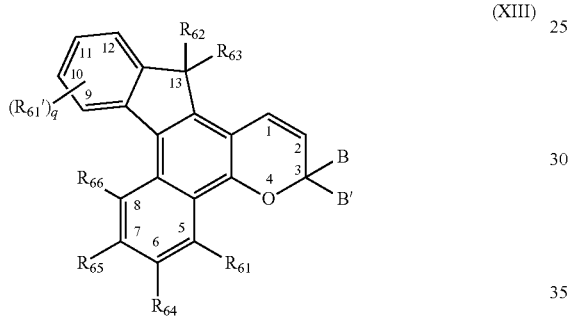

(XIII)

wherein for Formula (XIII), (a) R$_{61}$' is independently for each q is chosen for each occurrence from,
  (i) C$_1$-C$_6$ alkyl or C$_1$-C$_6$ alkoxy, perfluoro alkyl, halogen, cyano, ester;
  (ii) —SR$_{67}$, where R$_{67}$ is chosen from C$_1$-C$_6$ alkyl, aryl, mono- or di-substituted aryl, said aryl group being phenyl or naphthyl and each of said aryl substituents being chosen independently from C$_1$-C$_6$ alkyl, C$_1$-C$_6$ alkoxy or halogen; and
  (iii) an amino group described hereinbefore in (4)(b)(i), (ii), (iii), (iv) or (v) with regard to Formula (IV), where q is chosen from the integer 0, 1, 2 or 3, (b) R$_{61}$ is chosen from C$_1$-C$_6$ alkyl or C$_1$-C$_6$ alkoxy, perfluoro alkyl and halogen;

(c) R$_{62}$ and R$_{63}$ are each independently chosen from,
  (i) hydrogen, hydroxy, amino, mono- or di-substituted amino, C$_1$-C$_{12}$ alkyl, C$_3$-C$_{12}$ alkylidene, C$_2$-C$_{12}$ alkylidyne, vinyl, C$_3$-C$_7$ cycloalkyl, C$_1$-C$_6$ alkoxyalkyl, allyl, benzyl, mono-substituted benzyl, chloro, fluoro or —C(O)W'', wherein W'' being the same group described hereinbefore in (11)(b); said amino substituents in (c)(i) being C$_1$-C$_6$ alkyl, phenyl, benzyl or naphthyl; each of said benzyl substituents being C$_1$-C$_6$ alkyl or C$_1$-C$_6$ alkoxy,
  (ii) an unsubstituted, mono- di- or tri-substituted group chosen from phenyl, naphthyl, phenanthryl, pyrenyl, quinolyl, isoquinolyl, benzofuranyl, thienyl, benzothienyl, dibenzofuranyl, dibenzothienyl, carbazolyl or indolyl; each of said group substituents in (c)(ii) being chosen independently for each occurrence from chloro, fluoro, C$_1$-C$_6$ alkyl or C$_1$-C$_6$ alkoxy,
  (iii) a monosubstituted phenyl, said phenyl having a substituent located at the para position being as described hereinbefore in (2)(d)(v),
  (iv) —OR$_{67}$, R$_{67}$ being chosen from C$_1$-C$_6$ alkyl, C$_1$-C$_6$ acyl, phenyl(C$_1$-C$_3$)alkyl, mono(C$_1$-C$_6$)alkyl substituted phenyl(C$_1$-C$_3$)alkyl, mono(C$_1$-C$_6$)alkoxy substituted phenyl(C$_1$-C$_3$)alkyl, C$_1$-C$_6$ alkoxy(C$_2$-C$_4$) alkyl, C$_3$-C$_7$ cycloalkyl, mono(C$_1$-C$_4$)alkyl substituted C$_3$-C$_7$ cycloalkyl, C$_1$-C$_6$ chloroalkyl, C$_1$-C$_6$ fluoroalkyl, allyl, triarylsilyl, triarylsilyloxy, tri(C$_1$-C$_6$)alkylsilyl, tri(C$_1$-C$_6$)alkylsilyloxy, tri(C$_1$-C$_6$)alkoxysilyl, tri(C$_1$-C$_6$)alkoxysilyloxy, di(C$_1$-C$_6$) alkyl(C$_1$-C$_6$ alkoxy)silyl, di(C$_1$-C$_6$)alkyl(C$_1$-C$_6$ alkoxy)silyloxy, di(C$_1$-C$_6$)alkoxy(C$_1$-C$_6$ alkyl)silyl, di(C$_1$-C$_6$)alkoxy(C$_1$-C$_6$ alkyl)silyloxy, benzoyl, mono-substituted benzoyl, naphthoyl or mono-substituted naphthoyl; each of said benzoyl and naphthoyl substituents being independently chosen from C$_1$-C$_6$ alkyl or C$_1$-C$_6$ alkoxy; or R$_{67}$ being —CH(R$_{68}$)Q'', wherein R$_{68}$ being chosen from hydrogen or C$_1$-C$_3$ alkyl and Q'' being chosen from —CN, —CF$_3$, or —COOR$_{68}$; or R$_{67}$ being —C(O)V''', wherein V''' being chosen from hydrogen, C$_1$-C$_6$ alkoxy, phenoxy, mono- or di-(C$_1$-C$_6$)alkyl substituted phenoxy, mono- or di-(C$_1$-C$_6$)alkoxy substituted phenoxy, an unsubstituted, mono- or di-substituted aryl group, phenyl or naphthyl, amino, mono (C$_1$-C$_6$)alkylamino, di(C$_1$-C$_6$)alkylamino, phenylamino, mono- or di-(C$_1$-C$_6$)alkyl substituted phenylamino, or mono- or di-(C$_1$-C$_6$)alkoxy substituted phenylamino; each of said aryl group substituents being independently chosen from C$_1$-C$_6$ alkyl or C$_1$-C$_6$ alkoxy,
  (v) —CH(Q''')$_2$, Q''' being chosen from —CN or —COOR$_{69}$ and R$_{69}$ being chosen from hydrogen, C$_1$-C$_6$ alkyl, phenyl(C$_1$-C$_3$)alkyl, mono(C$_1$-C$_6$)alkyl substituted phenyl(C$_1$-C$_3$)alkyl, mono(C$_1$-C$_6$)alkoxy substituted phenyl(C$_1$-C$_3$)alkyl or an unsubstituted, mono- or di-substituted aryl group, phenyl or naphthyl; each of said aryl group substituents being independently chosen from C$_1$-C$_6$ alkyl or C$_1$-C$_6$ alkoxy,
  (vi) —CH(R$_{70}$)G'', R$_{70}$ being chosen from hydrogen, C$_1$-C$_6$ alkyl or an unsubstituted, mono- or di-substituted aryl group, phenyl or naphthyl, and G'' being chosen from —COOR$_{69}$, —COR$_{71}$ or —CH$_2$OR$_{72}$, wherein R$_{71}$ being chosen from hydrogen, C$_1$-C$_6$ alkyl, an unsubstituted, mono- or di-substituted aryl group, phenyl or naphthyl, amino, mono(C$_1$-C$_6$) alkylamino, di(C$_1$-C$_6$)alkylamino, phenylamino, mono- or di-(C$_1$-C$_6$)alkyl substituted phenylamino, mono- or di-(C$_1$-C$_6$)alkoxy substituted phenylamino, diphenylamino, mono- or di(C$_1$-C$_6$)alkyl substituted diphenylamino, mono- or di-(C$_1$-C$_6$)alkoxy substituted diphenylamino, morpholino or piperidino; R$_{72}$ being chosen from hydrogen, —C(O)R$_{69}$, C$_1$-C$_6$ alkyl, C$_1$-C$_3$ alkoxy(C$_1$-C$_6$)alkyl, phenyl(C$_1$-C$_3$) alkyl, mono(C$_1$-C$_6$)alkoxy substituted phenyl(C$_1$-C$_3$)alkyl or an unsubstituted, mono- or di-substituted aryl group, phenyl or naphthyl, each of said aryl group substituents being independently chosen from C$_1$-C$_6$ alkyl or C$_1$-C$_6$ alkoxy,
  (vii) the group T being the same as described hereinbefore in (2)(d)(i), or (viii) $R_{62}$ and $R_{63}$ together form an oxo group or a substituted or unsubstituted spiro-carbocyclic ring containing 3 to 6 carbon atoms or a substituted or unsubstituted spiro-heterocyclic group containing 1 or 2 oxygen atoms and 3 to 6 carbon atoms including the spirocarbon atom, said spiro-carbocyclic ring and spiro-heterocyclic group being annellated with 0, 1 or 2 benzene rings, said substituents being hydrogen or $C_1$-$C_6$ alkyl, (d) $R_{64}$ is chosen from hydrogen, $C_1$-$C_6$ alkyl, aryl, perfluoroalkyl, halogen, or the group $R_a$ chosen from,
  (i) —$OR_{73}$, $R_{73}$ being chosen from phenyl($C_1$-$C_3$)alkyl, $C_1$-$C_6$ alkyl, mono($C_1$-$C_6$)alkyl substituted phenyl ($C_1$-$C_3$)alkyl, mono ($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$)alkyl substituted $C_3$-$C_7$ cycloalkyl, $C_1$-$C_6$ chloroalkyl, $C_1$-$C_6$ fluoroalkyl, allyl or —CH($R_{68}$)Q'' described in (c)(i), or
  (ii) an amino group as described hereinbefore in (4)(b)(i), (ii), (iii), (iv) or (v),
(e) $R_{65}$ is chosen from hydrogen, $C_1$-$C_6$ alkyl, aryl, perfluoroalkyl, halogen, or $R_a$, said $R_a$ being the same as described hereinbefore in (d),
(f) $R_{66}$ is chosen from hydrogen, $C_1$-$C_6$ alkyl or $R_a$, where $R_a$ is as described hereinbefore in (d), or
(g) $R_{65}$ and $R_{66}$ together form one of the following Formulas,

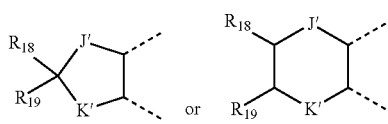

wherein J' and K' being independently chosen for each occurrence in each formula from oxygen or —N($R_{15}$)—, where $R_{15}$ is as described hereinbefore in (2)(b), $R_{18}$ and $R_{19}$ each being as described hereinbefore in (2)(d)(vi), and
(h) B and B' are each independently chosen from the groups described hereinbefore in (2)(d),
provided that for Formula (XIII) at least one of and less than all of $R_{61}$, $R_{61'}$, $R_{62}$, $R_{63}$, $R_{64}$, $R_{65}$, $R_{66}$, B, and B' is in each case independently said L-Group as defined below;

(14) a photochromic material chosen from at least one indenonaphthopyran represented by the following Formula (XIV),

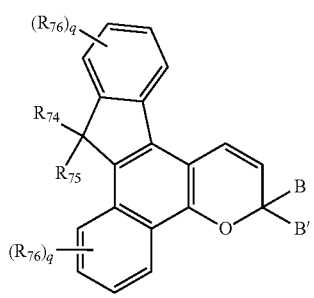

wherein for Formula (XIV),
(a) $R_{74}$ and $R_{75}$ are each independently as described hereinbefore with regard to $R_{62}$ and $R_{63}$ in (13)(c), (b) each $R_{76}$ is independently chosen for each occurrence from di($C_1$-$C_6$)alkylamino, dicyclohexylamino, diphenylamino, piperidyl, morpholinyl, pyridyl, a group T, described hereinbefore in (2)(d)(i) or group —C(O)W'' described hereinbefore in (11)(b) and q is the integer 0, 1, or 2; or when q is 2, and the $R_{76}$ substituents are adjacent, each pair of substituents independently forms a substituted or unsubstituted fused carbocyclic or heterocyclic ring chosen from benzo, pyridino, pyrazino, pyrimidino, furano, dihydrofurano, 1,3-dioxolo, 1,4-dioxolo, 1,3-dioxino, 1,4-dioxino, thiopheno, benzofuro, benzothieno, indolo, or indeno, the substituents of said fused carbocyclic or heterocyclic ring being chosen from halogen, $C_1$-$C_6$ alkyl, $C_1$-$C_6$ alkoxy, amino, mono- or di-substituted amino, said amino substituents being chosen from $C_1$-$C_6$ alkyl, phenyl, benzyl or naphthyl; said first $R_{76}$ ring being fused to the o, p or q side and said second $R_{76}$ ring being fused to the g, h, or i side of the indenonaphthopyran, and
(c) B and B' are each independently chosen from the groups described hereinbefore in (2)(d),
provided that for Formula (XIV) at least one of and less than all of $R_{74}$, $R_{75}$, $R_{76}$, B, and B' is in each case independently said L-Group as defined below;
wherein said L-Group is independently in each case a chiral or achiral lengthening group represented by the following Formula (XV), $$-(S_1)_c-(Q_1-(S_2)_d)_{d'}-(Q_2-(S_3)_e)_{e'}-(Q_3-(S_4)_f)_{f'}-S_5-P \quad (XV)$$

wherein,
(i) $Q_1$, $Q_2$, and $Q_3$ are each independently for each occurrence a divalent group chosen from, an unsubstituted or a substituted aromatic group, an unsubstituted or a substituted alicyclic group, and an unsubstituted or a substituted heterocyclic group, wherein each substituent is independently chosen from,
a group represented by P, liquid crystal mesogens, halogen, poly($C_1$-$C_{18}$ alkoxy), $C_1$-$C_{18}$ alkoxycarbonyl, $C_1$-$C_{18}$ alkylcarbonyl, $C_1$-$C_{18}$ alkoxycarbonyloxy, aryloxycarbonyloxy, perfluoro($C_1$-$C_{18}$)alkoxy, perfluoro ($C_1$-$C_{18}$)alkoxycarbonyl, perfluoro($C_1$-$C_{18}$)alkylcarbonyl, perfluoro($C_1$-$C_{18}$)alkylamino, di-(perfluoro($C_1$-$C_{18}$)alkyl)amino, perfluoro($C_1$-$C_{18}$)alkylthio, $C_1$-$C_{18}$ alkylthio, $C_1$-$C_{18}$ acetyl, $C_3$-$C_{10}$ cycloalkyl, $C_3$-$C_{10}$ cycloalkoxy, a straight-chain or branched $C_1$-$C_{18}$ alkyl group that is mono-substituted with cyano, halo, or $C_1$-$C_{18}$ alkoxy, or poly-substituted with halo, and a group comprising one of the following formulae: -M(T)$_{(t-1)}$ and -M(OT)$_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M,
(ii) c, d, e, and f are each independently an integer selected from 0 to 20, inclusive; and $S_1$, $S_2$, $S_3$, $S_4$, and $S_5$ are each independently for each occurrence a spacer unit chosen from:
(1) —(CH$_2$)$_g$—, —(CF$_2$)$_h$—, —Si(Z)$_2$(CH$_2$)$_g$—, —(Si (CH$_3$)$_2$O)$_h$—, wherein Z is independently chosen for each occurrence from hydrogen, $C_1$-$C_{18}$ alkyl, $C_3$-$C_{10}$ cycloalkyl and aryl; g is independently chosen for each occurrence from 1 to 20; h is a whole number from 1 to 16 inclusive;
(2) —N(Z)—, —C(Z)=C(Z)—, —C(Z)=N—, —C(Z')—C(Z')— or a single bond, wherein Z is independently chosen for each occurrence from hydrogen, $C_1$-$C_{18}$ alkyl, $C_3$-$C_{10}$ cycloalkyl and aryl, and Z' is independently chosen for each occurrence from $C_1$-$C_{18}$ alkyl, $C_3$-$C_{10}$ cycloalkyl and aryl; and (3) —O—, —C(O)—, —C≡C—, —N═N—, —S—, —S(O)—, —S(O)(O)—, —(O)S(O)—, —(O)S(O)O—, —O(O)S(O)O—, or straight-chain or branched $C_1$-$C_{24}$ alkylene residue, said $C_1$-$C_{24}$ alkylene residue being unsubstituted, mono-substituted by cyano or halo, or poly-substituted by halo, provided that when two spacer units comprising heteroatoms are linked together the spacer units are linked so that heteroatoms are not directly linked to each other, and provided that when $S_1$ is linked to said photochromic material and $S_5$ is linked to P, $S_1$ and $S_5$ are each linked so that two heteroatoms are not directly linked to each other;

(iii) P is chosen from: hydroxy, amino, $C_2$-$C_{18}$ alkenyl, $C_2$-$C_{18}$ alkynyl, azido, silyl, siloxy, silylhydride, (tetrahydro-2H-pyran-2-yl)oxy, thio, isocyanato, thioisocyanato, acryloyloxy, methacryloyloxy, 2-(acryloyloxy)ethylcarbamyl, 2-(methacryloyloxy) ethylcarbamyl, aziridinyl, allyloxycarbonyloxy, epoxy, carboxylic acid, carboxylic ester, acryloylamino, methacryloylamino, aminocarbonyl, $C_1$-$C_{18}$ alkyl aminocarbonyl, aminocarbonyl($C_1$-$C_{18}$)alkyl, $C_1$-$C_{18}$ alkyloxycarbonyloxy, halocarbonyl, hydrogen, aryl, hydroxy($C_1$-$C_{18}$)alkyl, $C_1$-$C_{18}$ alkyl, $C_1$-$C_{18}$ alkoxy, amino($C_1$-$C_{18}$)alkyl, $C_1$-$C_{18}$ alkylamino, di-($C_1$-$C_{18}$)alkylamino, $C_1$-$C_{18}$ alkyl($C_1$-$C_{18}$)alkoxy, $C_1$-$C_{18}$ alkoxy($C_1$-$C_{18}$)alkoxy, nitro, poly($C_1$-$C_{18}$)alkyl ether, ($C_1$-$C_{18}$)alkyl($C_1$-$C_{18}$) alkoxy($C_1$-$C_{18}$)alkyl, polyethyleneoxy, polypropyleneoxy, ethylenyl, acryloyl, acryloyloxy($C_1$-$C_{18}$) alkyl, methacryloyl, methacryloyloxy($C_1$-$C_{18}$)alkyl, 2-chloroacryloyl, 2-phenylacryloyl, acryloyloxyphenyl, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, or substituted or unsubstituted chiral or non-chiral monovalent or divalent groups chosen from steroid radicals, terpenoid radicals, alkaloid radicals and mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$ alkyl($C_1$-$C_{18}$)alkoxy, fluoro($C_1$-$C_{18}$)alkyl, cyano, cyano($C_1$-$C_{18}$)alkyl, cyano($C_1$-$C_{18}$)alkoxy or mixtures thereof, or P is a structure having from 2 to 4 reactive groups, or P is an unsubstituted or substituted ring opening metathesis polymerization precursor, or P is a substituted or unsubstituted photochromic compound; and (iv) d', e' and f' are each independently chosen from 0, 1, 2, 3, and 4, provided that a sum of d'+e'+f' is at least 2, provided that independently for each photochromic material represented by Formulas (II), (III), (IV), (VA), (VB), (VI), (VII), (VIII), (IXA) through (IXH), (XA), (XB), (XIA), (XIB), (XIIA), (XIIB), (XIII), and (XIV), when at least one of B and B' is in each case independently said L-Group, each L-Group, that at least one of B and B' is, is independently selected from,

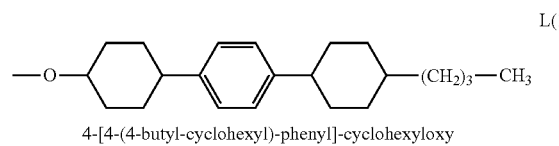

L(1)

4-[4-(4-butyl-cyclohexyl)-phenyl]-cyclohexyloxy

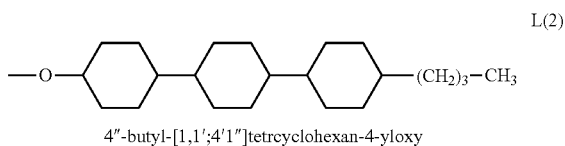

L(2)

4''-butyl-[1,1';4'1'']tetrcyclohexan-4-yloxy

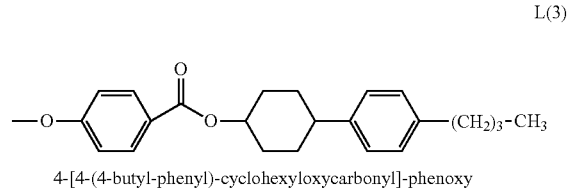

L(3)

4-[4-(4-butyl-phenyl)-cyclohexyloxycarbonyl]-phenoxy

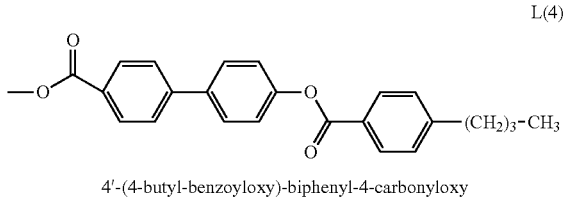

L(4)

4'-(4-butyl-benzoyloxy)-biphenyl-4-carbonyloxy

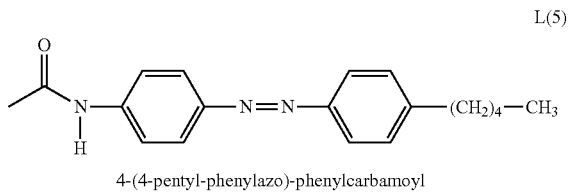

L(5)

4-(4-pentyl-phenylazo)-phenylcarbamoyl

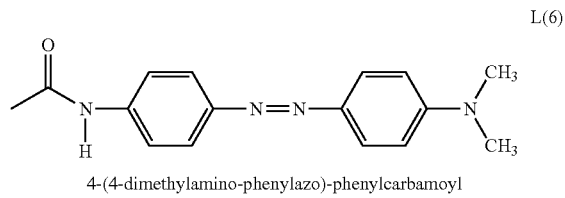

L(6)

4-(4-dimethylamino-phenylazo)-phenylcarbamoyl

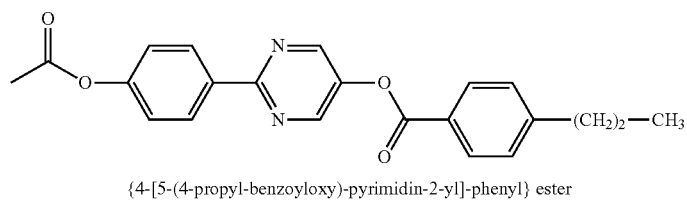

L(7)

{4-[5-(4-propyl-benzoyloxy)-pyrimidin-2-yl]-phenyl} ester

-continued

L(8)

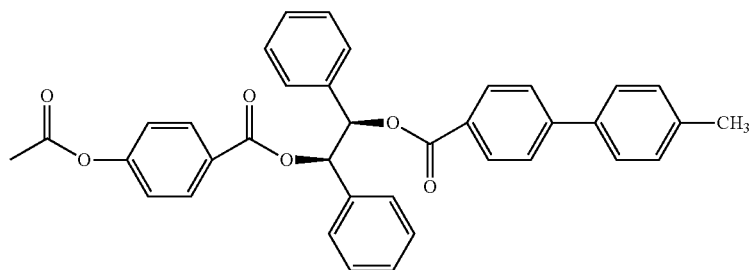

{4-[2-(4'-methyl-biphenyl-4-carbonyloxy)-1,2-diphenyl-ethoxycarbonyl]-phenyl} ester

L(9)

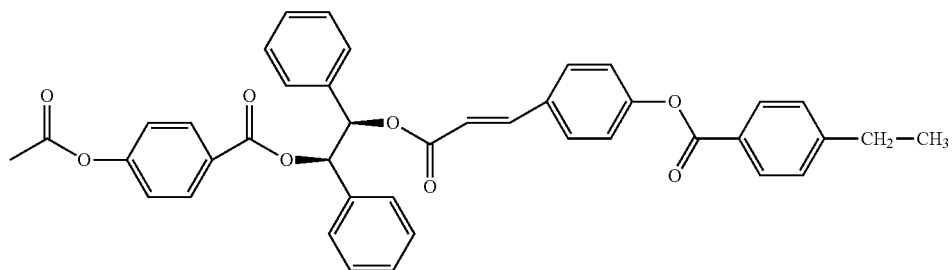

[4-(1,2-diphenyl-2-{3-[4-(4-propyl-benzoyloxy)-phenyl]-acryloyloxy}-ethoxycarbonyl)-phenyl] ester

L(10)

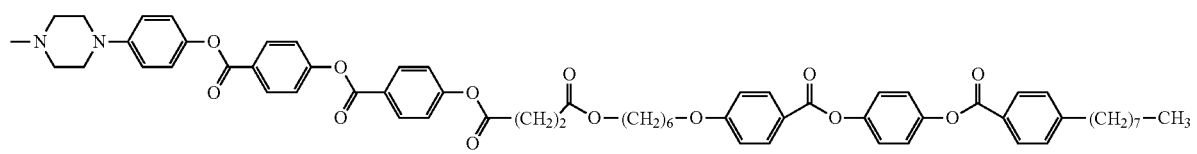

4-[4-(4-{4-[3-(6-{4-[4-(4-nonyl-benzoyloxy)-phenoxycarbonyl]-phenoxy}-hexyloxycarbonyl)-propionyloxy]-
benzoyloxy}-benzoyloxy)-phenyl]-piperazin-1-yl

L(11)

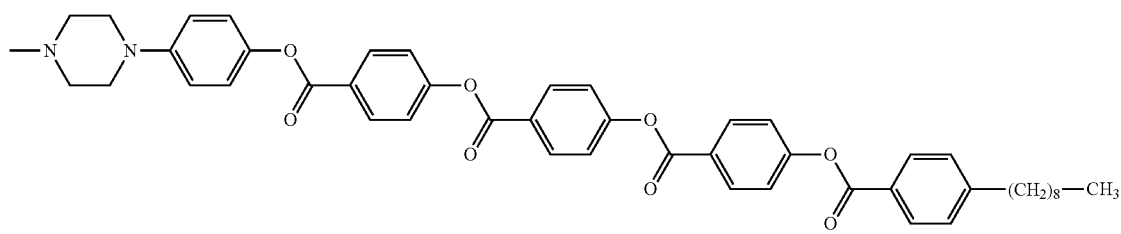

{4-[4-(4-{4-[4-(4-nonyl-benzoyloxy)-benzoyloxy]-benzoyloxy}-benzoyloxy)-phenyl]-piperazin-1-yl}

L(12)

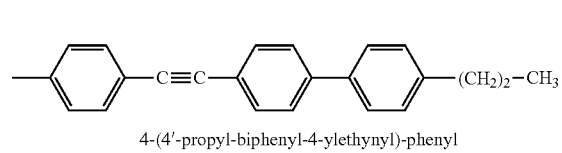

4-(4'-propyl-biphenyl-4-ylethynyl)-phenyl

L(13)

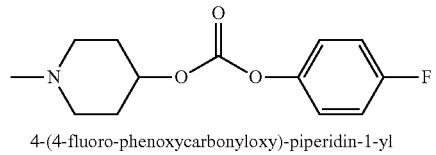

4-(4-fluoro-phenoxycarbonyloxy)-piperidin-1-yl

L(14)

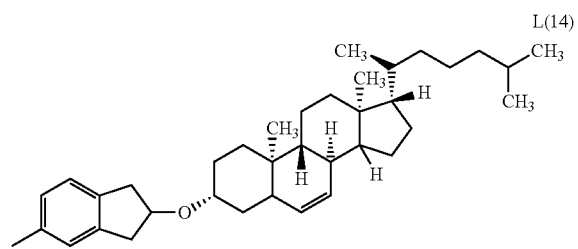

2-[17-(1,5-dimethyl-hexyl)-10,13-dimethyl-2,3,4,7,8,9,10,11,12,13,14,
15,16,17-tetradecahydro-1H-cyclopenta[a]phenanthren-3-yloxy]-indan-5-yl

L(15)

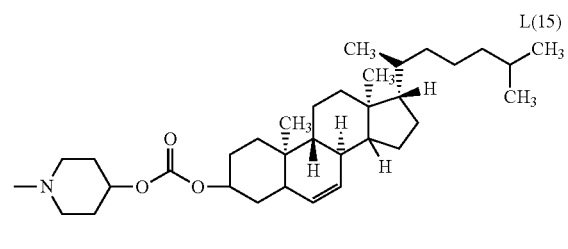

4-[17-(1,5-dimethyl-hexyl)-10,13-dimethyl-2,3,4,7,8,9,10,11,12,
13,14,15,16,17-tetradecahydro-1H-cyclopenta[a]phenanthren-
3-yloxycarbonyloxy]-piperidin-1-yl -continued L(16)
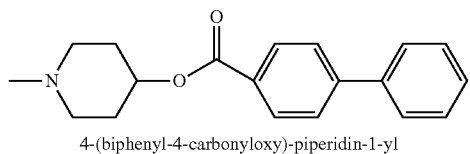
4-(biphenyl-4-carbonyloxy)-piperidin-1-yl L(17)
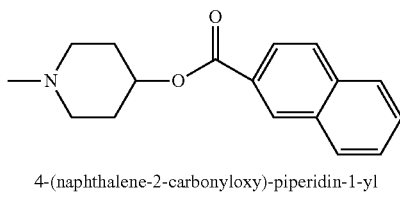
4-(naphthalene-2-carbonyloxy)-piperidin-1-yl L(18)
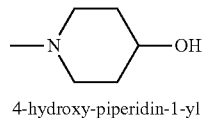
4-hydroxy-piperidin-1-yl L(19)
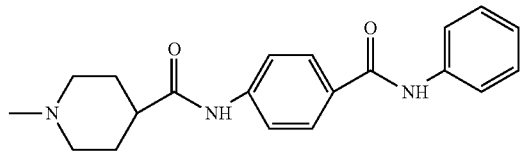

L(20)
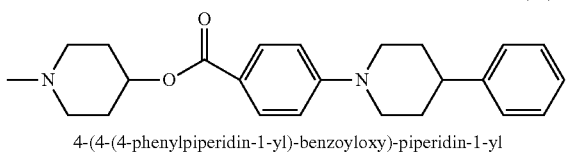
4-(4-(4-phenylpiperidin-1-yl)-benzoyloxy)-piperidin-1-yl

L(21)
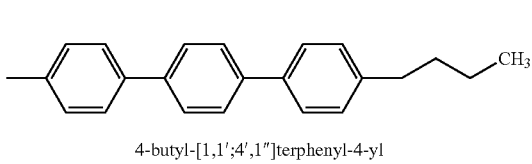
4-butyl-[1,1';4',1'']terphenyl-4-yl

L(22)
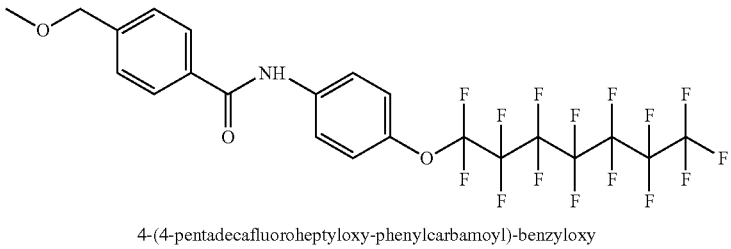
4-(4-pentadecafluoroheptyloxy-phenylcarbamoyl)-benzyloxy

L(23)
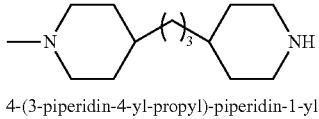
4-(3-piperidin-4-yl-propyl)-piperidin-1-yl

L(24)
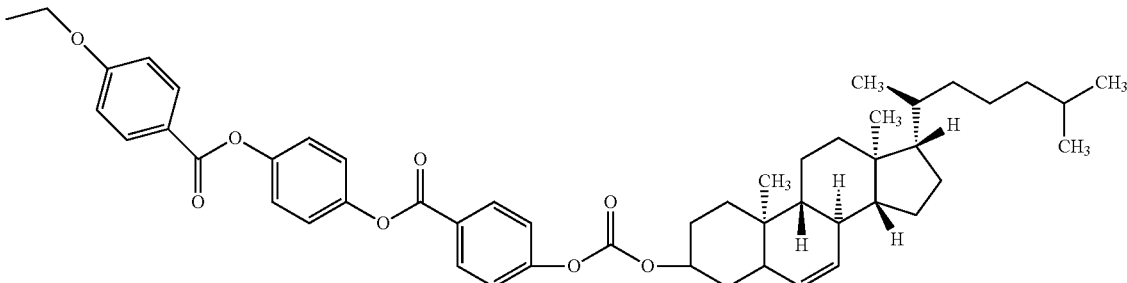
4-(4-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-benzoyloxy}-phenoxycarbonyl)-phenoxymethyl L(25)
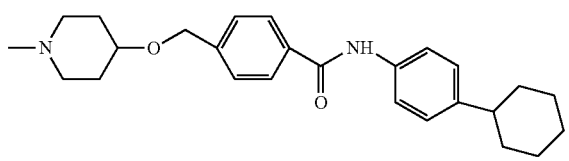
4-[4-(4-cyclohexyl-phenylcarbamoyl)-benzyloxy]-piperidin-1-yl L(26)
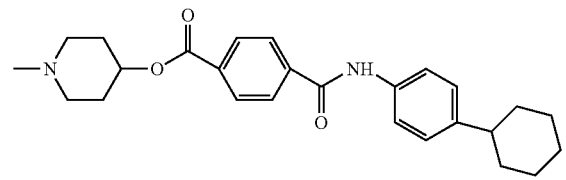
4-[4-(4-cyclohexyl-phenylcarbamoyl)-benzyloxy]-piperidin-1-yl -continued

L(27)

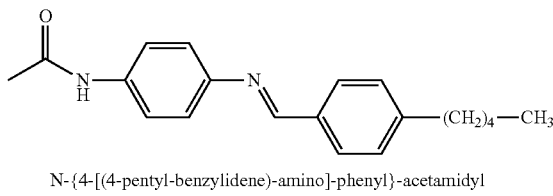

N-{4-[(4-pentyl-benzylidene)-amino]-phenyl}-acetamidyl

L(28)

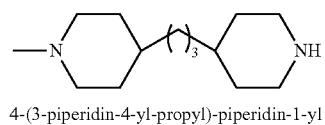

4-(3-piperidin-4-yl-propyl)-piperidin-1-yl

L(29)

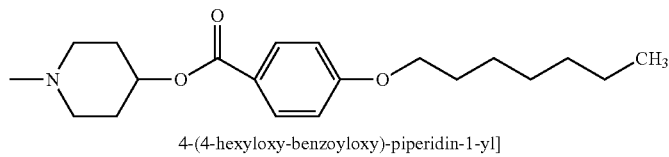

4-(4-hexyloxy-benzoyloxy)-piperidin-1-yl]

L(30)

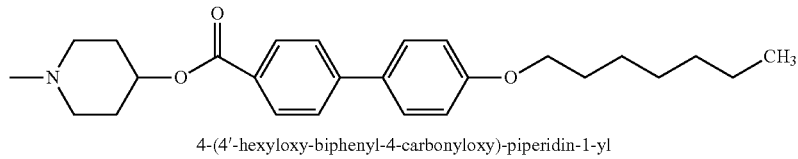

4-(4'-hexyloxy-biphenyl-4-carbonyloxy)-piperidin-1-yl

L(31)

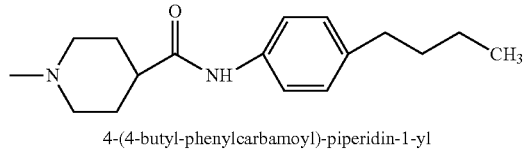

4-(4-butyl-phenylcarbamoyl)-piperidin-1-yl

L(32a)

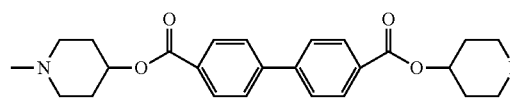

1-methyl-4-((4'-(((1-methylpiperidin-4-yl)oxy)carbonyl)-[1,1'-biphenyl]-4-carbonyl)oxy)piperidin-1-yl L(32b)

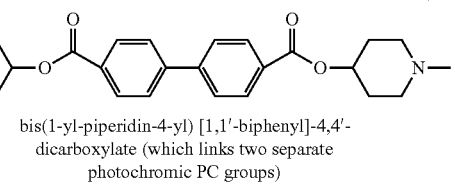

bis(1-yl-piperidin-4-yl) [1,1'-biphenyl]-4,4'-dicarboxylate (which links two separate photochromic PC groups)

L(33)

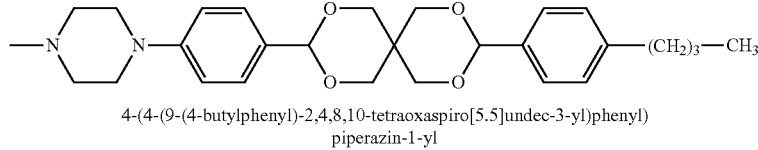

4-(4-(9-(4-butylphenyl)-2,4,8,10-tetraoxaspiro[5.5]undec-3-yl)phenyl)piperazin-1-yl

L(34)

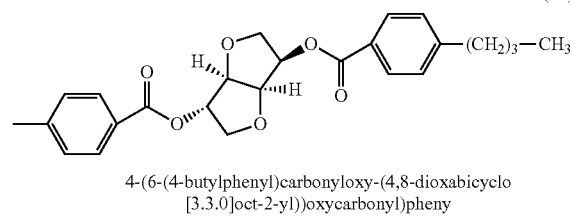

4-(6-(4-butylphenyl)carbonyloxy-(4,8-dioxabicyclo[3.3.0]oct-2-yl))oxycarbonyl)pheny

L(35)

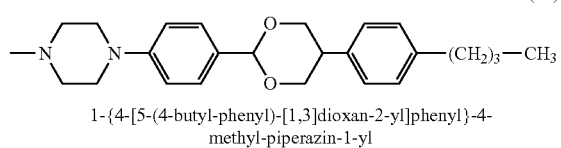

1-{4-[5-(4-butyl-phenyl)-[1,3]dioxan-2-yl]phenyl}-4-methyl-piperazin-1-yl

L(36)

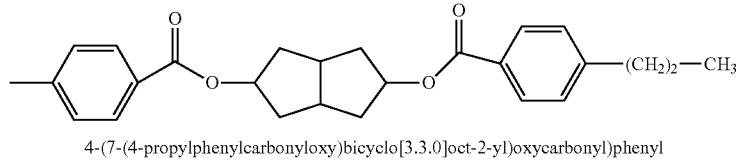

4-(7-(4-propylphenylcarbonyloxy)bicyclo[3.3.0]oct-2-yl)oxycarbonyl)phenyl

-continued
L(37)
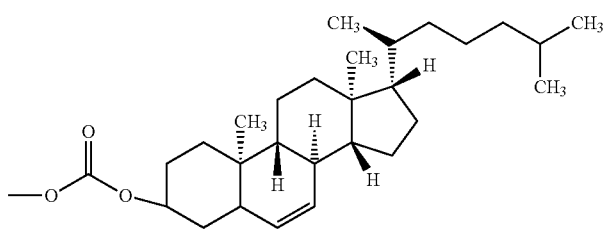
4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy
L(a)
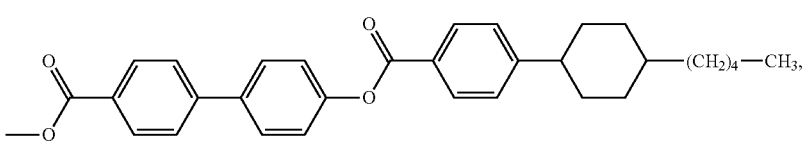
L(b)
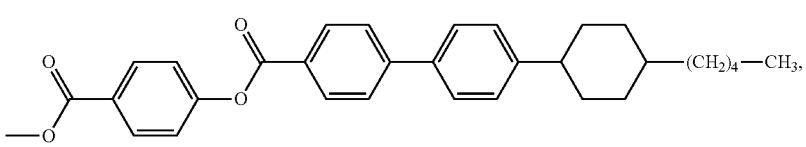
L(c)     L(d)
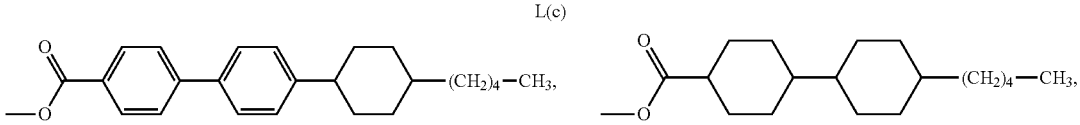
L(e)
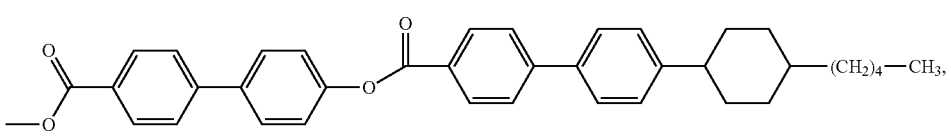
L(f)
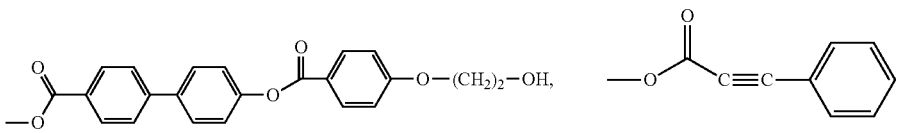
L(g)
L(h)
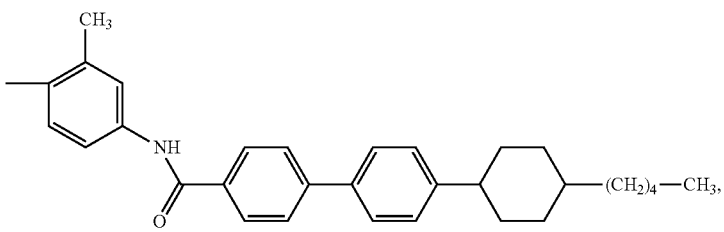
L(i)     L(j)
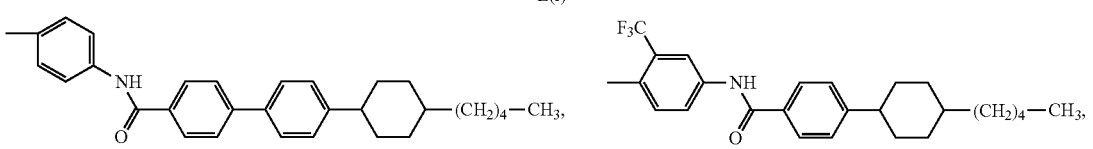
L(k)
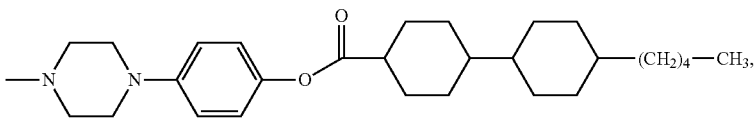

-continued
L(l)
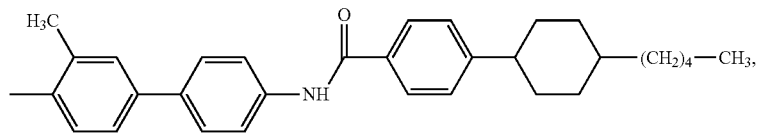
L(m)
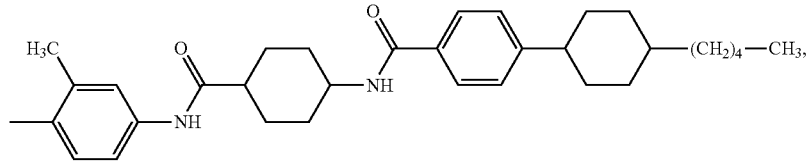
L(n)
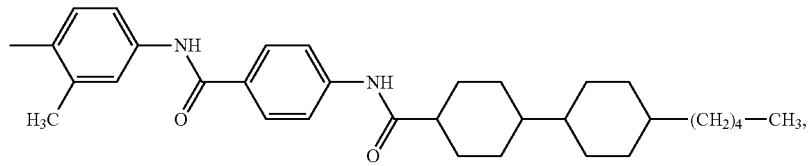
L(o)
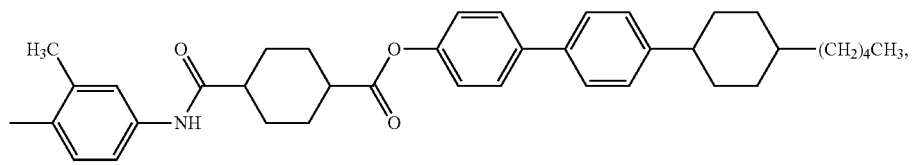
L(p)
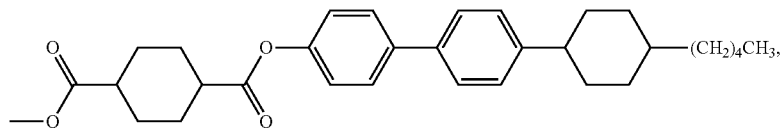
L(q)
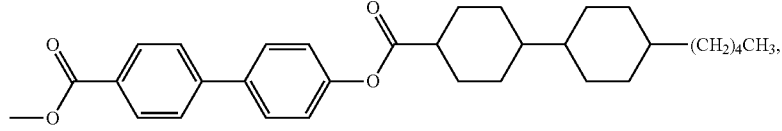
L(r)
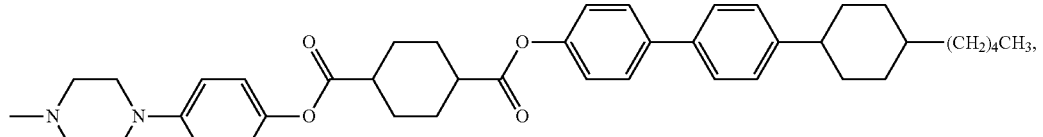
L(s)
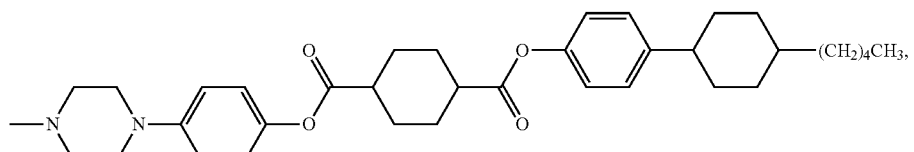
L(t)
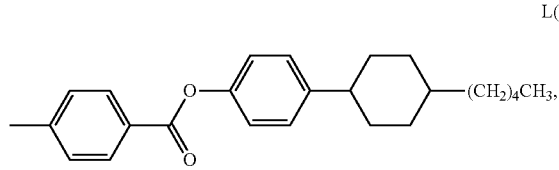
L(u)
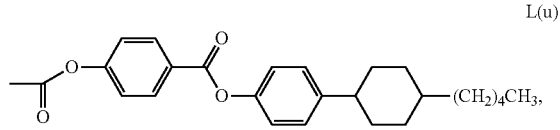
L(v)
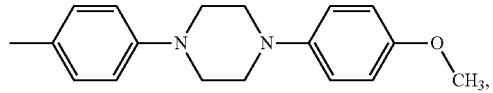

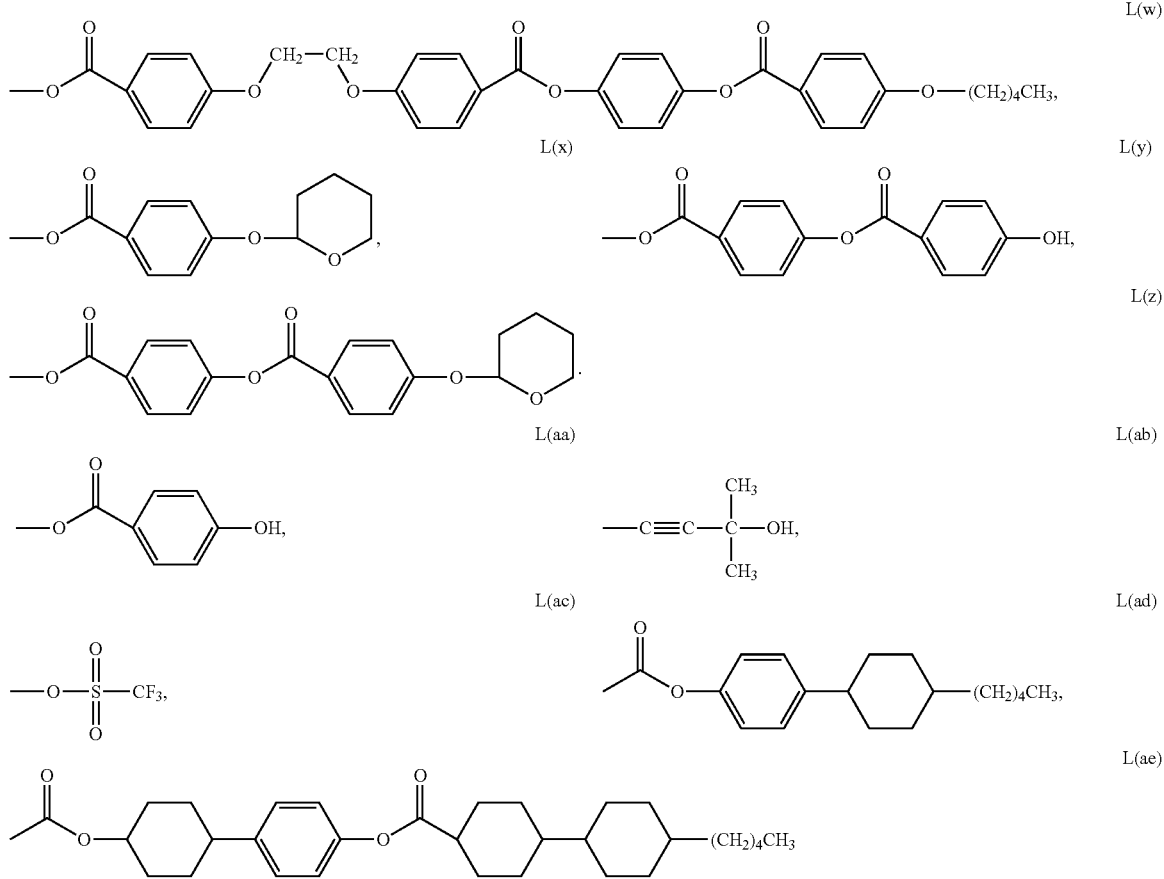

L-DC-(a) (4-trans-(4-pentylcyclohexyl)benzamido)phenyl,
L-DC-(b) (4-(4-trans-(4-pentylcyclohexyl)phenoxy)carbonyl) phenyl,
L-DC-(c) 4-(4-(4-trans-(4-pentylcyclohexyl)phenyl)benzamido) phenyl,
L-DC-(d) 4-((trans-(4'-pentyl-[1,1'-bi(cyclohexan)]-4-yl) oxy)carbonyl)phenyl,
L-DC-(e) 4-(4'-(4-pentylcyclohexyl)-[1,1'-biphenyl]-4-ylcarboxamido)phenyl,
L-DC-(f) 4-((4'-(4-pentylcyclohexyl)-[1,1'-biphenyl]-4-carbonyl)oxy)benzamido,
L-DC-(g) 4-(4'-(4-pentylcyclohexyl)-[1,1'-biphenyl]-4-carbonyl)piperazin-1-yl,
L-DC-(h) 4-(4-(4-trans-(4-pentylcyclohexyl) phenyl)benzamido)-2-(trifluoromethyl)phenyl,
L-DC-(i) 2-methyl-4-trans-(4-((4'-trans-(4-pentylcyclohexyl)biphenyl-4-yloxy)carbonyl)cyclohexanecarboxamido)phenyl,
L-DC-(j) 4'-(4'-pentylbi(cyclohexane-4-)carbonyloxy)biphenylcarbonyloxy,
L-DC-(k) 4-(((3S,8S,9S,10R,13R,14S,17R)-10,13-dimethyl-17-((R)-6-methylheptan-2-yl)-2,3,4,7,8,9,10,11,12,13,14,15,16,17-tetradecahydro-1H-cyclopenta[a]phenanthren-3-yloxy)carbonyl)piperazin-1-yl, and
L-DC-(l) 4-((S)-2-methylbutoxy)phenyl)-10-(4-(((3R,3aS,6S,6aS)-6-(4'-trans-(4-pentylcyclohexyl)biphenyl-carbonyloxy)hexahydrofuro[3,2-d]furan-3-yloxy)carbonyl)phenyl.

2. The photochromic article of claim 1 wherein the photochromic article is adapted to retain at least 20 percent of the delta OD measured in the Outdoor Test when tested in the Behind the Windshield Test.

3. The photochromic article of claim 1 wherein the photochromic article is adapted to retain at least 25 percent of the delta OD measured in the Outdoor Test when tested in the Behind the Windshield Test.

4. The photochromic article of claim 1 wherein,
(1) for said photochromic material chosen from at least one fluoranthenoxazine represented by Formula (I),
  (a) $R_1$ is chosen from $C_1$-$C_8$ alkyl, phen($C_1$-$C_4$)alkyl, acryloyloxy($C_2$-$C_6$)alkyl, methacryloyloxy($C_2$-$C_6$) alkyl, carboxy($C_2$-$C_6$)alkyl, tri($C_1$-$C_6$)alkylsilyl, tri ($C_1$-$C_6$)alkylsilyloxy, tri($C_1$-$C_6$)alkoxysilyl, tri($C_1$-$C_6$)alkoxysilyloxy, di($C_1$-$C_6$)alkyl($C_1$-$C_6$ alkoxy) silyl, di($C_1$-$C_6$)alkyl($C_1$-$C_6$ alkoxy)silyloxy, di($C_1$-$C_6$)alkoxy($C_1$-$C_6$ alkyl)silyl or di($C_1$-$C_6$)alkoxy($C_1$-$C_6$ alkyl)silyloxy,
  (b) $R_2$ is chosen from $C_1$-$C_5$ alkyl, $C_1$-$C_5$ alkoxy, $C_1$-$C_8$ alkoxycarbonyl, $C_1$-$C_4$ acyloxy, halo, $C_1$-$C_4$ monohaloalkyl or $C_1$-$C_4$ polyhaloalkyl; said halo substituents being chloro or fluoro, and q is 0, 1 or 2,
  (c) $R_3$ and $R_4$ are each independently chosen from $C_1$-$C_5$ alkyl, phenyl; or $R_3$ and $R_4$ taken together form a group chosen from a cyclic ring of from 5 to 8 carbon atoms which includes the spiro carbon atom,
  (d) $R_5$ is chosen from —$CH_2$Q and —C(O)W, wherein Q is halogen, hydroxy, $C_1$-$C_6$ alkoxy, tri($C_1$-$C_6$)

alkylsilyl, tri($C_1$-$C_6$)alkylsilyloxy, tri($C_1$-$C_6$)alkoxysilyl, tri($C_1$-$C_6$)alkoxysilyloxy, di($C_1$-$C_6$)alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ alkyl)silyl, di($C_1$-$C_6$)alkoxy($C_1$-$C_6$ alkyl)silyloxy, or the group, —OCH($R_8$)Z; W is the group, —OCH($R_8$)Z, morpholino or piperidino; Z is —COO$R_8$, $R_8$ is $C_1$-$C_6$ alkyl; or W is —O$R_9$ or —N($R_{10}$)$R_{11}$, wherein $R_9$ is chosen from $C_1$-$C_6$ alkyl or phenyl; and $R_{10}$ and $R_{11}$ are each independently chosen from hydrogen, $C_1$-$C_6$ alkyl, or $R_{10}$ and $R_{11}$ together with the nitrogen atom form a heterocyclic ring chosen from morpholino or piperidino; and each of said halogen or halo groups in this part (d) being fluoro or chloro, and (e) each $R_6$ and $R_7$ is independently chosen for each occurrence from aryl, mono($C_1$-$C_6$)alkoxyaryl, di($C_1$-$C_6$)alkylamino, piperidino, morpholino, $C_1$-$C_6$ alkoxy, or fluoro; and q is independently chosen for each occurrence form the integer 0, 1, or 2, provided that for Formula (I) one or two of $R_1$, $R_2$, $R_3$, $R_4$, $R_5$, $R_6$, and $R_7$ is in each case independently said L-Group;

(2) for said photochromic material chosen from at least one naphthopyran represented by Formula II,
(a) $R_{12}$ is hydrogen,
(b) $R_{13}$ is hydrogen or the group, —C(O)J, J being —O$R_{15}$ or —N($R_{10}$)$R_{11}$, wherein $R_{15}$ is $C_1$-$C_6$ alkyl, phenyl($C_1$-$C_3$)alkyl, or $C_1$-$C_6$ alkoxy($C_2$-$C_4$)alkyl, $R_{10}$ and $R_{11}$ are the same as described hereinbefore in (1)(d),
(c) $R_{14}$ is hydrogen, $C_1$-$C_6$ alkyl, phenyl($C_1$-$C_3$)alkyl, $C_1$-$C_6$ alkoxy($C_2$-$C_4$)alkyl, $C_5$-$C_7$ cycloalkyl, or the group, —C(O)V; wherein V is $C_1$-$C_6$ alkyl, $C_1$-$C_6$ alkoxy or $C_1$-$C_6$ alkylamino, and
(d) B and B' are each independently chosen from,
 (i) an unsubstituted, mono-, di-, or tri-substituted phenyl group;
 (ii) a mono-substituted heteroaromatic group chosen from benzofuran-2-yl, benzothien-3-yl, dibenzofuranyl, or carbazoyl; each of said phenyl and heteroaromatic substituents in (i) and (ii) being independently chosen from —C(O)U, wherein U being $C_1$-$C_6$ alkyl, $C_1$-$C_6$ alkoxy, mono-($C_1$-$C_6$)alkylamino, di-($C_1$-$C_6$)alkylamino, morpholino, or piperidino; or amino, mono($C_1$-$C_6$)alkylamino, di($C_1$-$C_6$)alkylamino, piperidino, morpholino or fluoro,
 (iii) an unsubstituted or mono-substituted phenothiazinyl, said substituents being $C_1$-$C_6$ alkyl or $C_1$-$C_6$ alkoxy;
 (iv) a monosubstituted phenyl, said phenyl having a substituent located at the para position being —O—(CH$_2$)$_r$—, wherein r being chosen from the integer 3 or 6, said substituent being connected to an aryl group which is a member of another photochromic material;
 (v) said group represented by one of the following Formulas,

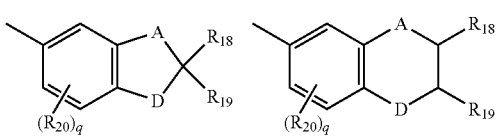

wherein A is independently chosen in each formula from methylene or oxygen and D is independently chosen in each formula from oxygen or substituted nitrogen, provided that when D is substituted nitrogen, A is methylene; said nitrogen substituents being $C_1$-$C_6$ alkyl; each $R_{20}$ being independently chosen for each occurrence in each formula from $C_1$-$C_6$ alkyl or $C_1$-$C_6$ alkoxy; $R_{18}$ and $R_{19}$ each being independently chosen in each formula from hydrogen or $C_1$-$C_6$ alkyl; and q being chosen from the integer 0, 1 or 2, (vi) $C_1$-$C_6$ alkyl, $C_3$-$C_6$ cycloalkyl, or $C_4$-$C_{12}$ bicycloalkyl,
 (vii) said group represented by the following Formula,

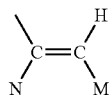

wherein N is hydrogen and M is an unsubstituted, mono-, or di-substituted phenyl; each of said group substituents being independently chosen from $C_1$-$C_4$ alkoxy or fluoro, or
 (viii) B and B' taken together form fluoren-9-ylidene, mono-, or di-substituted fluoren-9-ylidene or a saturated $C_7$-$C_{12}$ spiro-bicyclic hydrocarbon rings; each of said fluoren-9-ylidene substituents being fluoro, provided that for Formula (II) one or two of $R_{12}$, $R_{13}$, $R_{14}$, B, and B' is in each case independently said L-Group as defined below;

(3) for said photochromic material chosen from at least one naphthopyran represented by Formula (III),
(a) $R_{21}$ is the group, =C(O)W or CH$_2$Q, described hereinbefore in (1)(d),
(b) $R_{22}$ and each $R_{23}$ are independently chosen for each occurrence from hydroxy, NH$_2$ or N(R)H; wherein R is $C_1$-$C_3$ alkyl or phenyl and n is chosen from the integers 0, 1 or 2, and
(c) B and B' are each independently chosen from the groups described hereinbefore in (2)(d), provided that for Formula (III) one or two of $R_{21}$, $R_{22}$, $R_{23}$, B, and B' is in each case independently said L-Group as defined below;

(4) for said photochromic material chosen from at least one naphthopyran represented by Formula (IV),
(a) $R_5$ is independently chosen from the groups described hereinbefore in (1)(d),
(b) $R_{24}$ and $R_{25}$ are each chosen from hydrogen or an amino group defined hereinafter, provided that $R_{24}$ and $R_{25}$ are not both hydrogen; said amino group being,
 (i) —N($R_{16}$)$R_{17}$, $R_{16}$ and $R_{17}$ each being independently chosen from $C_1$-$C_8$ alkyl, aryl, or $C_3$-$C_{20}$ cycloalkyl; and said aryl group being phenyl or naphthyl,
 (ii) a nitrogen containing ring represented by the following formula:

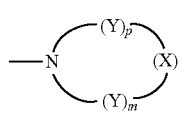

wherein each Y is independently chosen for each occurrence from —CH$_2$—, X is —Y—, —O—, —S—, or —N(R$_{26}$)—; R$_{26}$ being C$_1$-C$_6$ alkyl; said aryl group being phenyl or naphthyl, m is chosen from the integer 1, 2 or 3, and p is chosen from the integer 0, 1, 2 or 3; provided that when p is 0, X is Y, or (iii) said group represented by one of the following Formulas,

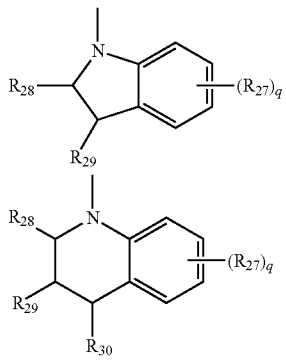

wherein each R$_{28}$, R$_{29}$ and R$_{30}$ are chosen independently for each occurrence in each formula from hydrogen; R$_{27}$ is chosen independently for each occurrence from C$_1$-C$_6$ alkyl, and q is chosen from the integer 0, 1 or 2, (c) B and B' are each independently chosen from the groups described hereinbefore in (2)(d), provided that for Formula (IV) one or two of R$_5$, R$_{24}$, and R$_{25}$, B, and B' is in each case independently said L-Group as defined below;

(5) for said photochromic material chosen from at least one phenanthropyan represented by one of Formula (VA) or Formula (VB), (a) R$_{31}$ is R$_5$ described hereinbefore in (1)(d), (b) R$_{32}$ is hydrogen or C$_1$-C$_6$ alkyl, (c) each R$_{33}$ is independently chosen for each occurrence from —N(R$_{10}$)R$_{11}$, which was described hereinbefore in (1)(d), C$_1$-C$_6$ alkyl, or —OR$_{34}$, wherein R$_{34}$ is C$_1$-C$_6$ alkyl, and q is the integer 0, 1, or 2, and (d) B and B' are each independently chosen from the groups described hereinbefore in (2)(d), provided that for Formula (VA) and Formula (VB) one or two of R$_{31}$, R$_{32}$, R$_{33}$, B, and B' is in each case independently said L-Group as defined below;

(6) for said photochromic material chosen from at least one fluoranthenopyran represented by Formula (VI), (a) R$_{35}$ and R$_{36}$ are each independently chosen for each occurrence from C$_1$-C$_6$ alkyl, C$_1$-C$_6$ alkoxy, fluoro, amino, mono(C$_1$-C$_6$)alkylamino, di(C$_1$-C$_6$)alkylamino, phenylamino, mono- or di-(C$_1$-C$_6$)alkyl substituted phenylamino or mono- or di-(C$_1$-C$_6$)alkoxy substituted phenylamino, and q is the integer 0, 1 or 2, (b) R$_5$ is chosen from the group described hereinbefore in (1)(d), and (c) B and B' are each independently chosen from the groups described hereinbefore in (2)(d), provided that for Formula (VI) one or two of R$_5$, R$_{35}$, R$_{36}$, B, and B' is in each case independently said L-Group as defined below;

(7) for said photochromic material chosen from at least one naphthopyran represented by Formula (VII), (a) R$_{37}$ and R$_{38}$ together form an oxo group or R$_{37}$ and R$_{38}$ each are independently chosen for each occurrence from hydrogen, C$_1$-C$_6$ alkyl, C$_3$-C$_7$ cycloalkyl, phenyl or methacryloxy(C$_1$-C$_6$)alkyl, (b) R$_{39}$ is chosen from C$_1$-C$_6$ alkyl, C$_1$-C$_6$ alkoxy, fluoro, or morpholino, and q is the integer 0, 1 or 2, (c) I is oxygen or —N(R$_{40}$)—, wherein R$_{40}$ is C$_1$-C$_6$ alkyl, C$_3$-C$_7$ cycloalkyl or phenyl, (d) K is oxygen, —N(R$_{40}$)— or —C(R$_{41}$)(R$_{42}$)—, wherein R$_{41}$ and R$_{42}$ are each hydrogen or C$_1$-C$_6$ alkyl, and (e) B and B' are each independently chosen from the groups described hereinbefore in (2)(d), provided that for Formula (VII) one or two of R$_{37}$, R$_{38}$, R$_{39}$, B, and B' is in each case independently said L-Group as defined below;

(8) for said photochromic material chosen from at least one naphthopyran represented by Formula (VIII), (a) R$_{43}$ and R$_{44}$ together form an oxo group or R$_{43}$ and R$_{44}$ are both hydrogen, C$_1$-C$_6$ alkyl, C$_3$-C$_7$ cycloalkyl or phenyl, (b) R$_{45}$ is hydrogen or C$_1$-C$_6$ alkyl, (c) R$_{46}$ is hydrogen or C$_1$-C$_6$ alkyl, C$_3$-C$_7$ cycloalkyl, (d) each R$_{47}$ is C$_1$-C$_6$ alkyl, C$_1$-C$_6$ alkoxy or fluoro, and q is the integer 0, 1 or 2, and (e) B and B' are each independently chosen from the groups described hereinbefore in (2)(d), provided that for Formula (VIII) one or two of R$_{43}$, R$_{45}$, R$_{46}$, R$_{47}$, B, and B' is in each case independently said L-Group as defined below;

(9) for said photochromic material chosen from at least one naphthopyran represented by Formulas (IXA), (IXB), (IXC), (IXD), (IXE), (IXF), (IXG) and (IXH), (a) R$_{43}$ and R$_{44}$ are the same groups described hereinbefore in (8)(a), (b) R$_{47}$ in each case is independently chosen from groups described hereinbefore in (8)(d), and q is in each case independently as described hereinbefore in (8)(d), and (c) B and B' are each independently chosen from the groups described hereinbefore in (2)(d), provided that independently for each of Formulas (IXA), (IXB) (IXC), (IXD), (IXE), (IXF), (IXG) and (IXH), one or two of R$_{43}$, R$_{44}$, R$_{47}$, B, and B' is in each case independently said L-Group as defined below;

(10) for said photochromic material chosen from at least one naphthopyran represented by Formula (XA) and Formula (XB), (a) Ring A' is chosen from, (i) an unsubstituted, mono- or di-substituted heterocyclic ring, or (ii) an unsubstituted, mono- or di-substituted indeno group, each of said heterocyclic ring and indeno group substituents being C$_1$-C$_4$ alkyl, C$_1$-C$_3$ alkoxy, —N(R$_{10}$)R$_{11}$, which was described hereinbefore in (1)(d), benzo, mono- or di-substituted benzo fused to the indeno moiety, said benzo substituents being C$_1$-C$_3$ alkyl, C$_1$-C$_3$ alkoxy or —N(R$_{10}$)R$_{11}$, (b) R$_{48}$ is chosen from:

(i) —C(O)W', W' being —OR$_9$ or —N(R$_{10}$)R$_{11}$, which groups are described hereinbefore in (1)(d), or (ii) —C($R_{51}$)$_2$X', wherein X' is —CN, halogen, hydroxy, benzoyloxy, $C_1$-$C_4$ alkoxy, $C_2$-$C_4$ acyloxy, amino, $C_1$-$C_4$ mono-alkylamino, $C_1$-$C_4$ dialkylamino, morpholino, piperidino, 1-indolinyl or pyrrolidyl, and $R_{51}$ is hydrogen, $C_1$-$C_4$ alkyl, phenyl or naphthyl, (c) $R_{49}$ is hydrogen, $C_1$-$C_4$ alkyl, the mono- or di-substituted aryl groups phenyl or naphthyl, said aryl substituents being $C_1$-$C_4$ alkyl or $C_1$-$C_4$ alkoxy, chloro or fluoro, (d) each $R_{50}$ is fluoro, $C_1$-$C_4$ alkyl, $C_1$-$C_4$ alkoxy, phenyl, naphthyl, phenoxy, naphthoxy, or the group, —N($R_{10}$)$R_{11}$, described hereinbefore in (1)(d), and q is selected from the integers 0, 1 or 2 for the naphthopyran represented by Formula (XA), or p is selected from the integers 0, 1, 2 or 3 for the naphthopyran represented by Formula (XB), and (e) B and B' are each independently chosen from the groups described hereinbefore in (2)(d), provided that independently for each of Formula (XA) and Formula (XB) one or two of $R_{48}$, $R_{49}$, $R_{50}$, B, and B' is in each case independently said L-Group as defined below;

(11) for said photochromic material chosen from at least one indenonaphthopyran represented by Formula (XIA) and (XIB), (a) Ring A" is an unsubstituted, mono-substituted or di-substituted heterocyclic ring chosen from furo, thieno, benzothieno, benzofurano or indolo, the 2,3 or 3,2 positions of said heterocyclic ring being fused to the I side of Formula (XIB), or to the p side of said indenonaphthopyran represented by Formula (XIA), where said heterocyclic ring substituents being $C_1$-$C_6$ alkyl, (b) $R_{52}$ and $R_{53}$ together form an oxo group, a spiro heterocyclic group having 2 oxygen atoms and from 3 to 6 carbon atoms including the spirocarbon atom, or $R_{52}$ and $R_{53}$ are each hydrogen, hydroxy, $C_1$-$C_6$ alkyl, $C_3$-$C_7$ cycloalkyl, phenyl or the group, —C(O)W", wherein each W" is $C_1$-$C_6$ alkoxy, mono($C_1$-$C_6$)alkylamino or di($C_1$-$C_6$)alkylamino, or $R_{52}$ and $R_{53}$ are each the group, —N($R_{10}$)$R_{11}$, described hereinbefore in (1)(d), or —O$R_{54}$, wherein each $R_{54}$ is $C_1$-$C_6$ alkyl, phenyl($C_1$-$C_3$)alkyl, the group, —CH($R_{55}$)X", wherein each $R_{55}$ is hydrogen or $C_1$-$C_3$ alkyl, each X" is —COO$R_{55}$, or each $R_{54}$ is the group, —C(O)Y', wherein each Y' is $C_1$-$C_6$ alkyl, (c) $R_{47}$ in each case is independently chosen from groups described hereinbefore in (8)(d), and q is in each case independently as described hereinbefore in (8)(d), and (d) B and B' are each independently chosen from the groups described hereinbefore in (2)(d), provided that independently for each of Formula (XIA) and Formula (XIB) one or two of $R_{47}$, $R_{52}$, $R_{53}$, B, and B' is in each case independently said L-Group as defined below;

(12) for said photochromic chosen from at least one indenonaphthopyran represented by Formula (XIIA) and Formula (XIIB), (a) Ring A" is independently as described hereinbefore in (11)(a), wherein Ring A" is fused to the i side of Formula (XIIB), or to the p side of Formula (XIIA), (b) $R_{56}$ is hydrogen or hydroxy and $R_{57}$ is the group, —CH(V')$_2$, wherein V' is —COO$R_{58}$, and each $R_{58}$ is $C_1$-$C_6$ alkyl or phenyl($C_1$-$C_3$)alkyl; or $R_{57}$ is the group, —CH($R_{59}$)Y", wherein $R_{59}$ is hydrogen and Y" is —COO$R_{58}$, or —CH$_2$O$R_{60}$, wherein $R_{59}$ is $C_1$-$C_6$ alkyl or di($C_1$-$C_6$)alkylamino; and $R_{60}$ is $C_1$-$C_6$ alkyl, or (c) $R_{56}$ and $R_{57}$ together form the group, =C($R_{59}$)W''', wherein W''' is —COO$R_{58}$, (d) $R_{47}$ in each case is independently chosen from groups described hereinbefore in (8)(d), and q is in each case independently as described hereinbefore in (8)(d), and (e) B and B' are each independently chosen from the groups described hereinbefore in (2)(d), provided that independently for each of Formula (XIIA) and Formula (XIIB) one or two of $R_{47}$, $R_{56}$, $R_{57}$, B, and B' is in each case independently said L-Group as defined below;

(13) for said photochromic material chosen from at least one indenonaphthopyran represented by Formula (XIII), (a) $R_{61'}$ is independently chosen for each q from,
 (i) $C_1$-$C_6$ alkoxy, perfluoro alkyl, and halogen,
 (ii) —S$R_{67}$, $R_{67}$ being $C_1$-$C_6$ alkyl or aryl, and
 (iii) an amino group described hereinbefore in (4)(b)(i), (ii) or (iii),
 where q is the integer 1, (b) $R_{61}$ is chosen from perfluoro alkyl or halogen, (c) $R_{62}$ and $R_{63}$ are each independently chosen from,
 (i) hydrogen, hydroxy, $C_1$-$C_{12}$ alkyl, $C_3$-$C_{12}$ alkylidene, $C_3$-$C_7$ cycloalkyl, or —C(O)W''', wherein W''' being the same group described hereinbefore in (11)(b),
 (ii) an unsubstituted, mono- di- or tri-substituted group chosen from phenyl; each of said phenyl substituents in (c)(ii) being chosen independently for each occurrence from chloro, fluoro, $C_1$-$C_6$ alkyl or $C_1$-$C_6$ alkoxy,
 (iii) a monosubstituted phenyl, described hereinbefore in (2)(d)(iv),
 (iv) —O$R_{67}$, $R_{67}$ being chosen from $C_1$-$C_6$ alkyl, phenyl($C_1$-$C_3$)alkyl, $C_1$-$C_6$ alkoxy($C_2$-$C_4$)alkyl tri($C_1$-$C_6$)alkylsilyl, tri($C_1$-$C_6$)alkylsilyloxy, tri($C_1$-$C_6$)alkoxysilyl, tri($C_1$-$C_6$)alkoxysilyloxy, di($C_1$-$C_6$)alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ alkyl)silyl or di($C_1$-$C_6$)alkoxy($C_1$-$C_6$ alkyl)silyloxy,
 (v) —CH(Q''')$_2$, Q''' being chosen from —COO$R_{69}$ and $R_{69}$ being $C_1$-$C_6$ alkyl,
 (vi) —CH($R_{70}$)G'', $R_{70}$ being chosen from hydrogen, $C_1$-$C_6$ alkyl or an unsubstituted, mono- or di-substituted aryl group, phenyl or naphthyl, and G'' being chosen from —COO$R_{69}$, —CO$R_{71}$ or —CH$_2$O$R_{72}$, wherein $R_{71}$ being chosen from hydrogen, $C_1$-$C_6$ alkyl, an unsubstituted, mono- or di-substituted aryl group, phenyl or naphthyl, amino, mono($C_1$-$C_6$)alkylamino, di($C_1$-$C_6$)alkylamino, phenylamino, mono- or di-($C_1$-$C_6$)alkyl substituted phenylamino, mono- or di-($C_1$-$C_6$) alkoxy substituted phenylamino, diphenylamino, mono- or di($C_1$-$C_6$)alkyl substituted diphenylamino, mono- or di($C_1$-$C_6$)alkoxy substituted diphenylamino, morpholino or piperidino; $R_{72}$ being chosen from hydrogen, —C(O)$R_{69}$, $C_1$-$C_6$ alkyl, $C_1$-$C_3$ alkoxy($C_1$-$C_6$)alkyl, phenyl($C_1$-$C_3$) alkyl, mono($C_1$-$C_6$)alkoxy substituted phenyl($C_1$-$C_3$)alkyl or an unsubstituted, mono- or di-substituted aryl group, phenyl or naphthyl, each of said aryl group substituents being independently chosen from $C_1$-$C_6$ alkyl or $C_1$-$C_6$ alkoxy, or (vii) $R_{62}$ and $R_{63}$ together form an oxo group or a substituted or unsubstituted spiro-carbocyclic ring containing 3 to 6 carbon atoms or a substituted or unsubstituted spiro-heterocyclic group containing 1 or 2 oxygen atoms and 3 to 6 carbon atoms including the spirocarbon atom, said spiro-carbocyclic ring and spiro-heterocyclic group being annellated with 0, 1 or 2 benzene rings, said substituents being hydrogen or $C_1$-$C_6$ alkyl, (d) $R_{64}$ is chosen from hydrogen, $C_1$-$C_6$ alkyl or the group $R_a$ chosen from, (i) —$OR_{73}$, $R_{73}$ being chosen from phenyl($C_1$-$C_3$) alkyl, $C_1$-$C_6$ alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$) alkyl, $C_3$-$C_7$ cycloalkyl, mono($C_1$-$C_4$)alkyl substituted $C_3$-$C_7$ cycloalkyl, $C_1$-$C_6$ chloroalkyl, $C_1$-$C_6$ fluoroalkyl, allyl or —$CH(R_{68})Q''$, or (ii) an amino group described hereinbefore in (4)(b)(i), (ii) or (iii), (e) $R_{65}$ is chosen from hydrogen, $C_1$-$C_6$ alkyl or $R_a$, where $R_a$ is the same as described hereinbefore in (d), (f) $R_{66}$ is chosen from hydrogen, $C_1$-$C_6$ alkyl or $R_a$, where $R_a$ is the same as described hereinbefore in (d), or (g) $R_{65}$ and $R_{66}$ together form one of the following Formulas,

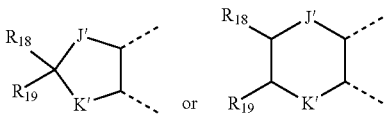

wherein J' and K' are oxygen, and groups $R_{18}$ and $R_{19}$ are each the same as described hereinbefore in (2)(d)(v), and (h) B and B' are each independently chosen from the groups described hereinbefore in (2)(d), provided that for Formula (XIII) one or two of $R_{61}$, $R_{61'}$, $R_{62}$, $R_{63}$, $R_{64}$, $R_{65}$, $R_{66}$, B, and B' is in each case independently said L-Group as defined below;

(14) for the photochromic material chosen from at least one indenonaphthopyran represented by Formula (XIV), (a) $R_{74}$ and $R_{75}$ are each independently as described hereinbefore with regard to $R_{62}$ and $R_{63}$ in (13)(c), (b) each $R_{76}$ is independently chosen from di($C_1$-$C_6$) alkylamino, dicyclohexylamino, diphenylamino, piperidyl, morpholinyl, pyridyl, halogen, or group —$C(O)W''$, the group —$C(O)W''$ being the same group described hereinbefore in (11)(b); and q is the integer 0, 1, or 2; or when q is 2, and the $R_{76}$ substituents are adjacent, each pair of substituents independently forms a substituted or unsubstituted fused carbocyclic or heterocyclic ring chosen from benzo, dihydrofurano, 1,4-dioxolo, 1,3-dioxino, or benzofuro, the substituents of said fused carbocyclic or heterocyclic ring being chosen from the group consisting of $C_1$-$C_6$ alkyl or $C_1$-$C_6$ alkoxy, and (c) B and B' are each independently chosen from the groups described hereinbefore in (2)(d), provided that for Formula (XIV) one or two of $R_{74}$, $R_{75}$, $R_{76}$, B, and B' is in each case independently said L-Group as defined below;

wherein independently for each L-Group represented by Formula (XV), (i) $Q_1$, $Q_2$, and $Q_3$ are each independently for each occurrence a divalent group selected from optionally substituted aryl, optionally substituted heteroaryl, optionally substituted cycloalkyl, and optionally substituted heterocycloalkyl, wherein each substituent is independently selected from, P, liquid crystal mesogens, halogen, poly($C_1$-$C_{12}$ alkoxy), $C_1$-$C_{12}$ alkoxycarbonyl, $C_1$-$C_{12}$ alkylcarbonyl, perfluoro($C_1$-$C_{12}$)alkoxy, perfluoro($C_1$-$C_{12}$) alkoxycarbonyl, perfluoro($C_1$-$C_{12}$)alkylcarbonyl, $C_1$-$C_{18}$ acetyl, $C_3$-$C_7$ cycloalkyl, $C_3$-$C_7$ cycloalkoxy, straight-chain $C_1$-$C_{12}$ alkyl, and branched $C_1$-$C_{12}$ alkyl, wherein said straight-chain $C_1$-$C_{12}$ alkyl and branched $C_1$-$C_{12}$ alkyl are mono-substituted with a group selected from, halogen, and $C_1$-$C_{12}$ alkoxy, or wherein said straight-chain $C_1$-$C_{12}$ alkyl and branched $C_1$-$C_{12}$ alkyl are poly-substituted with at least two groups independently selected from halogen;

(ii) c, d, e, and f are each independently an integer chosen from 1 to 10; and $S_1$, $S_2$, $S_3$, $S_4$, and $S_5$ are each independently for each occurrence a spacer unit selected from:

(1) substituted or unsubstituted alkylene, substituted or unsubstituted haloalkylene, —$Si(CH_2)_g$—, and —$Si[(CH_3)_2]O)_h$—, wherein g for each occurrence is independently chosen from an integer from 1 to 10; h for each occurrence is independently chosen from an integer from 1 to 8; and said substitutes for the alkylene and haloalkylene are independently selected from $C_1$-$C_{12}$ alkyl, $C_3$-$C_7$ cycloalkyl and phenyl;

(2) —$N(Z)$—, —$C(Z)$=$C(Z)$—, and a single bond, wherein Z for each occurrence is independently selected from hydrogen, $C_1$-$C_{12}$ alkyl, $C_3$-$C_7$ cycloalkyl and phenyl; and (3) —O—, —C(=O)—, —C≡C—, —N=N—, —S—, and —S(=O)—, provided that when two spacer units comprising heteroatoms are linked together the spacer units are linked so that heteroatoms of the first spacer unit are not directly linked to the heteroatoms of the second spacer unit, and provided that when $S_1$ is linked to Formula I and $S_5$ is linked to P, $S_1$ and $S_5$ are each linked so that two heteroatoms are not directly linked to each other;

(iii) P for each occurrence is selected from hydroxy, amino, $C_2$-$C_{12}$ alkenyl, $C_2$-$C_{12}$ alkenyl, silyl, siloxy, (tetrahydro-2H-pyran-2-yl)oxy, isocyanato, acryloyloxy, methacryloyloxy, epoxy, carboxylic acid, carboxylic ester, $C_1$-$C_{12}$ alkyloxycarbonyloxy, halocarbonyl, hydrogen, aryl, hydroxy($C_1$-$C_{12}$)alkyl, $C_1$-$C_{12}$ alkyl, $C_1$-$C_{12}$ alkoxy, ethylene, acryloyl, acryloyloxy($C_1$-$C_{12}$) alkyl, methacryloyl, methacryloyloxy($C_1$-$C_{12}$) alkyl, oxetanyl, glycidyl, vinyl ether, siloxane derivatives, unsubstituted cinnamic acid derivatives, cinnamic acid derivatives that are substituted with at least one of methyl, methoxy, cyano and halogen, and substituted or unsubstituted chiral or non-chiral monovalent or divalent groups chosen from steroid radicals, wherein each substituent is independently chosen from $C_1$-$C_{12}$ alkyl, $C_1$-$C_{12}$ alkoxy, amino, $C_3$-$C_7$ cycloalkyl, $C_1$-$C_{12}$ alkyl($C_1$-$C_{12}$)alkoxy, or fluoro($C_1$-$C_{12}$) alkyl, or P is a structure having from 2 to 4 reactive groups; and (iv) d', e' and f' are each independently chosen from 0, 1, 2, 3, and 4, provided that a sum of d'+e'+f' is at least 2.

5. The photochromic article of claim 4 wherein, independently for each L-Group represented by Formula (XV), (i) $Q_1$, $Q_2$, and $Q_3$ are each independently for each occurrence a divalent group selected from optionally substituted aryl, optionally substituted heteroaryl, optionally substituted cycloalkyl, and optionally substituted heterocycloalkyl, wherein each substituent is independently selected from, P, $C_1$-$C_6$ alkoxycarbonyl, perfluoro($C_1$-$C_6$)alkoxy, $C_3$-$C_7$ cycloalkyl, $C_3$-$C_7$ cycloalkoxy, straight-chain $C_1$-$C_6$ alkyl, and branched $C_1$-$C_6$ alkyl, wherein said straight-chain $C_1$-$C_6$ alkyl and branched $C_1$-$C_6$ alkyl are mono-substituted with a group selected from halogen and $C_1$-$C_{12}$ alkoxy, or wherein said straight-chain $C_1$-$C_6$ alkyl and branched $C_1$-$C_6$ alkyl are poly-substituted with at least two groups independently selected from halogen;

(ii) c, d, e, and f are each independently an integer chosen from 1 to 10; and $S_1$, $S_2$, $S_3$, $S_4$, and $S_5$ are each independently for each occurrence a spacer unit selected from:

(1) substituted or unsubstituted alkylene;
(2) —N(Z)—, —C(Z)=C(Z)—, and a single bond, wherein Z for each occurrence is independently selected from hydrogen and $C_1$-$C_6$ alkyl; and
(3) —O—, —C(=O)—, —C≡C—, and —N=N—, —S—;

provided that when two spacer units comprising heteroatoms are linked together the spacer units are linked so that heteroatoms of the first spacer unit are not directly linked to the heteroatoms of the second spacer unit, and provided that when $S_1$ is linked to Formula I and $S_5$ is linked to P, $S_1$ and $S_5$ are each linked so that two heteroatoms are not directly linked to each other;

(iii) P for each occurrence is independently selected from hydroxy, amino, $C_2$-$C_6$ alkenyl, $C_2$-$C_6$ alkenyl, siloxy, (tetrahydro-2H-pyran-2-yl)oxy, isocyanato, acryloyloxy, methacryloyloxy, epoxy, carboxylic acid, carboxylic ester, $C_1$-$C_6$ alkyloxycarbonyloxy, hydrogen, aryl, hydroxy($C_1$-$C_6$)alkyl, $C_1$-$C_6$ alkyl, ethylene, acryloyl, acryloyloxy($C_1$-$C_{12}$)alkyl, oxetanyl, glycidyl, vinyl ether, siloxane derivatives, and substituted or unsubstituted chiral or non-chiral monovalent or divalent groups chosen from steroid radicals, wherein each substituent is independently chosen from $C_1$-$C_6$ alkyl, $C_1$-$C_6$ alkoxy, amino, $C_3$-$C_7$ cycloalkyl.

6. The photochromic article of claim 1 wherein independently for each $R_1$, $R_2$, $R_3$, $R_4$, $R_5$, $R_6$, $R_7$, $R_{12}$, $R_{13}$, $R_{14}$, $R_{21}$, $R_{22}$, $R_{23}$, $R_{24}$, $R_{25}$, $R_{31}$, $R_{32}$, $R_{33}$, $R_{35}$, $R_{36}$, $R_{37}$, $R_{38}$, $R_{39}$, $R_{43}$, $R_{44}$, $R_{45}$, $R_{46}$, $R_{47}$, $R_{48}$, $R_{49}$, $R_{50}$, $R_{52}$, $R_{53}$, $R_{56}$, $R_{57}$, $R_{61}$, $R_{61'}$, $R_{62}$, $R_{63}$, $R_{64}$, $R_{65}$, $R_{66}$, $R_{74}$, $R_{75}$, and $R_{76}$, each L-Group is independently selected from,

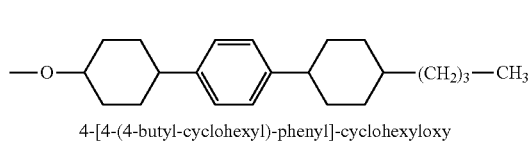

L(1)

4-[4-(4-butyl-cyclohexyl)-phenyl]-cyclohexyloxy

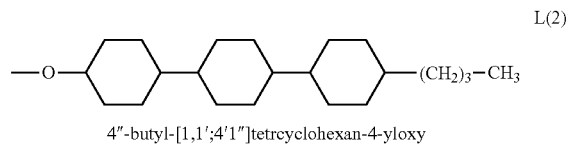

L(2)

4''-butyl-[1,1';4'1'']tetrcyclohexan-4-yloxy

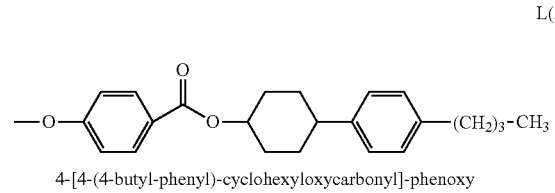

L(3)

4-[4-(4-butyl-phenyl)-cyclohexyloxycarbonyl]-phenoxy

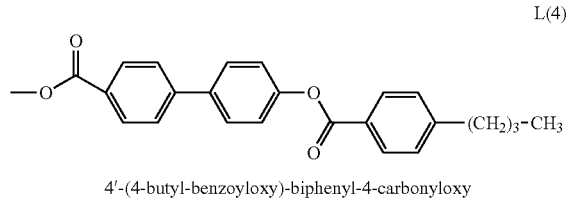

L(4)

4'-(4-butyl-benzoyloxy)-biphenyl-4-carbonyloxy

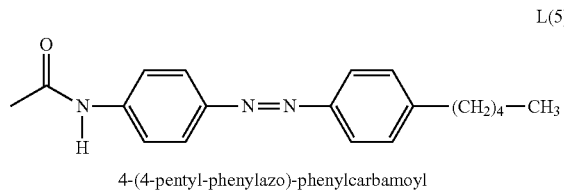

L(5)

4-(4-pentyl-phenylazo)-phenylcarbamoyl

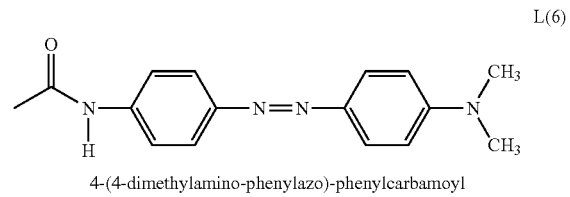

L(6)

4-(4-dimethylamino-phenylazo)-phenylcarbamoyl

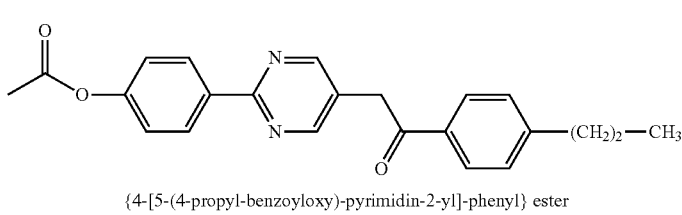

L(7)

{4-[5-(4-propyl-benzoyloxy)-pyrimidin-2-yl]-phenyl} ester

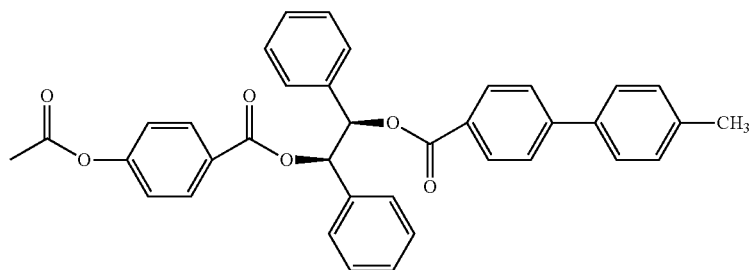

{4-[2-(4'-methyl-biphenyl-4-carbonyloxy)-1,2-diphenyl-ethoxycarbonyl]-phenyl} ester

L(8)

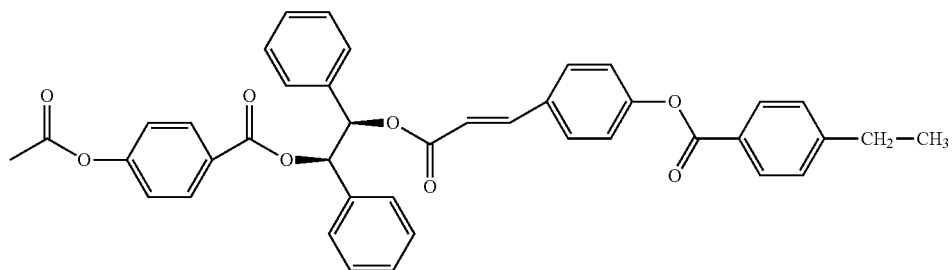

[4-(1,2-diphenyl-2-{3-[4-(4-propyl-benzoyloxy)-phenyl]-acryloyloxy}-ethoxycarbonyl)-phenyl] ester

L(9)

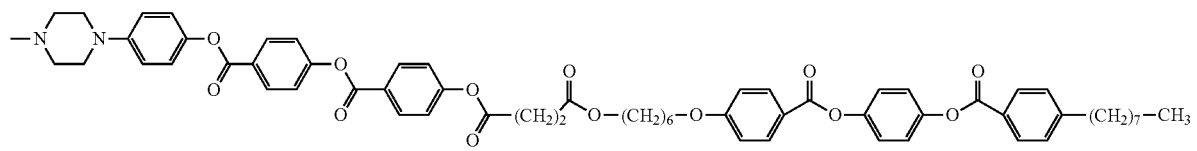

4-[4-(4-{4-[3-(6-{4-[4-(4-nonyl-benzoyloxy)-phenoxycarbonyl]-phenoxy}-hexyloxycarbonyl)-propionyloxy]-
benzoyloxy}-benzoyloxy)-phenyl]-piperazin-1-yl

L(10)

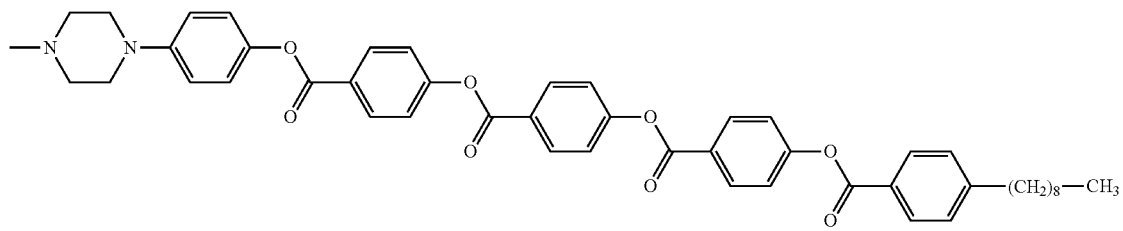

{4-[4-(4-{4-[4-(4-nonyl-benzoyloxy)-benzoyloxy]-benzoyloxy}-benzoyloxy)-phenyl]-piperazin-1-yl}

L(11)

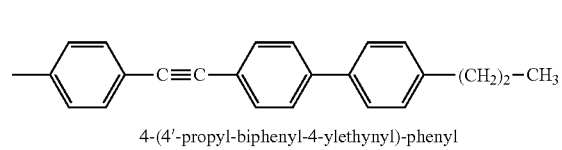

4-(4'-propyl-biphenyl-4-ylethynyl)-phenyl

L(12)

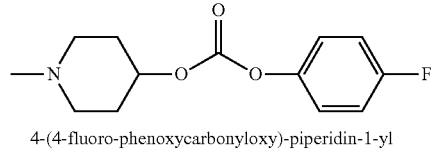

4-(4-fluoro-phenoxycarbonyloxy)-piperidin-1-yl

L(13)

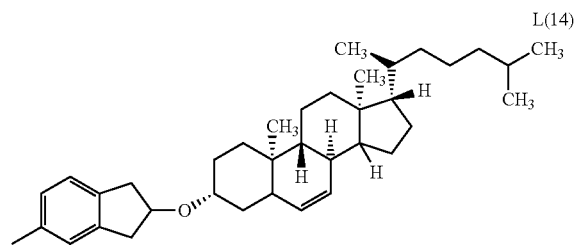

2-[17-(1,5-dimethyl-hexyl)-10,13-dimethyl-2,3,4,7,8,9,10,11,12,13,14,
15,16,17-tetradecahydro-1H-cyclopenta[a]phenanthren-3-yloxy]-indan-5-yl

L(14)

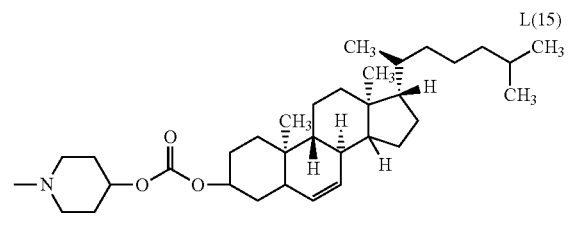

4-[17-(1,5-dimethyl-hexyl)-10,13-dimethyl-2,3,4,7,8,9,10,11,12,
13,14,15,16,17-tetradecahydro-1H-cyclopenta[a]phenanthren-
3-yloxycarbonyloxy]-piperidin-1-yl

L(15)

-continued

L(16)
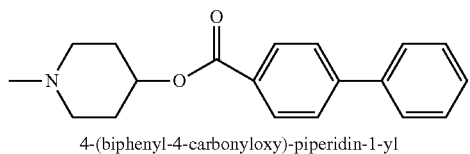
4-(biphenyl-4-carbonyloxy)-piperidin-1-yl

L(17)
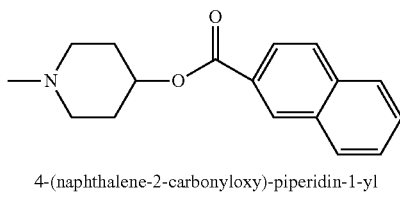
4-(naphthalene-2-carbonyloxy)-piperidin-1-yl

L(18)
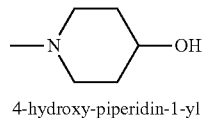
4-hydroxy-piperidin-1-yl

L(19)
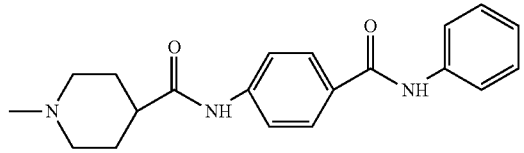

L(20)
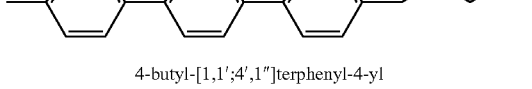
4-(4-(4-phenylpiperidin-1-yl)-benzoyloxy)-piperidin-1-yl

L(21)
4-butyl-[1,1';4',1'']terphenyl-4-yl

L(22)
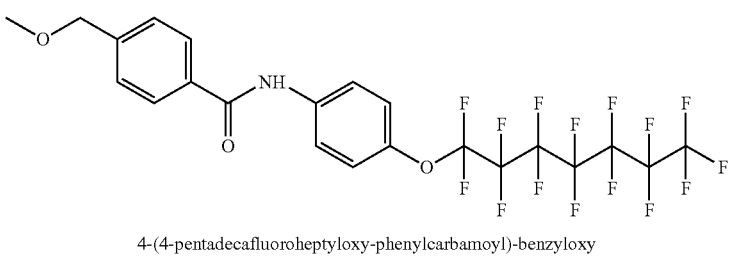
4-(4-pentadecafluoroheptyloxy-phenylcarbamoyl)-benzyloxy

L(23)
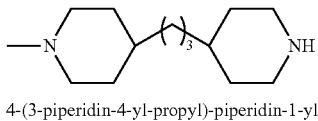
4-(3-piperidin-4-yl-propyl)-piperidin-1-yl

L(24)
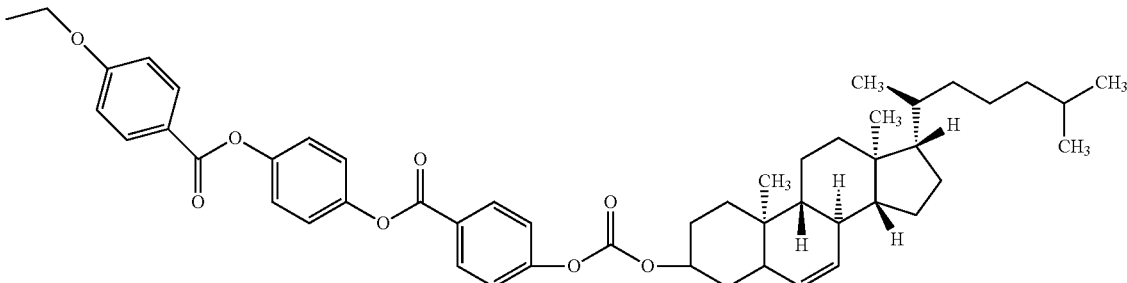
4-(4-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-benzoyloxy}-phenoxycarbonyl)-phenoxymethyl L(25)
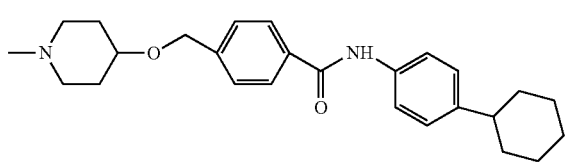
4-[4-(4-cyclohexyl-phenylcarbamoyl)-benzyloxy]-piperidin-1-yl L(26)
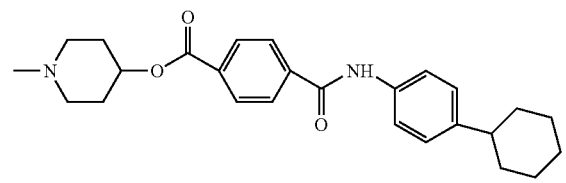
4-[4-(4-cyclohexyl-phenylcarbamoyl)-benzyloxy]-piperidin-1-yl -continued

L(27)

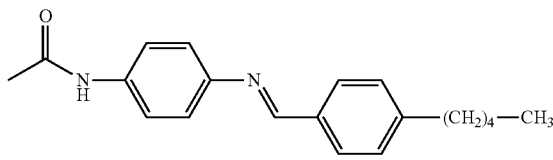

N-{4-[(4-pentyl-benzylidene)-amino]-phenyl}-acetamidyl

L(28)

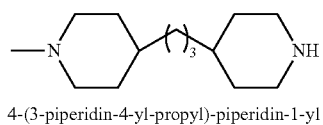

4-(3-piperidin-4-yl-propyl)-piperidin-1-yl

L(29)

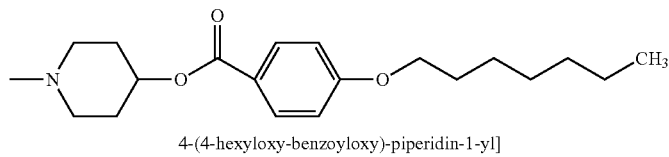

4-(4-hexyloxy-benzoyloxy)-piperidin-1-yl]

L(30)

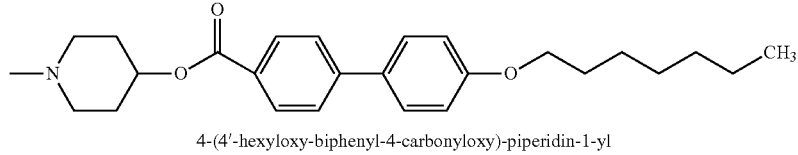

4-(4'-hexyloxy-biphenyl-4-carbonyloxy)-piperidin-1-yl

L(31)

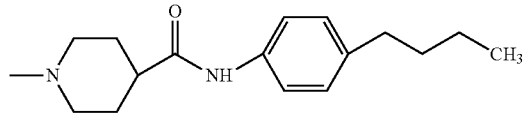

4-(4-butyl-phenylcarbamoyl)-piperidin-1-yl

L(32a)

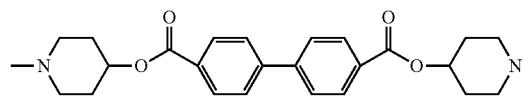

1-methyl-4-((4'-(((1-methylpiperidin-4-yl)oxy)carbonyl)-
[1,1'-biphenyl]-4-carbonyl)oxy)piperidin-1-yl L(32b)

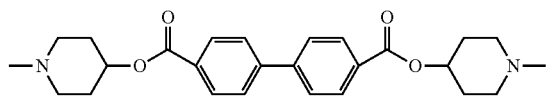

bis(1-yl-piperidin-4-yl) [1,1'-biphenyl]-4,4'-
dicarboxylate (which links two separate
photochromic PC groups)

L(33)

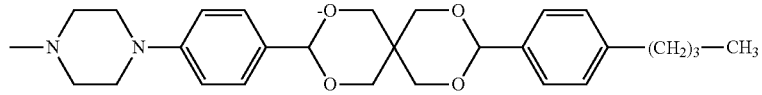

4-(4-(9-(4-butylphenyl)-2,4,8,10-tetraoxaspiro[5.5]undec-3-yl)phenyl)
piperazin-1-yl

L(34)

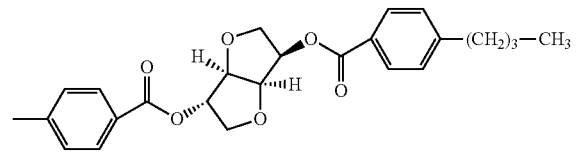

4-(6-(4-butylphenyl)carbonyloxy-(4,8-dioxabicyclo
[3.3.0]oct-2-yl))oxycarbonyl)pheny

L(35)

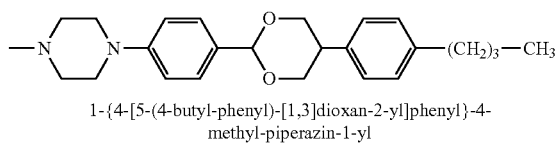

1-{4-[5-(4-butyl-phenyl)-[1,3]dioxan-2-yl]phenyl}-4-
methyl-piperazin-1-yl

L(36)

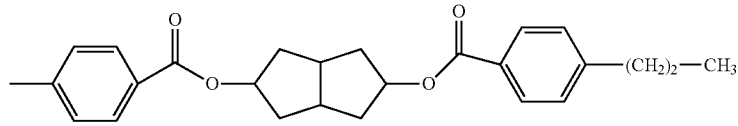

4-(7-(4-propylphenylcarbonyloxy)bicyclo[3.3.0]oct-2-yl)oxycarbonyl)phenyl

-continued
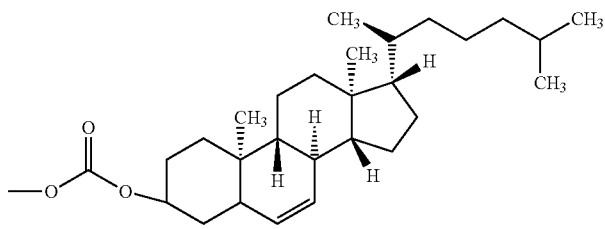
L(37)
4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy
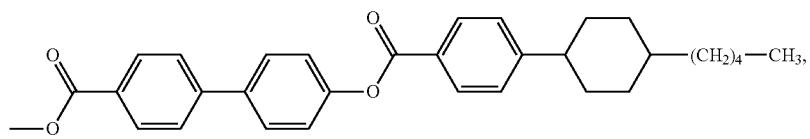
L(a)
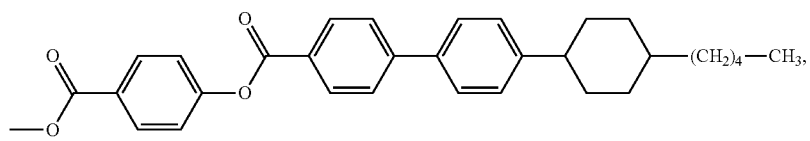
L(b)
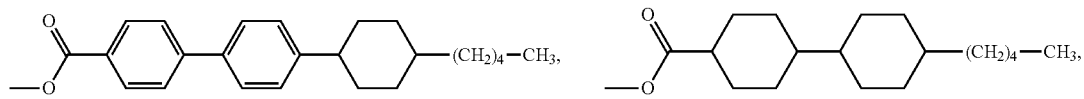
L(c)
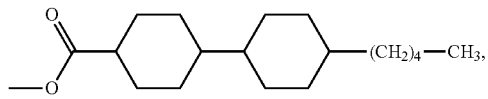
L(d)
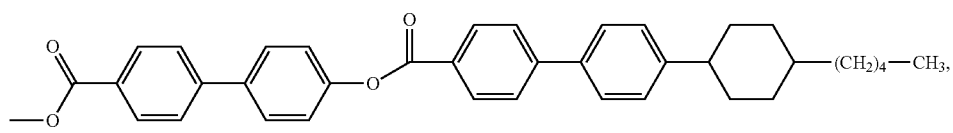
L(e)
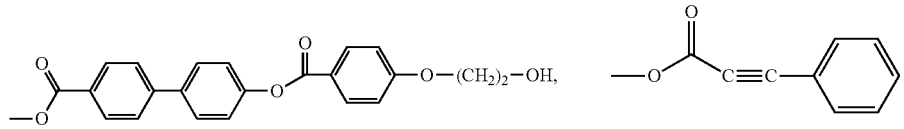
L(f)
L(g)
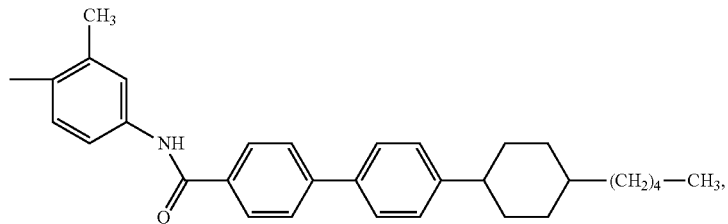
L(h)
L(i)
L(j)
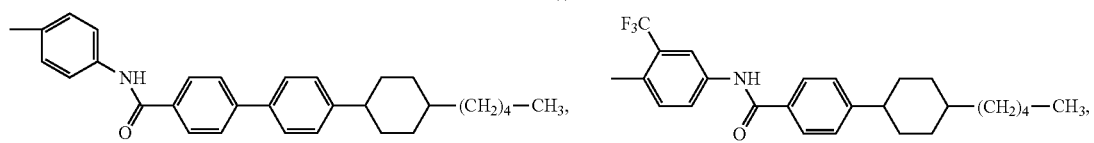
L(k)

L(l)
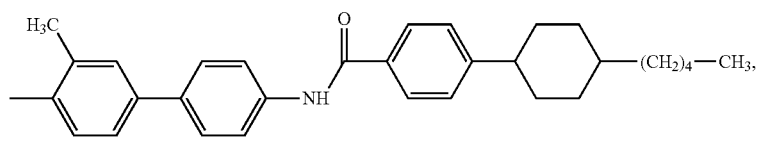
L(m)
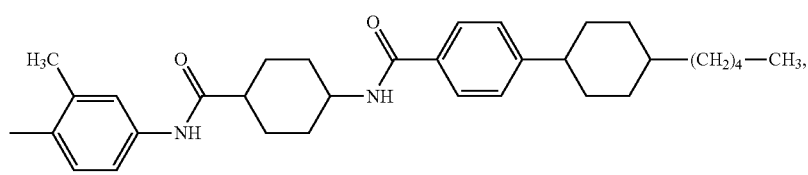
L(n)
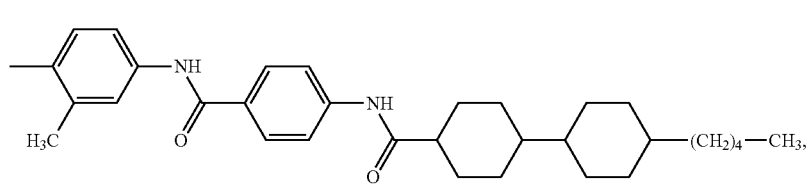
L(o)
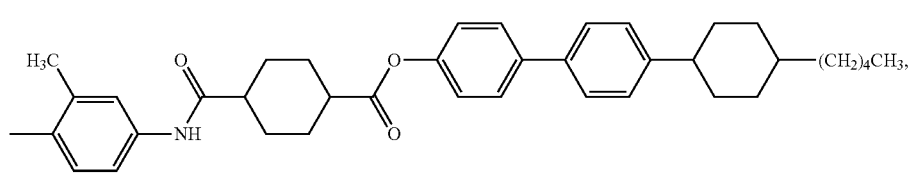
L(p)
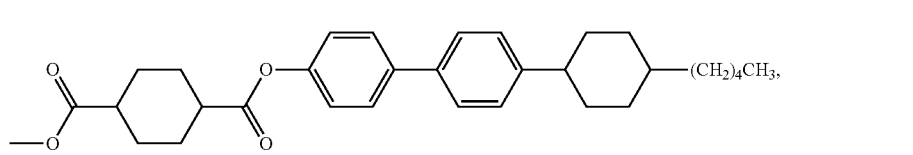
L(q)
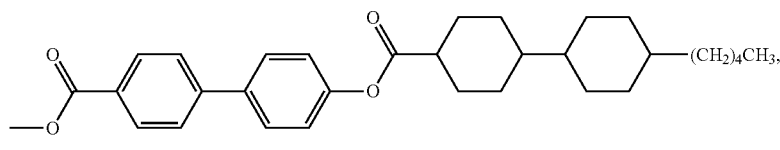
L(r)
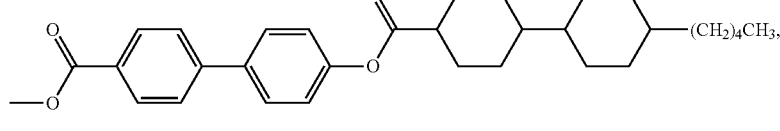
L(s)
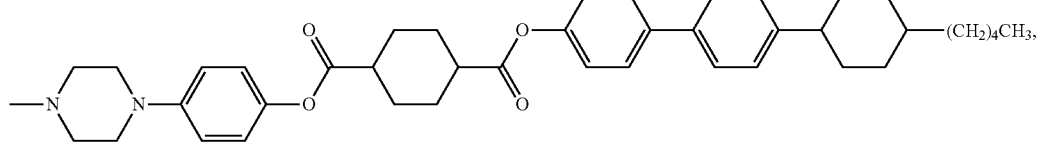
L(t)
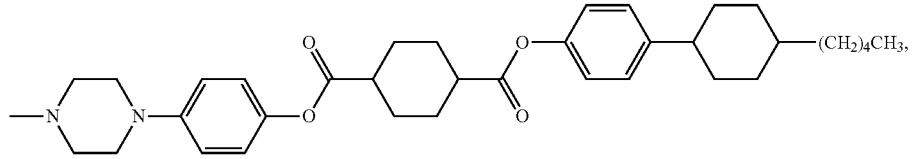
L(u)
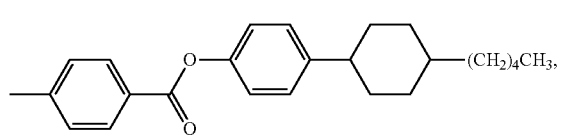
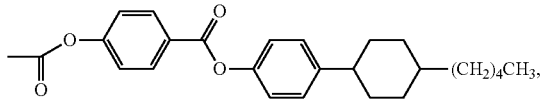
L(v)
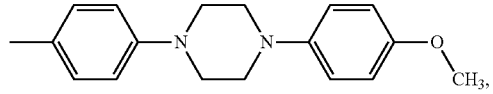

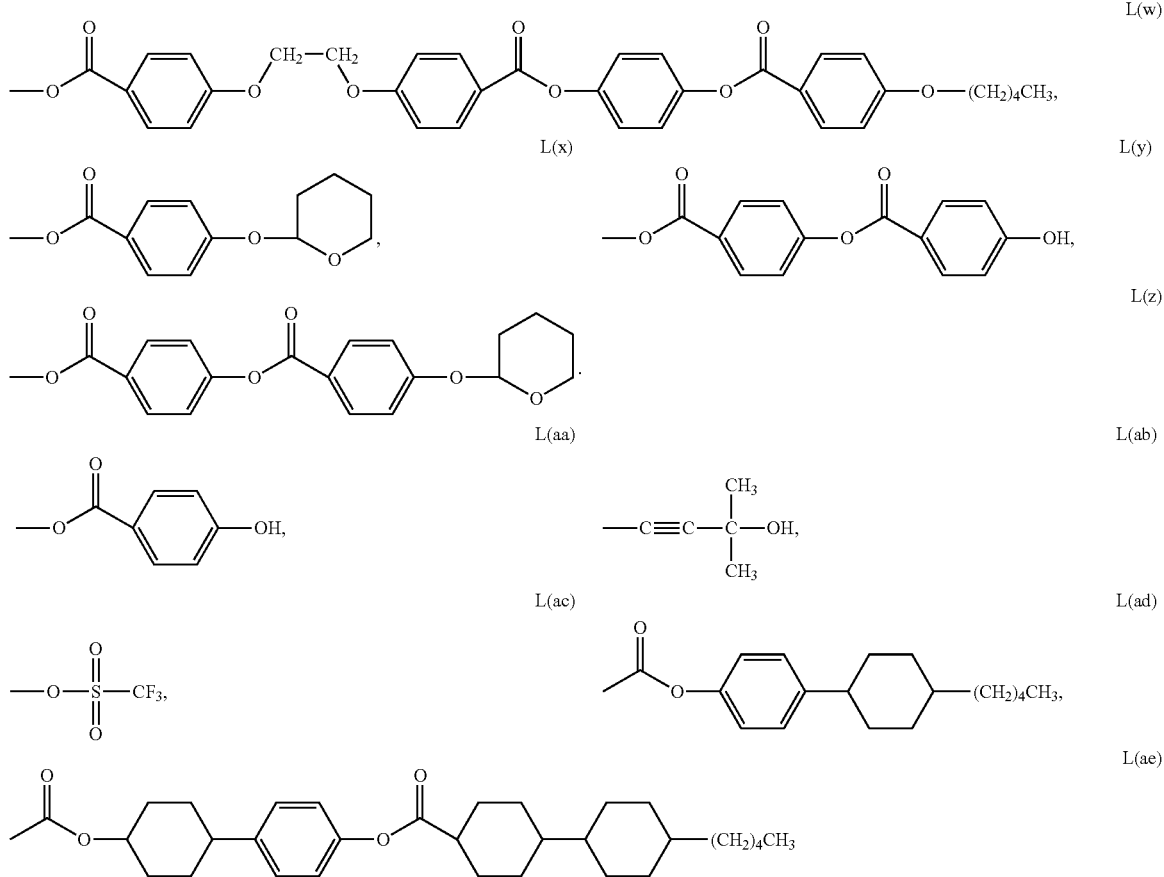

L-DC-(a) (4-trans-(4-pentylcyclohexyl)benzamido)phenyl,
L-DC-(b) (4-(4-trans-(4-pentylcyclohexyl)phenoxy)carbonyl) phenyl,
L-DC-(c) 4-(4-(4-trans-(4-pentylcyclohexyl)phenyl)benzamido) phenyl,
L-DC-(d) 4-((trans-(4'-pentyl-[1,1'-bi(cyclohexan)]-4-yl)oxy)carbonyl)phenyl,
L-DC-(e) 4-(4'-(4-pentylcyclohexyl)-[1,1'-biphenyl]-4-ylcarboxamido)phenyl,
L-DC-(f) 4-((4'-(4-pentylcyclohexyl)-[1,1'-biphenyl]-4-carbonyl)oxy)benzamido,
L-DC-(g) 4-(4'-(4-pentylcyclohexyl)-[1,1'-biphenyl]-4-carbonyl)piperazin-1-yl,
L-DC-(h) 4-(4-(4-trans-(4-pentylcyclohexyl) phenyl)benzamido)-2-(trifluoromethyl)phenyl,
L-DC-(i) 2-methyl-4-trans-(4-((4'-trans-(4-pentylcyclohexyl)biphenyl-4-yloxy)carbonyl)cyclohexanecarboxamido)phenyl,
L-DC-(j) 4'-(4'-pentylbi(cyclohexane-4-)carbonyloxy)biphenylcarbonyloxy,
L-DC-(k) 4-(((3S,8S,9S,10R,13R,14S,17R)-10,13-dimethyl-17-((R)-6-methylheptan-2-yl)-2,3,4,7,8,9,10,11,12,13,14,15,16,17-tetradecahydro-1H-cyclopenta[a]phenanthren-3-yloxy)carbonyl)piperazin-1-yl, and
L-DC-(l) 4-((S)-2-methylbutoxy)phenyl)-10-(4-((3R,3aS,6S,6aS)-6-(4'-trans-(4-pentylcyclohexyl)biphenylcarbonyloxy)hexahydrofuro[3,2-b]furan-3-yloxy)carbonyl)phenyl.

7. The photochromic article of claim 4, wherein photochromic material (b) is selected from at least one of:
(1) at least one fluoranthenoxazine represented by Formula (I) being chosen from at least one of,
  1-[4-(4-(4-(trans-4-pentylcyclohexyl) phenyl)benzamido)-2-(trifluoromethyl)phenyl]-1',3,3'-trimethyl-spiro[indoline-2',5-[3H]-fluorantheno[3,2-b][1,4]oxazine], and
  1-[4-(4-(4-(trans-4-pentylcyclohexyl) phenyl)benzamido)-1'-propyl-3,3',4',5' (or 3',3',5',6')-tetramethyl-spiro[indoline-2',5-[3H]-fluorantheno[3,2-b][1,4]oxazine];
(2) at least one naphthopyran represented by Formula (II) being chosen from at least one of,
  7-[4-(4-(4-(trans-4-pentylcyclohexyl)phenyl)benzamido)-3-(2-fluorophenyl)-3-(4-methoxyphenyl)-8-hydroxy-9-carbopropoxy-3H-naphtho[2,1-b]pyran,
  6,7-bis(4-(4'-(trans-4-pentylcyclohexyl)biphenyl-4-ylcarboxamido)phenyl)-3-(2-fluorophenyl)-3-(3-methoxy-2-thienyl)-7-h-pentyl-8-benzoyloxy-3H-naphtho[2,1-b]pyran, and
  7-(4'-(trans,trans-4'-pentylbi(cyclohexane-4-)carbonyloxy)biphenylcarbonyloxy)-3-(2,4-dimethoxyphenyl)-3-(4-methoxyphenyl)-8-acetoxy-9-carbomethoxy-3H-naphtho[2,1-b]pyran;
(3) at least one naphthopyran represented by Formula (III) being chosen from at least one of, 8-(4'-(trans,trans-4'-pentylbi(cyclohexane-4-)carbonyloxy)biphenylcarbonyloxy)-2,2-di(4-methoxyphenyl)-5-methoxycarbonyl-6-hydroxy-2H-naphtho[1,2-b]pyran, and 8-(4-(4-(trans-4-pentylcyclohexyl)benzamido)phenyl)-2,2-diphenyl-5-methoxycarbonyl-6-phenylamino-2H-naphtho[1,2-b]pyran, (4) at least one naphthopyran represented by Formula (IV) being chosen from at least one of, 8-(4'-(trans,trans-4'-pentylbi(cyclohexane-4-) carbonyloxy)biphenyl carbonyloxy)-2-phenyl-2-(4-morpholinophenyl)-5-carbomethoxy-9-dimethylamino-2H-naphtho[1,2-b]pyran, and 8-(4-(4-(trans-4-pentylcyclohexyl)benzamido)phenyl)-2-phenyl-2-(4-methoxyphenyl)-5-carbomethoxy-9-dimethylamino-2H-naphtho[1,2-b]pyran;

(5) at least one phenanthropyan represented by at least one of Formula (VA) and Formula (VB) being chosen from at least one of, 8-(4'-(trans,trans-4'-pentylbi(cyclohexane-4-) carbonyloxy)biphenyl carbonyloxy)-3,3-diphenyl-12-methoxycarbonyl-11-methyl-3H-phenanthro[1,2-b]pyran, 8-(2-methyl-4-(trans-4-((4'-((trans-4-pentylcyclohexyl)biphenyl-4-yloxy)carbonyl)cyclohexanecarboxamido)phenyl)-2,2-diphenyl-5-methoxcarbonyl-6-methyl-2H-phenanthro[4,3-b]pyran, 8-(4-(4'-(trans-4-pentylcyclohexyl)-[1,1'-biphenyl]-4-carbonyl)piperazin-1-yl)-2-(4-methoxyphenyl)-2-phenyl-5-methoxycarbonyl-6-methyl-2H-phenanthro[4,3-b]pyran, and 8-[4-(4-(4-(trans-4-pentylcyclohexyl) phenyl)benzamido)-2-(trifluoromethyl)phenyl]3-(2-fluorophenyl)-3-(4-methoxyphenyl)-6-methoxy-12-methoxycarbonyl-3H-phenanthro[1,2-b]pyran;

(6) at least one fluoranthenopyran represented by Formula (VI) being chosen from at least one of, 1-[4-(4-(4-(trans-4-pentylcyclohexyl) phenyl)benzamido)-5-(4-methoxyphenyl)-5-(4-morpholinophenyl)-8-ethoxycarbonyl-5H-fluorantheno[3,2-b]pyran, and 8-(2-methyl-4-(trans-4-((4'-((trans-4-pentylcyclohexyl)biphenyl-4-yloxy)carbonyl)cyclohexanecarboxamido)phenyl)-5,5-bis(4-methoxyphenyl)-2-methoxy-8-methoxycarbonyl-5H-fluorantheno[3,2-b]pyran;

(7) at least one naphthopyran represented by Formula (VII) being chosen from at least one of, 11-[4-(4-(4-(trans-4-pentylcyclohexyl) phenyl)benzamido)phenyl]-7,7-diphenyl-2-(1-phenylethyl)-4-oxo-4H-7H-[1,3]dioxino[5',4':3,4]naphtho[1,2-b]pyran, and 11-(4-(4'-(trans-4-pentylcyclohexyl)-[1,1'-biphenyl]-4-carbonyl)piperazin-1-yl)-3-(2-methacryloyloxyethyl)-7,7-diphenyl-2,4-dioxo-2,3,4,7-tetrahydro[1,3]oxazino[5',6':3,4]naphtho[1,2-b]pyran;

(8) at least one naphthopyran represented by Formula (VIII) being chosen from at least one of, 10-[4-(4-(4-(trans-4-pentylcyclohexyl)phenyl)benzamido)-2-(trifluoromethyl)phenyl]-2-(4-methoxyphenyl)-2-(2,4-dimethoxy-phenyl)-7-diphenylmethyl-5-oxo-2H-5H-pyrano[3',4':3,4]naphtho[1,2-b]pyran, and 10-[4-(4-(4-(trans-4-pentylcyclohexyl)phenyl)benzamido)-2-(trifluoromethyl)phenyl]-2-(4-methoxyphenyl)-2-(4-morphiliono-phenyl)-7-diphenylmethyl-5-oxo-2H-5H-pyrano[3',4':3,4]naphtho[1,2-b]pyran;

(9) at least one naphthopyran represented by at least one of Formulas (IXA), (IXB), (IXC), (IXD), (IXE), (IXF), (IXG) and (IXH) being chosen from at least one of, 2-[4-(4-(4-(trans-4-pentylcyclohexyl)phenyl)benzamido)-2-(trifluoromethyl)phenyl]-6,6-bis(4-methoxyphenyl)-6,10-dihydro[2]benzopyrano-[3',4':3,4]naphtho(1,2-b)pyran, 8-[4-(4-(4-(trans-4-pentylcyclohexyl)phenyl)benzamido)-2-(trifluoromethyl)phenyl]-2-(4-methoxyphenyl)-2-(4-morpholinophenyl)-10-oxo-2,10-dihydro[2]benzopyrano[4',3':3,4]naphtho(2,1-b)pyran, 8-[4-(4-(4-(trans-4-pentylcyclohexyl)phenyl)benzamido)-2-(4-methoxyphenyl)-2-phenyl-12,13-dimethoxy-10-oxo-2,10-dihydro[2]benzopyrano[4',3':3,4]naphtho(2,1-b) pyran, 2-[4-(4-(4-(trans-4-pentylcyclohexyl)phenyl)benzamido)-6,6-diphenyl-9-oxo-6,9-dihydro[1]benzopyrano [3',4':3,4]naphtho(1,2-b)pyran, and 6-[4-(4-(4-(trans-4-pentylcyclohexyl)phenyl)benzamido)-3,3-diphenyl-8-oxo-3,8-dihydro[2]benzopyrano[3',4': 5,6]naphtho(2,1-b)pyran;

(10) at least one naphthopyran represented by at least one of Formula (XA) and Formula XB) being chosen from at least one of, 8-[4-(4-(4-(trans-4-pentylcyclohexyl)phenyl)benzamido)-2,2-bis(4-methoxyphenyl)-5-methoxycarbonyl-6-methyl-2H-benzofuro[2',3':8,9]naphtho[12-b]pyran, and 3,3-Bis(4-methoxyphenyl)-13-[4-(4-(4-(trans-4-pentylcyclohexyl)phenyl)benzamido)-2-(trifluoromethyl)phenyl]-10-methoxy-3H-naphtho[2",1":4',5'] furo[2',3':3,4]naphtho[1,2-b]pyran;

(11) at least one indenonaphthopyran represented by at least one of Formula (XIA) and Formula (XIB) being chosen from at least one of, 10-[4-(4-(4-(trans-4-pentylcyclohexyl)phenyl)benzamido)-2-(trifluoromethyl)phenyl]-3,3-di(4-methoxyphenyl)-16-hydroxy-16-ethyl-16H-benzofuro[2',3':7,8]indeno[2',3':3,4]naphtho[1,2-b]pyran, 8-[4-(4-(4-(trans-4-pentylcyclohexyl)phenyl)benzamido)-3,3-di(4-methoxyphenyl)-16-hydroxy-16H-benzofuro[2",3":6',7]indeno[3',2':4,3]naphtho [1,2-b]pyran, and 3,3-di(4-methoxyphenyl)-10-[4-(4-(4-(trans-4-pentylcyclohexyl)phenyl)benzamido)-16-hydroxy-16-ethyl-16H-benzofuro[2",3":6',7']indeno[3',2':4,3]naphtho[1,2-b]pyran;

(12) at least one indenonaphthopyran represented by at least one of Formula (XIIA) and Formula (XIIB) being chosen from at least one of, 3,3-di(4-methoxyphenyl)-10-[4-(4-(4-(trans-4-pentylcyclohexyl)phenyl)benzamido)-2-(trifluoromethyl)phenyl]-16-(ethoxycarbonyl) methyl-16-hydroxy-3,16-di[H]-benzofuro[2',3':7,8]indeno [2',3':3,4]naphtho[1,2-b]pyran, and 10-[4-(4-(4-(trans-4-pentylcyclohexyl)phenyl)benzamido)-3-(4-methoxyphenyl)-3-(4-morpholinophenyl)-16-(ethoxycarbonyl)methyl-16-hydroxy-3,16-di[H]-benzofuro [2',3':7,8]indeno[2',3':3,4]naphtho [1,2-b]pyran;

(13) at least one indenonaphthopyran represented by Formula (XIII) being chosen from at least one of, 3-(4-fluorophenyl)-3-(4-morpholinophenyl)-6,8-difluoro-10-(4-(4'-trans-4-pentylcyclohexyl)-[1,1'-bi phenyl]-4-ylcarbamido)phenyl)-13,13-dimethyl-3, 13-dihydro-indeno[2',3':3,4]naphtho[1,2-b]pyran, 3-(4-butoxyphenyl)-3-(4-fluorophenyl)-5,7-dichloro-10-(4-(4'-trans-4-pentylcyclohexyl)-[1,1'-biphenyl]-4-ylcarbamido)phenyl)-13,13-dimethyl-3,13-dihydro-indeno[2',3':3,4]naphtho[1,2-b]pyran, 3-(4-butoxyphenyl)-3-(4-fluorophenyl)-6,8-difluoro-10-(4-(4'-trans-4-pentylcyclohexyl)-[1,1'-biphenyl]-4-ylcarbamido)phenyl)-13,13-dimethyl-3,13-dihydro-indeno[2',3':3,4]naphtho[1,2-b]pyran, 3-(4-butoxyphenyl)-3-(4-fluorophenyl)-6-(trifluoromethyl)-10-[4-(4'-(4-(trans-4-pentylcyclohexyl)-[1,1'-biphenyl]-4-carbonyloxy)benzamido]-12-bromo-13,13-dimethyl-3,13-dihydro-indeno[2',3':3,4]naphtho[1,2-b]pyran, 3-(4-butoxyphenyl)-3-(4-methoxyphenyl)-5,7-dichloro-10-(4-(4'-trans-4-pentylcyclohexyl)-11-methoxy-[1,1'-biphenyl]-4-ylcarbamido)phenyl)-13,13-dimethyl-3,13-dihydro-indeno[2',3':3,4]naphtho[1,2-b]pyran, 5,7-Dichloro-12-bromo-3,3-bis(4-hydroxyphenyl)-11-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran, 3-(4-butoxyphenyl)-3-(4-fluorophenyl)-6-(trifluoromethyl)-10-[4-(4'-(4-(trans-4-pentylcyclohexyl)-[1,1'-biphenyl]-4-carbonyloxy)benzamido]-13,13-dimethyl-3,13-dihydro-indeno[2',3':3,4]naphtho[1,2-b]pyran, 3-(4-butoxyphenyl)-3-(4-fluorophenyl)-7-(4-(4'-(trans-4-pentylcyclohexyl)-[1,1'-biphenyl]-4-ylcarbamido)phenyl)-11-(trifluoromethyl)-13,13-dimethyl-3,13-dihydro-indeno[2',3':3,4]naphtho[1,2-b]pyran, and 3-(4-butoxyphenyl)-3-(4-fluorophenyl)-6-(trifluoromethyl)-10-[(4-(4'-(trans-4-pentylcyclohexyl)-[1,1'-biphenyl]-4-yl)carbonyl)piperazin-1-yl]-13,13-dimethyl-3,13-dihydro-indeno[2',3':3,4]naphtho[1,2-b]pyran; and

(14) at least one indenonaphthopyran represented by Formula (XIV) being chosen from at least one of, 7-(4-((4'-(trans-4-pentylcyclohexyl)-[1,1'-biphenyl]-4-carbonyl)oxy)benzamido)-3,3,9-triphenyl-3H-9H-benzo[4",5"]indeno[3',2':3,4]naphtho[1,2-b]pyran, 7-(4-(4'-(trans-4-pentylcyclohexyl)-[1,1'-biphenyl]-4-ylcarboxamido)phenyl)-3-(4-morpholinophenyl)-3,9-diphenyl-3H-9H-benzo[4",5"]indeno[3',2': 3,4]naphtho[1,2-b]pyran, 10-(4-(4'-(trans-4-pentylcyclohexyl)-[1,1'-biphenyl]-4-carbonyl)piperazin-1yl)-3,3-di(4-methoxyphenyl)-9,9-dimethyl-7,11-dimethoxy-3H-9H-benzo[4",5"]indeno[3',2':3,4]naphtho[1,2-b]pyran, and 7-(2-methyl-4-(trans-4-((4'-((trans-4-pentylcyclohexyl)biphenyl-4-yloxy)carbonyl)cyclohexanecarboxamido)phenyl)-3,3-di(4-methoxyphenyl)-9-methyl-11,13-dimethoxy-3H-9H-benzo[4",5"]indeno[3',2': 3,4]naphtho[1,2-b]pyran.

8. The photochromic article of claim 1 further comprising at least one fixed tint dye.

9. The photochromic article of claim 1 wherein said photochromic article is adapted to exhibit a neutral activated color.

10. The photochromic article of claim 1 further comprising at least one other photochromic material (c) that is different from photochromic material (b).

11. The photochromic article of claim 10 wherein photochromic material (c) is an organic photochromic material, inorganic photochromic material or a mixture thereof.

12. The photochromic article of claim 11 wherein photochromic material (c) is an organic photochromic material and is chosen from naphthopyrans, benzopyrans, phenanthropyrans, indenonaphthopyrans, oxazines, metal-dithiozonates, fulgides, fulgimides, spiro(indoline)pyrans or mixtures thereof.

13. The photochromic article of claim 11 wherein photochromic material (c) is an inorganic photochromic material and is chosen from silver halide, cadmium halide, copper halide europium (II), cerium(III) or mixtures thereof.

14. The photochromic article of claim 1 wherein the substrate comprises at least one photochromic material (b).

15. The photochromic article of claim 14 wherein the substrate further comprises at least one photochromic material (c) that is different from photochromic material (b).

16. The photochromic article of claim 1 further comprising a coating, comprising an at least partially cured polymer matrix, applied to at least one surface of the substrate.

17. The photochromic article of claim 16 wherein the at least partially cured polymeric coating comprises photochromic material (b).

18. The photochromic article of claim 17 wherein the coating further comprises at least one other photochromic material (c) that is different from photochromic material (b).

19. The photochromic article of claim 1 wherein the substrate is chosen from paper, glass, ceramic, wood, masonry, textile, metal or organic polymeric material.

20. The photochromic article of claim 19 wherein the substrate is organic polymeric material and said organic polymeric material is chosen from poly($C_1$-$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly(alpha methylstyrene), copoly(styrene-methylmethacrylate), copoly(styrene-acrylonitrile), polyvinylbutyral or is polymerized from monomers chosen from bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bis methacrylate monomers, alkoxylated polyhydric alcohol polyacrylate monomers, styrene monomers, urethane acrylate monomers, glycidyl acrylate monomers, glycidyl methacrylate monomers, diallylidene pentaerythritol monomers or mixtures thereof.

21. The photochromic article of claim 20 wherein the substrate is an optical element.

22. The photochromic article of claim 21 wherein said optical element is an ophthalmic lens.

23. The photochromic article of claim 1 wherein said photochromic article is substantially free of ultraviolet radiation absorbing materials adapted to substantially inhibit the activation of said photochromic material by radiation below 380 nanometers.

24. The photochromic article of claim 1 wherein said photochromic article is adapted to exhibit an unactivated state luminous transmittance of greater than 70 percent at 23° C., an activated state luminous transmittance at saturation less than 30 percent when activated at 23° C. by simulated sunlight from a xenon arc lamp set at 6.7 Watts/meter$^2$ UVA and 50,000 lumens/meter$^2$, and an activated state luminous transmittance at saturation less than 60 percent when activated at 28° C. by simulated sunlight from a xenon arc lamp through an UV blocking transparency rendering an irradiance integrated between 380 and 420 nanometers of 0.75 Watts/meter$^2$ and 1,700 lumens/meter$^2$.

25. The photochromic article of claim 24 wherein the photochromic article is adapted to exhibit an unactivated state luminous transmittance of greater than 80 percent at 23° C., an activated state luminous transmittance at saturation less than 30 percent when activated at 23° C. by simulated sunlight from a xenon arc lamp set at 6.7 Watts/meter$^2$ UVA and 50,000 lumens/meter$^2$, and an activated state luminous transmittance at saturation less than 40 percent when activated at 28° C. by simulated sunlight from a xenon arc lamp through an UV blocking transparency rendering an irradiance integrated between 380 and 420 nanometers of 0.75 Watts/meter$^2$ and 1,700 lumens/meter$^2$.

26. The photochromic article of claim 24 wherein the UV blocking transparency is a vehicular windshield.

27. The photochromic article of claim 1, wherein said photochromic article further comprises an interpenetrating polymer network comprising, an anisotropic material that is at least partially ordered, and a polymeric material, wherein said anisotropic material comprises said photochromic material, and said photochromic material is at least partially aligned with at least a portion of said anisotropic material.

28. A method for producing a photochromic article adapted to retain at least 12 percent of the delta OD measured in the Outdoor Test when tested in the Behind the Windshield Test comprising:
a) providing a substrate;
b) providing at least one photochromic material (b) of claim 1;
c) combining said photochromic material together with said substrate by a method chosen from:
  i) introducing photochromic material (b) with the starting materials used to form said substrate;
  ii) at least partially imbibing photochromic material (b) into at least one surface of said substrate;
  iii) applying at least a partial coating of a polymeric coating composition comprising photochromic material (b) to at least one surface of said substrate;
  iv) at least partially connecting a superstrate comprising photochromic material (b) to at least one surface of said substrate; or
  v) combinations of i), ii), ii) or iv).

29. The method of claim 28 further comprising adding a photochromic material (c) that is different from photochromic material (b), in (c) (i), (ii), (iii), (iv) or (v).

30. The method of claim 29 further comprising adding a fixed tint dye in (c) (i), (ii), (iii), (iv) or (v).

* * * * *

UNITED STATES PATENT AND TRADEMARK OFFICE
CERTIFICATE OF CORRECTION

PATENT NO. : 10,145,996 B2
APPLICATION NO. : 15/050500
DATED : December 4, 2018
INVENTOR(S) : Rachel L. DeMeio et al.

It is certified that error appears in the above-identified patent and that said Letters Patent is hereby corrected as shown below:

In the Claims

Column 81, Line 42, Claim 1, delete "$R_1$is" and insert -- $R_1$ is --

Column 83, Line 15, Claim 1, delete "r" and insert -- or --

Column 88, Line 49, Claim 1, delete "$C_1$-$C_4$acyloxy" and insert -- $C_1$-$C_4$ acyloxy --

Column 88, Lines 51-52, Claim 1, delete "benzylfuran" and insert -- benzofuran --

Column 92, Line 33, Claim 1, delete "substitutent" and insert -- substituent --

Column 95, Line 45, Claim 1, delete "substitutents" and insert -- substituents --

Column 99, Line 15, Claim 1, delete "$S_1$is" and insert -- $S_1$ is --

Column 99, Line 16, Claim 1, delete "$S_1$and" and insert -- $S_1$ and --

Column 112, Line 49, Claim 4, delete "$R_1$is" and insert -- $R_1$ is --

Column 114, Line 36, Claim 4, delete "=C(O)W" and insert -- --C(O)W --

Column 115, Line 39, Claim 4, delete "phenanthropyan" and insert -- phenanthropyran --

Column 116, Line 31, Claim 4, after "$R_{43}$," insert -- $R_{44}$, --

Column 120, Line 48, Claim 4, delete "$S_1$is" and insert -- $S_1$ is --

Column 120, Line 49, Claim 4, delete "$S_1$and" and insert -- $S_1$ and --

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)

Column 121, Line 24, Claim 5, delete "$C_1$-$C_6$alkyl" and insert -- $C_1$-$C_6$ alkyl --

Column 122, Line 11, Claim 5, delete "$S_1$is" and insert -- $S_1$ is --

Column 122, Line 12, Claim 5, delete "$S_1$and" and insert -- $S_1$ and --

Columns 129-130, Line 9, Claim 6, after " 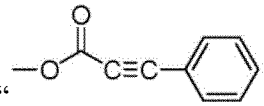 " insert -- , --

Column 135, Line 18, Claim 7, delete "phenanthropyan" and insert -- phenanthropyran --

Column 136, Line 21, Claim 7, delete "pyrano [" and insert -- pyrano[ --

Column 136, Line 24, Claim 7, delete "[3',4': 5,6]" and insert -- [3',4':5,6] --

Column 136, Line 57, Claim 7, delete "indeno [" and insert -- indeno[ --

Column 136, Line 62, Claim 7, delete "benzofuro [" and insert -- benzofuro[ --

Column 137, Line 49, Claim 7, delete "[3',2': 3,4]" and insert -- [3',2':3,4] --

Column 137, Line 59, Claim 7, delete "[3',2': 3,4]" and insert -- [3',2':3,4] --